United States Patent
Holzer et al.

(10) Patent No.: US 11,632,533 B2
(45) Date of Patent: *Apr. 18, 2023

(54) SYSTEM AND METHOD FOR GENERATING COMBINED EMBEDDED MULTI-VIEW INTERACTIVE DIGITAL MEDIA REPRESENTATIONS

(71) Applicant: Fyusion, Inc., San Francisco, CA (US)

(72) Inventors: Stefan Johannes Josef Holzer, San Mateo, CA (US); Dave Morrison, San Francisco, CA (US); Radu Bogdan Rusu, San Francisco, CA (US); George Haber, Los Altos Hills, CA (US); Keith Martin, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/373,737

(22) Filed: Jul. 12, 2021

(65) Prior Publication Data

US 2021/0344891 A1 Nov. 4, 2021

Related U.S. Application Data

(63) Continuation of application No. 15/969,749, filed on May 2, 2018, now Pat. No. 11,095,869, which is a
(Continued)

(51) Int. Cl.
*G06T 7/285* (2017.01)
*G06T 17/00* (2006.01)
(Continued)

(52) U.S. Cl.
CPC .......... *H04N 13/221* (2018.05); *G06T 7/285* (2017.01); *G06T 17/00* (2013.01); *H04N 13/117* (2018.05);
(Continued)

(58) Field of Classification Search
None
See application file for complete search history.

(56) References Cited

U.S. PATENT DOCUMENTS

| 2,534,821 A | 12/1950 | Ifield |
| 5,495,576 A | 2/1996 | Ritchey |

(Continued)

FOREIGN PATENT DOCUMENTS

| CN | 104462365 A | 3/2015 |
| CN | 105849781 A | 8/2016 |

(Continued)

OTHER PUBLICATIONS

U.S. Appl. No. 15/724,081, Examiner Interview Summary dated Mar. 4, 2019, 3 pages.
(Continued)

*Primary Examiner* — Anh-Tuan V Nguyen
(74) *Attorney, Agent, or Firm* — Kwan & Olynick LLP

(57) ABSTRACT

Various embodiments describe systems and processes for capturing and generating multi-view interactive digital media representations (MIDMRs). In one aspect, a method for automatically generating a MIDMR comprises obtaining a first MIDMR and a second MIDMR. The first MIDMR includes a convex or concave motion capture using a recording device and is a general object MIDMR. The second MIDMR is a specific feature MIDMR. The first and second MIDMRs may be obtained using different capture motions. A third MIDMR is generated from the first and second MIDMRs, and is a combined embedded MIDMR. The combined embedded MIDMR may comprise the second MIDMR being embedded in the first MIDMR, forming an embedded second MIDMR. The third MIDMR may include a general view in which the first MIDMR is displayed for interactive viewing by a user on a user device. The embed-
(Continued)

ded second MIDMR may not be viewable in the general view.

20 Claims, 50 Drawing Sheets

Related U.S. Application Data continuation-in-part of application No. 15/936,231, filed on Mar. 26, 2018, now Pat. No. 10,733,475, and a continuation-in-part of application No. 14/860,983, filed on Sep. 22, 2015, now Pat. No. 10,726,593, said application No. 15/936,231 is a continuation of application No. 14/800,638, filed on Jul. 15, 2015, now Pat. No. 9,940,541.

(51) Int. Cl.
| | |
|---|---|
| H04N 13/221 | (2018.01) |
| H04N 13/189 | (2018.01) |
| H04N 13/275 | (2018.01) |
| H04N 13/178 | (2018.01) |
| H04N 13/344 | (2018.01) |
| H04N 13/117 | (2018.01) |
| H04N 13/366 | (2018.01) |
| H04N 13/243 | (2018.01) |
| H04N 13/279 | (2018.01) |

(52) U.S. Cl.
CPC ......... *H04N 13/178* (2018.05); *H04N 13/189* (2018.05); *H04N 13/243* (2018.05); *H04N 13/275* (2018.05); *H04N 13/279* (2018.05); *H04N 13/344* (2018.05); *H04N 13/366* (2018.05); *G06T 2207/10021* (2013.01); *G06T 2207/30252* (2013.01); *G06T 2219/2008* (2013.01)

(56) References Cited

U.S. PATENT DOCUMENTS

| | | |
|---|---|---|
| 5,557,684 A | 9/1996 | Wang |
| 5,613,048 A | 3/1997 | Chen et al. |
| 5,613,056 A | 3/1997 | Gasper |
| 5,694,533 A | 12/1997 | Richards |
| 5,706,417 A | 1/1998 | Adelson |
| 5,847,714 A | 12/1998 | Naqvi |
| 5,850,352 A | 12/1998 | Moezzi et al. |
| 5,926,190 A | 7/1999 | Turkowski et al. |
| 6,031,564 A | 2/2000 | Ma et al. |
| 6,080,063 A | 6/2000 | Khosla |
| 6,185,343 B1 | 2/2001 | Ikeda |
| 6,252,974 B1 | 6/2001 | Martens et al. |
| 6,266,068 B1 | 7/2001 | Kang |
| 6,281,903 B1 | 8/2001 | Martin et al. |
| 6,327,381 B1 | 12/2001 | Rogina et al. |
| 6,385,245 B1 | 5/2002 | De Haan |
| 6,504,569 B1 | 1/2003 | Jasinschi et al. |
| 6,522,787 B1 | 2/2003 | Kumar |
| 6,778,207 B1 | 8/2004 | Lee et al. |
| 6,814,889 B1 | 11/2004 | O'Grady |
| 6,975,756 B1 | 12/2005 | Slabaugh |
| 7,167,180 B1 | 1/2007 | Shibolet |
| 7,593,000 B1 | 9/2009 | Chin |
| 7,631,261 B2 | 12/2009 | Williams |
| 7,631,277 B1 | 12/2009 | Nie |
| 8,078,004 B2 | 12/2011 | Kang et al. |
| 8,094,928 B2 | 1/2012 | Graepel |
| 8,160,391 B1 | 4/2012 | Zhu |
| 8,244,069 B1 | 8/2012 | Bourdev |
| 8,401,276 B1 | 3/2013 | Choe et al. |
| 8,503,826 B2 | 8/2013 | Klimenko |
| 8,504,842 B1 | 8/2013 | Meacham |
| 8,515,982 B1 | 8/2013 | Hickman |
| 8,589,069 B1 | 11/2013 | Lehman |
| 8,682,097 B2 | 3/2014 | Steinberg et al. |
| 8,803,912 B1 | 8/2014 | Fouts |
| 8,817,071 B2 | 8/2014 | Wang et al. |
| 8,819,525 B1 | 8/2014 | Holmer |
| 8,866,841 B1 | 10/2014 | Distler |
| 8,942,917 B2 | 1/2015 | Chrysanthakopoulos |
| 8,947,452 B1 | 2/2015 | Ballagh et al. |
| 8,947,455 B2 | 2/2015 | Friesen |
| 8,963,855 B2 | 2/2015 | Chen et al. |
| 8,966,356 B1 | 2/2015 | Hickman |
| 9,024,970 B2 | 5/2015 | Lynch |
| 9,027,117 B2 | 5/2015 | Wilairat |
| 9,043,222 B1 | 5/2015 | Kerr |
| 9,070,402 B2 | 6/2015 | Burtnyk |
| 9,094,670 B1 | 7/2015 | Furio et al. |
| 9,129,179 B1 | 9/2015 | Wong |
| 9,317,881 B1 | 4/2016 | Ledterman et al. |
| 9,325,899 B1 | 4/2016 | Chou et al. |
| 9,367,951 B1 | 6/2016 | Gray et al. |
| 9,390,250 B2 | 7/2016 | Kim et al. |
| 9,400,595 B2 | 7/2016 | Li et al. |
| 9,407,816 B1 | 8/2016 | Sehn |
| 9,412,203 B1 | 8/2016 | Garcia, III et al. |
| 9,472,161 B1 | 10/2016 | Ho |
| 9,621,768 B1 | 4/2017 | Lyon |
| 9,704,257 B1 | 7/2017 | Tuzel |
| 9,734,586 B2 | 8/2017 | Luo et al. |
| 9,865,033 B1 | 1/2018 | Jafarzadeh et al. |
| 9,865,058 B2 | 1/2018 | Mullins |
| 9,865,069 B1 | 1/2018 | Saporta |
| 9,886,771 B1 | 2/2018 | Chen |
| 9,898,742 B2 | 2/2018 | Higgins et al. |
| 9,904,056 B2 | 2/2018 | Raghoebardajal et al. |
| 9,910,505 B2 | 3/2018 | Park et al. |
| 9,928,544 B1 | 3/2018 | Hasan |
| 9,940,541 B2 | 4/2018 | Holzer et al. |
| 9,968,257 B1 | 5/2018 | Burt |
| 9,998,663 B1 | 6/2018 | François et al. |
| 10,055,882 B2 | 8/2018 | Marin |
| 10,147,211 B2 | 12/2018 | Holzer et al. |
| 10,157,333 B1 | 12/2018 | Wang |
| 10,176,592 B2 | 1/2019 | Holzer et al. |
| 10,176,636 B1 | 1/2019 | Neustein |
| 10,204,448 B2 | 2/2019 | Hazeghi |
| 10,222,932 B2 | 3/2019 | Holzer et al. |
| 10,242,474 B2 | 3/2019 | Holzer et al. |
| 10,262,426 B2 | 4/2019 | Holzer et al. |
| 10,275,935 B2 | 4/2019 | Holzer |
| 10,284,794 B1 | 5/2019 | Francois |
| 10,306,203 B1 | 5/2019 | Goyal |
| 10,360,601 B1 | 7/2019 | Adegan |
| 10,373,260 B1 | 8/2019 | Haller, Jr. |
| 10,382,739 B1 | 8/2019 | Rusu |
| 10,430,995 B2 | 10/2019 | Holzer |
| 10,574,974 B2 | 2/2020 | Arora |
| 10,657,647 B1 | 5/2020 | Chen |
| 10,668,965 B2 | 6/2020 | Czinger |
| 10,719,939 B2 | 7/2020 | Holzer et al. |
| 10,725,609 B2 | 7/2020 | Holzer et al. |
| 10,726,560 B2 | 7/2020 | Holzer et al. |
| 10,748,313 B2 | 8/2020 | Holzer et al. |
| 10,750,161 B2 | 8/2020 | Holzer et al. |
| 10,818,029 B2 | 10/2020 | Holzer et al. |
| 10,846,913 B2 | 11/2020 | Holzer et al. |
| 10,852,902 B2 | 12/2020 | Holzer et al. |
| 11,006,095 B2 | 5/2021 | Holzer et al. |
| 11,055,534 B2 | 7/2021 | Beall |
| 11,138,432 B2 | 10/2021 | Holzer |
| 2001/0014172 A1 | 8/2001 | Baba |
| 2001/0046262 A1 | 11/2001 | Freda |
| 2002/0024517 A1 | 2/2002 | Yamaguchi et al. |
| 2002/0094125 A1 | 7/2002 | Guo |
| 2002/0190991 A1 | 12/2002 | Efran et al. |
| 2003/0086002 A1 | 5/2003 | Cahill et al. |
| 2003/0137506 A1 | 7/2003 | Efran |
| 2003/0137517 A1 | 7/2003 | Kondo |
| 2003/0185456 A1 | 10/2003 | Sato et al. |

(56) References Cited

U.S. PATENT DOCUMENTS

| | | |
|---|---|---|
| 2003/0231179 A1 | 12/2003 | Suzuki |
| 2004/0085335 A1 | 5/2004 | Burlnyk |
| 2004/0104935 A1 | 6/2004 | Williamson |
| 2004/0141014 A1 | 7/2004 | Kamiwada et al. |
| 2004/0184013 A1 | 9/2004 | Raskar et al. |
| 2004/0222987 A1 | 11/2004 | Chang et al. |
| 2004/0239699 A1 | 12/2004 | Uyttendaele |
| 2005/0018045 A1 | 1/2005 | Thomas |
| 2005/0041842 A1 | 2/2005 | Frakes |
| 2005/0046645 A1 | 3/2005 | Breton |
| 2005/0119550 A1 | 6/2005 | Serra |
| 2005/0151759 A1 | 7/2005 | Gonzalez-Banos et al. |
| 2005/0186548 A1 | 8/2005 | Tomlinson |
| 2005/0219264 A1 | 10/2005 | Shum et al. |
| 2005/0226502 A1 | 10/2005 | Cohen et al. |
| 2005/0232467 A1 | 10/2005 | Mohri et al. |
| 2005/0232510 A1 | 10/2005 | Blake |
| 2005/0253877 A1 | 11/2005 | Thompson |
| 2005/0283075 A1 | 12/2005 | Ma |
| 2005/0285874 A1 | 12/2005 | Zitnick et al. |
| 2006/0028552 A1 | 2/2006 | Aggarwal |
| 2006/0087498 A1 | 4/2006 | Evemy |
| 2006/0188147 A1 | 8/2006 | Rai et al. |
| 2006/0193535 A1 | 8/2006 | Mishima et al. |
| 2006/0250505 A1 | 11/2006 | Gennetten et al. |
| 2006/0256109 A1 | 11/2006 | Acker |
| 2007/0008312 A1 | 1/2007 | Zhou et al. |
| 2007/0058880 A1 | 3/2007 | Lienard |
| 2007/0064802 A1 | 3/2007 | Paniconi et al. |
| 2007/0070069 A1 | 3/2007 | Samarasekera |
| 2007/0110338 A1 | 5/2007 | Snavely et al. |
| 2007/0118801 A1 | 5/2007 | Harshbarger |
| 2007/0126928 A1 | 6/2007 | Klompnhouwer et al. |
| 2007/0159487 A1 | 7/2007 | Felt |
| 2007/0237420 A1 | 10/2007 | Steedly et al. |
| 2007/0237422 A1 | 10/2007 | Zhou et al. |
| 2007/0252804 A1 | 11/2007 | Engel et al. |
| 2007/0269054 A1 | 11/2007 | Takagi |
| 2008/0009734 A1 | 1/2008 | Houle |
| 2008/0025588 A1 | 1/2008 | Zhang |
| 2008/0033641 A1 | 2/2008 | Medalia |
| 2008/0106593 A1 | 5/2008 | Arfvidsson et al. |
| 2008/0151106 A1 | 6/2008 | Verburgh et al. |
| 2008/0152258 A1 | 6/2008 | Tulkki |
| 2008/0198159 A1 | 8/2008 | Liu et al. |
| 2008/0201734 A1 | 8/2008 | Lyon |
| 2008/0225132 A1 | 9/2008 | Inaguma |
| 2008/0232716 A1 | 9/2008 | Plagne |
| 2008/0246759 A1 | 10/2008 | Summers |
| 2008/0266142 A1 | 10/2008 | Sula |
| 2008/0278569 A1 | 11/2008 | Rotem et al. |
| 2008/0313014 A1 | 12/2008 | Fell et al. |
| 2009/0003725 A1 | 1/2009 | Merkel |
| 2009/0046160 A1 | 2/2009 | Hayashi |
| 2009/0077161 A1 | 3/2009 | Hamilton, II |
| 2009/0087029 A1 | 4/2009 | Coleman |
| 2009/0116732 A1 | 5/2009 | Zhou et al. |
| 2009/0141130 A1 | 6/2009 | Ortiz |
| 2009/0144173 A1 | 6/2009 | Mo et al. |
| 2009/0153549 A1 | 6/2009 | Lynch |
| 2009/0160934 A1 | 6/2009 | Hendrickson et al. |
| 2009/0163185 A1 | 6/2009 | Lim |
| 2009/0174709 A1 | 7/2009 | Kozlak |
| 2009/0208062 A1 | 8/2009 | Sorek et al. |
| 2009/0262074 A1 | 10/2009 | Nasiri et al. |
| 2009/0263045 A1 | 10/2009 | Szeliski et al. |
| 2009/0274391 A1 | 11/2009 | Areas et al. |
| 2009/0276805 A1 | 11/2009 | Andrews, II et al. |
| 2009/0303343 A1 | 12/2009 | Drimbarean et al. |
| 2010/0007715 A1 | 1/2010 | Lai |
| 2010/0017181 A1 | 1/2010 | Mouton et al. |
| 2010/0026788 A1 | 2/2010 | Ishikawa |
| 2010/0033553 A1 | 2/2010 | Levy |
| 2010/0060793 A1 | 3/2010 | Oz |
| 2010/0079667 A1 | 4/2010 | Türetken et al. |
| 2010/0098258 A1 | 4/2010 | Thorn |
| 2010/0100492 A1 | 4/2010 | Law |
| 2010/0110069 A1 | 5/2010 | Yuan |
| 2010/0111444 A1 | 5/2010 | Coffman |
| 2010/0164990 A1 | 7/2010 | Van Doorn |
| 2010/0171691 A1 | 7/2010 | Cook et al. |
| 2010/0188584 A1 | 7/2010 | Liu et al. |
| 2010/0215251 A1 | 8/2010 | Gunnewiek et al. |
| 2010/0225743 A1 | 9/2010 | Florencio et al. |
| 2010/0231593 A1 | 9/2010 | Zhou |
| 2010/0259595 A1 | 10/2010 | Trimeche et al. |
| 2010/0266172 A1 | 10/2010 | Shlomi |
| 2010/0305857 A1 | 12/2010 | Byrne et al. |
| 2010/0315412 A1 | 12/2010 | Sinha et al. |
| 2010/0329542 A1 | 12/2010 | Ramalingam |
| 2011/0007072 A1 | 1/2011 | Khan et al. |
| 2011/0033170 A1 | 2/2011 | Ikeda |
| 2011/0034103 A1 | 2/2011 | Fong |
| 2011/0040539 A1 | 2/2011 | Szymczyk et al. |
| 2011/0043604 A1 | 2/2011 | Peleg et al. |
| 2011/0064388 A1 | 3/2011 | Brown |
| 2011/0074926 A1 | 3/2011 | Khan |
| 2011/0090344 A1 | 4/2011 | Gefen |
| 2011/0105192 A1 | 5/2011 | Jung |
| 2011/0109618 A1 | 5/2011 | Nowak |
| 2011/0109726 A1 | 5/2011 | Hwang |
| 2011/0115886 A1 | 5/2011 | Nguyen |
| 2011/0141141 A1 | 6/2011 | Kankainen |
| 2011/0141227 A1 | 6/2011 | Bigioi et al. |
| 2011/0142289 A1 | 6/2011 | Barenbrug et al. |
| 2011/0142343 A1 | 6/2011 | Kim |
| 2011/0170789 A1 | 7/2011 | Amon et al. |
| 2011/0173565 A1 | 7/2011 | Ofek |
| 2011/0179373 A1 | 7/2011 | Moore et al. |
| 2011/0193941 A1 | 8/2011 | Inaba et al. |
| 2011/0214072 A1 | 9/2011 | Lindemann |
| 2011/0234750 A1 | 9/2011 | Lai |
| 2011/0248987 A1 | 10/2011 | Mitchell |
| 2011/0254835 A1 | 10/2011 | Segal |
| 2011/0261050 A1 | 10/2011 | Smolic et al. |
| 2011/0288858 A1 | 11/2011 | Gay |
| 2011/0313653 A1 | 12/2011 | Lindner |
| 2011/0316963 A1 | 12/2011 | Li |
| 2012/0007713 A1 | 1/2012 | Nasiri et al. |
| 2012/0013711 A1 | 1/2012 | Tamir et al. |
| 2012/0017147 A1 | 1/2012 | Mark |
| 2012/0019557 A1 | 1/2012 | Aronsson et al. |
| 2012/0028706 A1 | 2/2012 | Raitt et al. |
| 2012/0041722 A1 | 2/2012 | Quan et al. |
| 2012/0057006 A1 | 3/2012 | Joseph et al. |
| 2012/0062756 A1 | 3/2012 | Tian |
| 2012/0075411 A1 | 3/2012 | Matsumoto |
| 2012/0092348 A1 | 4/2012 | Mccutchen |
| 2012/0095323 A1 | 4/2012 | Eskandari |
| 2012/0099804 A1 | 4/2012 | Aguilera |
| 2012/0127172 A1 | 5/2012 | Wu et al. |
| 2012/0127270 A1 | 5/2012 | Zhang et al. |
| 2012/0139918 A1 | 6/2012 | Michail et al. |
| 2012/0147224 A1 | 6/2012 | Takayama |
| 2012/0148162 A1 | 6/2012 | Zhang et al. |
| 2012/0162223 A1 | 6/2012 | Hirai et al. |
| 2012/0162253 A1 | 6/2012 | Collins |
| 2012/0167146 A1 | 6/2012 | Incorvia |
| 2012/0198317 A1 | 8/2012 | Eppolito |
| 2012/0207308 A1 | 8/2012 | Sung |
| 2012/0212579 A1 | 8/2012 | Fröjdh et al. |
| 2012/0236201 A1 | 9/2012 | Larsen |
| 2012/0240035 A1 | 9/2012 | Gaucas et al. |
| 2012/0242798 A1 | 9/2012 | Mcardle |
| 2012/0257025 A1 | 10/2012 | Kim |
| 2012/0257065 A1 | 10/2012 | Velarde et al. |
| 2012/0258436 A1 | 10/2012 | Lee |
| 2012/0262580 A1 | 10/2012 | Huebner |
| 2012/0287123 A1 | 11/2012 | Starner |
| 2012/0293632 A1 | 11/2012 | Yukich |
| 2012/0294549 A1 | 11/2012 | Doepke |
| 2012/0300019 A1 | 11/2012 | Yang |
| 2012/0301044 A1 | 11/2012 | Nakada |
| 2012/0314027 A1 | 12/2012 | Tian |

(56) References Cited

U.S. PATENT DOCUMENTS

| | | |
|---|---|---|
| 2012/0314040 A1 | 12/2012 | Kopf et al. |
| 2012/0314899 A1 | 12/2012 | Cohen et al. |
| 2013/0002649 A1 | 1/2013 | Wu et al. |
| 2013/0016102 A1 | 1/2013 | Look et al. |
| 2013/0016897 A1 | 1/2013 | Cho et al. |
| 2013/0018881 A1 | 1/2013 | Bhatt |
| 2013/0044191 A1 | 2/2013 | Matsumoto |
| 2013/0050573 A1 | 2/2013 | Syed |
| 2013/0057644 A1 | 3/2013 | Stefanoski et al. |
| 2013/0063549 A1 | 3/2013 | Schnyder et al. |
| 2013/0071012 A1 | 3/2013 | Leichsenring |
| 2013/0076619 A1 | 3/2013 | Carr et al. |
| 2013/0113830 A1 | 5/2013 | Suzuki |
| 2013/0120581 A1 | 5/2013 | Daniels |
| 2013/0127844 A1 | 5/2013 | Koeppel et al. |
| 2013/0127847 A1 | 5/2013 | Jin |
| 2013/0129304 A1 | 5/2013 | Feinson |
| 2013/0141530 A1 | 6/2013 | Zavesky |
| 2013/0147795 A1 | 6/2013 | Kim |
| 2013/0147905 A1 | 6/2013 | Vivekanandan |
| 2013/0154926 A1 | 6/2013 | Kim et al. |
| 2013/0155180 A1 | 6/2013 | Wantland et al. |
| 2013/0162634 A1 | 6/2013 | Baik |
| 2013/0162787 A1 | 6/2013 | Cho |
| 2013/0176392 A1 | 7/2013 | Carr et al. |
| 2013/0195350 A1 | 8/2013 | Tanaka et al. |
| 2013/0204411 A1 | 8/2013 | Clark et al. |
| 2013/0208900 A1 | 8/2013 | Vincent |
| 2013/0212538 A1 | 8/2013 | Lemire |
| 2013/0219357 A1 | 8/2013 | Reitan |
| 2013/0240628 A1 | 9/2013 | Merwe et al. |
| 2013/0250045 A1 | 9/2013 | Ki et al. |
| 2013/0271566 A1 | 10/2013 | Chen et al. |
| 2013/0278596 A1 | 10/2013 | Wu et al. |
| 2013/0314442 A1 | 11/2013 | Langlotz et al. |
| 2014/0002440 A1 | 1/2014 | Lynch |
| 2014/0002472 A1 | 1/2014 | Sobeski |
| 2014/0009462 A1 | 1/2014 | McNamer et al. |
| 2014/0013414 A1 | 1/2014 | Bruck |
| 2014/0023341 A1 | 1/2014 | Wang |
| 2014/0037198 A1 | 2/2014 | Larlus-Larrondo et al. |
| 2014/0040742 A1 | 2/2014 | Park |
| 2014/0049607 A1 | 2/2014 | Amon et al. |
| 2014/0059674 A1 | 2/2014 | Sun et al. |
| 2014/0063005 A1 | 3/2014 | Ahn et al. |
| 2014/0078136 A1 | 3/2014 | Sohn et al. |
| 2014/0087877 A1 | 3/2014 | Krishnan |
| 2014/0092259 A1 | 4/2014 | Tsang |
| 2014/0100995 A1 | 4/2014 | Koshy |
| 2014/0107888 A1 | 4/2014 | Quast et al. |
| 2014/0118479 A1 | 5/2014 | Rapoport |
| 2014/0118483 A1 | 5/2014 | Rapoport |
| 2014/0118494 A1 | 5/2014 | Wu et al. |
| 2014/0125659 A1 | 5/2014 | Yoshida |
| 2014/0132594 A1 | 5/2014 | Gharpure |
| 2014/0152834 A1 | 6/2014 | Kosseifi |
| 2014/0153832 A1 | 6/2014 | Kwatra et al. |
| 2014/0177927 A1 | 6/2014 | Shieh |
| 2014/0192155 A1 | 7/2014 | Choi et al. |
| 2014/0198184 A1 | 7/2014 | Stein et al. |
| 2014/0199050 A1 | 7/2014 | Khalsa |
| 2014/0211989 A1 | 7/2014 | Ding et al. |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss et al. |
| 2014/0267616 A1 | 9/2014 | Krig |
| 2014/0275704 A1 | 9/2014 | Zhang et al. |
| 2014/0286566 A1 | 9/2014 | Rhoads |
| 2014/0293004 A1 | 10/2014 | Tsubaki |
| 2014/0293028 A1 | 10/2014 | Nguyen et al. |
| 2014/0297798 A1 | 10/2014 | Bakalash |
| 2014/0307045 A1 | 10/2014 | Richardt et al. |
| 2014/0340404 A1 | 11/2014 | Wang et al. |
| 2014/0362198 A1 | 12/2014 | Nakayama |
| 2014/0365888 A1 | 12/2014 | Curzon |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0022518 A1 | 1/2015 | Takeshita |
| 2015/0042812 A1 | 2/2015 | Tang |
| 2015/0046875 A1 | 2/2015 | Xu |
| 2015/0073570 A1 | 3/2015 | Gonzalez-Mendoza |
| 2015/0078449 A1 | 3/2015 | Diggins |
| 2015/0097961 A1 | 4/2015 | Ure |
| 2015/0103170 A1 | 4/2015 | Nelson |
| 2015/0103197 A1 | 4/2015 | Djordjevic |
| 2015/0130799 A1 | 5/2015 | Holzer et al. |
| 2015/0130800 A1 | 5/2015 | Holzer et al. |
| 2015/0130894 A1 | 5/2015 | Holzer |
| 2015/0134651 A1 | 5/2015 | Holzer et al. |
| 2015/0138190 A1 | 5/2015 | Holzer et al. |
| 2015/0143239 A1 | 5/2015 | Birkbeck |
| 2015/0154442 A1 | 6/2015 | Takahashi |
| 2015/0188967 A1 | 7/2015 | Paulauskas |
| 2015/0193863 A1 | 7/2015 | Cao |
| 2015/0193963 A1 | 7/2015 | Chen et al. |
| 2015/0198443 A1 | 7/2015 | Yi et al. |
| 2015/0201176 A1 | 7/2015 | Graziosi |
| 2015/0206341 A1 | 7/2015 | Loper |
| 2015/0222880 A1 | 8/2015 | Choi et al. |
| 2015/0227285 A1 | 8/2015 | Lee |
| 2015/0227816 A1 | 8/2015 | Du et al. |
| 2015/0235408 A1 | 8/2015 | Gross et al. |
| 2015/0242686 A1 | 8/2015 | Lenka |
| 2015/0254224 A1 | 9/2015 | Kim |
| 2015/0269772 A1 | 9/2015 | Ha et al. |
| 2015/0271356 A1 | 9/2015 | Terada |
| 2015/0281323 A1 | 10/2015 | Gold |
| 2015/0294492 A1 | 10/2015 | Koch et al. |
| 2015/0309695 A1 | 10/2015 | Sannandeji |
| 2015/0318020 A1 | 11/2015 | Pribula |
| 2015/0319424 A1 | 11/2015 | Haimovitch-Yogev et al. |
| 2015/0324649 A1 | 11/2015 | Grewe |
| 2015/0325044 A1 | 11/2015 | Lebovitz |
| 2015/0339846 A1 | 11/2015 | Holzer et al. |
| 2015/0371440 A1 | 12/2015 | Pirchheim et al. |
| 2015/0379763 A1 | 12/2015 | Liktor et al. |
| 2016/0001137 A1 | 1/2016 | Phillips |
| 2016/0012646 A1 | 1/2016 | Huang |
| 2016/0026253 A1 | 1/2016 | Bradski |
| 2016/0027209 A1 | 1/2016 | Demirli |
| 2016/0034459 A1 | 2/2016 | Larsen et al. |
| 2016/0042251 A1 | 2/2016 | Cordova-Diba |
| 2016/0044240 A1 | 2/2016 | Beers |
| 2016/0050368 A1 | 2/2016 | Seo et al. |
| 2016/0055330 A1 | 2/2016 | Morishita |
| 2016/0061582 A1 | 3/2016 | Lucey |
| 2016/0063740 A1 | 3/2016 | Sakimoto et al. |
| 2016/0077422 A1 | 3/2016 | Wang |
| 2016/0078287 A1 | 3/2016 | Auge |
| 2016/0080684 A1 | 3/2016 | Farrell |
| 2016/0080830 A1 | 3/2016 | Kim et al. |
| 2016/0086381 A1 | 3/2016 | Jung et al. |
| 2016/0088287 A1 | 3/2016 | Sadi |
| 2016/0110913 A1 | 4/2016 | Kosoy |
| 2016/0139794 A1 | 5/2016 | Hammendorp |
| 2016/0140125 A1 | 5/2016 | Goyal et al. |
| 2016/0148349 A1 | 5/2016 | Cho |
| 2016/0171330 A1 | 6/2016 | Mentese |
| 2016/0189334 A1 | 6/2016 | Mason |
| 2016/0191895 A1 | 6/2016 | Yun |
| 2016/0203586 A1 | 7/2016 | Chang |
| 2016/0205341 A1 | 7/2016 | Hollander et al. |
| 2016/0210602 A1 | 7/2016 | Siddique |
| 2016/0261855 A1 | 9/2016 | Park |
| 2016/0267676 A1 | 9/2016 | Setomoto |
| 2016/0275283 A1 | 9/2016 | De Leon |
| 2016/0295127 A1 | 10/2016 | Yu |
| 2016/0350930 A1 | 12/2016 | Lin et al. |
| 2016/0350975 A1 | 12/2016 | Nakagawa |
| 2016/0353089 A1 | 12/2016 | Gallup et al. |
| 2016/0358337 A1 | 12/2016 | Dai et al. |

(56) References Cited

U.S. PATENT DOCUMENTS

| | | |
|---|---|---|
| 2016/0379415 A1 | 12/2016 | Espeset |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0024094 A1 | 1/2017 | Gresham |
| 2017/0026574 A1 | 1/2017 | Kwon |
| 2017/0053169 A1 | 2/2017 | Cuban |
| 2017/0067739 A1 | 3/2017 | Siercks |
| 2017/0084001 A1 | 3/2017 | Holzer et al. |
| 2017/0084293 A1 | 3/2017 | Holzer |
| 2017/0087415 A1 | 3/2017 | Nandimandalam et al. |
| 2017/0103510 A1 | 4/2017 | Wang |
| 2017/0103584 A1 | 4/2017 | Vats |
| 2017/0109930 A1 | 4/2017 | Holzer |
| 2017/0124769 A1 | 5/2017 | Saito |
| 2017/0124770 A1 | 5/2017 | Vats |
| 2017/0126988 A1 | 5/2017 | Holzer et al. |
| 2017/0140236 A1 | 5/2017 | Price et al. |
| 2017/0148179 A1 | 5/2017 | Holzer et al. |
| 2017/0148186 A1 | 5/2017 | Holzer et al. |
| 2017/0148199 A1 | 5/2017 | Holzer et al. |
| 2017/0148222 A1 | 5/2017 | Holzer et al. |
| 2017/0148223 A1 | 5/2017 | Holzer et al. |
| 2017/0158131 A1 | 6/2017 | Friebe |
| 2017/0206648 A1 | 7/2017 | Marra |
| 2017/0213385 A1 | 7/2017 | Yu |
| 2017/0231550 A1 | 8/2017 | Do et al. |
| 2017/0236287 A1 | 8/2017 | Shen |
| 2017/0249339 A1 | 8/2017 | Lester |
| 2017/0255648 A1 | 9/2017 | Dube |
| 2017/0256066 A1 | 9/2017 | Richard |
| 2017/0277363 A1 | 9/2017 | Holzer et al. |
| 2017/0277952 A1 | 9/2017 | Thommes |
| 2017/0278544 A1 | 9/2017 | Choi |
| 2017/0287137 A1 | 10/2017 | Lin et al. |
| 2017/0293894 A1 | 10/2017 | Taliwal |
| 2017/0308771 A1 | 10/2017 | Shimauchi |
| 2017/0316092 A1 | 11/2017 | Fighter |
| 2017/0330319 A1 | 11/2017 | Xu et al. |
| 2017/0337693 A1 | 11/2017 | Baruch |
| 2017/0344223 A1 | 11/2017 | Holzer et al. |
| 2017/0344808 A1 | 11/2017 | El-Khamy et al. |
| 2017/0357910 A1 | 12/2017 | Sommer et al. |
| 2017/0359570 A1 | 12/2017 | Holzer et al. |
| 2017/0364766 A1 | 12/2017 | Das |
| 2018/0012330 A1 | 1/2018 | Holzer et al. |
| 2018/0012529 A1 | 1/2018 | Chiba |
| 2018/0035105 A1 | 2/2018 | Choi |
| 2018/0035500 A1 | 2/2018 | Song |
| 2018/0045592 A1 | 2/2018 | Okita et al. |
| 2018/0046356 A1 | 2/2018 | Holzer et al. |
| 2018/0046357 A1 | 2/2018 | Holzer et al. |
| 2018/0046649 A1 | 2/2018 | Dal Mutto |
| 2018/0052665 A1 | 2/2018 | Kaur |
| 2018/0063504 A1 | 3/2018 | Haines |
| 2018/0082715 A1 | 3/2018 | Rymkowski et al. |
| 2018/0143023 A1 | 5/2018 | Bjorke |
| 2018/0143756 A1 | 5/2018 | Mildrew |
| 2018/0144547 A1 | 5/2018 | Shakib |
| 2018/0155057 A1 | 6/2018 | Irish |
| 2018/0158197 A1 | 6/2018 | Dasgupta |
| 2018/0165875 A1 | 6/2018 | Yu |
| 2018/0199025 A1 | 7/2018 | Holzer |
| 2018/0203877 A1 | 7/2018 | Holzer |
| 2018/0205941 A1 | 7/2018 | Kopf et al. |
| 2018/0211131 A1 | 7/2018 | Holzer et al. |
| 2018/0211404 A1 | 7/2018 | Zhu |
| 2018/0218235 A1 | 8/2018 | Holzer et al. |
| 2018/0218236 A1 | 8/2018 | Holzer et al. |
| 2018/0234671 A1 | 8/2018 | Yang |
| 2018/0240243 A1 | 8/2018 | Kim |
| 2018/0255290 A1 | 9/2018 | Holzer et al. |
| 2018/0268220 A1 | 9/2018 | Lee |
| 2018/0286098 A1 | 10/2018 | Lorenzo |
| 2018/0293774 A1 | 10/2018 | Yu |
| 2018/0315200 A1 | 11/2018 | Davydov |
| 2018/0336724 A1 | 11/2018 | Spring |
| 2018/0336737 A1 | 11/2018 | Yarady |
| 2018/0338126 A1 | 11/2018 | Bruen |
| 2018/0338128 A1 | 11/2018 | Bruen |
| 2018/0357518 A1 | 12/2018 | Taiki |
| 2018/0374273 A1 | 12/2018 | Holzer |
| 2019/0019056 A1 | 1/2019 | Pierce et al. |
| 2019/0025544 A1 | 1/2019 | Watanabe |
| 2019/0026956 A1 | 1/2019 | Gausebeck |
| 2019/0035149 A1 | 1/2019 | Chen et al. |
| 2019/0050664 A1 | 2/2019 | Yang et al. |
| 2019/0080499 A1 | 3/2019 | Holzer et al. |
| 2019/0094981 A1 | 3/2019 | Bradski |
| 2019/0132569 A1* | 5/2019 | Karpenko ........... G06F 3/04886 |
| 2019/0147221 A1 | 5/2019 | Grabner |
| 2019/0209886 A1 | 7/2019 | Harlow |
| 2019/0213406 A1 | 7/2019 | Porikli |
| 2019/0220991 A1 | 7/2019 | Holzer |
| 2019/0221021 A1 | 7/2019 | Holzer |
| 2019/0222776 A1 | 7/2019 | Carter |
| 2019/0235729 A1 | 8/2019 | Day |
| 2019/0244372 A1 | 8/2019 | Holzer |
| 2019/0251738 A1 | 8/2019 | Holzer |
| 2019/0278434 A1 | 9/2019 | Holzer et al. |
| 2019/0304064 A1 | 10/2019 | Zhang |
| 2019/0213392 A1 | 11/2019 | Pan et al. |
| 2019/0364265 A1 | 11/2019 | Matsunobu |
| 2020/0027263 A1 | 1/2020 | Holzer et al. |
| 2020/0045249 A1 | 2/2020 | Francois |
| 2020/0125877 A1 | 4/2020 | Phan |
| 2020/0128060 A1 | 4/2020 | Han |
| 2020/0137380 A1 | 4/2020 | Supikov |
| 2020/0167570 A1 | 5/2020 | Beall |
| 2020/0234397 A1 | 7/2020 | Holzer |
| 2020/0234451 A1 | 7/2020 | Holzer |

FOREIGN PATENT DOCUMENTS

| | | |
|---|---|---|
| CN | 105849781 B | 1/2020 |
| DE | 112014005165 | 7/2016 |
| DE | 112017004150 | 6/2019 |
| GB | 2534821 A | 8/2016 |
| KR | 20120110861 | 10/2012 |
| KR | 10159025661 | 2/2016 |
| WO | 2015073570 A2 | 5/2015 |
| WO | 2017053197 A1 | 3/2017 |
| WO | 2018035500 A1 | 2/2018 |
| WO | 2018052665 A1 | 3/2018 |
| WO | 2018154331 A1 | 8/2018 |
| WO | 2019209886 | 10/2019 |
| WO | 2020092177 A2 | 5/2020 |

OTHER PUBLICATIONS

U.S. Appl. No. 15/724,081, Non-Final Office Action dated Dec. 11, 2018, 12 pgs.

U.S. Appl. No. 15/724,087, Non-Final Office Action dated Jan. 31, 2019, 15 pgs.

U.S. Appl. No. 15/911,993, Notice of Allowance dated Jan. 12, 2021, 8 pgs.

U.S. Appl. No. 15/969,749, Examiner Interview Summary dated Apr. 20, 2021, 1 pg.

U.S. Appl. No. 15/969,749, Notice of Allowance dated Apr. 20, 2021, 5 pgs.

U.S. Appl. No. 16/179,746, Examiner Interview Summary dated Jun. 3, 2021, 1 pg.

U.S. Appl. No. 16/179,746, Final Office Action dated Jun. 3, 2021, 25 pgs.

U.S. Appl. No. 16/179,746, Non-Final Office Action dated Feb. 11, 2021, 25 pgs.

U.S. Appl. No. 16/362,547, Examiner Interview Summary dated Jul. 12, 2021, 2 pgs.

U.S. Appl. No. 16/362,547, Non-Final Office Action dated Mar. 23, 2021, 14 pgs.

U.S. Appl. No. 16/726,090, Advisory Action dated Jun. 21, 2021, 3 pgs.

(56) References Cited

OTHER PUBLICATIONS

U.S. Appl. No. 16/726,090, Examiner Interview Summary dated Feb. 25, 2021, 3 pgs.
U.S. Appl. No. 16/726,090, Examiner Interview Summary dated Jun. 21, 2021, 1 pg.
U.S. Appl. No. 16/726,090, Final Office Action dated Mar. 12, 2021, 13 pgs.
U.S. Appl. No. 14/800,638, Advisory Action dated May 9, 2017, 5 pgs.
Ballan, Luca et al., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010.
Buehler, Chris et al., "Unstructured Lumigraph Rendering", ACM, ACM SIGGRAPH, 2001, pp. 425-432.
Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.
Chan et al, "An Object-Based Approach to Image/Video-Based Synthesis and Processing for 3-D and Multiview Televisions", 2009, IEEE Transactions on Circuits and Systems for Video Tech, vol. 19, No. 6, pp. 821-831. (Year: 2009).
Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.
Chen, Shenchang E., "QuickTime VR—An Image-Based Approach to Virtual Environment Navigation", ACM, SIGGRAPH '95 Proceedings of the 22nd annual conference on Computer graphics and interactive techniques, 1995, 29-38.
Davis, Abe et al., "Unstructured Light Fields", Blackwell Publishing, Computer Graphics Forum, vol. 31, Issue 2, Pt. 1, May 2012, pp. 305-314.
Figueroa, Nadia, et al., "From Sense to Print: Towards Automatic 3D Printing from 3D Sensing Devices", IEEE, 2013 IEEE International Conference on Systems, Man, and Cybernetics (SMC, Oct. 13, 2013.).
Fitzgibbon, Andrew , "Automatic 3D Model Acquisition and Generation of New Images from Video Sequences", IEEE, 9th European Signal Processing Conference, Sep. 1998, 8 pgs.
Fusiello, Andrea et al., "View Synthesis from Uncalibrated Images Using Parallax", Proceedings of the 12th International Conference on Image Analysis and Processing, 2003, pp. 146-151.
Golovinsklty, Aleksey et al., "Shape-based Recognition of 3D Point Clouds in Urban Environment", IEEE, IEEE 12th International Conference on Computer Vision (ICCV), 2009, 2154-2161.
Gurdan, Tobias et al., "Spatial and Temporal Interpolation of Multi-View Image Sequences", Department of Computer Science, Technische UniversifitMunchen Ascending Technologies GmbH, Krailing, Germany, Section 2.3, Image Warping and Blending; Retrieved from the Internet, 12pg, [2014].
Keller, Maik et al., "Real-Time 3D Reconstruction in Dynamic Scenes Using Point-Based Fusion", IEEE, 2013 International Conference on 3DTV, Jul. 1, 2013.
Klappstein, Jens et al., "Moving Object Segmentation Using Optical Flow and Depth Information", Springer, In: Wada T., Huang F., Lin S. (eds) Advances in Image and Video Technology. PSIVT 2009. Lecture Notes in Computer Science, vol. 5414, 2009, pp. 611-623.
Kottamasu, V. L. P. , "User Interaction of One-Dimensional Panoramic Images for iPod Touch", Thesis, Linkoping University Electronic Press, LIU-IDA-LITH-EX-A—12/071—SE, Dec. 4, 2012.
Mian, Ajmal S. et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601.
Pollard, Stephen, et al., "Automatically Synthesising Virtual Viewpoints by Trinocular Image Interpolation—Detailed Report", HP, Technical Report, HP Laboratories Bristol HPL-97-166, Dec. 1997, 40 pgs.
Prisacariu, Victor A., et al., "Simultaneous 3D Tracking and Reconstruction on a Mobile Phone", IEEE International Symposium on Mixed and Augmented Reality, 2013, pp. 89-98.
Saito, Hideo et al., "View Interpolation of Multiple Cameras Based on Projective Geometry", Department of Information and Computer Science, Keio University and Presto, Japan Science and Technology Corporation (JST), retrieved from the Internet, 6pg, [2002].
Schiller, Ingo et al., "Data structure for Capturing Dynamic Scenes with a Time-of-Flight Camera", Springer-Verlad, Dyna3D 2009, LNCS 5742, 2009, 42-57.
Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet , 1997, 111 pgs.
Shade, Jonathan et al., "Layered Depth Images", Proceedings of the 25th Annual Conference on Computer Graphics and Interactive Techniques, ACM, SIGGRAPH, Jul. 24, 1998, pp. 231-242.
Shin, Hong-Chang et al., "FastView Synthesis using GPU for 3D Display", IEEE Transactions on Consumer Electronics, vol. 54, No. 4, Dec. 2008, pp. 2068-2076.
Snavely, Noah et al., "Photo Tourism: Exploring Photo Collections in 3D", ACM, ACM Transactions on Graphics (TOG)—Proceeding of ACM SIGGRAPH 2006, vol. 25, Issue 3, Jul. 2006, 835-846.
Steder, Bastian et al., "Robust On-line Model-based Object Detection from Range Images", International Conference on Intelligent Robots and Systems, pp. 4739-4744, Oct. 15, 2009, 6 pages.
Thyssen, Anthony , "ImageMagick v6 Examples—Color Basics and Channels", Website http://www.imagemagick.org/Usage/color_basics/, Retrieved Dec. 23, 2016, Mar. 9, 2011.
Torr, P.H.S. et al., "Robust Parameterization and Computation of the Trifocal Tensor", Elsevier, Image and Vision Computing, vol. 15, Issue 8, Aug. 1997, pp. 591-605.
Xiao, Jiangjian et al., "Tri-view Morphing", Elsevier, Computer Vision, and Image Understanding, vol. 96, Issue 3, Dec. 2004, pp. 345-366.
"U.S. Appl. No. 15/409,500, Examiner Interview Summary dated Mar. 5, 2019", 3 pages.
"U.S. Appl. No. 15/409,500, Non Final Office Action dated Dec. 11, 2018", 11 pgs.
"U.S. Appl. No. 15/409,500, Notice of Allowance dated Jun. 3, 2019", 8 pages.
"U.S. Appl. No. 15/601,863, Examiner Interview Summary dated Nov. 21, 2018", 4 pgs.
"U.S. Appl. No. 15/601,863, Non Final Office Action dated Sep. 20, 2018", 23 pages.
"U.S. Appl. No. 15/601,863, Notice of Allowance dated Jan. 24, 2019", 8 pages.
"International Application Serial No. PCT/US16/52192, Intl Search Report and Written Opinion dated Dec. 12, 2016", 8 pages, [7 pages].
U.S. Appl. No. 14/860,983, Final Rejection, dated Feb. 12, 2020, 18 pgs.
U.S. Appl. No. 15/620,506, Notice of Allowance and Fees Due (Ptol-85), dated Mar. 2, 2020, 10 pgs.
U.S. Appl. No. 15/632,709, Non-Final Rejection,dated May 22, 2020, 10 pgs.
U.S. Appl. No. 15/673,125, Final Rejection, dated Feb. 19, 2020, 17 pgs.
U.S. Appl. No. 15/713,406, Final Rejection, dated Feb. 19, 2020, 22 pgs.
U.S. Appl. No. 15/969,749, Final Rejection, dated Feb. 26, 2020, 15 pgs.
U.S. Appl. No. 15/969,749, Non-Final Rejection, dated Sep. 17, 2020, 15 pgs.
U.S. Appl. No. 16/451,371, NOA—Notice of Allowance and Fees Due (Ptol-85), dated Sep. 17, 2020, 5 pgs.
U.S. Appl. No. 16/451,371, Non-Final Rejection, dated Jun. 11, 2020,—9 pgs.
U.S. Appl. No. 16/586,868, USPTO e-Office Action: CTNF—Non-Final Rejection, dated Dec. 20, 2019, 19 pgs.
U.S. Appl. No. 16/778,981, Non-Final Rejection, dated Oct. 13, 2020,7 pgs.

(56) References Cited

OTHER PUBLICATIONS

U.S. Appl. No. 13/464,588, Non Final Office Action dated Aug. 2, 2019, 14 pgs.
U.S. Appl. No. 14/800,642, Non Final Office Action dated May 18, 2017, 17 pgs.
U.S. Appl. No. 15/408,211, Examiner Interview Summary dated Aug. 5, 2019, 3 pgs.
U.S. Appl. No. 15/408,211, Examiner Interview Summary dated Oct. 16, 2019, 2 pgs.
U.S. Appl. No. 15/426,994, Non Final Office Action dated Aug. 6, 2019, 22 pgs.
U.S. Appl. No. 15/428,104, Non Final Office Action dated Aug. 6, 2019, 24 pgs.
U.S. Appl. No. 15/620,506, Advisory Action dated Aug. 26, 2019, 2 pgs.
U.S. Appl. No. 15/620,506, Examiner Inteview Summary dated Aug. 26, 2019, 1 pg.
U.S. Appl. No. 15/620,506, Final Office Action dated Jun. 10, 2019, 17 pgs.
U.S. Appl. No. 15/632,709, Examiner Interview Summary dated Apr. 30, 2018, 1 pg.
U.S. Appl. No. 15/632,709, Final Office Action dated Jul. 17, 2018, 12 pgs.
U.S. Appl. No. 15/632,709, Non Final Office Action dated Apr. 3, 2019, 13 pgs.
U.S. Appl. No. 15/632,709, Non Final Office Action dated Apr. 30, 2018, 14 pgs.
U.S. Appl. No. 15/632,709, Notice of Allowance dated May 3, 2021, 9 pgs.
U.S. Appl. No. 15/673,125, Examiner Interview Summary dated Aug. 1, 2019, 3 pgs.
U.S. Appl. No. 15/673,125, Final Office Action dated Jun. 3, 2019, 17 pgs.
U.S. Appl. No. 15/713,406, Examiner Interview Summary dated Aug. 2, 2019, 3 pgs.
U.S. Appl. No. 15/713,406, Final Office Action dated Jun. 3, 2019, 21 pgs.
U.S. Appl. No. 15/724,081, Examiner Interview Summary dated Jul. 30, 2019, 3 pgs.
U.S. Appl. No. 15/724,081, Examiner Interview Summary dated Aug. 20, 2019, 2 pgs.
U.S. Appl. No. 15/724,081, Final Office Action dated May 14, 2019, 14 pgs.
U.S. Appl. No. 15/724,081, Notice of Allowance dated Aug. 20, 2019, 12 pgs.
U.S. Appl. No. 15/724,087, Final Office Action dated Jul. 1, 2019, 16 pgs.
U.S. Appl. No. 15/963,896, Non Final Office Action dated Apr. 18, 2019, 7 pgs.
U.S. Appl. No. 15/963,896, Notice of Allowance dated May 22, 2019, 8 pgs.
U.S. Appl. No. 16/384,578, Corrected Notice of Allowance dated Nov. 26, 2019, 2 pgs.
U.S. Appl. No. 16/384,578, Non Final Office Action dated May 9, 2019, 9 pgs.
U.S. Appl. No. 16/778,981, Corrected Notice of Allowance dated Mar. 31, 2021, 11 pgs.
U.S. Appl. No. 16/778,981, Examiner Interview Summary dated Mar. 31, 2021, 1 pg.
U.S. Appl. No. 16/778,981, Notice of Allowance dated Mar. 9, 2021, 9 pgs.
Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).
U.S. Appl. No. 14/819,473, Final Office Action dated Apr. 28, 2016, 45 pages.
U.S. Appl. No. 14/819,473, Non-Final Office Action dated Sep. 1, 2016, 36 pages.
U.S. Appl. No. 14/819,473, Non-Final Office Action dated Oct. 8, 2015, 44 pgs.
U.S. Appl. No. 14/860,983, Advisory Action dated Jan. 23, 2018, 3 pages.
U.S. Appl. No. 14/860,983, Advisory Action dated Mar. 26, 2019, 2 pages.
U.S. Appl. No. 14/860,983, Examiner Interview Summary dated Mar. 26, 2019, 2 pages.
U.S. Appl. No. 14/860,983, Examiner Interview Summary dated Apr. 8, 2019, 3 pages.
U.S. Appl. No. 14/860,983, Examiner Interview Summary dated Nov. 15, 2018, 3 pgs.
U.S. Appl. No. 14/860,983, Final Office Action dated Jan. 18, 2019, 19 pgs.
U.S. Appl. No. 14/860,983, Final Office Action dated Oct. 18, 2017, 21 pages.
U.S. Appl. No. 14/860,983, Non-Final Office Action dated Jun. 8, 2017, 26 pgs.
U.S. Appl. No. 14/860,983, Non-Final Office Action dated Aug. 7, 2018, 22 pages.
U.S. Appl. No. 15/408,211, Advisory Action dated Mar. 18, 2019, 4 pages.
U.S. Appl. No. 15/408,211, Examiner Interview Summary dated Mar. 4, 2019, 3 pages.
U.S. Appl. No. 15/408,211, Examiner Interview Summary dated Mar. 18, 2019, 2 pages.
U.S. Appl. No. 15/408,211, Examiner Interview Summary dated Apr. 3, 2019, 3 pages.
U.S. Appl. No. 15/408,211, Examiner Interview Summary dated Dec. 5, 2018, 3 pages.
U.S. Appl. No. 15/408,211, Final Office Action dated Jan. 11, 2019, 23 pgs.
U.S. Appl. No. 15/408,211, Non-Final Office Action dated Aug. 6, 2018, 22 pages.
U.S. Appl. No. 15/408,211, Non-Final Office Action dated May 2, 2019, 20 Pages.
U.S. Appl. No. 15/425,983, Advisory Action dated Oct. 12, 2018, 5 pgs.
U.S. Appl. No. 15/425,983, Examiner Interview Summary dated May 3, 2018, 3 pages.
U.S. Appl. No. 15/425,983, Examiner Interview Summary dated Jun. 5, 2018, 3 pages.
U.S. Appl. No. 15/425,983, Examiner Interview Summary dated Sep. 28, 2018, 3 pages.
U.S. Appl. No. 15/425,983, Examiner Interview Summary dated Oct. 12, 2018, 2 pgs.
U.S. Appl. No. 15/425,983, Examiner Interview Summary dated Dec. 12, 2018, 2 pgs.
U.S. Appl. No. 15/425,983, Final Office Action dated Jun. 26, 2018, 29 pages.
U.S. Appl. No. 15/425,983, Non-Final Office Action dated Jan. 11, 2018, 29 pages.
U.S. Appl. No. 15/425,983, Notice of Allowance dated Dec. 12, 2018, 14 pgs.
U.S. Appl. No. 15/425,988, Examiner Interview Summary dated Nov. 20, 2018, 3 pages.
U.S. Appl. No. 15/425,988, Non-Final Office Action dated Aug. 10, 2018, 18 pgs.
U.S. Appl. No. 15/425,988, Notice of Allowance dated Dec. 28, 2018, 8 pgs.
U.S. Appl. No. 15/426,994, Advisory Action dated Dec. 13, 2018, 3 pgs.
U.S. Appl. No. 15/426,994, Examiner Interview Summary dated Jan. 15, 2019, 3 pages.
U.S. Appl. No. 15/426,994, Final Office Action dated Oct. 10, 2018, 21 pgs.
U.S. Appl. No. 15/426,994, Non-Final Office Action dated Apr. 19, 2018, 22 pages.
U.S. Appl. No. 15/427,009, Notice of Allowance dated Sep. 6, 2018, 9 pages.
U.S. Appl. No. 15/428,104, Advisory Action dated Dec. 13, 2018, 3 pgs.

(56) References Cited

OTHER PUBLICATIONS

U.S. Appl. No. 15/428,104, Examiner Interview Summary dated Jan. 15, 2019, 3 pages.
U.S. Appl. No. 15/428,104, Examiner Interview Summary dated Dec. 7, 2018, 3 pgs.
U.S. Appl. No. 15/428,104, Final Office Action dated Oct. 10, 2018, 23 pgs.
U.S. Appl. No. 15/428,104, Non-Final Office Action dated Apr. 19, 2018, 21 pages.
U.S. Appl. No. 15/620,506, Non-Final Office Action dated Jan. 23, 2019, 13 pages.
U.S. Appl. No. 15/673,125, Non-Final Office Action dated Feb. 6, 2019, 17 pgs.
U.S. Appl. No. 15/682,362, Notice of Allowance dated Oct. 22, 2018, 9 pgs.
U.S. Appl. No. 15/713,406, Non-Final Office Action dated Jan. 30, 2019, 21 pgs.
U.S. Appl. No. 15/717,889, Advisory Action dated Jul. 6, 2021, 3 pgs.
U.S. Appl. No. 15/717,889, Examiner Interview Summary dated Jun. 4, 2021, 2 pgs.
U.S. Appl. No. 15/717,889, Examiner Interview Summary dated Jul. 6, 2021, 2 pgs.
U.S. Appl. No. 15/717,889, Final Office Action dated Mar. 4, 2021, 37 pgs.
U.S. Appl. No. 14/530,669, Examiner Interview Summary dated Aug. 8, 2017, 2 pgs.
U.S. Appl. No. 15/717,889, Non-Final Rejection, dated Oct. 27, 2020, 40 pgs.
U.S. Appl. No. 15/911,993, Non-Final Rejection, dated Aug. 5, 2020, 6 pgs.
U.S. Appl. No. 16/179,746, Advisory Action (Ptol-303), dated Sep. 15, 2020, 2 pgs.
U.S. Appl. No. 16/179,746, Examiner Interview Summary Record (Ptol-413), dated Nov. 5, 2020, 2 pgs.
U.S. Appl. No. 16/362,547, Examiner Interview Summary Record (Ptol-413), dated Nov. 18, 2020, 1 pg.
U.S. Appl. No. 16/362,547, Advisory Action (Ptol-303), dated Nov. 18, 2020, 2 pgs.
U.S. Appl. No. 16/362,547, Final Rejection, dated Sep. 24, 2020, 14 pgs.
U.S. Appl. No. 16/362,547,Examiner Interview Summary Record (Ptol-413), dated Nov. 5, 2020, 2 pgs.
U.S. Appl. No. 16/426,323, Notice of Allowance and Fees Due (Ptol-85), dated Aug. 5, 2020, 11 pgs.
U.S. Appl. No. 16/586,868, Notice of Allowance and Fees Due (Ptol-85), dated Oct. 7, 2020, 2 pgs.
U.S. Appl. No. 16/586,868, Notice of Allowance and Fees Due (Ptol-85), dated Jul. 13, 2020,13 pgs.
U.S. Appl. No. 16/726,090, Non-Final Rejection, dated Nov. 19, 2020, 12 pgs.
U.S. Appl. No. 14/800,638, Non-Final Office Action dated Jul. 29, 2016, 11 pages.
U.S. Appl. No. 1/800,642, Notice of Allowance dated Aug. 6, 2018, 12 pages.
U.S. Appl. No. 12/101,883, Examiner Interview Summary dated Oct. 18, 2017, 2 pages.
U.S. Appl. No. 12/101,883, Examiner Interview Summary dated Nov. 15, 2018, 3 pgs.
U.S. Appl. No. 14/530,669, Advisory Action dated Aug. 8, 2017, 5 pgs.
U.S. Appl. No. 14/530,669, Examiner Interview Summary dated Apr. 14, 2017, 3 pages.
U.S. Appl. No. 14/530,669, Final Office Action dated Apr. 20, 2017, 25 pages.
U.S. Appl. No. 14/530,669, Non-Final Office Action dated Jan. 3, 2017, 26 pages.
U.S. Appl. No. 14/530,671, Non-Final Office Action dated Jan. 3, 2017, 32 pages.
U.S. Appl. No. 14/539,814, Non-Final Office Action dated Dec. 30, 2016, 37 pages.
U.S. Appl. No. 14/539,889, Non-Final Office Action dated Oct. 6, 2016, 14 pages.
U.S. Appl. No. 14/800,638, Examiner Interview Summary dated May 9, 2017, 2 pages.
U.S. Appl. No. 14/800,638, Examiner Interview Summary dated Nov. 7, 2016, 3 pages.
U.S. Appl. No. 14/800,638, Examiner Interview Summary dated Dec. 13, 2017, 1 page.
U.S. Appl. No. 14/800,638, Final Office Action dated Jan. 20, 2017, 12 pages.
U.S. Appl. No. 14/800,638, Non-Final Office Action dated Jun. 15, 2017, 12 pgs.
U.S. Appl. No. 14/800,638, Notice of Allowance dated Dec. 13, 2017, 9 pages.
U.S. Appl. No. 14/800,640, Advisory Action dated Jan. 5, 2018, 3 pages.
U.S. Appl. No. 14/800,640, Advisory Action dated Feb. 8, 2018, 2 pages.
U.S. Appl. No. 14/800,640, Examiner Interview Summary dated Feb. 8, 2018, 1 page.
U.S. Appl. No. 14/800,640, Examiner Interview Summary dated Oct. 23, 2018, 3 pages.
U.S. Appl. No. 14/800,640, Final Office Action dated Oct. 16, 2017, 15 pages.
U.S. Appl. No. 14/800,640, Non-Final Office Action dated Jun. 8, 2017, 14 pgs.
U.S. Appl. No. 14/800,640, Non-Final Office Action dated Jul. 17, 2018, 16 pages.
U.S. Appl. No. 14/800,640, Notice of Allowance dated Nov. 21, 2018, 7 pgs.
U.S. Appl. No. 14/800,640, Restriction Requirement dated Mar. 3, 2017, 5 pages.
U.S. Appl. No. 14/800,642, Advisory Action dated Jan. 5, 2018, 3 pages.
U.S. Appl. No. 14/800,642, Advisory Action dated Feb. 8, 2018, 3 pages.
U.S. Appl. No. 14/800,642, Examiner Interview Summary dated Feb. 8, 2018, 1 page.
U.S. Appl. No. 14/800,642, Examiner Interview Summary dated Aug. 6, 2018, 1 page.
U.S. Appl. No. 14/800,642, Final Office Action dated Oct. 17, 2017, 18 pages.
U.S. Appl. No. 14/800,642, Non-Final Office Action dated May 18, 2017, 17 pages.
U.S. Appl. No. 14/800,642, Notice of Allowance dated Aug. 6, 2018, 12 pages.
U.S. Appl. No. 14/819,473, Examiner Interview Summary dated Jul. 11, 2016, 3 pages.
U.S. Appl. No. 14/819,473, Examiner Interview Summary dated Aug. 17, 2016, 3 pages.
U.S. Appl. No. 14/819,473, Examiner Interview Summary dated Oct. 14, 2016, 3 pages.
Office Action (Final Rejection) dated Jul. 6, 2022 for U.S. Appl. No. 14/861,019 (pp. 1-36).
Office Action (Final Rejection) dated Jul. 22, 2022 for U.S. Appl. No. 15/427,030 (pp. 1-18).
Office Action (Notice of Allowance and Fees Due (PTOL-85)) dated May 18, 2022 for U.S. Appl. No. 16/389,544 (pp. 1-8).
Office Action (Notice of Allowance and Fees Due (PTOL-85)) dated Jun. 2, 2022 for U.S. Appl. No. 16/726,090 (pp. 1-7).
Office Action (Notice of Allowance and Fees Due (PTOL-85)) dated Jun. 29, 2022 for U.S. Appl. No. 17/338,217 (pp. 1-9).
Bulat et al.; "Human pose estimation via convolutional part heatmap regression," In ECCV, 2016 (Year: 2016).
Extract all frames from video files, Video Help Forum, Oct. 2010, 3 pages.
Fischler, Martin A.., et al., Random Sample Consensus: A Paradigm for Model Fitting with Applications to Image Analysis and Automated Cartography, ACM, Communications of the ACM, vol. 24, No. 6, Jun. 1981, 381-395 pgs.

(56) References Cited

OTHER PUBLICATIONS

Fusiello, Andrea, Specifying Virtual Cameras in Uncalibrated View Synthesis, IEEE Transactions on Circuits and Systems for Video Technology, vol. 17, No. 5, May 2007, 8 pages.
Gatys et al, "A Neural Algorithm of Artistic Style", Cornell University, arXiv:1508.06576v2 pp. 1-16. (Year: 2015).
Gibson, Simon, et al., Accurate Camera Calibration for Off-line, Video-Based Augmented Reality, IEEE, Proceedings of the International Symposium on Mixed and Augmented Reality (ISMAR'02) 10 pages.
Haines, Russell, U.S. Appl. No. 62/380,914, Specification and Drawings, p. 1-24 (Year: 2016).
International Application Serial No. PCT/US19/28807 Preliminary Report on Patentability dated 11/5/209 pgs.
International Application Serial No. PCT/US19/28807 Search Report and Written Opinion dated Oct. 8, 2019, 12 pgs.
International Application Serial No. PCT/US19/58204, Preliminary Report on Patentability dated May 14, 2021, 7 pgs.
International Application Serial No. PCT/US2019/058204, Search Report and Written Opinion dated Apr. 21, 2010 pages.
Intl Application Serial No. PCT/US19/030395, Intl Search Report and Written Opinion dated Sep. 2, 2019, 9 pgs.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
Matsunobu, Tom et al., U.S. Appl. No. 62/457,276, Specification, p. 1-19 (Year: 2017).
Mikolajczyk, Krystian, et al., A Performance Evaluation of Local Descriptors, IEEE Transactions on Pattern Analysis and Machine Intelligence, vol. 27, No. 10, Oct. 2005, 1615-1630.
Notice of Allowance dated Jun. 17, 2021 for U.S. Appl. No. 15/604,938 (pp. 1-12).
Notice of Allowance dated May 3, 2021 for U.S. Appl. No. 15/632,709 (pp. 1-9).
Nützi, Gabriel, et al. "Fusion of IMU and vision for absolute scale estimation in monocular SLAM." Journal of intelligent & robotic Systems 61.1-4 (2011): 287-299. (Year: 2011).
Office Action (Final Rejection) dated Jan. 19, 2022 for U.S. Appl. No. 16/726,090 (pp. 1-16).
Office Action (Final Rejection) dated Apr. 25, 2022 for U.S. Appl. No. 16/813,506 (pp. 1-17).
Office Action (Final Rejection) dated Aug. 20, 2021 for U.S. Appl. No. 16/362,547 (pp. 1-15).
Office Action (Non-Final Rejection) dated Mar. 21, 2022 for U.S. Appl. No. 14/861,019 (pp. 1-32).
Office Action (Non-Final Rejection) dated Mar. 24, 2022 for U.S. Appl. No. 16/362,547 (pp. 1-14).
Office Action (Non-Final Rejection) dated Apr. 14, 2022 for U.S. Appl. No. 17/338,217 (pp. 1-10).
Office Action (Non-Final Rejection) dated Sep. 22, 2021 for U.S. Appl. No. 16/726,090 (pp. 1-15).
Office Action (Non-Final Rejection) dated Oct. 14, 2021 for U.S. Appl. No. 15/427,030 (pp. 1-17).
Office Action (Non-Final Rejection) dated Oct. 28, 2021 for U.S. Appl. No. 16/813,506 (pp. 1-19).
Office Action (Non-Final Rejection) dated Nov. 10, 2021 for U.S. Appl. No. 16/389,544 (pp. 1-28).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 29, 2021 for U.S. Appl. No. 15/717,889 (pp. 1-12).
Office Action (Notice of Allowance and Fees Due (PTOL-85)) dated Sep. 30, 2021 for U.S. Appl. No. 16/179,746 (pp. 1-2).
Office Action (Notice of Allowance and Fees Due (PTOL-85)) dated Oct. 15, 2021 for U.S. Appl. No. 16/179,746 (pp. 1-2).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Jun. 3, 2021 for U.S. Appl. No. 16/179,746 (pp. 1-26).
Office Action dated Mar. 23, 2021 for U.S. Appl. No. 16/362,547 (pp. 1-15).
Qi Pan et al., "Rapid Scene Reconstruction on Mobile Phones from Panoramic Images", Oct. 2011, pp. 55-64 (Year: 2011).
Russell, Bryan C, et al. "LabelMe: a database and web-based tool forimage annotation." International Journal of Computer vision 77.1-3 (2008): 157-173. (Year: 2008).
Supplemental Notice of Allowability dated May 5, 2021 for U.S. Appl. No. 15/969,749 (pp. 1-2).
Utasi, Ákos, and Csaba Benedek. "A multi-view annotation tool for people detection evaluation." Proceedings of the Ist International Workshop on Visual interfaces forground truth collection in Computer vision applications. ACM, 2012. (Year: 2012) 7 pages.
Weigel, Christian, et al., Advanced 3D Video Object Synthesis Based on Trilinear Tensors, IEEE Tenth International Symposium on Consumer Electronics, 2006, 5 pages.
Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and ffigure 2.
Zhang, Guofeng, et al., Video stabilization based on a 3D perspective camera model, Springer, The Visual Computer (2009) 25, 997 pg.
Zhang, Zhengyou, et al., A robust technique for matching two uncalibrated images through the recovery of the unknown epipolar geometry, Elsevier, Artificial Intelligence 78, 1995, 87-119 pgs.
Zheng, et al., Conditional Random Fields as Recurrent Neural Networks, IEEE International Conference on Computer Vision, 1529-1537 pgs, [2016].
English Translation of CN104462365A (Year: 2015).
Office Action (Final Rejection) dated Sep. 2, 2022 for U.S. Appl. No. 16/362,547 (pp. 1-15).
Office Action (Non-Final Rejection) dated Sep. 12, 2022 for U.S. Appl. No. 16/813,506 (pp. 1-15).
Office Action (Non-Final Rejection) dated Oct. 4, 2022 for U.S. Appl. No. 17/352,654 (pp. 1-19).
Office Action (Non-Final Rejection) dated Oct. 5, 2022 for U.S. Appl. No. 17/483,573 (pp. 1-20).
Office Action (Non-Final Rejection) dated Oct. 5, 2022 for U.S. Appl. No. 17/519,452 (pp. 1-17).

* cited by examiner

SYSTEM AND METHOD FOR GENERATING COMBINED EMBEDDED MULTI-VIEW INTERACTIVE DIGITAL MEDIA REPRESENTATIONS

CROSS-REFERENCE TO RELATED APPLICATIONS

This application is a continuation of U.S. patent application Ser. No. 15/969,749 by Holzer et al., filed on May 2, 2018, titled SYSTEM AND METHOD FOR GENERATING COMBINED EMBEDDED MULTI-VIEW INTERACTIVE DIGITAL MEDIA REPRESENTATIONS, and is a continuation-in-part of U.S. patent application Ser. No. 14/860,983 by Holzer et al., filed on Sep. 22, 2015, titled ARTIFICIALLY RENDERING IMAGES USING VIEWPOINT INTERPOLATION AND EXTRAPOLATION, now Issued on Jul. 28, 2020 under Pat. No. 10,726,593, and is a continuation-in-part of U.S. patent application Ser. No. 15/936,231 by Holzer et al., filed on Mar. 26, 2018, titled ARTIFICIALLY RENDERING IMAGES USING INTERPOLATION OF TRACKED CONTROL POINTS, now Issued on Aug. 4, 2020 under Pat. No. 10,733,475 which is a continuation U.S. patent application Ser. No. 14/800,638 by Holzer et al., filed on Jul. 15, 2015, titled ARTIFICIALLY RENDERING IMAGES USING INTERPOLATION OF TRACKED CONTROL POINTS, now Issued on Apr. 10, 2018 under U.S. Pat. No. 9,940,541 The above referenced applications are incorporated by reference herein in their entirety and for all purposes.

TECHNICAL FIELD

The present disclosure relates generally to the capture and presentation of image sequences, and more specifically to capturing and generating content for multi-view interactive digital media representations (MIDMR) for augmented reality and virtual reality systems.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). Other existing methods of producing 3D models may be done by computer generation of polygons or texture mapping over a three-dimensional mesh and/or polygon models, which also require high processing times and resources. This limits the efficiency of these methods in processing speed as well as transfer rates when sending it over a network. Accordingly, improved mechanisms for extrapolating and presenting 3D image data are desirable.

SUMMARY

Provided are various mechanisms and processes relating to capturing and generating multi-view interactive digital media representations (MIDMRs). In one aspect, which may include at least a portion of the subject matter of any of the preceding and/or following examples and aspects, a method for automatically generating a MIDMR is provided. The method comprises obtaining a first MIDMR. The MIDMR includes a convex or concave motion capture using a recording device. The first MIDMR is a general object MIDMR. The method further comprises obtaining a second MIDMR. The second MIDMR is a specific feature MIDMR.

The method further comprises generating a third MIDMR from the first MIDMR and the second MIDMR. The first and second MIDMRs are obtained using different capture motions. The third MIDMR is a combined embedded MIDMR. The combined embedded MIDMR may comprise the second MIDMR being embedded in the first MIDMR, thereby forming an embedded second MIDMR.

The third MIDMR may include a general view in which the first MIDMR is displayed for interactive viewing by a user on a user device. The embedded second MIDMR may not be available for viewing in the general view. The general view may include a selectable tag located somewhere on the first MIDMR. The selectable tag corresponds to the embedded second MIDMR. The selection of the selectable tag may trigger a specific view to be displayed on the user device. The specific view corresponds to the embedded second MIDMR.

The method may further comprise generating a user template to assist in execution of the aforementioned steps. The method may further comprise automatically generating a website once the third MIDMR is generated.

The general object MIDMR may be a representation of a vehicle. Viewing angles of the third MIDMR are manipulated by rotating the device or moving the device along a translational path.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features.

In another aspect, which may include at least a portion of the subject matter of any of the preceding and/or following examples and aspects, a system is provided which comprises a processor, memory, and one or more programs stored in the memory. The one or more programs comprise instructions for performing the actions of described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION

Figure 1:
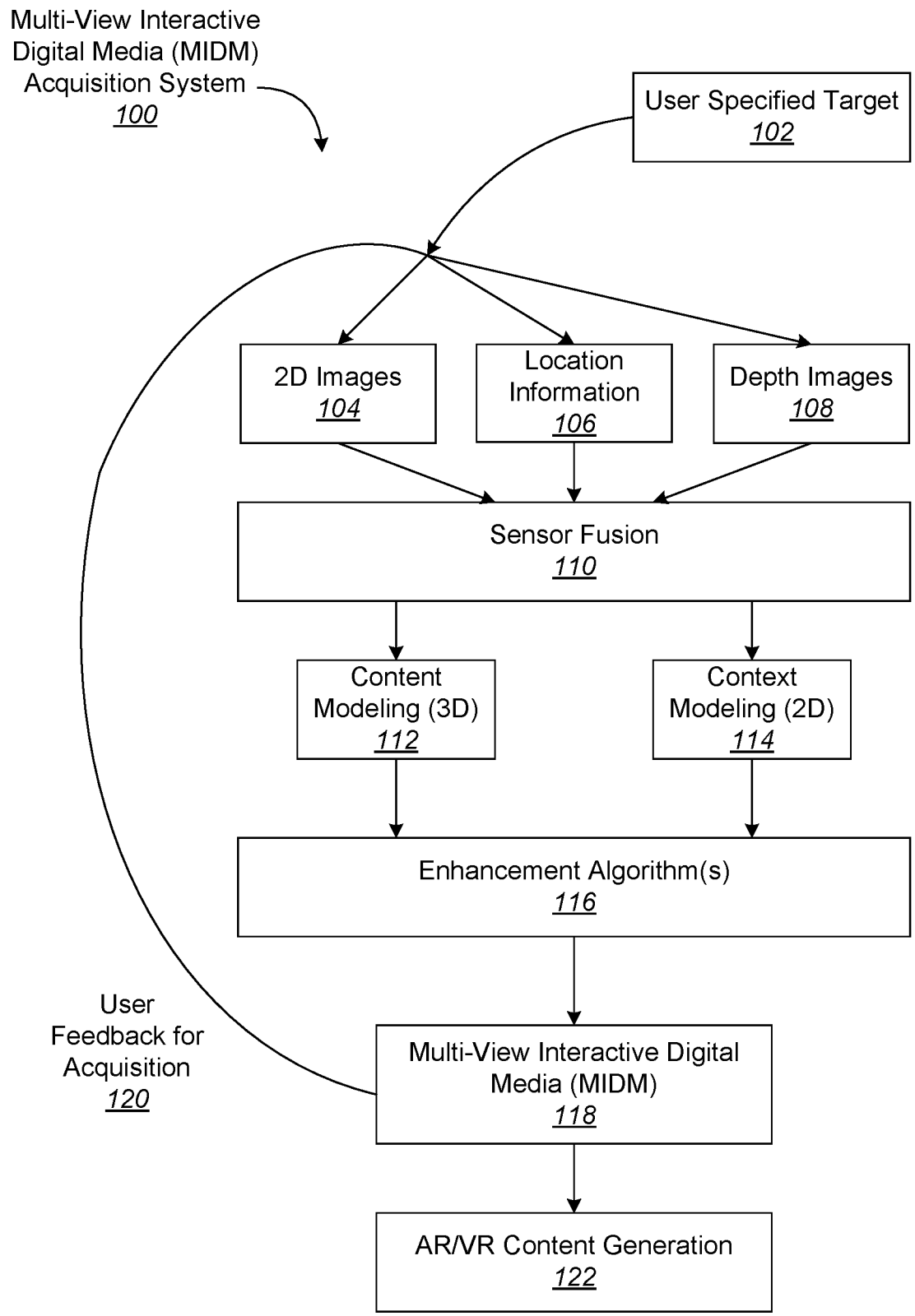
FIG. 1 illustrates an example of a multi-view interactive digital media representation acquisition system.

Reference will now be made in detail to some specific examples of the disclosure including the best modes contemplated by the inventors for carrying out the disclosure.

Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

Various systems and methods are presented herein for analyzing the spatial relationship between multiple images and video together with location information data, for the purpose of creating a single representation, a MIDMR, which eliminates redundancy in the data, and presents a user with an interactive and immersive active viewing experience. According to various embodiments described therein, a MIDMR provides a user with the ability to control the viewpoint of the visual information displayed on a screen.

Various systems and methods for rendering artificial intermediate images through view interpolation of one or more existing images, for the purpose creating missing frames for improved viewing experience, is described in U.S. patent application No. 14,800,638 by Holzer et al., filed on Jul. 15, 2015, titled ARTIFICIALLY RENDERING IMAGES USING INTERPOLATION OF TRACKED CONTROL POINTS, and U.S. patent application No. 14,860,983 by Holzer et al., filed on Sep. 22, 2015, titled ARTIFICIALLY RENDERING IMAGES USING VIEWPOINT INTERPOLATION AND EXTRAPOLATION, both of which applications are incorporated by reference herein in their entirety and for all purposes. According to various embodiments described therein, artificial images may be interpolated between captured image frames, selected keyframes and/or used as one or more frames in a stereo pair of image frames. Such interpolation may be implemented in an infinite smoothing technique to generate any number of intermediate frames to create a smooth and realistic transition between frames, as described in U.S. patent application No. 15,425,983 by Holzer et al., filed on Feb. 6, 2017, titled SYSTEM AND METHOD FOR INFINITE SMOOTHING OF IMAGE SEQUENCES, which application is incorporated by reference herein in its entirety and for all purposes.

Various systems and methods for stabilizing image frames using focal length and rotation, for the purpose of creating optically sound MIDMRs, are described in U.S. patent application No. 15,408,270 by Holzer et al., filed on Jan. 17, 2017, titled STABILIZING IMAGE SEQUENCES BASED ON CAMERA ROTATION AND FOCAL LENGTH, which application is incorporated by reference herein in its entirety and for all purposes. Such systems and methods for image stabilization may also be implemented to create stereoscopic pairs of image frames to be presented to the user to provide perception of depth, as described in U.S. patent application No. 15,408,211 by Holzer et al., filed on Jan. 17, 2017, titled GENERATING STEREOSCOPIC PAIRS OF IMAGES FROM A SINGLE LENS CAMERA, which application is incorporated by reference herein in its entirety and for all purposes.

In various embodiments, interpolated images may alternatively, and/or additionally, be rendered by systems and methods for image array capture on a 2D graph, as described in U.S. patent application No. 15,425,988 by Holzer et al., filed on Feb. 6, 2017, titled SYSTEM AND METHOD FOR INFINITE SYNTHETIC IMAGE GENERATION FROM MULTI-DIRECTIONAL STRUCTURED IMAGE ARRAY, which application is incorporated by reference herein in its entirety and for all purposes. Such image array capture of images may be enabled by systems and methods as described in U.S. patent application No. 15,427,009 by Holzer et al., filed on Feb. 7, 2017, titled MULTI-DIRECTIONAL STRUCTURED IMAGE ARRAY CAPTURE ON A 2D GRAPH, which application is incorporated by reference herein in its entirety and for all purposes.

Various systems and methods for real-time capture and generation of Multi-View Interactive Digital Media Representations (MIDMRs) for AR/VR systems are described in U.S. patent application No. 15,428,104 by Holzer et al., filed on Feb. 8, 2017, titled REAL-TIME MOBILE DEVICE CAPTURE AND GENERATION OF AR/VR CONTENT, which application is incorporated by reference herein in its entirety and for all purposes. In some embodiments, the movement (such as tilt) of a device may be implemented by various systems and methods for generating a MIDMR, as described in U.S. patent application No. 15,449,511 by Holzer et al., filed on Mar. 3, 2017, titled TILTS AS A MEASURE OF USER ENGAGEMENT FOR MULTIVIEW INTERACTIVE DIGITAL MEDIA REPRESENTATIONS, which application is incorporated by reference herein in its entirety and for all purposes.

Furthermore, various embodiments disclosed herein also provide the dynamic modification and augmentation of MIDMRs, and are described with reference to U.S. patent application No. 15,607,334 by Holzer et al., filed May 26, 2017, titled DYNAMIC CONTENT MODIFICATION OF IMAGE AND VIDEO BASED MULTI-VIEW INTERACTIVE DIGITAL MEDIA REPRESENTATIONS, which application is incorporated by reference herein in its entirety and for all purposes. Various systems and methods for estimating the progress of capture or manipulation of a MIDMR based on IMU data are described in U.S. patent application No. 15,601,874 by Trevor et al., filed May 22, 2017, titled INERTIAL MEASUREMENT UNIT PROGRESS ESTIMATION, which application is incorporated by reference herein in its entirety and for all purposes. In some embodiments, IMU data may be further implemented to generate a MIDMR including a three hundred sixty degree of an object based upon angle estimation using IMU data in accordance with embodiments of the present invention, as described in U.S. patent application No. 15,601,863 by Trevor et al., filed May 22, 2017, titled SNAPSHOTS AT PREDEFINED INTERVALS OR ANGLES, and in U.S. patent application No. 15,601,893 by Trevor et al., filed May 22, 2017, titled LOOP CLOSURE, which applications are incorporated by reference herein in their entirety and for all purposes.

Overview

According to various embodiments, a multi-view interactive digital media (MIDM) is used herein to describe any one of various images (or other media data) used to represent a dynamic surrounding view of an object of interest and/or contextual background. Such dynamic surrounding view may be referred to herein as multi-view interactive digital media representation (MIDMR). Such MIDM may comprise content for virtual reality (VR) and/or augmented reality (AR), and be presented to a user with a viewing device, such as a virtual reality headset. For example, a structured concave sequence of images may be live captured around an object of interest and presented as a MIDM representation (MIDMR), which presents a model with holographic characteristics when viewed through a viewing device. The term "AR/VR" shall be used herein when referring to both augmented reality and virtual reality.

The data used to generate a MIDMR can come from a variety of sources. In particular, data such as, but not limited to, two-dimensional (2D) images can be used to generate MIDMR. Such 2D images may be captured by a camera moving along a camera translation, which may or may not be uniform. The 2D images may be captured a constant intervals of time and/or distance of camera translation. These 2D images can include color image data streams such as multiple image sequences, video data, etc., or multiple images in any of various formats for images, depending on the application. Another source of data that can be used to generate MIDMR includes location information obtained from sources such as accelerometers, gyroscopes, magnetometers, GPS, WiFi, IMU-like systems (Inertial Measurement Unit systems), and the like. Yet another source of data that can be used to generate MIDMR can include depth images.

In the present example embodiment, the data can then be fused together. In some embodiments, a MIDMR can be generated by a combination of data that includes both 2D images and location information, without any depth images provided. In other embodiments, depth images and location information can be used together. Various combinations of image data can be used with location information, depending on the application and available data. In the present example embodiment, the data that has been fused together is then used for content modeling and context modeling. The content can be delineated as the object of interest and the context can be delineated as the scenery surrounding the object of interest. According to various embodiments, the content can be presented as a three-dimensional model, depicting an object of interest, although the content can be a two-dimensional image in some embodiments. Furthermore, in some embodiments, the context can be presented as a two-dimensional model depicting the scenery surrounding the object of interest. Although in many examples the context can provide two-dimensional views of the scenery surrounding the object of interest, the context can also include three-dimensional aspects in some embodiments.

In the present example embodiment, one or more enhancement algorithms can be applied. In particular example embodiments, various algorithms can be employed during capture of MIDM data, regardless of the type of capture mode employed. These algorithms can be used to enhance the user experience. For instance, automatic frame selection, image stabilization, object segmentation, view interpolation, image rotation, infinite smoothing, filters, and/or compression can be used during capture of MIDM data. In some examples, these enhancement algorithms can be applied to image data after acquisition of the data. In other examples, these enhancement algorithms can be applied to image data during capture of MIDM data. For example, automatic frame selection may be implemented to reduce storage of images by identifying and saving one or more keyframes from all the capture images such that viewpoints of an object of interest are more uniformly distributed in space. Image stabilization may be implemented to stabilize keyframes in a MIDM to produce improvements such as smoother transitions, improved/enhanced focus on the content, etc.

Additionally, view interpolation can be used to improve the viewing experience. In particular, to avoid sudden "jumps" between stabilized frames, synthetic, intermediate views can be rendered on the fly. View interpolation may only be applied to foreground regions, such as the object of interest. This can be informed by content-weighted keypoint tracking and IMU information, as well as by denser pixel-to-pixel matches. If depth information is available, fewer artifacts resulting from mismatched pixels may occur, thereby simplifying the process. As described above, view interpolation can be applied during capture of MIDM data in some embodiments. In other embodiments, view interpolation can be applied during MIDMR generation. These and other enhancement algorithms may be described with reference to systems and methods described in U.S. patent application No. 14,800,638, titled ARTIFICIALLY RENDERING IMAGES USING INTERPOLATION OF TRACKED CONTROL POINTS, and U.S. patent application No. 14,860,983 titled ARTIFICIALLY RENDERING IMAGES USING VIEWPOINT INTERPOLATION AND EXTRAPOLATION, previously referenced above.

In some embodiments, artificial images may be linearly interpolated based on images captured along a linear camera translation, such as an concave and/or convex arc. However, in some embodiments, images may be captured along a camera translation comprising multiple directions, such as a light field comprising multiple image captures from multiple camera locations. The image frames may be organized as a multi-direction structured image array, which may allow smooth navigation through the captured space. Given a structured image on 2D graph where each node is a keyframe, every connection between keyframe is a relative transformation. By triangulating the centers corresponding to each camera location, artificial images may be rendered based on information from the three nearest image frames. Artificial frames may be rendered by determining the nearest three neighboring keyframes on the graph based on a given spatial location, which may correspond to a selected camera position. The relative transformation from the selected position to the three neighboring keyframes is then determined by trilinear interpolation. For each pixel in the selected synthetic location, a corresponding pixel in the three keyframes is determined given a transformation and the differences between the three pixels in the keyframes is evaluated. The transformation with the minimum difference is used as the transformation of that pixel. Each pixel in the synthetic image is generated by blending its corresponding pixel in the key frames given the best transformation.

In some embodiments, IMU data may be further implemented to generate a MIDMR including a three hundred sixty degree of an object based upon angle estimation using IMU data in accordance with embodiments of the present invention, as described in U.S. patent application No. 15,601,863, titled SNAPSHOTS AT PREDEFINED INTERVALS OR ANGLES, and in U.S. patent application No. 15,601,893, titled LOOP CLOSURE, which applications are incorporated by reference herein in their entirety and for all purposes.

Content for augmented reality (AR) and/or virtual reality (VR) viewing may be generated from the MIDM data. According to various embodiments, additional image processing can generate a stereoscopic three-dimensional view of an object of interest to be presented to a user of a viewing device, such as a virtual reality headset. According to various examples, the subject matter featured in the images can be separated into content (foreground) and context (background) by semantic segmentation with neural networks and/or fine grained segmentation refinement using temporal conditional random fields. The resulting separation may be used to remove background imagery from the foreground such that only parts of the images corresponding to the object of interest can be displayed. In various embodiments, stereoscopic pairs of image frames may be generated by systems and methods described in the U.S. Patent Application titled GENERATING STEREO PAIRS OF IMAGES FROM A SINGLE Lens CAMERA by Holzer et al., which application is incorporated by reference herein in its entirety and for all purposes. Stabilization my image by determining image rotation and focal length may be implemented to create stereoscopic image pairs, as described in the U.S. Patent Application titled GENERATING STEREO PAIRS OF IMAGES FROM A SINGLE LENS CAMERA by Holzer et al., which application is incorporated by reference herein in its entirety and for all purposes.

Other systems and methods for real-time capture and generation of Multi-View Interactive Digital Media Representations (MIDMRs) for AR/VR systems are described in U.S. patent application No. 15,428,104, titled REAL-TIME MOBILE DEVICE CAPTURE AND GENERATION OF AR/VR CONTENT, and in U.S. patent application No. 15,449,511, titled TILTS AS A MEASURE OF USER ENGAGEMENT FOR MULTIVIEW INTERACTIVE DIGITAL MEDIA REPRESENTATIONS, and in U.S. patent application No. 15,607,334, titled DYNAMIC CONTENT MODIFICATION OF IMAGE AND VIDEO BASED MULTI-VIEW INTERACTIVE DIGITAL MEDIA REPRESENTATIONS, previously referenced above.

Additionally, view interpolation can be implemented to infinitely smooth the transition between image frames by generating any number of intermediate artificial image frames, as described in U.S. patent application No. 15,425,983, titled SYSTEM AND METHOD FOR INFINITE SMOOTHING OF IMAGE SEQUENCES, previously referenced above. Furthermore, capture keyframes and/or interpolated frames may be grouped into stereoscopic pairs (stereo pairs) of image frames. Stereoscopic pairs of the MIDMR may be presented to the user such that the user may perceive depth within the MIDMR, and add to the user experience when viewing a 3D MIDMR. The image frames within each stereoscopic pair may correspond to a 2D image used to create the MIDMR. The image frames within each stereoscopic pair may be a set of 2D images that are separated by a predetermined spatial baseline. Such baseline may be determined based on a predetermined angle of vergence at a particular focal point and the distance from the focal point. Image rotation may also be used to correct one or more images within the stereo pair such that the line of site to an object of interest or other desired focal point is perpendicular to the image frame. As such, stereographic pairs of frames may be generated on the fly from existing images captured by a single image view. Thus, experience of depth can be provided without storage of additional images, as required by existing methods.

The image frames are then mapped to a rotation display such that movement of a user and/or corresponding viewing device can determine which image frames to display. For example, image indexes are matched with various physical locations corresponding to a camera translation around an object of interest. Thus, a user can perceive a stereoscopic three-dimensional MIDMR of an object of interest at various angles and focal lengths. Such MIDMR provides a three-dimensional view of the content without rendering and/or storing an actual three-dimensional model using polygon generation or texture mapping over a three-dimensional mesh and/or polygon model. The three-dimensional effect provided by the MIDMR is generated simply through stitching of actual two-dimensional images and/or portions thereof, and grouping of stereoscopic pairs of images.

According to various embodiments, MIDM representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MIDMRs that allow the MIDMRs to be indexed with a high degree of efficiency and accuracy; and the ability of the user to interact and change the viewpoint of the MIDMR.

In particular example embodiments, the characteristics described above can be incorporated natively in the MIDM representation, and provide the capability for use in various applications. For instance, MIDMRs can be used to enhance various fields such as e-commerce, visual search, 3D printing, file sharing, user interaction, and entertainment. The MIDMR may also be displayed to a user as virtual reality (VR) and/or augmented reality (AR) at a viewing device, such as a virtual reality headset. In various embodiments, VR applications may simulate a user's physical presence in an environment and enable the user to interact with this space and any objects depicted therein. Images may also be presented to a user as augmented reality (AR), which is a live direct or indirect view of a physical, real-world environment whose elements are augmented (or supplemented) by computer-generated sensory input such as sound, video, graphics, or GPS data. When implemented in conjunction with systems and method described herein, such AR and/or VR content may be generated on the fly, thereby decreasing the number of images and other data to be stored by the system. Systems and methods described herein may also reduce processing time and power requirements, thereby allowing AR and/or VR content to be generated more quickly in real-time and/or near real-time.

In particular example embodiments, one or more MIDMRs may be presented as a combined embedded MIDMR. The combined embedded MIDMR may include one or more general views that display a general object MIDMR. The general object MIDMR may include a surrounding view of an object of interest at multiple viewing angles. The general view may further include one or more selectable tags embedded within image frames of the general object MIDMR. These selectable tags may be visible or invisible to the user, and correspond to various features or components of the object of interest. Selection of a tag may trigger a specific view of the corresponding feature or component which displays a more detailed specific feature MIDMR. The specific feature MIDMR displays a detailed view of the feature or component corresponding to the selected tag. In some embodiments, the specific feature MIDMR may be a detailed close-up extracted from the general object MIDMR. In other embodiments, the specific feature MIDMR may be a separate MIDMR of the corresponding feature or component that is captured using a different capture motion.

In some embodiments, a user template may be generated to assist a user in capturing and generating a combined embedded MIDMR. These may include prompts for a user to input the object type or other information about the object of interest. Based on the object of interest, the template may prompt the user to capture images of particular features or components of the object of interest. Such prompts may be based on a database including features or components captured by other users. In some embodiments, the system may include a neural network that is trained to recognize the object type of the object of interest to generate the user template. In some embodiments, the neural network may further be trained to detect and recognize particular features or components and prompt the user to capture corresponding specific view MIDMRs. The system may also automatically generate and place tags corresponding to the specific view MIDMRs. The tags may be automatically placed on a particular feature or component based on neural network recognition.

In particular embodiments, a webpage may be automatically generated that includes information of the object of interest, as well as the combined embedded MIDMR. In some embodiments, the webpage may be a listing to sell or buy the object of interest.

EXAMPLE EMBODIMENTS

According to various embodiments of the present disclosure, described systems and methods can capture, generate, and/or produce multi-view interactive digital media (MIDM) content for presentation of a multi-view interactive digital media representation (MIDMR), which may include content for virtual reality (VR) and/or augmented reality (AR). As used herein, multi-view interactive digital media (MIDM) is used to describe any one of various images (or other media data) used to represent a dynamic surrounding view of an object of interest and/or contextual background. Such MIDM may comprise content for virtual reality (VR) and/or augmented reality (AR), and be presented to a user with a viewing device, such as a virtual reality headset.

With reference to FIG. 1, shown is one example of a system 100 for real-time capture and generation of augmented reality (AR) and/or virtual reality (VR) content. In the present example embodiment, the system 100 is depicted in a flow sequence that can be used to generate multi-view interactive digital media (MIDM) for AR and/or VR. According to various embodiments, the data used to generate MIDM can come from a variety of sources. In particular, data such as, but not limited to two-dimensional (2D) images 104 can be used to generate MIDM. These 2D images can include color image data streams such as multiple image sequences, video data, etc., or multiple images in any of various formats for images, depending on the application. Another source of data that can be used to generate MIDM includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate MIDM can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, MIDM can be generated by a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 5, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 4.

According to various embodiments, context and content of MIDM are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that MIDM can be generated without a user specified target in some applications.

In the present example embodiment, one or more enhancement algorithms can be applied at enhancement algorithm(s) block 116. In particular example embodiments, various algorithms can be employed during capture of MIDM data, regardless of the type of capture mode employed. These algorithms can be used to enhance the user experience. For instance, automatic frame selection, stabilization, view interpolation, image rotation, infinite smoothing, filters, and/or compression can be used during capture of MIDM data. In some examples, these enhancement algorithms can be applied to image data after acquisition of the data. In other examples, these enhancement algorithms can be applied to image data during capture of MIDM data.

According to particular example embodiments, automatic frame selection can be used to create a more enjoyable MIDM view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, image stabilization can be used for MIDM in a manner similar to that used for video. In particular, keyframes in a MIDMR can be stabilized for to produce improvements such as smoother transitions, improved/enhanced focus on the content, etc. However, unlike video, there are many additional sources of stabilization for MIDM, such as by using IM information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for MIDM. Because points of interest in a MIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for MIDM. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because MIDM is often focused on a particular object of interest, MIDM can be content-weighted so that the object of interest is maximally stabilized in some examples.

Another way to improve stabilization in MIDM includes direct selection of a region of a screen. For instance, if a user taps to focus on a region of a screen, then records a convex series of images, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of MIDM in some embodiments. In other embodiments, view interpolation can be applied during MIDM generation.

In some embodiments, IMU data such as tilt, direction, acceleration, etc. may be used to detect captured frames that are "out of line" or deviating from a detected capture trajectory. For example, a 360 degree capture of an object may be desired with a smooth concave trajectory. IMU may be used to predict a trajectory and can be used to discard frames or prevent capture of frames that are too far out of the predicted trajectory beyond a certain threshold (or "out of line" threshold). For example, embodiments, if a sudden or rapid movement is detected and associated with a captured frame, such captured frame may be determined to be out of the trajectory line. As another example, such trajectory monitoring capability may eliminate a captured frame in which the object is too close or too far as compared to previously captured frames along a trajectory. In various embodiments, the "out of line" threshold may be determined via a combination of x,y translation of pixels and rotational movement of image frames in addition to the IMU data. For example, position of keypoints in captured image frames may be tracked over time in addition to the IMU data.

Such use of both translation and rotation are not implemented in existing methods of image stabilization or interpolation. Additionally, existing methods of video stabilization use optical stabilization in the lens. This video stabilization, which occurs post-processing, includes shifting, but does not include scaling. Thus, larger frames are required because stabilization without scaling may cause the edge of each video frame to be unaligned and unsmooth.

However, the methods and systems described herein may implement scaling for stabilization of artificial frames interpolated between captured frames. In one example embodiment, similarity 2D parameters, including x,y translation, a 2D rotation, and a 2D scale, may be used to determine the translation between frames. Such parameters may include 1 rotation variable, 2 translation variables, and 2 scaling variables. By using a combination of translation, rotation, and scale, the methods and systems described herein is able to account for movement toward and away from an object. In certain systems, if only keypoints are matched, then images may be interpolated along a camera translation using a least squares regression analysis. In other systems, keypoints may be matched using a random sample consensus (RANSAC) algorithm as described further in this description. Thus, the described methods and systems result in a set of images that have been stabilized along a smooth trajectory.

In some examples, view interpolation may be implemented as infinite smoothing, which may also be used to improve the viewing experience by creating a smoother transition between displayed frames, which may be actual or interpolated, as described above. Infinite smoothing may include determining a predetermined amount of possible transformations between frames. A Harris corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. a RANSAC (random sample consensus) algorithm may then be implemented to determine a number of the most common occurring transformations possible based on all possible transformations of the keypoints between frames. For example, a smooth flow space of eight possible transformations and/or motions for various pixels between frames may be discretized. Different transformations may be assigned to different pixels in a frame. Such keypoint detection, keypoint tracking, and RANSAC algorithms may be run offline. In some embodiments, infinite smoothing algorithms may be run in real time on the fly. For example, as the user navigate to a particular translation position, and if that translation position does not already correspond to an existing and/or captured image frame, the system may generate an appropriate artificial image frame corresponding to the particular translation position using the optimal transformation chosen from the possible transformation candidates.

In various embodiments, infinite smoothing and other methods of view interpolation described herein may generate a smooth view around an object or panoramic scene with fewer stored image frames. In some embodiments, a MIDMR may only require 10 or fewer stored image frames from which artificial frames may be interpolated. However in some embodiments, up to 100 stored image frames may be required. In yet other embodiments, up to 1000 stored image frames may be required. The number of stored image frames may depend on the angle range of camera translation. However, in such embodiments, the number of stored image frames required for a given angle of camera translation is less with the system and methods described herein, than for conventional and existing methods of image stitching. In some embodiments, up to 25 degrees of a concave camera rotation around an object may be generated between two stored image frames with sufficient overlapping imagery. In some embodiments, even greater degrees of such camera rotation may be generated from just two stored image frames. In various embodiments, the angle range of such camera rotation between two stored frames may depend upon the size of and amount of overlap in between the two stored frames.

In some examples, filters can also be used during capture or generation of MIDM to enhance the viewing experience of the MIDMR. Just as many popular photo sharing services provide aesthetic filters that can be applied to static, two-dimensional images, aesthetic filters can similarly be applied to surround images. However, because a MIDMR is more expressive than a two-dimensional image, and three-dimensional information is available in MIDM, these filters can be extended to include effects that are ill-defined in two dimensional photos. For instance, in a MIDMR, motion blur can be added to the background (i.e. context) while the content remains crisp. In another example, a drop-shadow can be added to the object of interest in a MIDMR.

In various examples, compression can also be used as an enhancement algorithm 116. In particular, compression can be used to enhance user-experience by reducing data upload and download costs. Because MIDMRs use spatial information, far less data can be sent for a MIDMR than a typical video, while maintaining desired qualities of the MIDMR. Specifically, the IMU, keypoint tracks, and user input, combined with the view interpolation described above, can all reduce the amount of data that must be transferred to and from a device during upload or download of a MIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MIDM 118 is generated after any enhancement algorithms are applied. The MIDM can provide a multi-view interactive digital media representation (MIDMR). In various examples, the MIDMR can present three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MIDM that allow the MIDM to be indexed with a high degree of efficiency and accuracy; and the ability of the user to interact and change the viewpoint of the MIDMR. In particular example embodiments, the characteristics described above can be incorporated natively in the MIDMR, and provide the capability for use in various applications. For instance, MIDM can be used to enhance various fields such as e-commerce, visual search, 3D printing, file sharing, user interaction, and entertainment.

Although MIDMR produced with described methods and systems may have some characteristics that are similar to other types of digital media such as panoramas, according to various embodiments, MIDMRs include additional features that distinguish them from these existing types of digital media. For instance, existing methods of generating panorama involve combining multiple overlapping images together by matching similar and/or matching points and/or areas in each image and simply stitching the matching points and/or areas together. Overlapping areas are discarded and the stitched image is then mapped to a sphere or cylinder. Thus such panoramas generated by existing methods have distorted edges and lack parallax, causing scenes with foreground and background to lack an impression of depth and look unrealistic.

Furthermore, a stitched panorama comprises one large image after overlapping images are stitched. MIDMRs, as described herein, comprise a series of images that are presented to the user as a user interacts with the MIDMR or viewing device. The information in the overlaps of the series of images, including interpolation information for generating artificial frames in between captured frames, is stored. Matching keypoints are identified to compute intermediate frames and linear blending is implemented to transform an image between two capture frames. To compute intermediate frames, transformations are implemented, such as homography which may be used for stabilization, as well as scaling, which allows interpolated keypoints in images to match up. No part of any image frame is discarded. This causes parallax to be visible in MIDMRs generated by systems and methods described herein, in contrast to existing panoramas, Additionally, a MIDMR can represent moving data. Nor is a MIDMR is not limited to a specific cylindrical, spherical or translational movement. Furthermore, unlike a stitched panorama, a MIDMR can display different sides of the same object. Additionally, various motions can be used to capture image data with a camera or other capture device.

According to various example embodiments, once MIDM 118 is generated, user feedback for acquisition 120 of additional image data can be provided. In particular, if a MIDMR is determined to need additional views to provide a more accurate model of the content or context, a user may be prompted to provide additional views. Once these additional views are received by the MIDM acquisition system 100, these additional views can be processed by the system 100 and incorporated into the MIDMR.

The MIDM 118 may further be processed at AR/VR content generation block 122 to create content for various AR/VR systems. Such AR/VR content block 122 may comprise a processing module which can segment the images to extract an object of interest and/or background imagery through semantic segmentation and/or fine-grained segmentation further described with reference to FIGS. 11 and 12, respectively. Further enhancement algorithms may be implemented at AR/VR content generation block 122, such as those described with reference to block 116. For example, view interpolation may be applied to determine parameters for any number of artificial intermediate images to result in an infinitely smooth transition between image frames, as further described with reference to FIGS. 13-21. Furthermore, stereoscopic pairs of image frames may be determined, which can be presented to the user to provide a perception of depth, as further described with reference to FIGS. 22-24. The indexes for the image frames may further be mapped to the rotation range of the camera translation, allowing image frames to correspond to the position of a user and/or viewing device.

Figure 2:
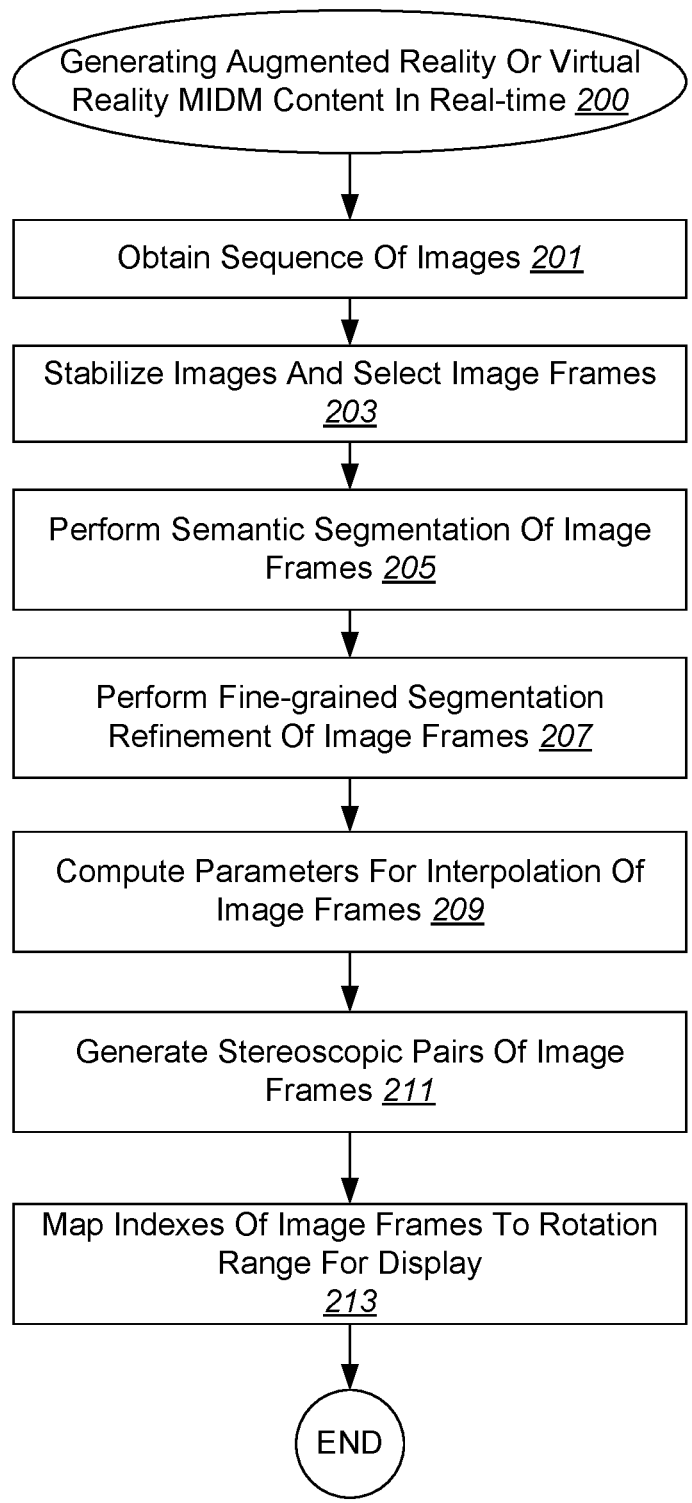
FIG. 2 illustrates an example of a process flow for real-time AR/VR content capture and generation.

With reference to FIG. 2, shown is an example of a method 200 for generating augmented reality and/or virtual reality MIDM content in real-time. In various embodiments, method 200 utilizes system 100 and/or various methods described with respect to process 300 described below. In some embodiments, method 200 may be a process performed at AR/VR content generation block 122. Method 200 may produce AR/VR content that provides a user with a three-dimensional MIDMR of an object of interest with depth. In various embodiments, some steps shown in FIG. 2 may not be implemented to create an MIDMR of an object of interest. In some embodiments, steps described throughout this specification may be implemented in addition to the steps shown in FIG. 2 in the creation of an MIDMR of an object of interest.

At step 201, a sequence of images is obtained. In some embodiments, the sequence of images may include 2D images, such as 2D images 104. In some embodiments, other data may also be obtained from the camera and/or user, including location information, such as location information 106, as well as depth information. At step 203, the images are stabilized and a set of image frames are selected. The selected image frames may be referred to as keyframes. Such keyframes may be processed into a MIDMR through content modeling 112, context modeling 114, and/or enhancement algorithms 116, as described above with reference to FIG. 1.

According to various aspects of the present disclosure, AR/VR content is further generated from the MIDM by extracting an object of interest or other content, such as a person, within a sequence of images to separate it from the background and other context imagery. This may be achieved by applying various segmentation algorithms and processes to the images. In an example embodiment, semantic segmentation of the keyframes is performed to separate the foreground from the background of the image within each keyframe at step 205. Such semantic segmentation may be performed by a segmenting neural network trained to identify and label pixels within each image frame. Semantic segmentation is further described below with reference to FIG. 11. Furthermore, fine-grained segmentation refinement of the keyframes may be performed at step 207. Step 207 may enhance and/or improve the separation of foreground from the background such that the object of interest is clearly and cleanly isolated without artifacts corresponding to the background. Fine-grained segmentation is further described below with reference to FIG. 12.

At step 209, parameters for interpolation of keyframes are computed. In some embodiments, parameters for interpolation may be determined by determining a number of likely transformations and applying the optimal transformation to each pixel within an image frame. In some embodiments, such parameters may be determined offline and used to render images at runtime when the MIDMR is viewed by a user. Interpolation of keyframes and rendering of artificial frames are further described below with reference to FIGS. 13-21. According to various methods described herein, any number of image frames may be rendered between two keyframes of the MIDMR based on the location of the user and/or viewing device, which provides a viewpoint at any location around an object of interest, as well as a smooth transition between keyframes.

At step 211, stereoscopic pairs of image frames are generated. In some embodiments, stereoscopic pairs may be generated by determining the pair of frames that will a desired perception of depth based on the distance of the camera to the object of interest and an angle of vergence. In some embodiments, one or more image frames within a stereoscopic pair may include an artificially interpolated image. In some embodiments, one or more image frames within a stereoscopic pair may be corrected by applying a rotation transformation such that the line of site is perpendicular to the plane of the image frame. Generation of stereoscopic pairs is further described below with reference to FIGS. 22-24.

At step 213, indexes of the image frames are mapped to a rotation range for display. In some embodiments, the rotation range may be concave arc around an object of interest. In other embodiments, the rotation range may be a convex image rotation. Various rotation ranges may correspond to the various types of camera translations and positions described with reference to FIGS. 4, 6A-6B, 7A-7E, 8 and 9. For example, in an image sequence of 150 images, the leftmost frame in a captured image sequence may be keyframe 0, and the last frame corresponding to the end of the camera translation may be keyframe 150. In some embodiments, the captured frames or selected keyframes may be uniformly distributed along the rotation range. In other embodiments, they may be distributed based on location and/or other IMU data.

In various embodiments, the physical viewing location is matched to the frame index. Thus, if a user and/or viewing device is at the middle of the rotation range, then an image frame corresponding to the middle of the rotation range should be displayed. In some embodiments, such information is loaded into a viewing device, such as headset 2500, described with reference to FIG. 25. Thus, based on the position of the headset 2500, the appropriate image and/or stereoscopic pair of images may be displayed to the user.

Figure 3:
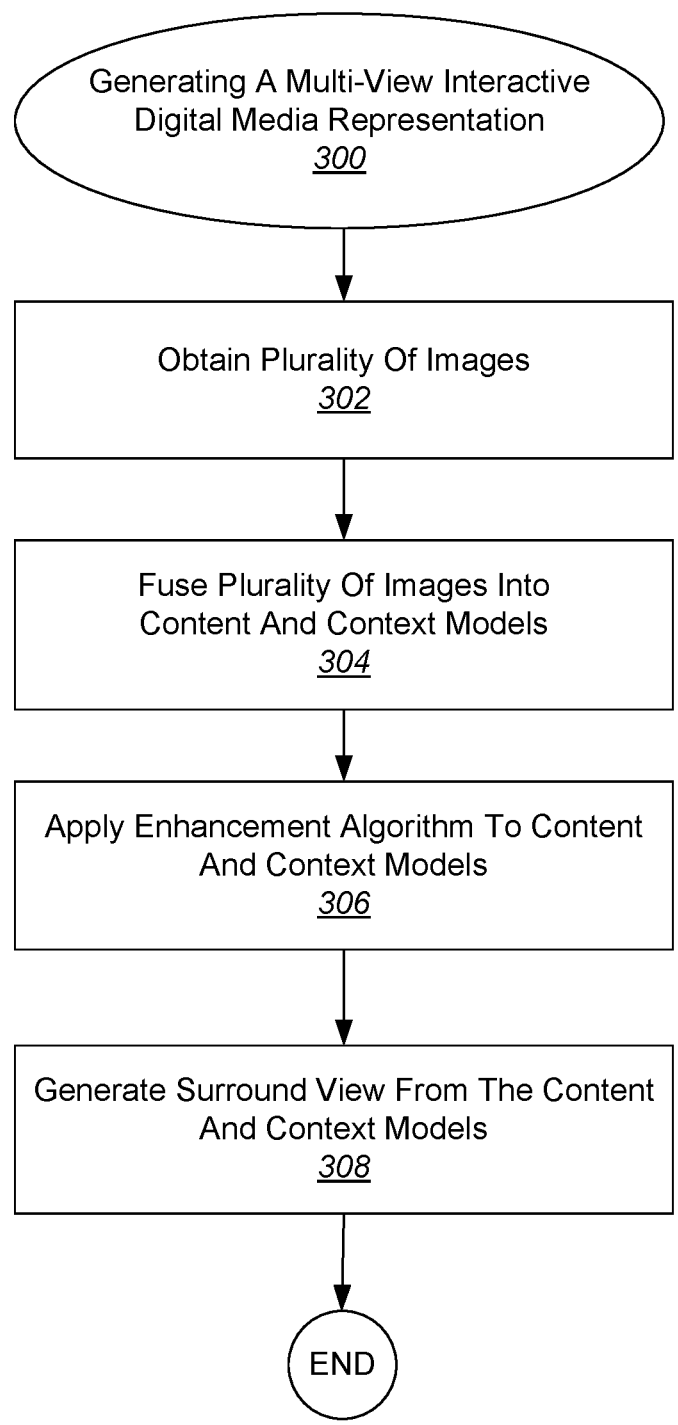
FIG. 3 illustrates an example of a process flow for generating a multi-view interactive digital media representation.

In various embodiments, AR/VR content generated by process flow 200 can include an object of interest which may be viewed by a user as a three-dimensional model from various angles and/or viewpoints. In some embodiments, the model in the MIDMR is not an actual three-dimensional model that is rendered, but a three-dimensional view experienced as a three-dimensional model by the user. For example, in certain embodiments, the MIDMR provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the MIDMR is generated simply through stitching of actual two-dimensional images and/or portions thereof. As used herein, the term "three-dimensional model" is used interchangeably with this type of three-dimensional view. However, in some embodiments, polygon models may be generated Generation of Multi-View Interactive Digital Media Representations With reference to FIG. 3, shown is illustrates an example of a process flow for generating a Multi-View Interactive Digital Media Representation (MIDMR). In the present example, a plurality of images is obtained at 302. According to various embodiments, the plurality of images may be various types of images obtained by various types of cameras. For example, a camera may be a digital camera in a continuous shooting mode (or burst mode) configured to capture a number of frames in a certain amount of time, such as five frames per second. In other embodiments, the camera may be a camera on a smartphone. In some embodiments, the camera may be configured to capture the plurality of images as a continuous video.

According to various embodiments, the plurality of images can include two-dimensional (2D) images or data streams. These 2D images can include location information that can be used to generate a MIDMR. In some embodiments, the plurality of images can include depth images 108, as also described above with regard to FIG. 1. The depth images can also include location information in various examples.

According to various embodiments, the plurality of images obtained at 302 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 304. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 306. These algorithms can be used to enhance the user experience. For instance, enhancement algorithms such as automatic frame selection, stabilization, view interpolation, image rotation, infinite smoothing, filters, and/or compression can be used. In some examples, these enhancement algorithms can be applied to image data during capture of the images. In other examples, these enhancement algorithms can be applied to image data after acquisition of the data.

In the present embodiment, a MIDMR is generated from the content and context models at 308. In various examples, the MIDMR can include a three-dimensional model of the content and a two-dimensional model of the context. According to various embodiments, depending on the mode of capture and the viewpoints of the images, the MIDMR model can include certain characteristics. For instance, some examples of different styles of MIDMRs include a locally concave view, a locally convex view, and a locally flat view. However, it should be noted that MIDMRs can include combinations of views and characteristics, depending on the application. In some embodiments, the MIDMR model is not an actual three-dimensional model that is rendered, but a three-dimensional view experienced as a three-dimensional model by the user. For example, the MIDMR may provide a three-dimensional view of the content without rendering and/or storing an actual three-dimensional model.

Figure 4:
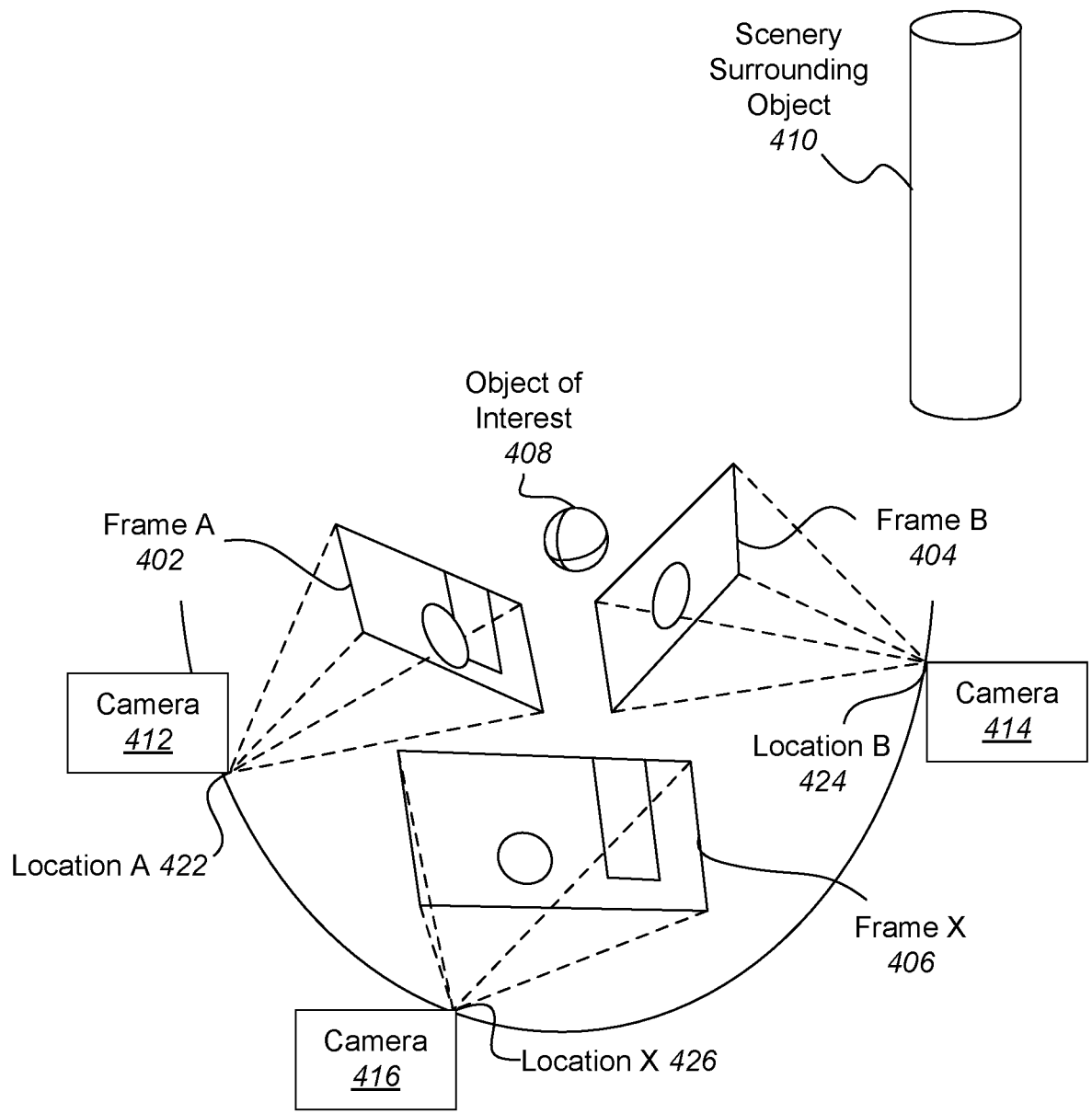
FIG. 4 illustrates one example of multiple camera views that can be fused into a three-dimensional (3D) model to create an immersive experience.

With reference to FIG. 4, shown is one example of multiple camera frames that can be fused together into a three-dimensional (3D) model to create an immersive experience in a Multi-View Interactive Digital Media Representation (MIDMR). According to various embodiments, multiple images can be captured from various viewpoints and fused together to provide a MIDMR. In the present example embodiment, three cameras 412, 414, and 416 are positioned at location A 422, location B 424, and location X 426, respectively, in proximity to an object of interest 408. Scenery can surround the object of interest 408 such as object 410. Frame A 402, frame B 404, and frame X 406 from their respective cameras 412, 414, and 416 include overlapping subject matter. Specifically, each frame 402, 404, and 406 includes the object of interest 408 and varying degrees of visibility of the scenery surrounding the object 410. For instance, frame A 402 includes a view of the object of interest 408 in front of the cylinder that is part of the scenery surrounding the object 410. View 406 shows the object of interest 408 to one side of the cylinder, and view 404 shows the object of interest without any view of the cylinder.

In the present example embodiment, the various frames, frame A 402, frame B 404, and frame X 416, along with their associated locations, location A 422, location B 424, and location X 426, respectively, provide a rich source of information about object of interest 408 and the surrounding context that can be used to produce a MIDMR. For instance, when analyzed together, the various frames 402, 404, and 426 provide information about different sides of the object of interest and the relationship between the object of interest and the scenery. According to various embodiments, this information can be used to parse out the object of interest 408 into content and the scenery as the context. Furthermore, as also described above with regard to FIGS. 1 and 2, various algorithms can be applied to images produced by these viewpoints to create an immersive, interactive experience when viewing a MIDMR.

In some embodiments Frame X 406 may be an artificially rendered image that is generated for a viewpoint at Location X 426 on a trajectory between Location A 422 and Location B 424. In such example, a single transform for viewpoint interpolation is used along the trajectory between two frames, Frame A 402 and Frame B 404. As previously described, Frame A 402 represents an image captured of objects 408 and 410 by a camera 412 located at Location A 422. Frame B 404 represents an image captured of object 408 by a camera 414 located at Location B 424. In the present example, the transformation (T_AB) is estimated between the two frames, where T_AB maps a pixel from frame A to frame B. This transformation is performed using methods such as homography, affine, similarity, translation, rotation, or scale.

In the present example, an artificially rendered image at Location X 426, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 402 to Frame X 406 based on T_AX and by transferring image information from Frame B 404 to Frame X 406 based on T_XB. Finally, the image information gathered from both Frames A and B is combined to generate an artificially rendered image at Location X 426. Interpolation to render artificial frames is further described below with references to FIGS. 13-21.

Figure 5:
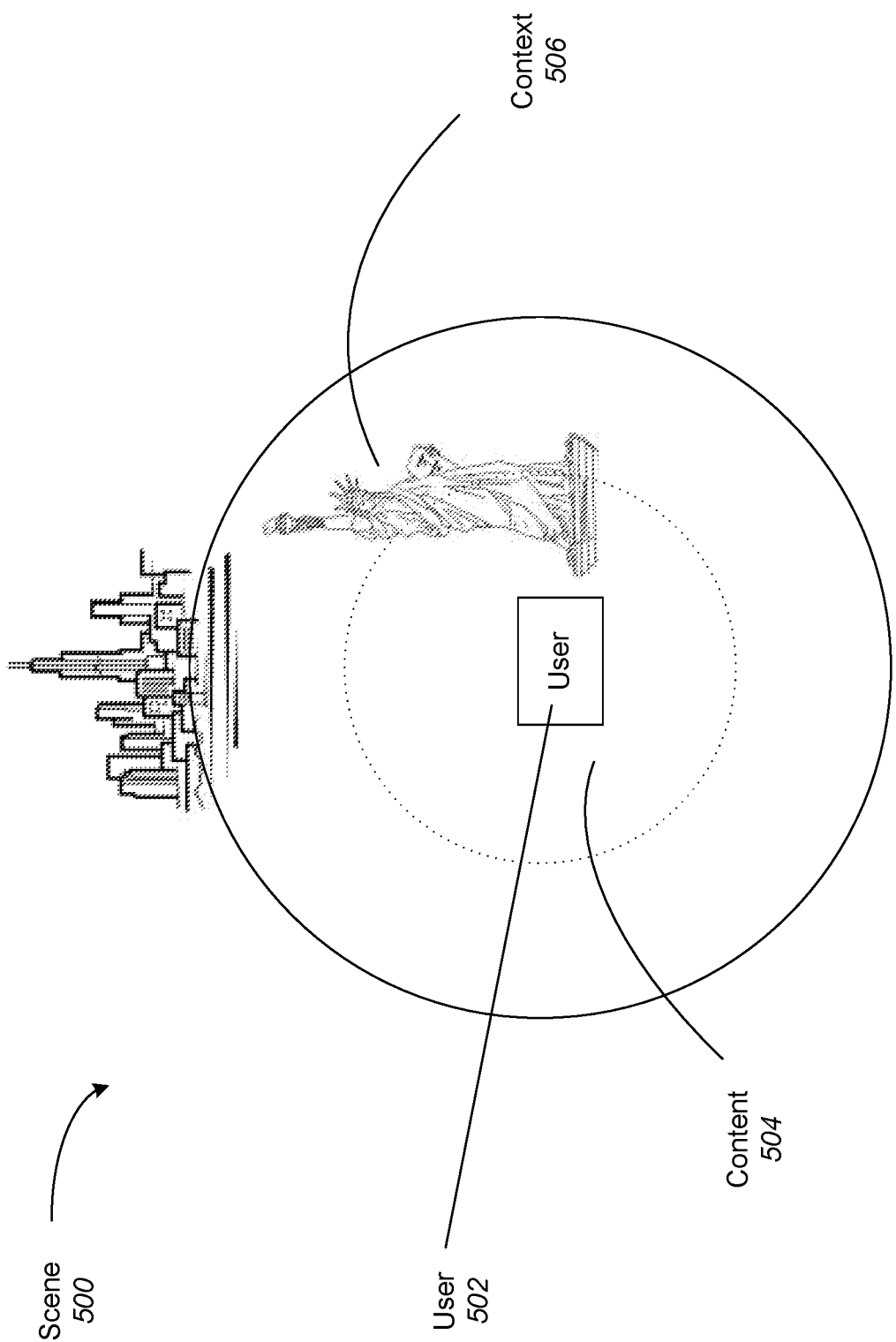
FIG. 5 illustrates one example of separation of content and context in a multi-view interactive digital media representation.

FIG. 5 illustrates one example of separation of content and context in a Multi-View Interactive Digital Media Representation (MIDMR). According to various embodiments of the present disclosure, a MIDMR may depict a scene 500. With reference to FIGS., shown is a user 502 located in a scene 500. The user 502 is capturing images of an object of interest, such as a statue. The images captured by the user constitute Multi-View Interactive Digital Media, such as digital visual data, that can be used to generate a MIDMR.

According to various embodiments of the present disclosure, the digital visual data included in a MIDMR can be, semantically and/or practically, separated into content 504 and context 506. According to particular embodiments, content 504 can include the object(s), person(s), or scene(s) of interest while the context 506 represents the remaining elements of the scene surrounding the content 504. In some examples, a MIDMR may represent the content 504 as three-dimensional data, and the context 506 as a two-dimensional panoramic background. In other examples, a MIDMR may represent both the content 504 and context 506 as two-dimensional panoramic scenes. In yet other examples, content 504 and context 506 may include three-dimensional components or aspects. In particular embodiments, the way that the MIDMR depicts content 504 and context 506 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 504 and the context 506 may be the same. In these examples, the MIDMR produced may have some characteristics that are similar to other types of digital media such as panoramas. However, according to various embodiments, MIDMRs include additional features that distinguish them from these existing types of digital media. For instance, existing methods of generating panorama involve combining multiple overlapping images together by matching similar and/or matching points and/or areas in each image and simply stitching the matching points and/or areas together. Overlapping areas are discarded and the stitched image is then mapped to a sphere or cylinder. Thus such panoramas generated by existing methods have distorted edges and lack parallax, causing scenes with foreground and background to lack an impression of depth and look unrealistic. Furthermore, a stitched panorama comprises one large image after overlapping images are stitched.

In contrast, MIDMRs, as described herein, comprise a series of images that are presented to the user as a user interacts with the MIDMR or viewing device. The information in the overlaps of the series of images, including interpolation information for generating artificial frames in between captured frames, is stored. Matching keypoints are identified to compute intermediate frames and linear blending is implemented to transform an image between two capture frames. To compute intermediate frames, transformations are implemented, such as homography which may be used for stabilization, as well as scaling, which allows interpolated keypoints in images to match up. No part of any image frame is discarded. This causes parallax to be visible in MIDMRs generated by systems and methods described herein, in contrast to existing panoramas, Additionally, a MIDMR can represent moving data. Nor is a MIDMR is not limited to a specific cylindrical, spherical or translational movement. Furthermore, unlike a stitched panorama, a MIDMR can display different sides of the same object. Additionally, various motions can be used to capture image data with a camera or other capture device.

Figures 6A, 6B:
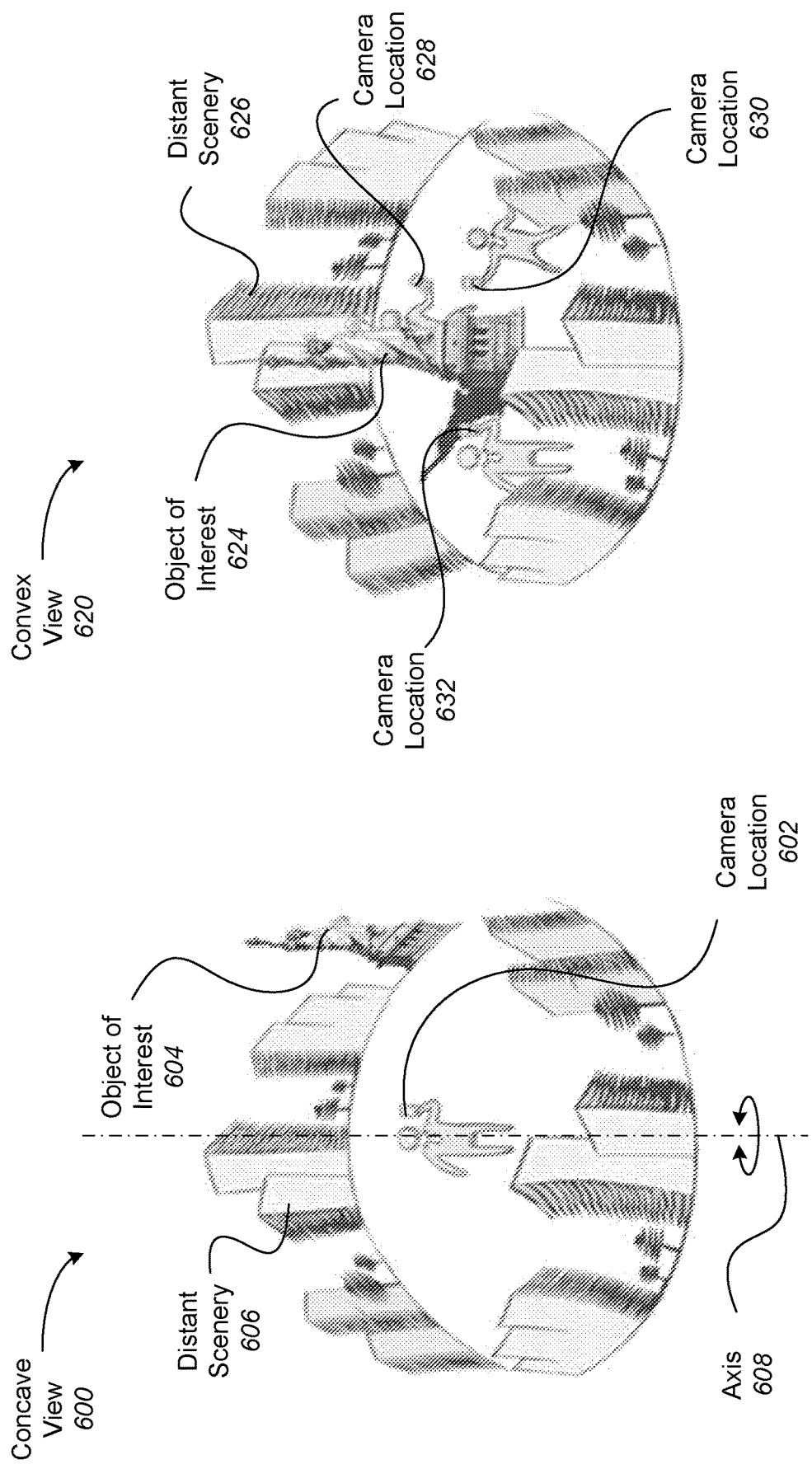
FIGS. 6A-6B illustrate examples of concave view and convex views, respectively, where both views use a back-camera capture style.

FIGS. 6A-6B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MIDMR.

With reference to FIG. 6A, shown is one example of a concave view 600 in which a user is standing along a vertical axis 608. In this example, the user is holding a camera, such that camera location 602 does not leave axis 608 during image capture. However, as the user pivots about axis 608, the camera captures a panoramic view of the scene around the user, forming a concave view. In this embodiment, the object of interest 604 and the distant scenery 606 are all viewed similarly because of the way in which the images are captured. In this example, all objects in the concave view appear at infinity, so the content is equal to the context according to this view.

With reference to FIG. 6B, shown is one example of a convex view 620 in which a user changes position when capturing images of an object of interest 624. In this example, the user moves around the object of interest 624, taking pictures from different sides of the object of interest from camera locations 628, 630, and 632. Each of the images obtained includes a view of the object of interest, and a background of the distant scenery 626. In the present example, the object of interest 624 represents the content, and the distant scenery 626 represents the context in this convex view.

FIGS. 7A-7E illustrate examples of various capture modes for Multi-View Interactive Digital Media (MIDM). Although various motions can be used to capture a surrounding view of an object and are not constrained to any particular type of motion, three general types of motion can be used to capture particular features or views described in conjunction MIDM representations (MIDMR). These three types of motion, respectively, can yield a locally concave MIDMR, a locally convex MIDMR, and a locally flat MIDMR. In some examples, a MIDMR can include various types of motions within the same MIDMR. As described with reference to FIGS. 7A-7E, the type of MIDMR (for example, concave or convex) is described with reference to the direction of the camera view.

Figure 7A:
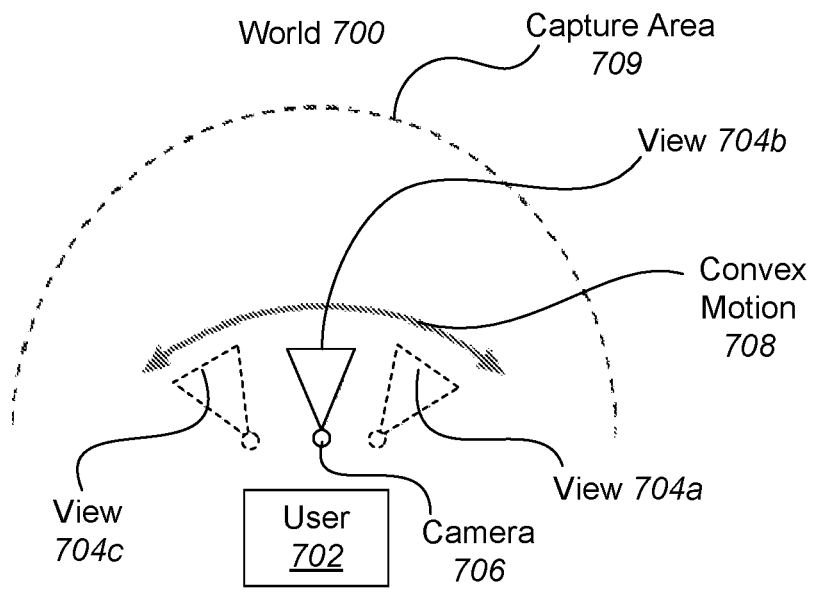
FIGS. 7A-7E illustrate examples of various capture modes for multi-view interactive digital media representations.

With reference to FIG. 7A, shown is an example of a back-facing, convex MIDMR being captured. According to various embodiments, a locally convex MIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 702 is using a back-facing camera 706 to capture images towards world 700, and away from user 702. As described in various examples, a back-facing camera refers to a device with a camera that faces away from the user, such as the camera on the back of a smart phone. The camera is moved in a concave motion 708, such that views 704a, 704b, and 704c capture various parts of capture area 709.

Figure 7B:
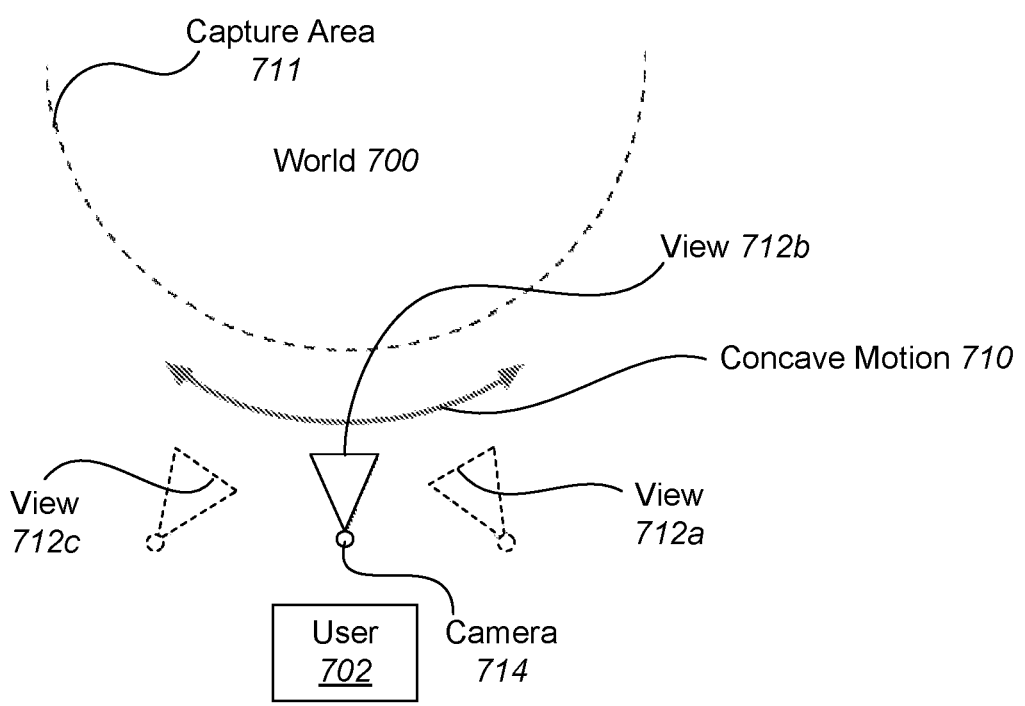

With reference to FIG. 7B, shown is an example of a back-facing, concave MIDMR being captured. According to various embodiments, a locally concave MIDMR is one in which viewing angles converge toward a single object of interest. In some examples, a locally concave MIDMR can provide the experience of orbiting about a point, such that a viewer can see multiple sides of the same object. This object, which may be an "object of interest," can be segmented from the MIDMR to become the content, and any surrounding data can be segmented to become the context. Previous technologies fail to recognize this type of viewing angle in the media-sharing landscape.

In the present example embodiment, a user 702 is using a back-facing camera 714 to capture images towards world 700, and away from user 702. The camera is moved in a concave motion 710, such that views 712a, 712b, and 712c capture various parts of capture area 711. As described above, world 700 can include an object of interest in some examples, and the convex motion 710 can orbit around this object. Views 712a, 712b, and 712c can include views of different sides of this object in these examples.

Figure 7C:
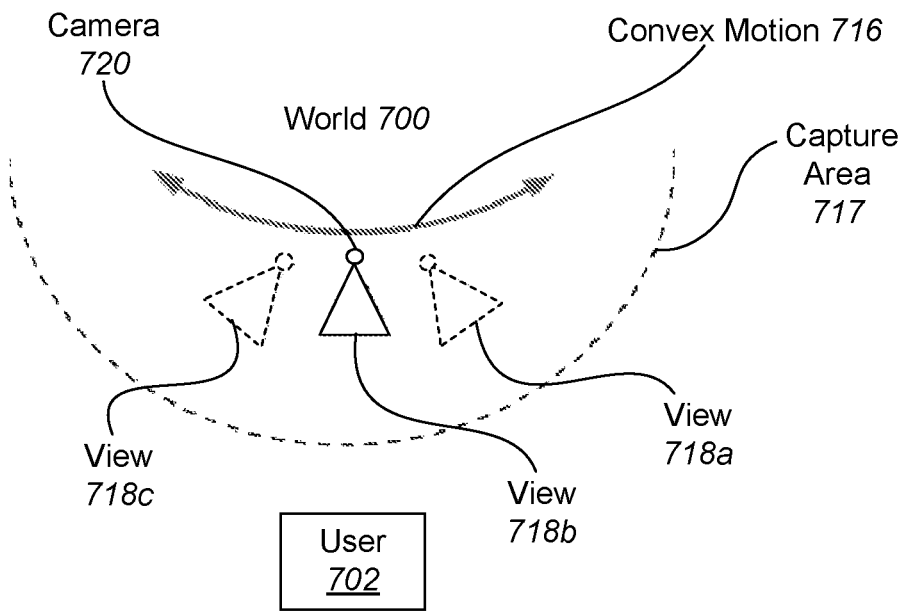

With reference to FIG. 7C, shown is an example of a front-facing, convex MIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 720 is facing user 702. The camera follows a convex motion 706 such that the views 718a, 718b, and 718c diverge from each other in an angular sense. The capture area 717 follows a convex shape that includes the user at a perimeter.

Figure 7D:
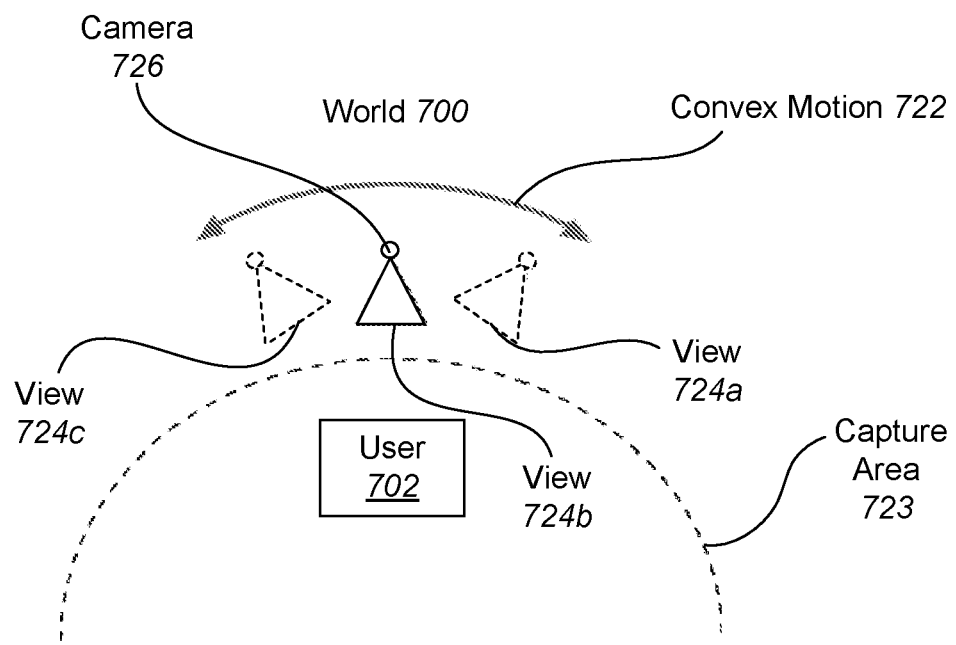

With reference to FIG. 7D, shown is an example of a front-facing, concave MIDMR being captured. In the present example embodiment, camera 726 is facing user 702. The camera follows a concave motion 722 such that the views 724a, 724b, and 724c converge towards the user 702. The capture area 717 follows a concave shape that surrounds the user 702.

Figure 7E:
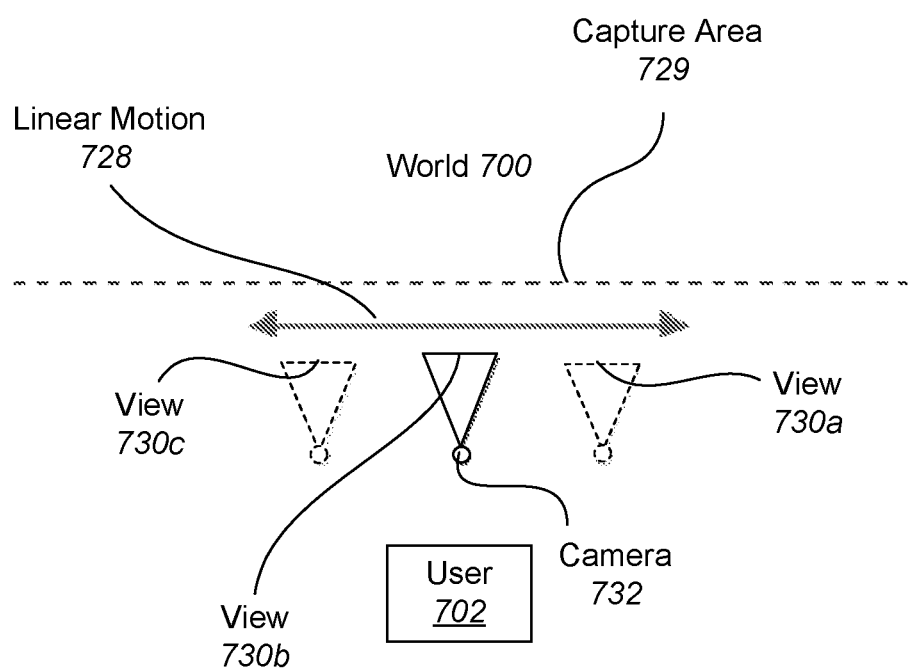

With reference to FIG. 7E, shown is an example of a back-facing, flat view being captured. In particular example embodiments, a locally flat MIDMR is one in which the rotation of the camera is small compared to its translation. In a locally flat MIDMR, the viewing angles remain roughly parallel, and the parallax effect dominates. In this type of MIDMR, there can also be an "object of interest", but its position does not remain fixed in the different views. Previous technologies also fail to recognize this type of viewing angle in the media-sharing landscape.

In the present example embodiment, camera 732 is facing away from user 702, and towards world 700. The camera follows a generally linear motion 728 such that the capture area 729 generally follows a line. The views 730a, 730b, and 730c have generally parallel lines of sight. An object viewed in multiple views can appear to have different or shifted background scenery in each view. In addition, a slightly different side of the object may be visible in different views. Using the parallax effect, information about the position and characteristics of the object can be generated in a MIDMR that provides more information than any one static image.

As described above, various modes can be used to capture images for a MIDMR. These modes, including locally concave, locally convex, and locally linear motions, can be used during capture of separate images or during continuous recording of a scene. Such recording can capture a series of images during a single session.

According to various embodiments of the present disclosure, a MIDMR can be generated from data acquired in numerous ways. For example, data may be acquired by moving a camera through space. In particular, a user may tap a record button on a capture device to begin recording. As movement of the capture device follows a generally leftward direction, an object may move in a generally rightward motion across the screen. As the capture device moves leftward, the object appears to move rightward between subsequent views. In some examples, when the user is finished recording, the record button can be tapped again to end recording. In other examples, the user can tap and hold the record button during recording, and release to stop recording. In the present embodiment, the recording captures a series of images that can be used to generate a MIDMR.

Figure 8:
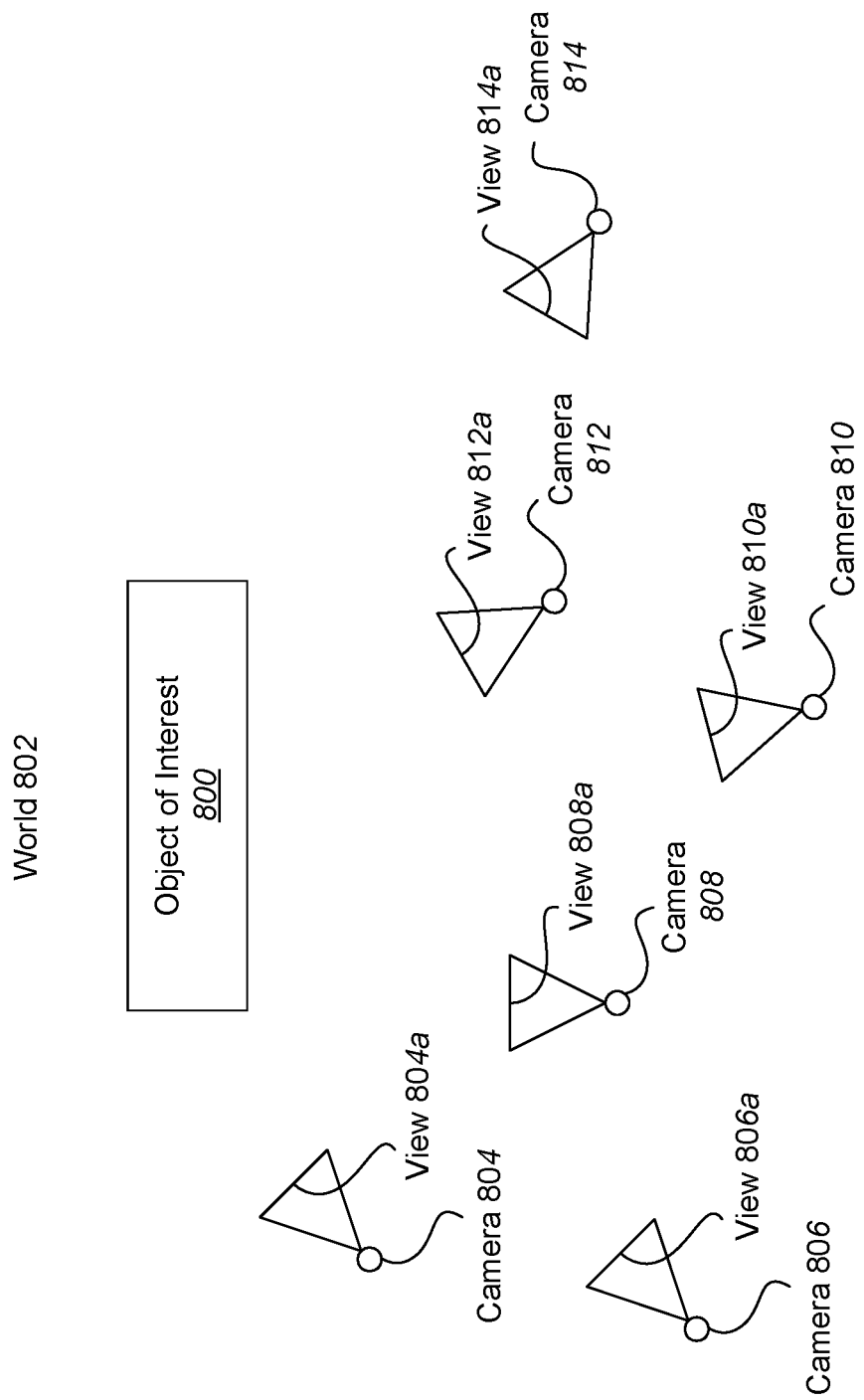
FIG. 8 illustrates one example of a space-time multi-view interactive digital media representation being simultaneously recorded by independent observers.

According to various embodiments, a series of images used to generate a MIDMR can be captured by a user recording a scene, object of interest, etc. Additionally, in some examples, multiple users can contribute to acquiring a series of images used to generate a MIDMR. With reference to FIG. 8, shown is one example of space-time MIDM being simultaneously recorded by independent observers.

In the present example embodiment, cameras 804, 806, 808, 810, 812, and 814 are positioned at different locations. In some examples, these cameras 804, 806, 808, 810, 812, and 814 can be associated with independent observers. For instance, the independent observers could be audience members at a concert, show, event, etc. In other examples, cameras 804, 806, 808, 810, 812, and 814 could be placed on tripods, stands, etc. In the present embodiment, the cameras 804, 806, 808, 810, 812, and 814 are used to capture views 804*a*, 806*a*, 808*a*, 810*a*, 812*a*, and 814*a*, respectively, of an object of interest 800, with world 802 providing the background scenery. The images captured by cameras 804, 806, 808, 810, 812, and 814 can be aggregated and used together in a single MIDMR in some examples. Each of the cameras 804, 806, 808, 810, 812, and 814 provides a different vantage point relative to the object of interest 800, so aggregating the images from these different locations provides information about different viewing angles of the object of interest 800. In addition, cameras 804, 806, 808, 810, 812, and 814 can provide a series of images from their respective locations over a span of time, such that the MIDMR generated from these series of images can include temporal information and can also indicate movement over time.

As described above with regard to various embodiments, a MIDMR can be associated with a variety of capture modes. In addition, a MIDM can include different capture modes or different capture motions in the same MIDMR. Accordingly, MIDMR can be separated into smaller parts in some examples. For example, a complex surround-view may be separated into smaller, linear parts. In some embodiments, a complex MIDMR may include a capture area that follows a sweeping L motion, which includes two separate linear motions of the camera. Such an MIDMR associated with these separate linear motions can be broken down into two or more separate MIDMRs. It should be noted that although the linear motions of the complex MIDMR can be captured sequentially and continuously in some embodiments, such linear motions can also be captured in separate sessions in other embodiments.

In some embodiments, the two linear MIDMRs can be processed independently, and joined with a transition to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear MIDMRs can also be separated into discrete components. In some examples, MIDMRs can be broken down based on local capture motion. For example, a complex motion may be broken down into a locally convex portion and a linear portion. In another example, a complex motion can be broken down into separate locally convex portions. It should be recognized that any number of motions can be included in a complex MIDMR, and that such complex MIDMR can be broken down into any number of separate portions, depending on the application.

Figure 9:
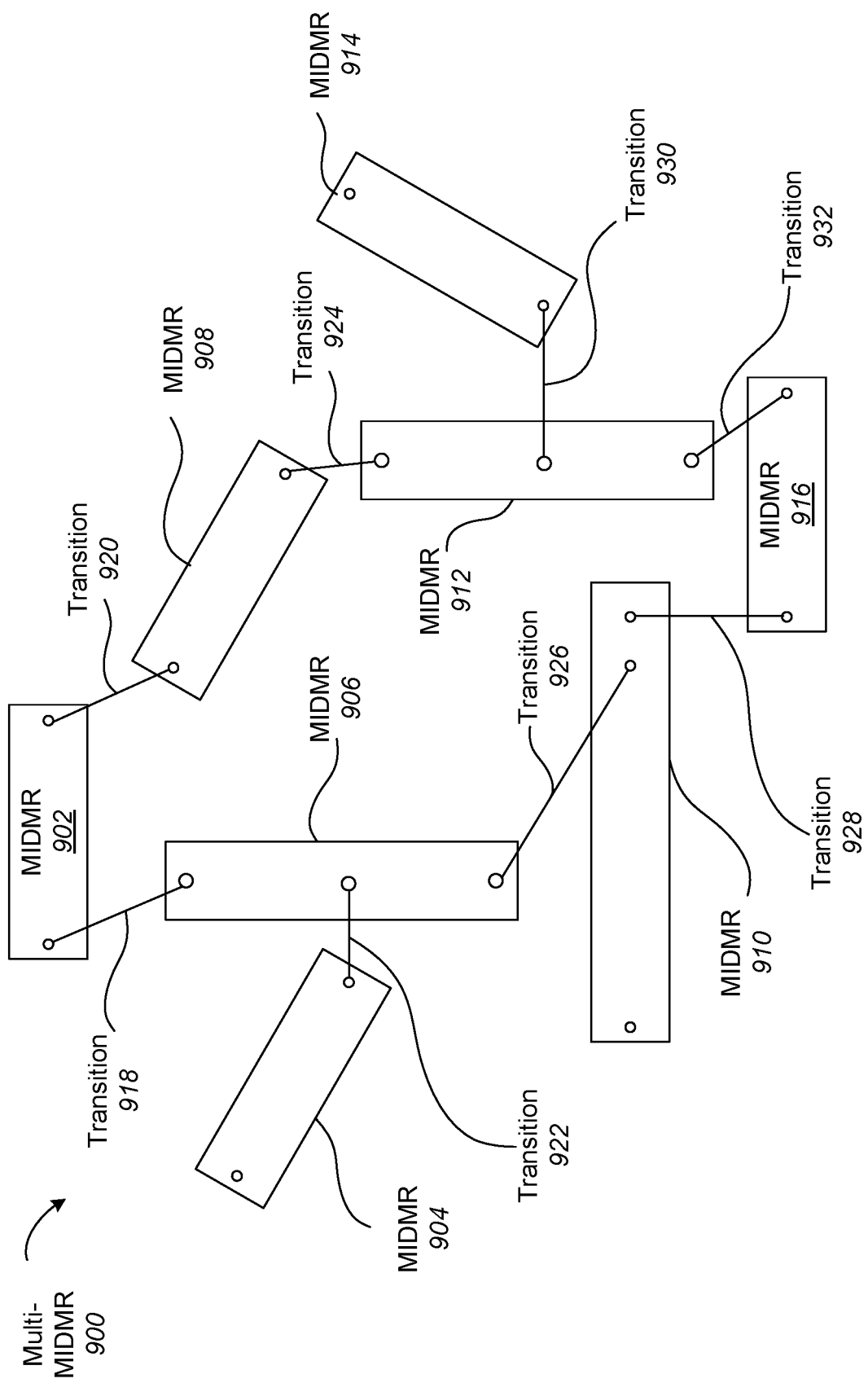
FIG. 9 illustrates one example of a combination of multiple multi-view interactive digital media representations into a multi-multi-view interactive digital media representation.

Although in some applications, it is desirable to separate complex MIDMRs, in other applications it is desirable to combine multiple MIDMRs. With reference to FIG. 9, shown is one example of a graph that includes multiple MIDMRs combined into a multi-MIDMR 900. In this example, the rectangles represent various MIDMRs 902, 904, 906, 908, 910, 912, 914, and 916, and the length of each rectangle indicates the dominant motion of each MIDMR. Lines between the MIDMRs indicate possible transitions 918, 920, 922, 924, 926, 928, 930, and 932 between them.

In some examples, a MIDMR can provide a way to partition a scene both spatially and temporally in a very efficient manner. For very large scale scenes, multi—900 data can be used. In particular, a multi-MIDMR 900 can include a collection of MIDMRs that are connected together in a spatial graph. The individual MIDMRs can be collected by a single source, such as a single user, or by multiple sources, such as multiple users. In addition, the individual MIDMRs can be captured in sequence, in parallel, or totally uncorrelated at different times. However, in order to connect the individual MIDMRs, there must be some overlap of content, context, or location, or of a combination of these features. Accordingly, any two MIDMRs would need to have some overlap in content, context, and/or location to provide a portion of a multi-MIDMR 900. Individual MIDMRs can be linked to one another through this overlap and stitched together to form a multi-MIDMR 900. According to various examples, any combination of capture devices with either front, back, or front and back cameras can be used.

In some embodiments, multi-MIDMRs 900 can be generalized to more fully capture entire environments. Much like "photo tours" collect photographs into a graph of discrete, spatially-neighboring components, multiple MIDMRs can be combined into an entire scene graph. In some examples, this can be achieved using information obtained from but not limited to: image matching/tracking, depth matching/tracking, IMU, user input, and/or GPS. Within such a graph or multi-MIDMR, a user can switch between different MIDMRs either at the end points of the recorded motion or wherever there is an overlap with other MIDMRs in the graph. One advantage of multi-MIDMRs over "photo tours" is that a user can navigate the MIDMRs as desired and much more visual information can be stored in MIDMRs. In contrast, traditional "photo tours" typically have limited views that can be shown to the viewer either automatically or by allowing the user to pan through a panorama with a computer mouse or keystrokes.

According to various embodiments, a MIDMR is generated from a set of images. These images can be captured by a user intending to produce a MIDMR or retrieved from storage, depending on the application. Because a MIDMR is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a MIDMR provides views from many sides of an object, distinctive views that are appropriate for search can be selected from the MIDMR or requested from a user if a distinctive view is not available. For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a MIDMR is determined to need additional views to produce a more accurate model, a user may be prompted to provide additional images.

Once a MIDMR is generated, it can be used in various applications, in particular embodiments. One application for a MIDMR includes allowing a user to navigate a MIDMR or otherwise interact with it. According to various embodiments, a MIDMR is designed to simulate the feeling of being physically present in a scene as the user interacts with the MIDMR. This experience depends not only on the viewing angle of the camera, but on the type of MIDMR that is being viewed. Although a MIDMR does not need to have a specific fixed geometry overall, different types of geometries can be represented over a local segment of a MIDMR such as a concave, convex, and flat MIDMR, in particular embodiments.

In particular example embodiments, the mode of navigation is informed by the type of geometry represented in a MIDMR. For instance, with concave MIDMRs, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex MIDMRs, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-MIDMR or a graph of MIDMRs in which individual MIDMRs can be loaded piece by piece and further MIDMRs may be loaded when necessary (e.g. when they are adjacent to/overlap the current MIDMR and/or the user navigates towards them). If the user reaches a point in a MIDMR where two or more MIDMRs overlap, the user can select which of those overlapping MIDMRs to follow. In some instances, the selection of which MIDMR to follow can be based on the direction the user swipes or moves the device.

Figure 10:
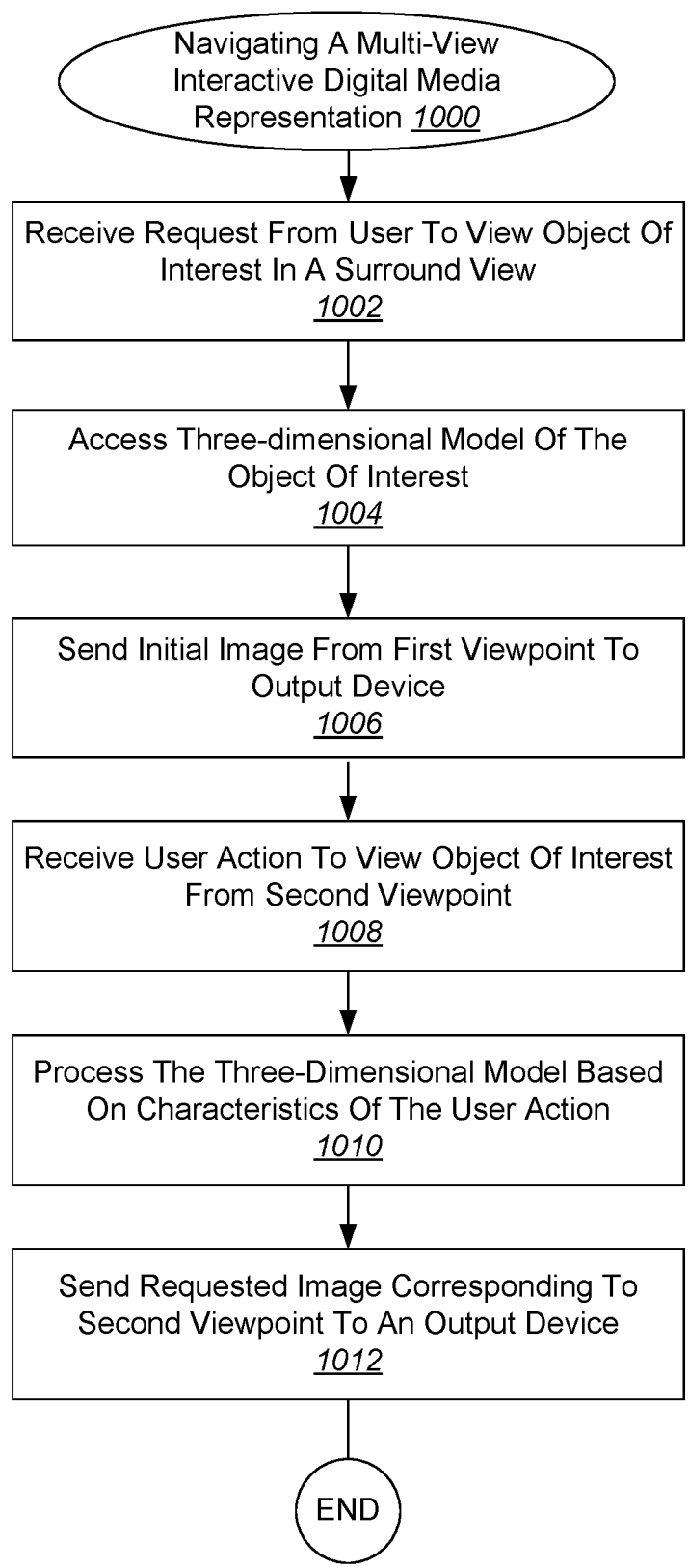
FIG. 10 illustrates one example of a process for navigating a multi-view interactive digital media representation.

With reference to FIG. 10, shown is one example of a process 1000 for navigating a MIDMR. In the present example, a request is received from a user to view an object of interest in a MIDMR at 1002. According to various embodiments, the request can also be a generic request to view a MIDMR without a particular object of interest, such as when viewing a landscape or panoramic view. Next, a three-dimensional model of the object is accessed at 1004. This three-dimensional model can include all or a portion of a stored MIDMR. For instance, the three-dimensional model can be a segmented content view in some applications. An initial image is then sent from a first viewpoint to an output device at 1006. This first viewpoint serves as a starting point for viewing the MIDMR on the output device.

In the present embodiment, a user action is then received to view the object of interest from a second viewpoint at 1008. This user action can include moving (e.g. tilting, translating, rotating, etc.) an input device, swiping the screen, etc., depending on the application. For instance, the user action can correspond to motion associated with a locally concave MIDMR, a locally convex MIDMR, or a locally flat MIDMR, etc. Based on the characteristics of the user action, the three-dimensional model is processed at 1010. For instance, movement of the input device can be detected and a corresponding viewpoint of the object of interest can be found. Depending on the application, the input device and output device can both be included in a mobile device, etc. In some examples, the requested image corresponds to an image captured prior to generation of the MIDMR. In other examples the requested image is generated based on the three-dimensional model (e.g. by interpolation, etc.). An image from this viewpoint can be sent to the output device at 1012. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications. In other examples, a message can be provided to the output device indicating if there is insufficient information in the MIDMR to provide the requested images.

In some embodiments, intermediate images can be sent between the initial image at 1006 and the requested image at 1012. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Segmentation of the Object of Interest and Background

According to various aspects of the present disclosure, AR/VR content is further generated by extracting an object of interest or other content, such as a person, within a sequence of images to separate it from the background and other context imagery. This may be achieved by applying various segmentation algorithms and processes to the images, as previously described with reference to FIG. 2. In some embodiments, semantic segmentation using neural networks is performed. In further embodiments, fine-grained segmentation is further performed. In some embodiments fine-grained segmentation may utilize conditional random fields and/or temporal conditional random fields.

Figure 11:
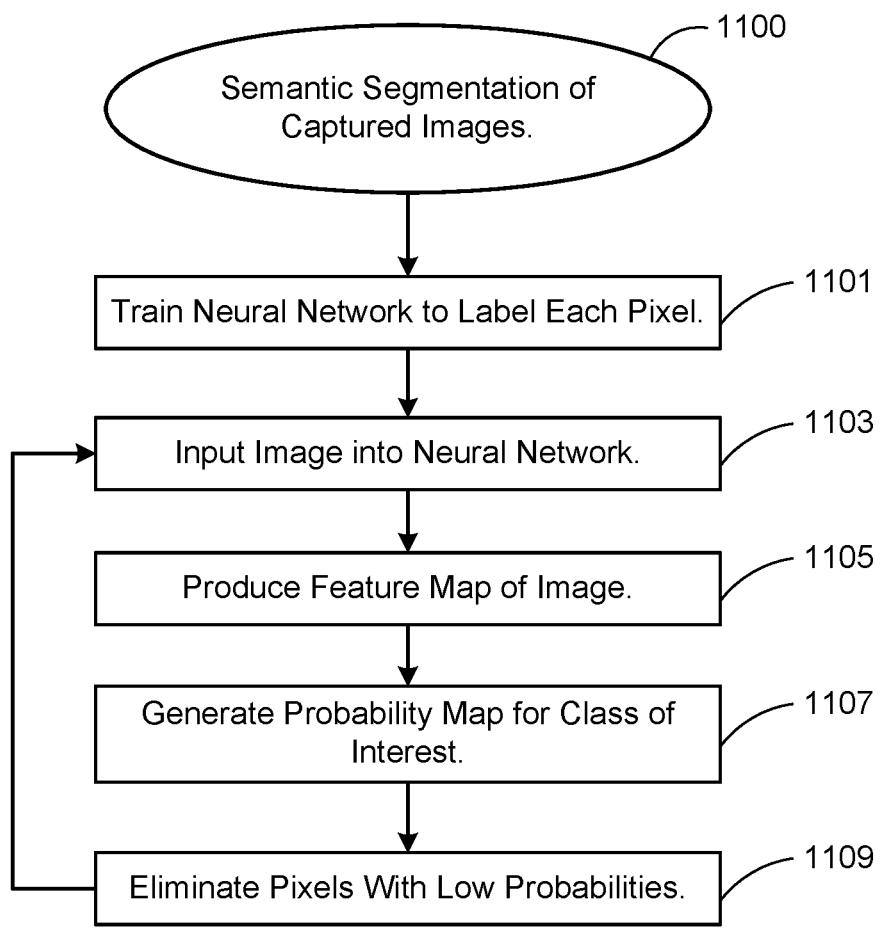
FIG. 11 illustrates an example method 1100 for semantic segmentation of image frames, in accordance with one or more embodiments.

With reference to FIG. 11, shown is an example method 1100 for semantic segmentation of image frames, in accordance with one or more embodiments. In various embodiments, semantic segmentation is performed by a neural network system that has been trained to identify and label pixels according to a corresponding category or class. In some embodiments, the neural network system described herein is a convolutional neural network. In some embodiments, the neural network may comprise multiple computational layers.

At step 1101, a neural network is trained to label each pixel in an image. The neural network may be trained to label every pixel in the image with a particular category label (e.g., person, car, sky, etc.). Such training may be done by inputting training pairs comprising a training image and a corresponding label map. The training image may be input into the neural network as a tensor, such as third-order tensor, to be processed through the various layers of neural network for labeling. In some embodiments, the neural network is trained with a softmax loss on pixels after aggregating outputs from various computational layers, such as convolution (conv) layers and pooling (pool) layers, in a feature map that results in a 8× downsample from the original image size. For example the neural network may aggregate ouputs from pool3, pool4, and conv7 layers. The result may then be compared to the predetermined label map corresponding to that training image. The parameters of the neural network may then be updated. In some embodiments, the parameters are updated using a stochastic gradient descent. Once the neural network is sufficiently trained, it may be used to label pixels in new image sequences. Such image sequences may be images frames corresponding to a MIDMR, such as that generated at MIDMR 118. In other embodiments, the images may be unprocessed images captured by a camera.

At step 1103, an image is input into the neural network. A feature map of the image is then produced by the neural network at step 1105. In some embodiments, the neural network may be trained for k object classes (e.g., person, car, sky, etc.) to produce a feature map that has k channels where channel 'j' represents the probability of each pixel being of object class 'j'. In various embodiments, object classes may include, but are not limited to, the following object classes: building, grass, tree, cow, sheep, sky, airplane, water, face, car, bicycle, flower, sign, bird, book, chair, road, cat, dog, body, and boat. As previously described with reference to the training of the neural network, the neural network may aggregate outputs from layers pool3, pool4 and conv7 in a feature map that results in a 8× downsample from the original image size. The benefit of aggregating feature maps from different layers of the neural network allows the use of both finer scale and coarser scale details to produce these probability maps. For example, using only lower layers or only higher layers would produce sub-optimal outputs.

A probability map for a class of interest may be generated at step 1107. In some embodiments, to get a probability map of an object class of interest (e.g. person), the feature map corresponding to the person object class is extracted. Then pixels with low probabilities are eliminated at step 1109. For example, the pixels where the person object class is not the most probable amongst all other classes are zeroed out. In some embodiments, a threshold probability may be predetermined or set by a user. In some embodiments, the pixels with low probabilities are not eliminated, but labeled instead. The pixels corresponding to the desired object class may also be labeled. In some embodiments, the probability values may then be re-normalized between 0-1.

Method 1100 may then return to step 1103 to segment another image in the sequence of images. This procedure may be applied to every frame individually to obtain probability maps corresponding to the person object class for every frame. In some embodiments, the probability maps may then be passed onto the temporal dense conditional random field (CRF) smoothing system, further described below with reference to FIG. 12, to obtain a binary mask for every frame that is sharply aligned to the boundaries and temporally consistent (non-fluctuating). These binary masks are then used to mask out pixels in every frame to extract the person or other object of interest out of the frames.

As described, a segmenting neural network capable of performing method 1100 may include various computational layers. In some embodiments, the neural network may include a series of convolution layers followed by pooling layers. A convolution-pool layer pair may be used to refer to a convolution layer followed by a pooling layer. Each convolution layer may accumulate and aggregate information from a larger area of the image to form a high level representation of the image. In other words, the convolution layers condense pixel information into a more abstract version in order to make it easier and faster to process by the segmenting neural network. Thus, the output for each convolution-pool layer pair may be down-sampled by 2X. In other embodiments, the convolution-pool layer pair may down-sample the input by more or less than 2×. In some embodiments, the pooling layers may be programmed to perform max pooling. Thus, the pooling layers may take the output of a convolution layer, identify the pixel with the highest value within 2×2 pixel neighborhoods, and set that pixel as the pixel in the down-sampled output of the convolution-pool layer pair. In some embodiments, the values of the pixels are based on the RGB value after being processed by the convolution layer within a convolution-pool layer pair.

For example, an image comprising a pixel dimension of 512×512 pixels may be input into a first convolution-pool layer Pair 1, which may output a 2× down-sampled Output 1 comprising a pixel dimension of 256×256 pixels, where each pixel in Output 1 represents the highest valued pixel of a 2×2 pixel neighborhood in the original image. Output 1 may then be input into a second convolution-pool layer Pair 2, which may output a 4× down-sampled Output 2 comprising a pixel dimension of 128×128 pixels, where each pixel in Output 2 represents the highest valued pixel of a 2×2 pixel neighborhood in Output 1. Output 2 may then be input into a third convolution-pool layer Pair 3, which may output a 8× down-sampled Output 3 comprising a pixel dimension of 64×64 pixels, where each pixel in Output 3 represents the highest valued pixel of a 2×2 pixel neighborhood in Output 2. Output 3 may then be input into a fourth convolution-pool layer Pair 4, which may output a 16× down-sampled Output 4 comprising a pixel dimension of 32×32 pixels, where each pixel in Output 4 represents the highest valued pixel of a 2×2 pixel neighborhood in Output 3. Output 4 may then be input into a fifth convolution-pool layer Pair 5, which may output a 32× down-sampled Output 5 comprising a pixel dimension of 16×16 pixels, where each pixel in Output 5 represents the highest valued pixel of a 2×2 pixel neighborhood in Output 4. In some embodiments, output 5 may then be processed through one or more additional convolution layers.

After five convolution-pool layer pairs, Output 5 may include accurately labeled pixels. However, Output 5 has also been down-sampled by 32×. Thus, if resized back to 512×512 pixel dimension, Output 5 may yield a very coarse image with low resolution, which may not define fine structures within the original image input. Thus, in some embodiments, outputs from intermediate convolution-pool layer pairs, which include higher resolutions, may be added together to refine the output of the segmenting neural network. For example, Output 3, Output 4, and Output 5 may be combined. Outputs 4 and 5 may be resized and up-sampled to 8×. Since Output 3 is already 8×, it would not need to be up-sampled before adding. In some embodiments, more or less outputs from any other convolution-pool layer pairs may be used. In some embodiments, the Outputs 3, 4, and 5 are combined providing an 8× down-sampled Output A that may include accurate labeling, as well as a higher resolution. In some embodiments, additional sequential processing through one or more additional convolution layers may be performed on Output A, and/or on Outputs 3, 4, and 5 before their combination.

In some embodiments, the Output A may then be up-sampled and resized back to the format of the original image input (which, in this example, is 512×512 pixels). In some embodiments, interpolation may be performed to resize the Output A back to the original format. In some embodiments, pixel labeling via method 1100 occurs during one or more of the convolution-pool layer pairs. In other embodiments, pixel labeling may occur during the convolution layers and/or the pooling layers. In various embodiments, more or fewer convolution-pool layer pairs may be programmed in the segmenting neural network. As previously described, during the training procedure of such segmenting neural network, the system may perform a backwards pass to adjust the parameters of the described layers based on the training image and corresponding label map. In some embodiments, the parameters are updated using a stochastic gradient descent.

Figure 12:
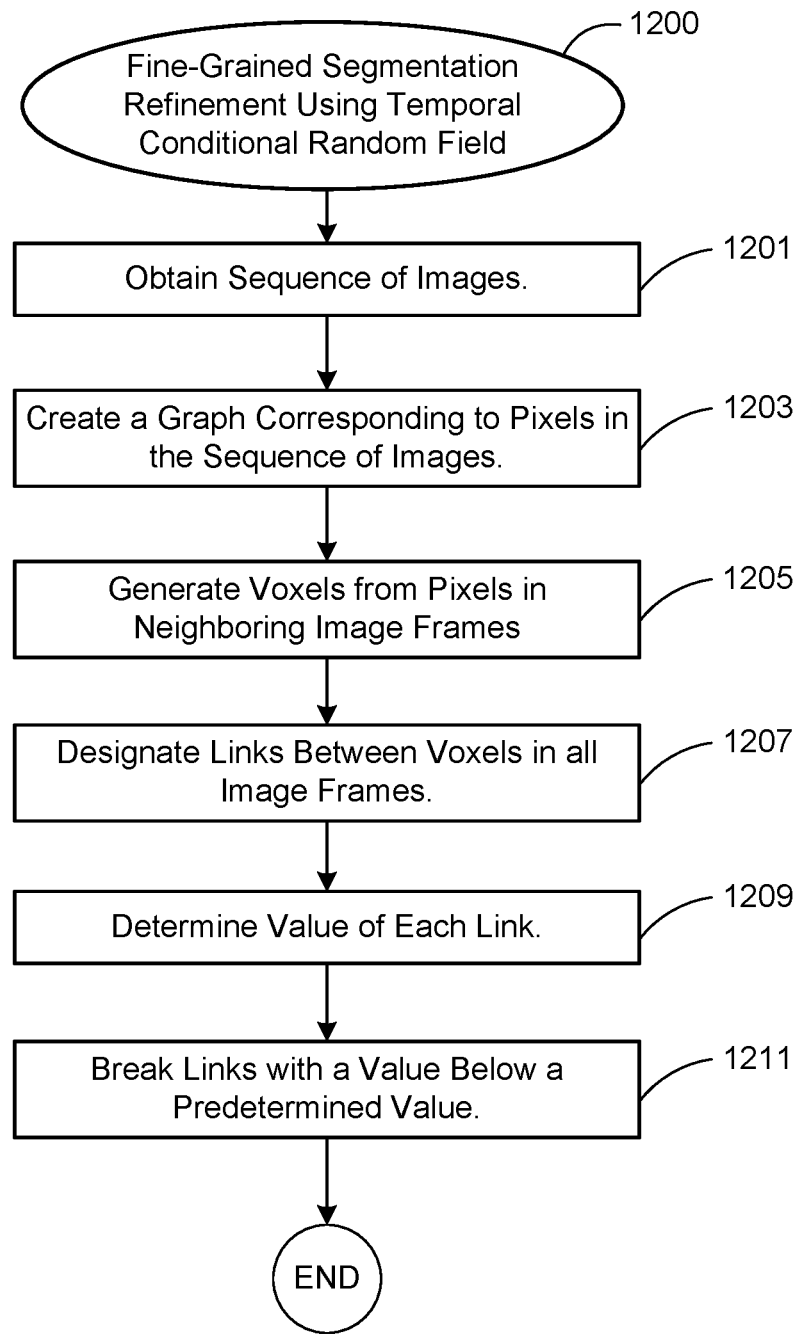
FIG. 12 illustrates an example method 1200 for fine-grained segmentation of image frames with temporal conditional random field, in accordance with one or more embodiments.

With reference to FIG. 12, shown is an example method 1200 for fine-grained segmentation of image frames with temporal conditional random field, in accordance with one or more embodiments. At step 1201, a sequence of images is obtained. The sequence of images obtained at step 1201 may be images output from method 1100. In some embodiments, such output from method 1100 may comprise extracted pixels corresponding to an object of interest. In other embodiments, the output from method 1100 may comprise an image frame with labeled pixels that correspond to an object of interest or background. In some embodiments, the images may be obtained at step 1201 one at a time as they are segmented in method 1100, rather than the entire sequence of images.

At step 1203, a graph corresponding to the pixels in an image is created. In some embodiments, the graph is a graphical model of the pixels in the image, each of which represents a node in the graph. In various embodiments, this graphical model may be a conditional random field. Links between each node may be created and include a link strength value defined by parameters such as x,y distance between the linked pixels, and/or color distance based RGB value difference of the linked pixels. In some embodiments, every node includes one or more designated edges, which may be used to determine the distance of that pixel to other pixels. In other embodiments, brightness may be used to determine the strength value of a link. The links with a strength value under a predetermined threshold value may be broken. In this way, the graphical model may be divided into two sub-graphs of nodes, one corresponding to the foreground and/or object of interest of the object class, the other corresponding to the background or context. In some embodiments, the graphical model may be divided into any number of sub-graphs corresponding to different object classes and/or background. In some embodiments, the sub-graphs may be labeled, but the links between pixels corresponding to different sub-graphs may not be actually broken.

In certain embodiments, the images may be segmented based on x,y distance and RGB value difference of the pixels, as described above. However, in other embodiments, a time parameter may also be used to determine the strength of a link between pixels. For example, a temporal random conditional field may be implemented for fine-grained segmentation. According to some embodiments, voxels are generated from the pixels in neighboring image frames at step 1205. Links may be established between pixels in neighboring image frames in the image sequence. For example, pixels in an image may be connected to pixels in the nearest five image frames that are continuous in time. In other embodiments, pixels in any number of chronologically neighboring images may be connected. In some embodiments, pixels in all image frames in the image sequence are connected. In some embodiments, the pixels are connected to corresponding pixels in the neighboring image frames. Corresponding pixels may be identified by various keypoint detectors and tracking methods described herein. As such, voxels are generated from the connected pixels between neighboring image frames. For example, a voxel may include a volume defined by designated edges of the pixel node in an image frame and its span across neighboring frames.

At step 1207, links are designated between voxels in all image frames. Each voxel may be linked to every other voxel. Then the value of each link is determined at step 1209. As previously described the strength value between each voxel link may be based on parameters including x,y distance, RGB value difference, and closeness in time. In some embodiments, the strength value of a link between voxels is a weighted sum of the three parameters. At step 1211, links with a value below a predetermined value are broken.

In some embodiments, performing method 1100 for semantic segmentation on the images first shortens the processing time and resources necessary to perform method 1200 for fine-grained segmentation. Overall, the segmentation process may be performed faster by a neural network system or other computer system. In some embodiments, the steps of method 1100 and processes described with reference to step 1203 of method 1200 may be performed on a single initial image frame. The extracted object of interest may then be used to create a temporal conditional random field corresponding to all other images in the image sequence. This may allow the remaining images after the single initial image frame to be segmented without being semantically segmented by method 1100. This may further speed the processing time required for segmentation of all images in the sequence.

Further methods and systems for semantic segmentation and fine-grained segmentation are further described in U.S. patent application No. 15,428,104, titled REAL-TIME MOBILE DEVICE CAPTURE AND GENERATION OF AR/VR CONTENT, previously referenced above.

View Interpolation and Artificial Frame Generation

As described above, view interpolation can be used to improve the viewing experience. In particular, to avoid sudden "jumps" between stabilized frames, synthetic, intermediate views can be rendered during acquisition or generation of a MIDMR. Additionally, synthetic, intermediate views may also be rendered to complete stereographic pairs of frames. According to various embodiments, only a limited amount of image frames are stored as MIDM for each MIDMR for storage efficiency. In some examples, the selection of these frames is based on the motion of the camera rather than on time. For instance, a new frame is sampled only if the camera moved sufficiently with respect to the previously sampled frame. Consequently, in order to provide a smooth viewing experience for a user interacting with a MIDMR, artificially rendered frames must be generated. These artificially rendered frames serve to close the gap between two sampled frames that would otherwise appear to have a "jump" between them.

Various embodiments described below include methods of viewpoint interpolation and extrapolation that can be used to generate artificially rendered frames. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a MIDMR. In some embodiments, view interpolation may be performed on the entire images within the image frames of an image sequence. In other embodiments, view interpolation may be performed only on pixels extracted from method 1100 and/or method 1200.

Various embodiments of the present disclosure relate generally to systems and processes for artificially rendering images using interpolation of tracked control points.

According to particular embodiments, a set of control points is tracked between a first frame and a second frame, where the first frame includes a first image captured from a first location and the second frame includes a second image captured from a second location. An artificially rendered image corresponding to a third location is then generated by interpolating individual control points for the third location using the set of control points and interpolating pixel locations using the individual control points. The individual control points are used to transform image data.

Figure 13:
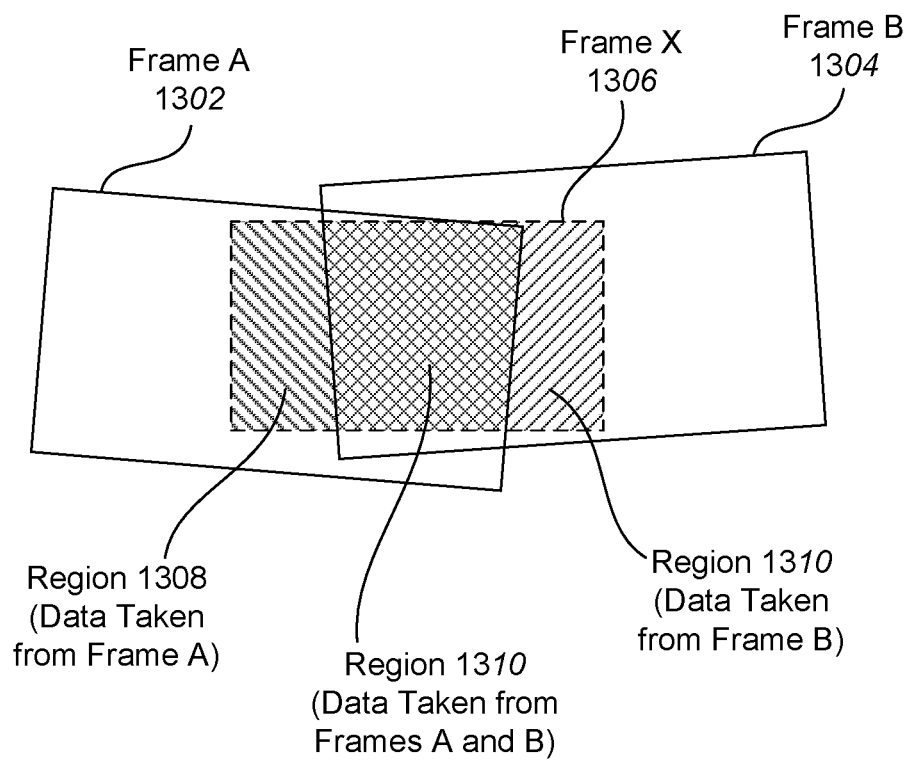
FIG. 13 illustrates an example of combining image information gathered from two frames to artificially render an image for another frame using weighted image information.

In the present example, combining the image information gathered from both Frames A and B, as described in FIG. 4, can be done in various ways. The following FIGS. 13-21 provide various methods and/or examples of view interpolation as previously described with reference to various enhancement algorithms, such as at enhancement algorithms block 116 and/or at AR/VR content generation block 122. With reference to FIG. 13, shown is one example of a way to combine image information gathered from both Frames A and B to artificially render an image in Frame X using weighted image information. Such combination of image information may be performed by a view interpolation algorithm as previously described with reference to FIG. 1. As shown, image information is taken from Frame A 1302 and Frame B 1304 to generate an image in Frame X 1306. Image information in Region 1308 of Frame X 1306 is taken from Frame A 1302. Image information in Region 1310 of Frame X 1306 is taken from Frame B 1304. Image information in Region 1310 of Frame X 1306 includes information from both Frame A 1302 and Frame B 1304. In order to account for the overlap in information, the image information is weighted. Specifically, the information is combined using the image information from Frame A 1302 using 1-x and the image information from Frame B 1304 using x.

Figure 14:
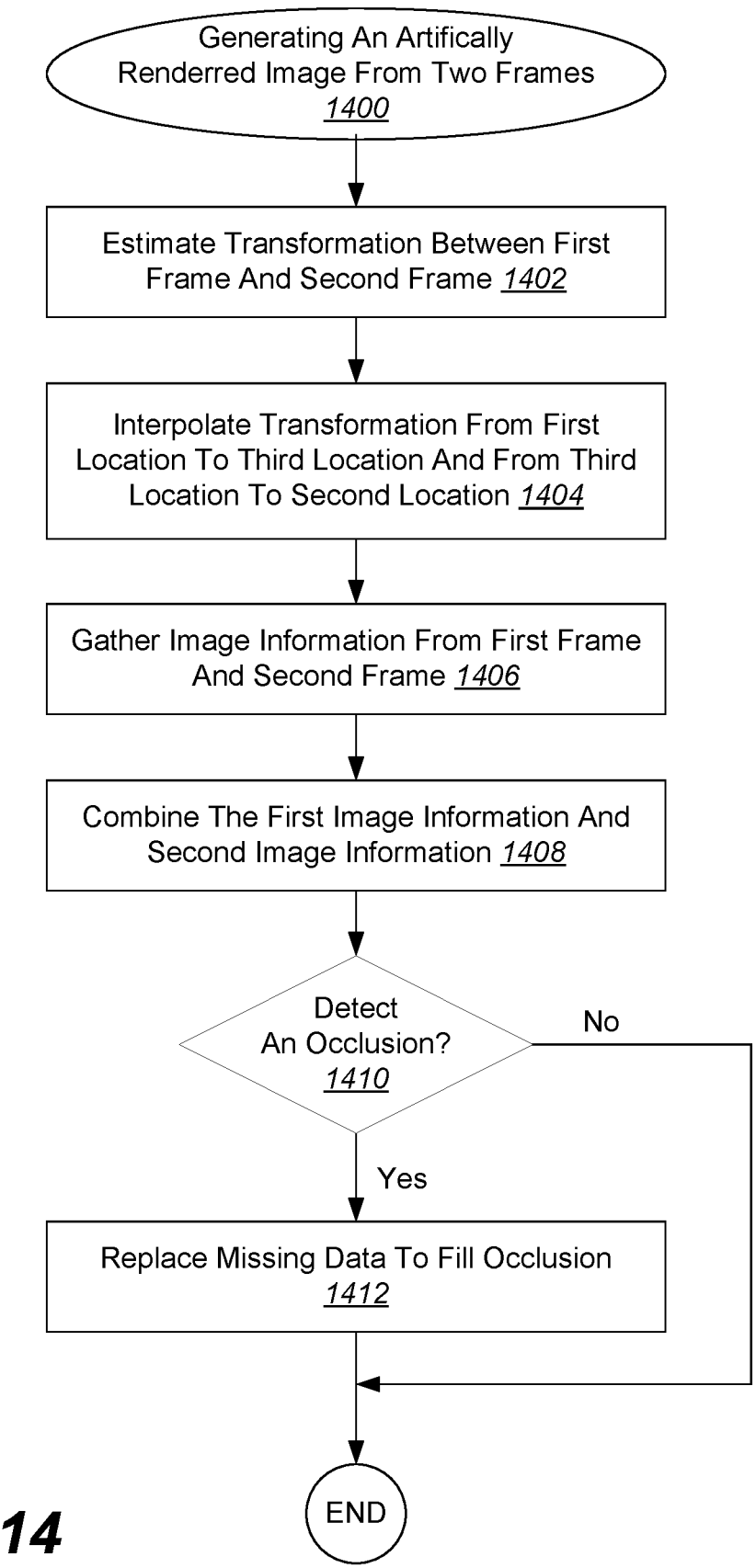
FIG. 14 illustrates an example of a process for generating an artificially rendered image from two frames.

With reference to FIG. 14, shown is an example of a process 1400 for generating an artificially rendered image from two frames. In this example, a transformation is estimated between a first frame and a second frame at 1402. The transformation is estimated using methods such as homography, affine, similarity, translation, rotation, or scale. As described above with regard to FIG. 4, the first frame includes a first image captured from a first location (Location A 422) and the second frame includes a second image captured from a second location (Location B 424). In some examples, the first image and second image are associated with the same layer. Next, an artificially rendered image is rendered corresponding to a third location. This third location is positioned on a trajectory between the first location and the second location, as shown as Location X 426 in FIG. 4.

The artificially rendered image is generated in a number of steps. First, a transformation is interpolated from the first location to the third location and from the third location to the second location at 1404. In some instances, interpolating the transformation includes parameterizing the transformation from the first location to the third location and from the third location to the second location. Furthermore, in some examples, the parameterized transformation is then linearly interpolated.

Next, image information is gathered from the first frame and the second frame at 1406 by transferring first image information from the first frame to the third frame based on the interpolated transformation and second image information from the second frame to the third frame based on the interpolated transformation. Finally, the first image information and the second image information are combined to yield the artificially rendered image. In some examples, combining the first image information and the second image information includes weighting the first image information from the first frame and weighting the second image information from the second frame.

According to various embodiments, the process can end with combining the first image information and second image information at 1408. However, according to the present example, the process shown may continue with determining whether an occlusion is present in the artificially rendered image at 1410. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 15. These layers can move relative to each other. In some cases, the layers may move in a manner causing an occlusion in a combined image. If an occlusion is detected, then the missing data is replaced to fill the first occlusion at 1412. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

Figure 15:
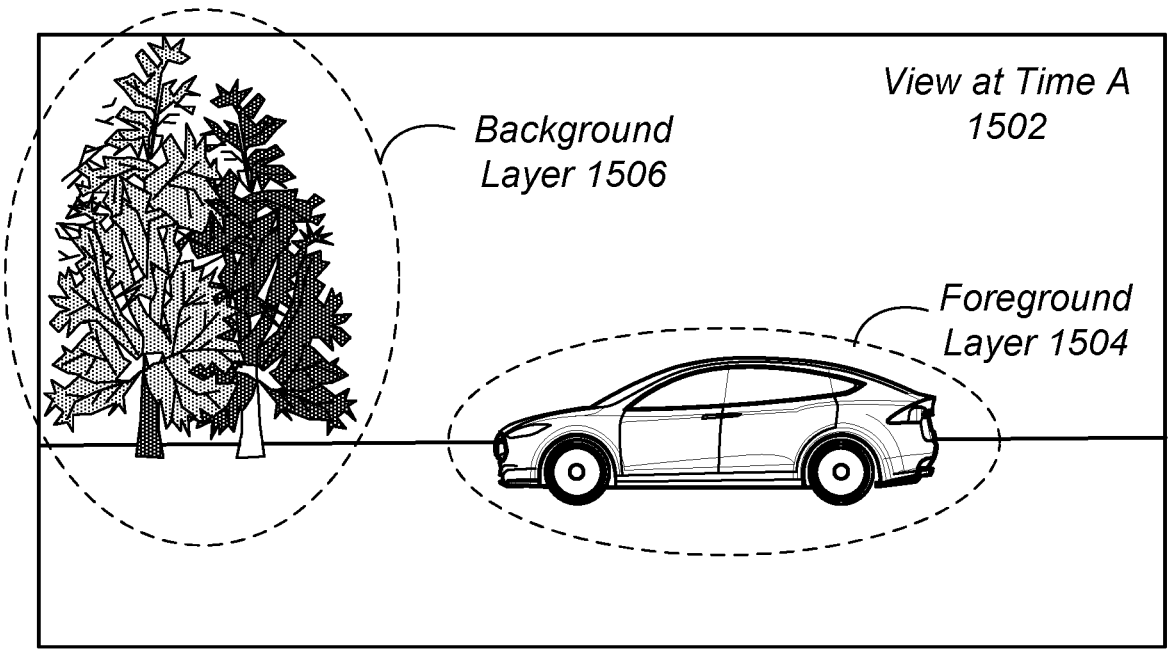
FIG. 15 illustrates an example of combining image information gathered from two frames to artificially render an image in another frame using multiple layers extracted from multi-view interactive digital media representations.
Figure 15:
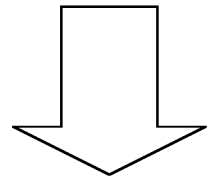
Figure 15:
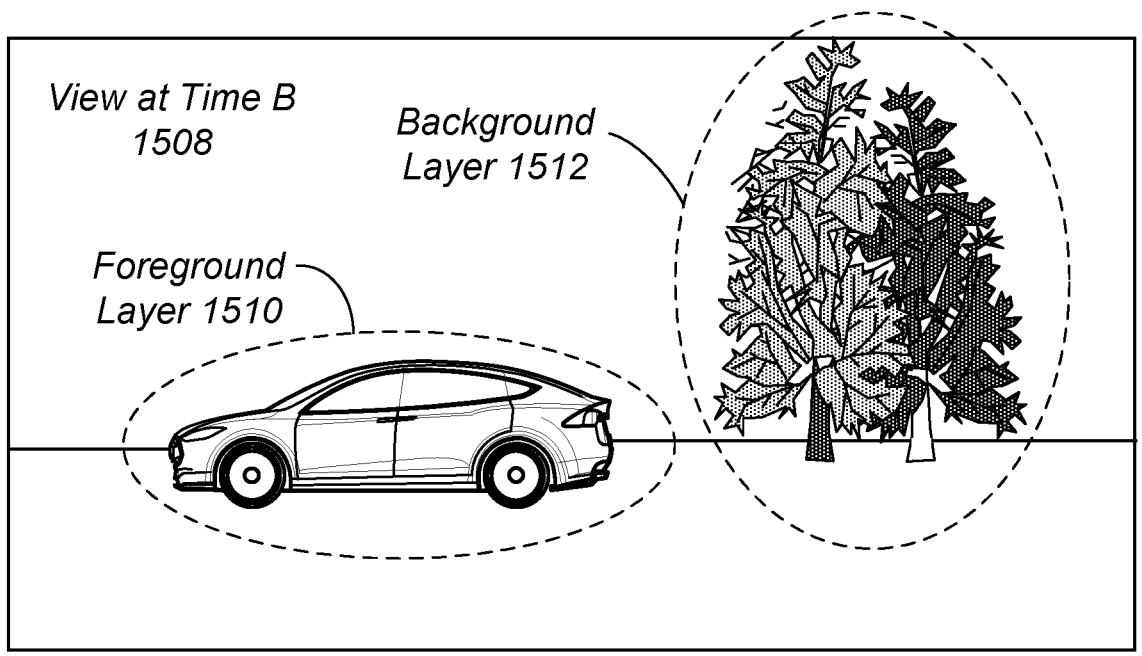

With reference to FIG. 15, shown is an example of combining image information gathered from both Frames A and B to artificially render an image in Frame X by using multiple layers of an image. The present example uses the method described above with regard to FIG. 14, where the first frame and second frame are made up of two or more layers. In particular, the first frame, which includes a view at Time A 1502, includes a background layer 1506 and foreground layer 1504. The second frame, which includes a view at Time B 1508, includes a background layer 1512 and foreground layer 1510. In some examples, foreground and/or background can include one or more layer. In the present example, a layer is a region of image pixels that share a similar motion, based on factors such as depth and or speed of the corresponding real world object.

In the present example, viewpoint-interpolation can be used to generate an artificially rendered image as described above with regard to FIG. 14. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is non-see-through, image information from the first layer is taken wherever the first and second layer overlap. In the case that the first layer is partially see-through, image information is taken from both layers according to the opacity of the first layer. This process can also be extended to more than two layers.

As described above with regard to FIG. 14, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a MIDMR that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 17. According to various examples, the transform between the two frames can be an image transformation or a 3D transformation. An image transformation can use methods such as homography, affine, similarity, translation, rotation, scale. For a 3D transformation, layers are moved with respect to their depth and the 3D transformation, according to various embodiments.

Figure 16A:
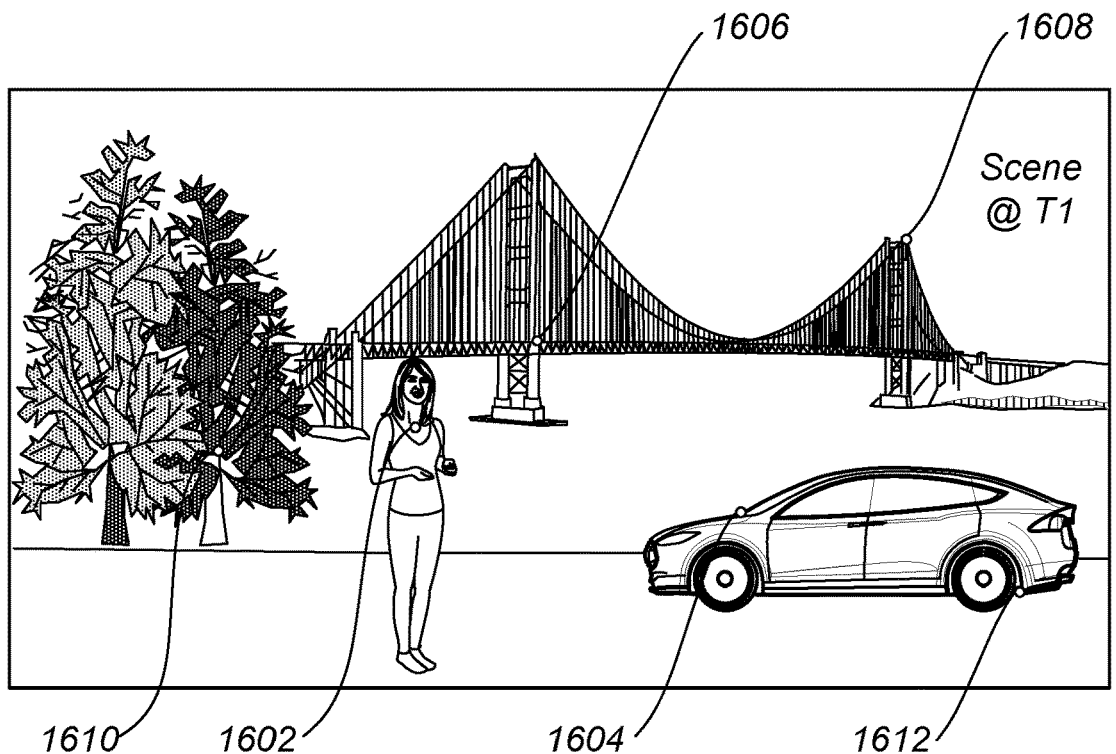
FIGS. 16A-16B illustrate an example of an image transformation between two frames using tracked control points between the two frames.
Figure 16B:
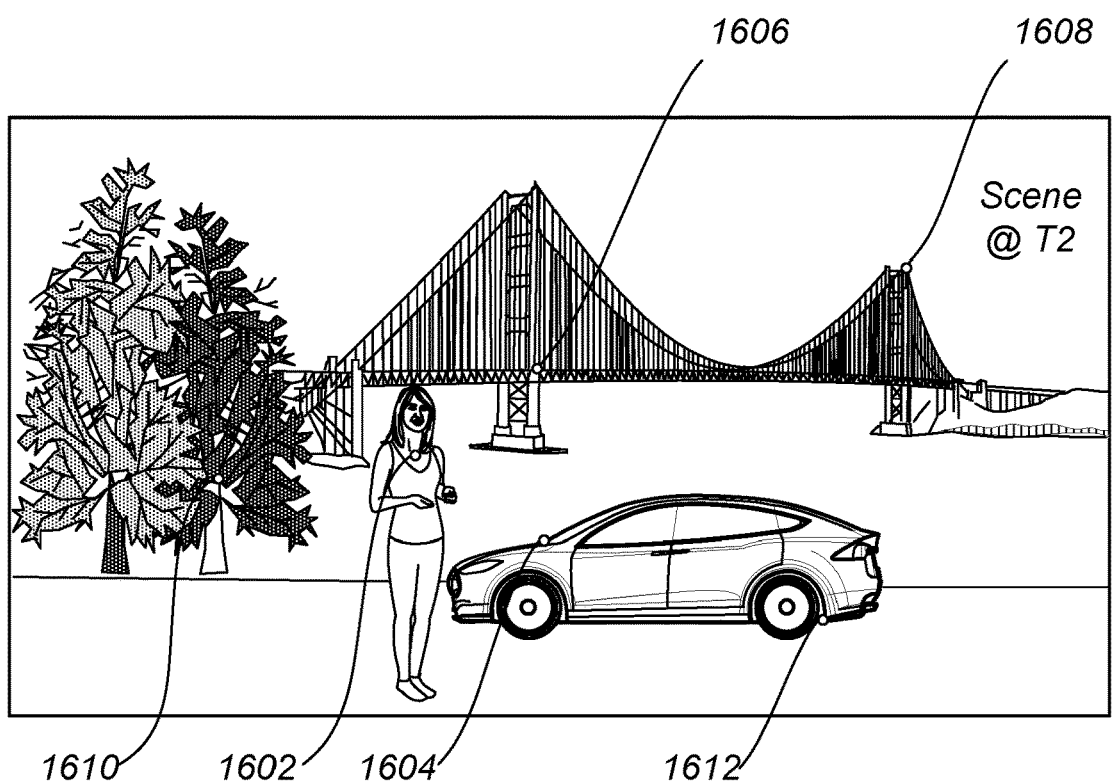

With reference to FIGS. 16A-16B, shown is an example of an image transformation between two frames using tracked control points between the two frames. In particular, FIG. 16A shows a first frame of a scene at a first time T1 and FIG. 16B shows a second frame of the scene at a second time T2. A set of control points 1602, 1604, 1606, 1608, 1610, and 1612 are tracked between the two frames, such that their locations are known in both frames. An intermediate frame X at x in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other examples, each pixel in the first frame corresponds to a control point in the set of control points. Accordingly, each pixel is tracked and interpolated in that instance.

In the present embodiment, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 17:
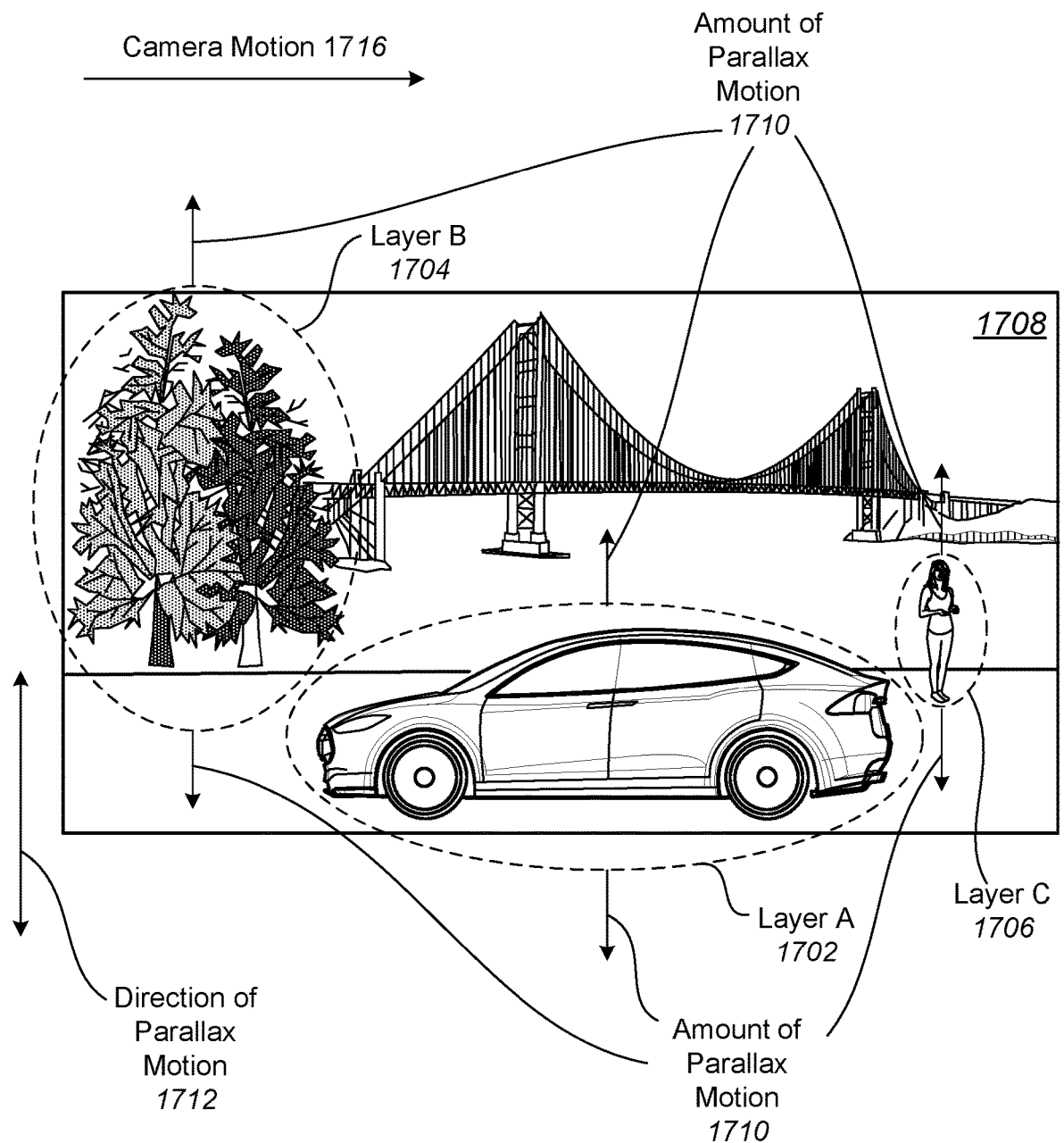
FIG. 17 illustrates an example of viewpoint extrapolation outside of the trajectory between two frames using multiple layers and the parallax effect.

With reference to FIG. 17, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 1708 includes multiple layers, such as Layer A 1702, Layer B 1704, and Layer C 1706. Although not shown, two frames capturing images of the scene 1708 can be obtained by moving a camera along camera motion 1716. Comparing the two images will show parallax motion in the direction 1712. As shown in the figure, the amount of parallax motion 1710 of each of the layers can indicate movement or differences between the frames. Although not indicated in the figure, the different layers 1702, 1704, and 1706 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point. Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 18:
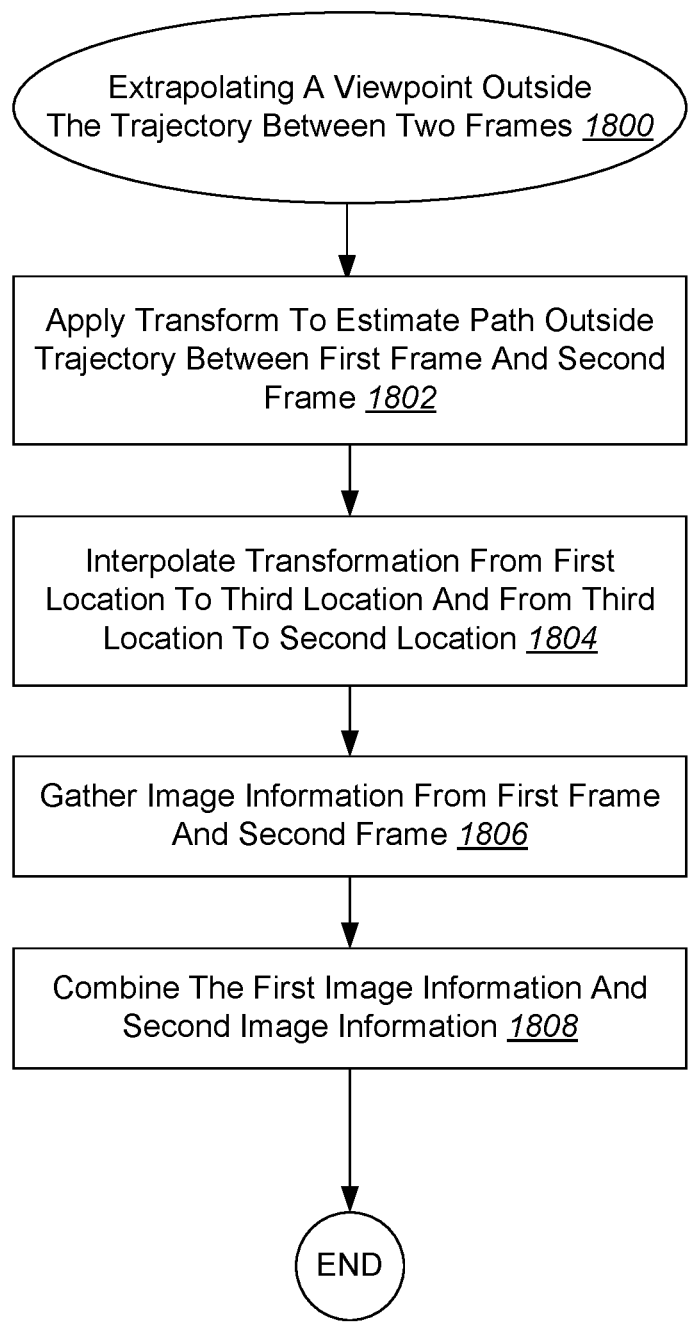
FIG. 18 illustrates an example of a process for extrapolating a viewpoint outside the trajectory between two frames.

With reference to FIG. 18, shown is an example of a process for extrapolating a viewpoint outside the trajectory between two frames. This process can be viewed as an extension to the process described with regard to FIG. 14, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 1802. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image.

Next, an artificially rendered image corresponding to a third location positioned on the path is generated. The artificially rendered image is generated by first interpolating a transformation from the first location to the third location and from the third location to the second location at 1804. Image information is then gathered from the first frame and the second frame at 1806 by transferring first image information from the first frame to the third frame based on the interpolated transformation and second image information from the second frame to the third frame based on the interpolated transformation. Finally, the first image information and the second image information is combined at 1808.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 17, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 19:
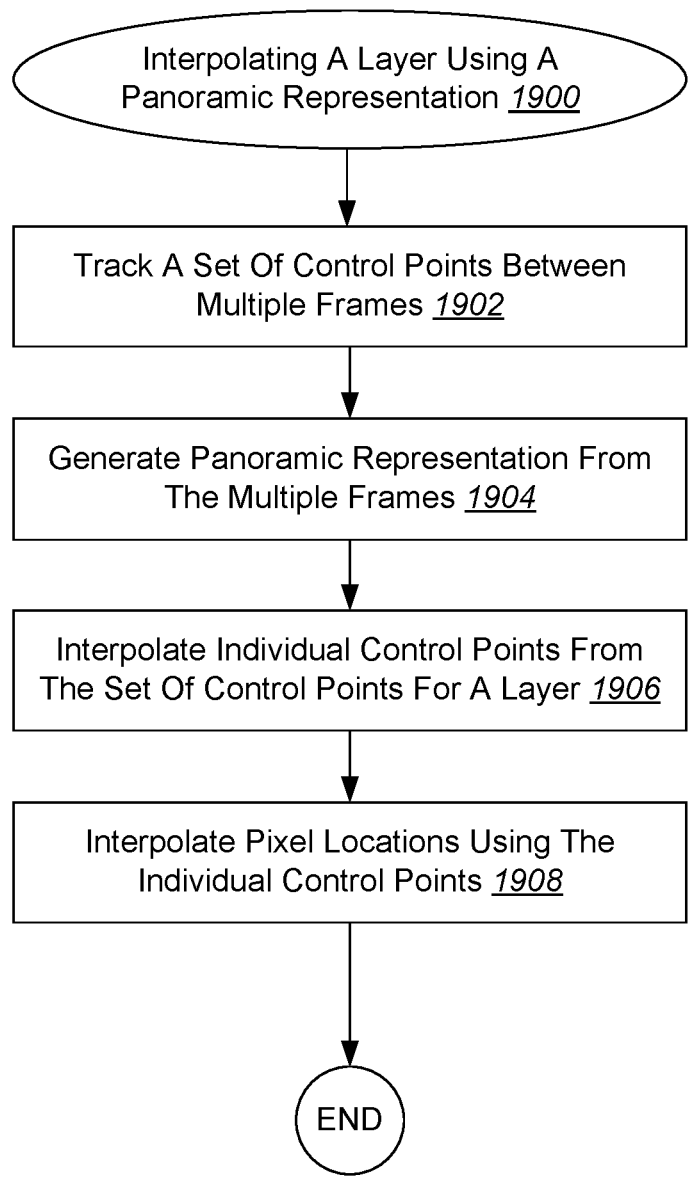
FIG. 19 illustrates an example of a process for interpolating a layer using a panoramic representation.

With reference to FIG. 19, shown is an example of a process for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 1902. In some examples, each pixel corresponds to a control point in the set of control points. In these cases, each pixel is then interpolated based on the set of control points for the artificially rendered image. Next, a panoramic representation is generated from the multiple frames at 1904. Individual control points are then interpolated from the set of control points at 1906 for a desired frame or layer. Pixel locations are then interpolated for this frame or layer using the individual control points at 1908. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 20:
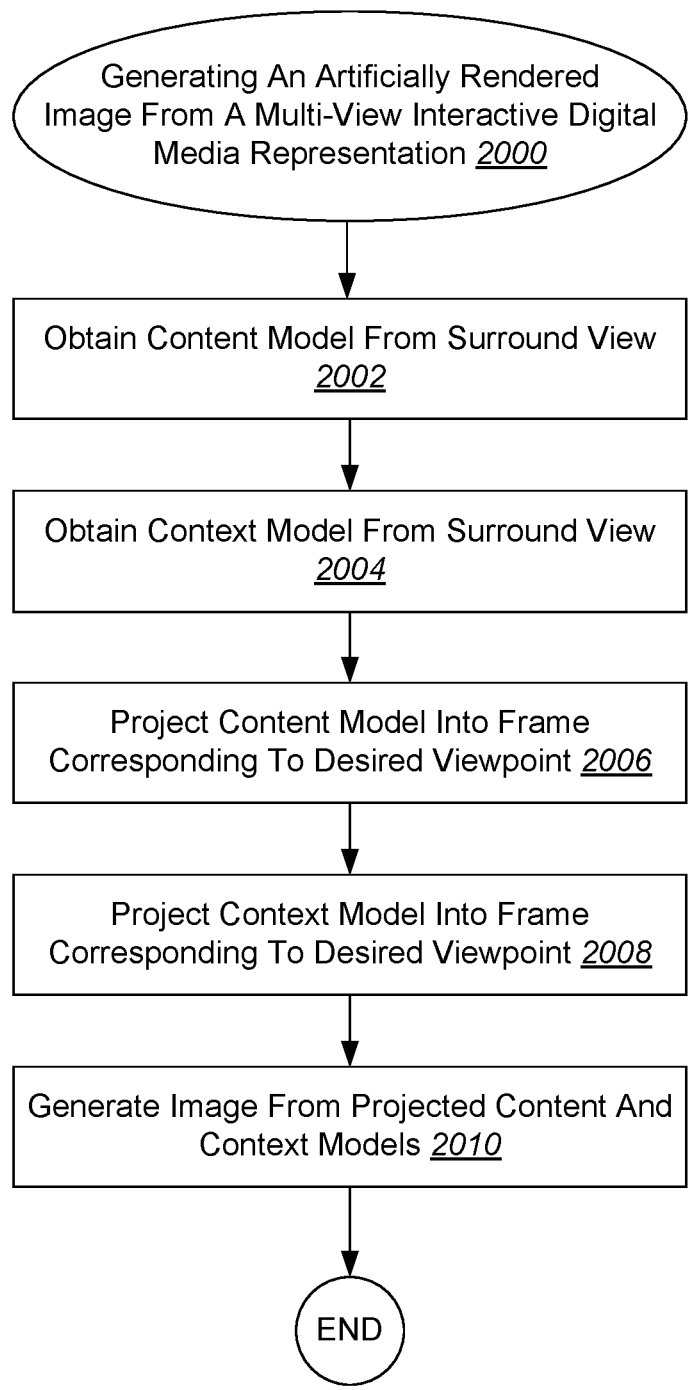
FIG. 20 illustrates an example of a process for generating an artificially rendered image from a multi-view interactive digital media representation.

With reference to FIG. 20, shown is an example of a process for generating an artificially rendered image from a MIDMR. In some examples, the MIDMR is generated from multiple images having location information, and at least a portion of overlapping subject matter. Furthermore, according to various embodiments, the MIDMR is generated by interpolating between the multiple images and/or extrapolating data from the multiple images. In the present example, a MIDMR can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a MIDMR at 2002. This content model is a foreground three-dimensional model including at least one object. In some examples, obtaining the content model from the MIDMR includes extracting the content model from the MIDMR. At 2004, a context model is obtained from the MIDMR. This context model is a background panoramic representation including scenery surrounding any objects in the content model. In some examples, obtaining the context model from the MIDMR includes extracting the context model from the MIDMR. In some embodiments, obtaining the content model and/or context model occurs through segmentation processes as previously described with reference to FIGS. 11 and/or 12. Next, the content model is projected into a frame corresponding to a desired viewpoint at 2006. The context model is also projected into the frame corresponding to the desired viewpoint at 2008. According to various embodiments, the content model and context model are projected according to the depth and orientation of the content model. The artificially rendered image at the desired viewpoint is generated from a combination of the projected content and context at 2010.

Various examples of viewpoint interpolation and extrapolation are described in the present disclosure. According to various embodiments, one or a combination of methods can be used to generate a single artificially rendered image. For instance, one layer can be handled using the method described with regard to FIG. 14, another layer can be handled using the method described with regard to FIGS. 16A-16B, and a background layer can be handled using the method described with regard to FIG. 19. Any combination of methods can be used within the scope of this disclosure. Additionally, any one method can be used alone to generate an artificially rendered image.

Figure 21:
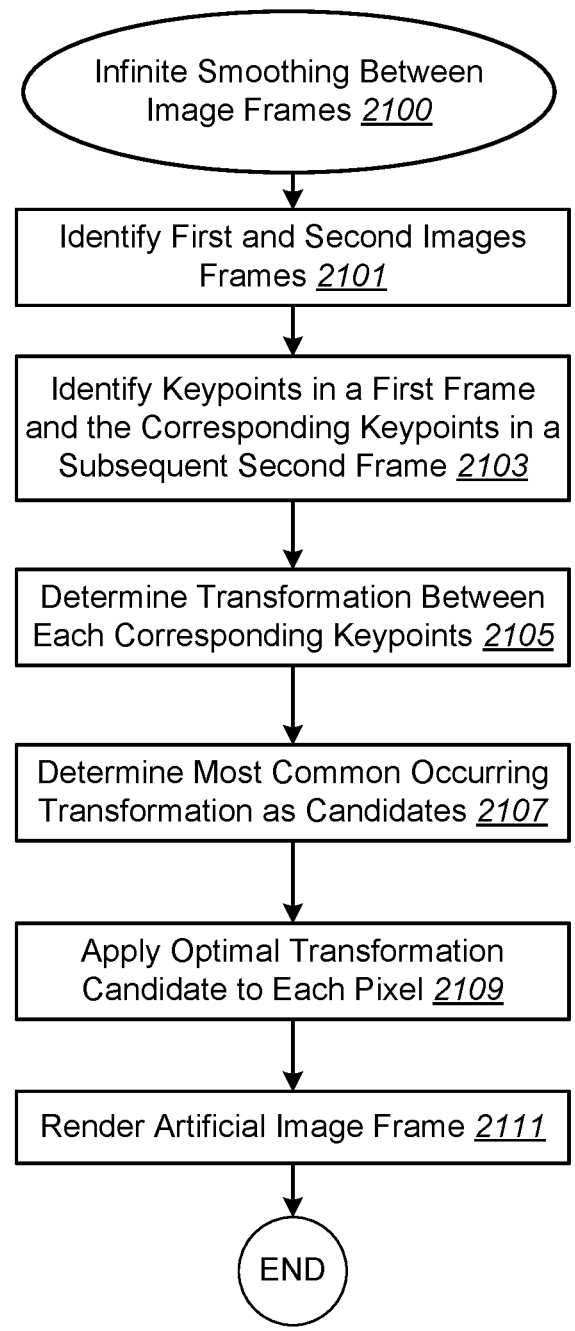
FIG. 21 illustrates an example of a method for infinite smoothing between image frames, in accordance with one or more embodiments.

With reference to FIG. 21, shown is an example of a method 2100 for infinite smoothing between image frames, in accordance with one or more embodiments. Additional examples of processes for interpolation of image frames and infinite smoothing between image frames are described in U.S. patent application No. 15/427,009, titled MULTI-DIRECTIONAL STRUCTURED IMAGE ARRAY CAPTURE ON A 2D GRAPH, previously referenced above. In various embodiments, method 2100 may be implemented as one or more various steps in method 1400, such as estimating transformation at step 1402 and/or interpolating the transformation at step 1404. In various embodiments, method 2100 may be implemented to parameterize a transformation, such as T_AB, described with reference to FIG. 1, for interpolation of those parameters during runtime.

At step 2101, first and second image frames are identified. In some embodiments, the first and second image frames may be part of a sequence of images captured as described with reference to FIGS. 1-8. In various embodiments, the image frames may be consecutively captured images in time and/or space. In some embodiments, the first and second image frames may be adjacent image frames, such as frame N and frame N+1. The method 2100 described herein may be implemented to render any number of frames between N and N+1 based on the position of the user, user selection, and/or viewing device.

A random sample consensus (RANSAC) algorithm may be implemented to determine the possible transformation candidates between the two image frames. As described herein, transformation candidates may be identified from keypoints tracked from a first frame to a second frame. Various transformations may be calculated from various different parameters gathered from various combinations of keypoints. At step 2103, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2105, a transformation is determined for each corresponding keypoint in each image frame. In some embodiments, a set of two keypoint correspondences are used to determine a transformation, such as described in step 2405 with reference to FIG. 24. Various parameters may be used to calculate the transformation between corresponding keyframes by a predetermined algorithm. In one example embodiment, similarity 2D parameters, including x,y translation, a 2D rotation, and a 2D scale, may be used to determine the translation. Other parameters that may be used include 2D translation (x and y translation), 2D Euclidean parameters (2D rotation and x,y translation), affine, homography, etc. The RANSAC algorithm may repeatedly select corresponding keyframes between image frames to determine the transformation. In some embodiments, corresponding keyframes may be selected randomly. In other embodiments, corresponding keyframes may be selected by location.

Once all transformations have been calculated for each keyframe correspondence, the most common occurring transformations are determined as candidates at step 2107. According to various embodiments, keypoints may be grouped based on the associated transformation calculated at step 2105. In some embodiments, each transformation determined at step 2105 is applied to all keypoints in an image, and the number of inlier keypoints for which the transformation is successful is determined, such as described in step 2411 with reference to FIG. 24. In other words, keypoints that experience the same transformation between the first and second image frames are grouped together as inlier keypoints. In some embodiments, a predetermined number of transformations with the most associated inlier keypoints are selected to be transformation candidates. In some embodiments, the image intensity difference between a transformed image and the second image may also be calculated for each transformation determined at step 2105 and applied to the keypoints, such as described in steps 2415 and 2419 with reference to FIG. 24. In some embodiments, image intensity difference is only calculated if a transformation results in a larger number of inlier keypoints than a previous determined transformation as described in step 2413. In various embodiments, the transformations are ranked based on the corresponding number of resulting inlier keypoints and/or image intensity difference.

In various embodiments, a predetermined number of highest ranking transformations are selected to be transformation candidates. In some embodiments, the remaining transformations determined at step 2105 are discarded. Any number of transformation candidates may be selected. However, in some embodiments, the number of transformations selected as transformation candidates is a function of processing power. In some embodiments, processing time may increase linearly with increased number of candidates. In an example embodiment, eight possible transformation candidates with the most associated keypoints are selected. However, in other example embodiments, fewer than eight possible transformation candidates may be selected to decrease required processing time or memory. In some embodiments, steps 2103, 2105, and 2107 are run offline. In some embodiments, steps 2103, 2105, and 2107 are run in real-time, as image frames are captured.

At step 2109, the optimal transformation candidate is applied to each pixel. Each pixel in an image may experience a different transformation between frames. In some embodiments, each of the transformation candidates is applied to each pixel. The transformation candidate that results in the least difference between frames may be selected. In some embodiments, each of the transformation candidates is applied to a group, or "community," of pixels. For example, a community of pixels may comprise a 7×7 (−3, +3) group of pixels. Once an optimal transformation is applied to each pixel, an artificial image may be rendered at step 2111. In various embodiments, steps 2109 and 2111 may be performed during runtime when the user is viewing the sequence of images. In such embodiments, the transformation may be a function of frame number of the frame between N and N+1. The number of frames between N and N+1 may be determined based on various considerations, such as the speed of movement and/or the distance between frames N and N+1. Because method 2100 may generate any number of frames between frames N and N+1, the user may perceive a smooth transition as the user view different viewpoints of the three-dimensional model of an object of interest, as an image frame may be rendered for virtually any viewpoint position the user is requesting to view. Furthermore, because the artificial image frames may be rendered based on the calculated transformation parameters, storage of such artificial image frames is not required. This enhances the functioning of image processing computer systems by reducing storage requirements.

Method 2100 may then be implemented for the transition between each image frame in the sequence. Various embodiments of method 2100 may provide advantages over existing methods of rendering artificial images, such as alpha blending. Especially in the case of concave MIDMRs, existing methods result in artifacts or ghosting effect from improperly aligned image frames. This occurs because unlike convex MIDMRs, concave and/or flat MIDMRs do not experience a single transformation for all pixels and/or keypoints. Method 2100 provides a process for determining the optimal transformation out of multiple transformation candidates to apply to a pixel. Additionally, method 2100 may generate image frames that are seen, as well as portions of image frames that are unseen. Thus, motion between two discretized image frames may be generated by selecting the frame that includes the least amount of conflict.

Generation of Stereoscopic Image Pairs

Figure 22:
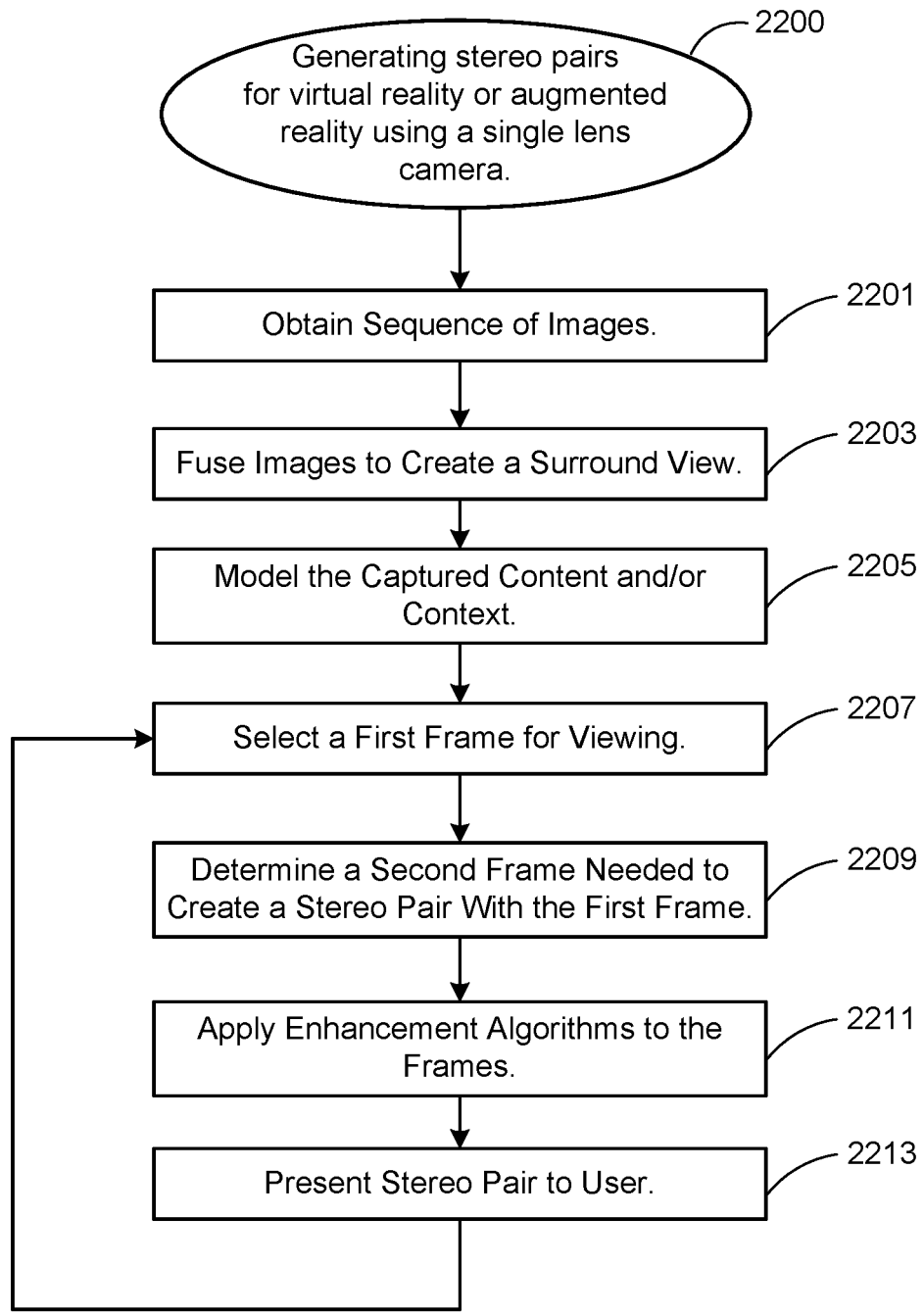
FIG. 22 illustrates an example method for generating stereo pairs for virtual reality or augmented reality using a single lens camera, in accordance with one or more embodiments.

With reference to FIG. 22, shown is an example method 2200 for generating stereo pairs for virtual reality or augmented reality using a single lens camera, in accordance with one or more embodiments. At step 2201, a sequence of images is obtained. In some embodiments, the sequence of images may be multiple snapshots and/or video captured by a camera as previously described with reference to FIGS. 1-8. In some embodiments, the camera may comprise a single lens for capturing sequential images one at a time. In some embodiments, the captured image may include 2D images, such as 2D images 104. In some embodiments, other data may also be obtained from the camera and/or user, including location information, such as location information 106, as well as depth information.

At step 2203, the sequence of images is fused to create a MIDMR. For example, the images and other data captured in step 2201 may be fused together at a sensor fusion block, such as sensor fusion block 110 as previously described with reference to FIG. 1. At step 2205, the captured content and/or context is modeled. As previously described, the data that has been fused together in step 2203 may then be used for content modeling and/or context modeling, as discussed with reference to content modeling 112 and context modeling 114, respectively, in FIG. 1. As such, a MIDMR with a three-dimensional view of an object and/or the context may be provided and accessed by a user. As previously described with reference to block 116 in FIG. 1, various enhancement algorithms may be employed to enhance the user experience. For instance, automatic frame selection, stabilization, view interpolation, image rotation, infinite smoothing, filters, and/or compression can be used during capture of MIDM data. In some examples, these enhancement algorithms can be applied to image data after acquisition of the data. In other examples, these enhancement algorithms can be applied to image data during capture of MIDM data. In some embodiments, the enhancement algorithms may be applied during a subsequent step, such as at step 2211, described below.

At step 2207, a first frame is selected for viewing. In some embodiments, a first frame may be selected by receiving a request from a user to view an object of interest in a MIDMR, such as in step 1002, described above. As previously described, the request may also be a generic request to view a MIDMR without a particular object of interest. In some embodiments, a particular first frame may be specifically selected by the user. In some embodiments, the first frame may be designated for viewing by either the right eye or the left eye. In the present example, the first frame selected at step 2207 is designated for viewing by the left eye.

At step 2209, a second frame needed to create a stereo pair with the first frame is determined. The second frame may be designated for viewing by the other eye of the user, which is not designated to the first frame. Thus, in the present example, the second frame determined at step 2209 is designated for viewing by the right eye. In various embodiments, the second frame may be selected based on a desired angle of vergence at the object of interest and/or focal point. Vergence refers to the simultaneous movement of both eyes in opposite directions to obtain or maintain single binocular vision. When a creature with binocular vision looks at an object, the each eye must rotate around a vertical axis so that the projection of the image is in the center of the retina in both eyes. To look at an object closer by, the eyes rotate towards each other (convergence), while for an object farther away they rotate away from each other (divergence). Exaggerated convergence is called cross eyed viewing (focusing on one's nose for example). When looking into the distance, the eyes diverge until parallel, effectively fixating the same point at infinity (or very far away). As used herein, the angle of vergence refers to the angle between the lines of sight of each frame to the object of interest and/or desired focal point. In some embodiments, a degree of vergence may be between 5 degrees to 10 degrees. In some embodiments, a desired degree of vergence of more than 10 degrees may cause a user to see different objects and/or experience disjointed views (i.e., double vision or diplopia).

In some embodiments, the second frame may additionally be selected based on gathered location and/or IMU information. For example, if the object of interest and/or focal point is closer, a larger degree of vergence may be desired to convey an appropriate level of depth. Conversely, if the object of interest and/or focal point is further away, a smaller degree of vergence may be desired.

In some embodiments, the degree of vergence may then be used to determine a spatial baseline. The spatial baseline refers to the distance between the left eye and the right eye, and consequently, the distance between the first frame and the second frame. The average distance between the left eye and right eye of a human is about 10 cm to 15 cm. However, in some embodiments, a wider spatial baseline may be allowed in order to enhance the experience effect of depth. For example, a desired spatial baseline may be 30 cm.

Once the distance of the spatial baseline has been determined, a second frame located at that distance away from the first frame may be selected to be used as the stereo pair of the first frame. In some embodiments, the second frame located at the determined distance may be an actual frame captured by the camera at step 2201. In some embodiments, the second frame located at the determined distance may be an artificial frame generated by interpolation, or other enhancement algorithms, in creating the MIDMR. In other embodiments, an artificial second frame may be generated by various enhancement algorithms described below with reference to step 2209.

At step 2211, enhancement algorithms are applied to the frames. In some embodiments, enhancement algorithms may only be applied to the second frame. In some embodiments, step 2211 may alternatively, or additionally, occur after step 2205 and before selecting the first frame for viewing at step 2207. In various embodiments, such algorithms may include: automatic frame selection, stabilization, view interpolation, filters, and/or compression. In some embodiments, the enhancement algorithms may include image rotation. In order for the user to perceive depth, the view of each frame must be angled toward the object of interest such that the line of sight to the object of interest is perpendicular to the image frame. In some embodiments, certain portions of the image of a frame may be rotated more or less than other portions of that image. For example, portions identified as context and/or background with a focal point at infinity may be rotated less than a nearby object of interest in the foreground identified as the content.

In some embodiments, image rotation may include using IMU and image data to identify regions that belong to the foreground and regions that belong to the background. For example, rotation information from the IMU data informs how a keypoint at infinity should move. This then can be used to identify foreground regions where a keypoint's movement violates the optical flow for infinity. In some embodiments, the foreground may correspond to the content or an object of interest, and the background may correspond to the context, as described with reference to FIG. 5. In some embodiments, the keypoints may be used to determine optimal transformation for one or more images in a stereo pair. In some embodiments, the keypoints are used to determine focal length and rotation parameters for the optimal transformation.

A Harris corner detector algorithm may be implemented to detect salient features to designate as keypoints in each frame, such as areas of large contrast, areas with minimum ambiguity in different dimensions, and/or areas with high cornerness. In some embodiments, only keypoints corresponding to the object of interest and/or content are designated. For example, when performing image rotation for a concave MIDMR, only keypoints corresponding to the object of interest and/or content will be designated and used. However, where image rotation is used for a convex MIDMR, keypoints corresponding to both the background and the foreground may be designated and used. Then, a Kanade-Lucas-Tomasi (KLT) feature tracker may be used to track keypoints between two image frames. In some embodiments, one or more keypoints tracked by the KLT feature tracker for image rotation may be the same keypoints used by other enhancement algorithms, such as infinite smoothing and/or view interpolation, as further described herein.

Two keypoints in a first frame and corresponding keypoints in a second frame may be selected at random to determine the rotation transformation. Based on the two keypoint correspondences, the focal length and rotation are solved to calculate the transformation. In various embodiments, only keypoints corresponding to the foreground regions are used to solve for focal length and rotation. In some embodiments, finding the optimal rotation transformation may further include minimizing the image intensity difference between the foreground regions of the two image frames. This two-dimensional 3×3 image transformation can be mapped from the combination of an actual 3D camera rotation and the focal length. The new pre-rotated image sequence is then produced given the solved transformation. An example of optimizing the two-dimensional image transformation is further described with reference to FIG. 24.

Figure 24:
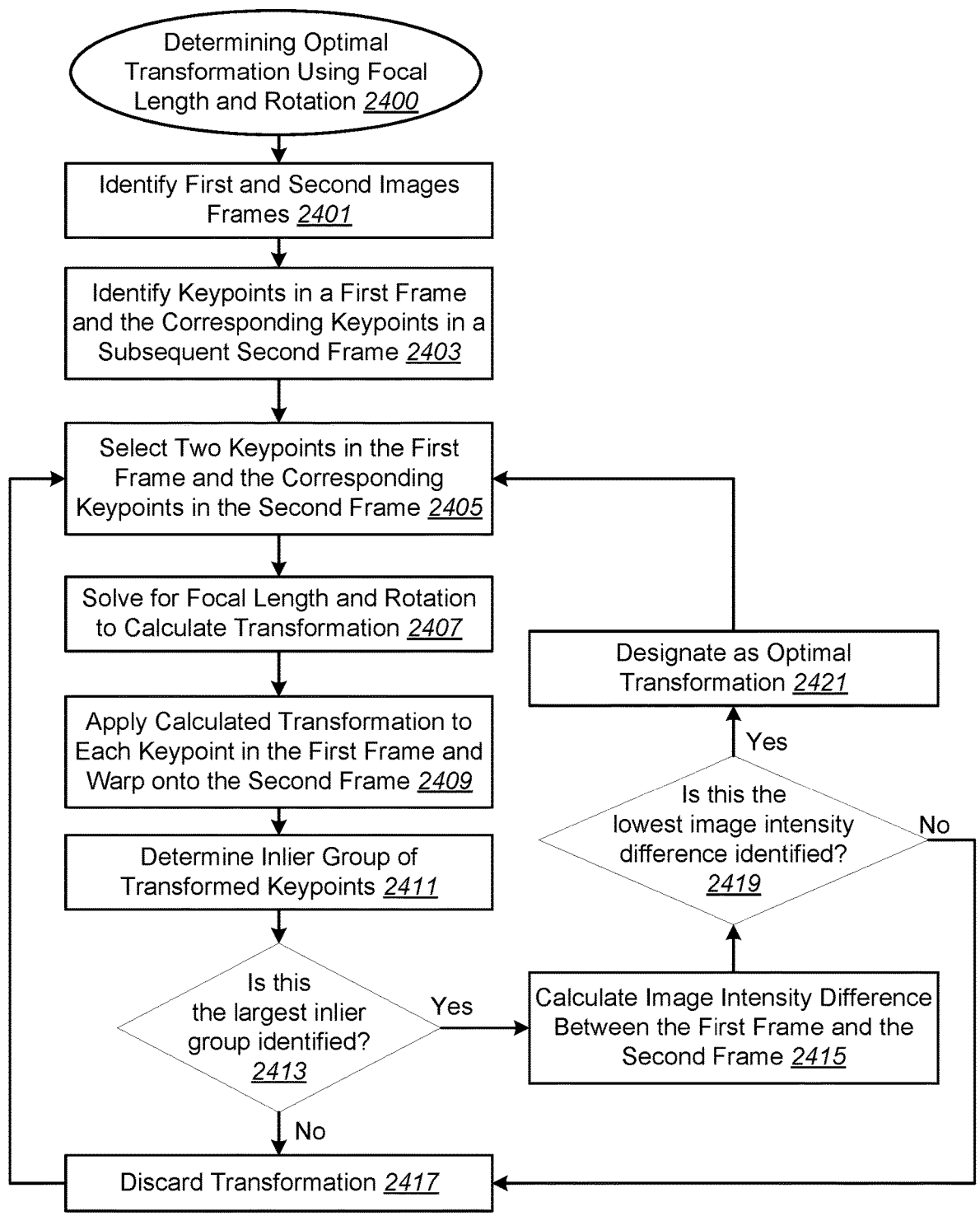
FIG. 24 illustrates an example method for determining the optimal transformation using focal length and rotation as parameters, in accordance with one or more embodiments.

In some embodiments, a frame that is located at a particular point along the camera translation, which needed to create a stereo pair, may not exist. An artificially frame may be rendered to serve as the frame required to complete the stereo pair. Accordingly, by generating these artificially rendered frames, smooth navigation within the MIDMR becomes possible. In some embodiments, frames that have been rotated based on methods described with respect to step 2211 and FIG. 24 are already stabilized and correctly focused onto the object of interest. Thus, image frames interpolated based on these rotated frames may not require additional image rotation applied.

At step 2213, the stereo pair is presented to the user. In some embodiments, a first frame in the stereo pair is designated to be viewed by the user's left eye, while the second frame is designated to be viewed by the user's right eye. In some embodiments, the first and second frames are presented to the respective eye each frame is designated for, such that only the left eye views the first frame while only the right eye views the second frame. For example, the frames may be presented to the user in a viewing device, such as a virtual reality headset, further described with reference to FIGS. 25A and 25B. This effectively applies a 3×3 image warp to the left eye and right eye images. By viewing each frame in the stereo pair with separate eyes in this way, these two-dimensional images are combined in the user's brain to give the perception of 3D depth.

The method may then return to step 2207 to select another frame for viewing. As previously described above, a subsequent frame may be selected by the user. In other embodiments, a subsequent frame may be selected based on a received user action to view the object of interest from a second viewpoint, as described with reference to step 1008 in FIG. 10. For example, this user action can include moving (e.g. tilting, translating, rotating, etc.) an input device, swiping the screen, etc., depending on the application. For instance, the user action can correspond to motion associated with a locally concave MIDMR, a locally convex MIDMR, or a locally flat MIDMR, etc. Additionally, the user action may include movement of the user and/or a viewing device in three-dimensional space. For example, if the user moves the viewing device to another location in three-dimensional space, an appropriate frame corresponding to the view of the object of interest, content, and/or context from that camera location in three dimensional space. As previously described, intermediate images can be rendered between image frames in a MIDMR. Such intermediate images correspond to viewpoints located between the viewpoints of the existing image frames. In some embodiments, stereo pairs may be generated for each of these intermediate images and presented to the user by method 2200.

Thus, method 2200 may be used to generate stereoscopic pairs of images for a monocular image sequence captured by a single lens camera. Unlike existing methods in which stereoscopic pairs are created by simultaneously capturing two images at a predetermined distance apart along a camera translation, method 2200, and other processes described herein, can create stereoscopic pairs with only a sequence of single images captured along a camera translation. Thus, fewer images, and corresponding image data is required, resulting in less data storage. Moreover, the information required for selection of stereoscopic pairs and image rotation for method 2200 do not need to be stored and may be determined in real-time. Additionally, parameters are not set for stereoscopic pairs of images generated by method 2200, unlike in existing methods. For example, a wider or shorter distance may be selected between each image frame in a stereoscopic pair in order to increase or decrease the depth perception, respectively. Furthermore, one or more various objects within an image sequence may be determined to be an object of interest and different rotation. Images may be rotated differently depending on which object or objects are determined to be the object of interest. Moreover, various portions within an image may be rotated differently based on the determined object of interest. In other words, different rotation transformations may be determined for different portions of an image.

By generating and presenting stereo pairs corresponding to sequence of image frames in a MIDMR, method 2200 may be used to provide depth to the MIDMR. In various instances, this allows the user to perceive depth in a scene and/or an object of interest presented as a three-dimensional model without actually rendering and/or storing an actual three-dimensional model. In other words, there is no polygon generation or texture mapping over a three-dimensional mesh and/or polygon model, as in existing methods. However, the user still perceives the content and/or context as an actual three-dimensional model with depth from multiple viewpoint angles. The three-dimensional effect provided by the MIDMR is generated simply through stitching of actual two-dimensional images and/or portions thereof, and generation of stereo pairs corresponding to the two-dimensional images.

Figure 23A:
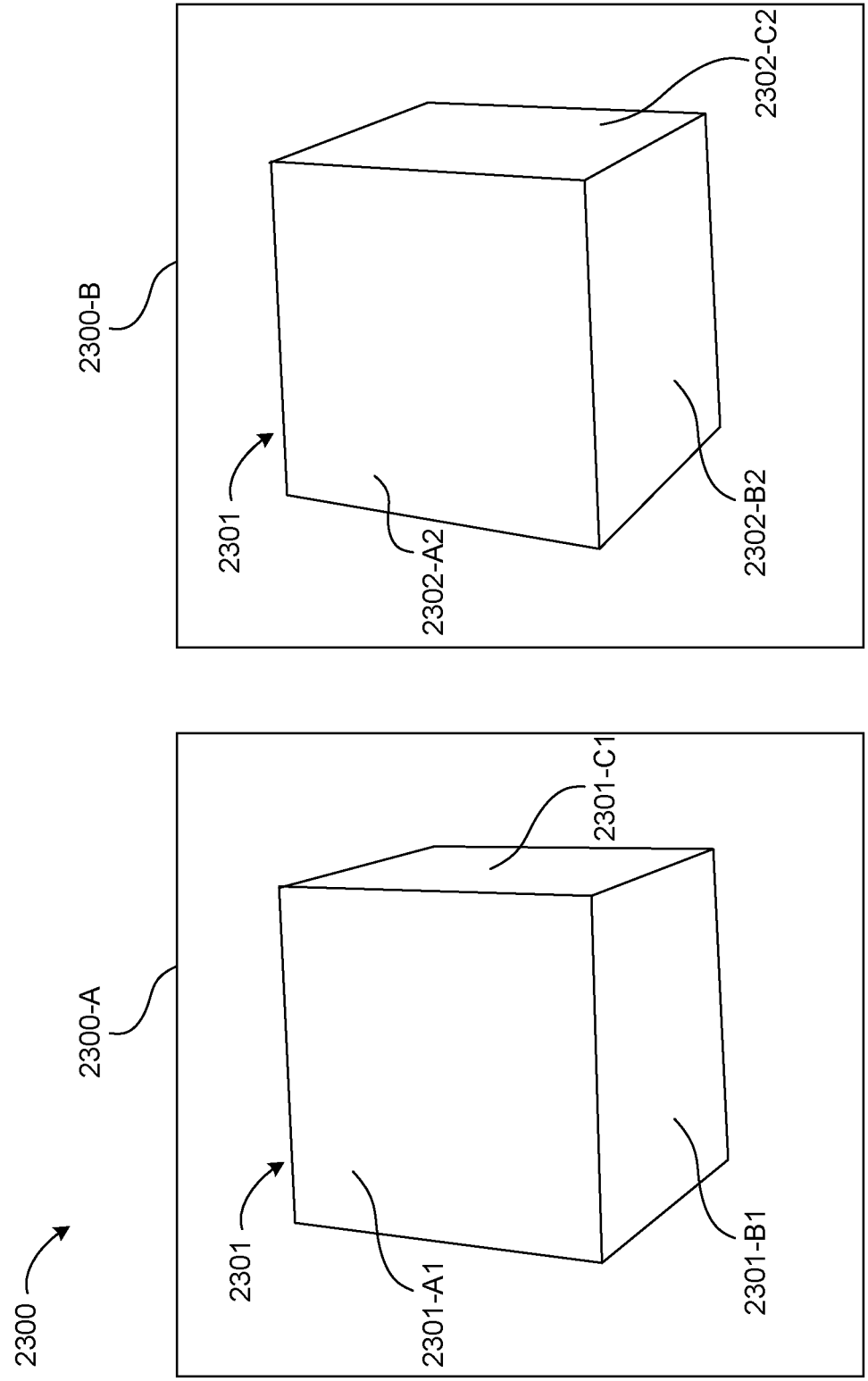
FIGS. 23A and 23B illustrate an example of a stereo pair for virtual reality or augmented reality, in accordance with one or more embodiments.
Figure 23B:
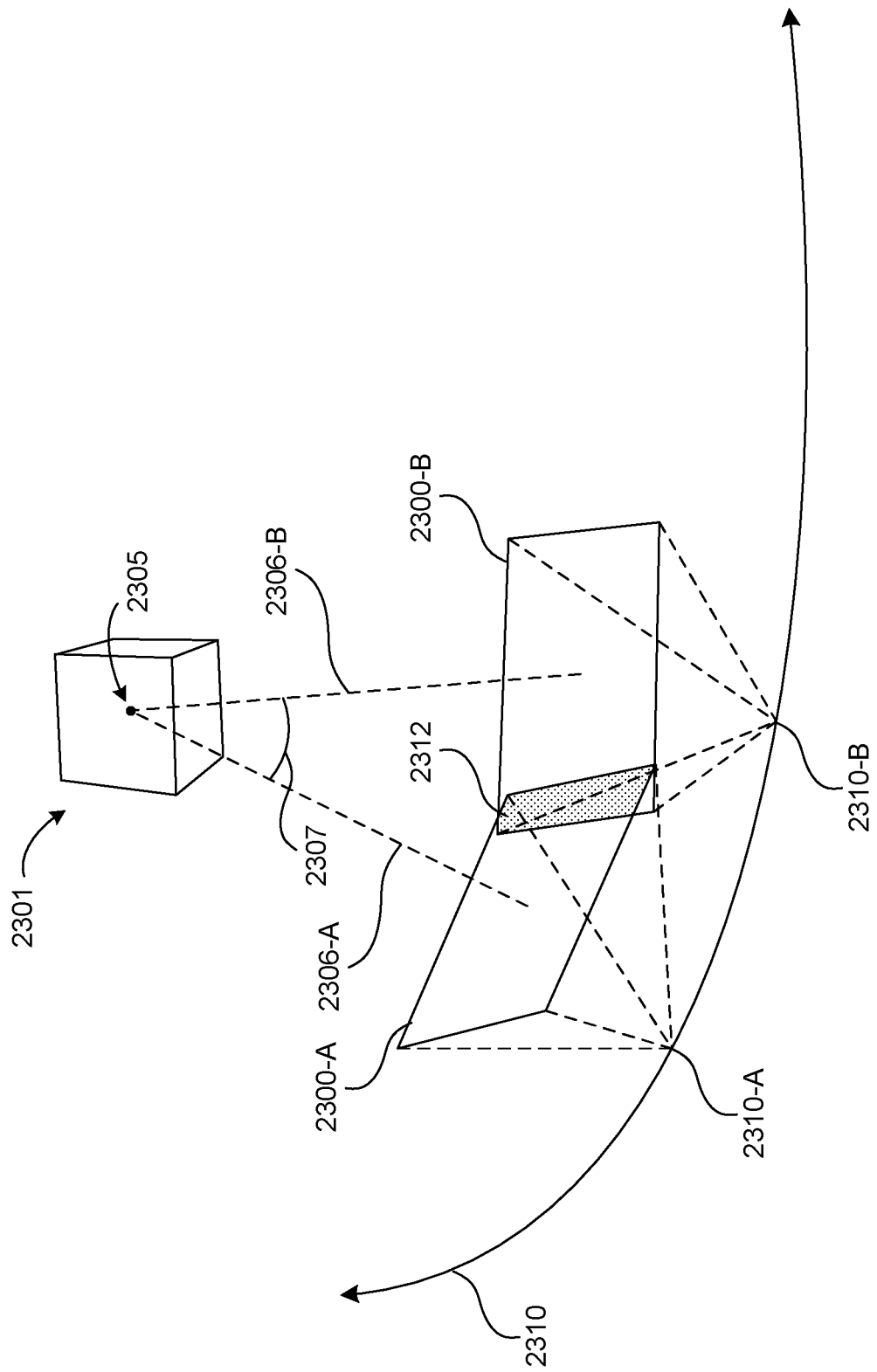

With reference to FIGS. 23A and 23B, an example of a stereo pair 2300 for virtual reality or augmented reality is illustrated, in accordance with one or more embodiments. Stereo pair 2300 includes a first frame 2300-A and a second frame 2300-B, which include an image of a cube 2301. Frames 2300-A and 2300-B correspond to camera locations and/or images captures along a camera translation 2310, as depicted in FIG. 23B. For example, frames 2300-A and 2300-B may correspond to camera locations 2310-A and 2310-B, respectively. Frames 2300-A and 2300-B may include overlapping subject matter, as shown by shaded portion 2312. In various embodiments, the arc path of the camera translation 2310 may or may not be uniform around cube 2301. Frame 2300-A is a frame that may be designated for viewing by a user's left eye. Accordingly, frame 2300-A may be displayed on a screen in a virtual reality headset corresponding to the left eye view. Frame 2300-B is a frame that may be designated for viewing by a user's right eye. Accordingly, frame 2300-B may be displayed on a screen in a virtual reality headset corresponding to the right eye view.

As can be seen in FIG. 23A, cube 2301 includes sides that are visible within the images of frames 2300-A and 2300-B. The sides in image frame 2300-A are designated 2301-A1, 2301-B1, and 2301-C1, while the corresponding sides in image frame 2300-B are designated 2301-A2, 2301-B2, and 2301-C2. According to various embodiments, frames 2300-A and 2300-B may include slightly different views of cube 2301 corresponding to their respective positions on a spatial baseline. As previously described, frame 2300-A may be selected, as in step 2207, based on receiving a request from a user to view an object of interest in a MIDMR. Frame 2300-A may be selected as a starting position for viewing cube 2301. In other embodiments, frame 2300-A may be selected based on user input selecting a starting position for viewing cube 2301. Frame 2300-A is then designated for left eye viewing. In some embodiments, frame 2300-A may be artificially rendered by view interpolation using existing images captured. The image of frame 2300-A may include a line of sight 2306-A to a focal point 2305 that is perpendicular to the plane of frame 2300-A. In some embodiments, image rotation may be implemented to correct the image of frame 2300-A, such as at step 2211 or with reference to method 2400 described below, such that the line of sight 2306-A to focal point 2305 is perpendicular to the plane of frame 2300-A.

The second frame 2300-B is then determined, as in step 2209. As previously described, frame 2300-B may be selected based on a desired angle of vergence 2307 between the line of sight 2306-A for frame 2300-A and the line of sight 2306-B to focal point 2305 for frame 2300-B. Frame 2300-B may additionally, and/or alternatively, be selected based on a determined spatial baseline. In some embodiments, the determination of frame 2300-B may utilize IMU and other location information gathered. In some embodiments, frame 2300-B may be artificially rendered by view interpolation using existing images captured. In some embodiments, image rotation may be implemented to correct the image of frame 2300-B, such as at step 2211, such that the line of sight 2306-B to focal point 2305 is perpendicular to the plane of frame 2300-B. As depicted in FIG. 23, the images within each frame contain slightly offset views of cube 2301. For example, a greater area of side 2301-C is visible in frame 2300-B as compared to within frame 2300-A.

In other embodiments, the first frame selected may be frame 2300-B and frame 2300-A may be determined to be included within stereo pair 2300 based on the angle of vergence, IM data, and/or other location information, as previously described.

With reference to FIG. 24, shown is an example method 2400 for determining the optimal transformation using focal length and rotation as parameters, in accordance with one or more embodiments. In some embodiments, method 2400 is implemented to calculate the transformations to rotate frames in a sequence of images, such as during image rotation, as previously mentioned at step 2241. In some embodiments, method 2400 may be implemented as image stabilization to stabilize captured image frames in the image sequence corresponding to a MIDMR. In some embodiments, method 2400 may be implemented at step 2241 and/or before selecting a first frame for viewing at step 2207

At step 2401, first and second image frames are identified. In some embodiments, the first and second image frames may be part of a sequence of images captured at step 2201. In various embodiments, the image frames may be consecutively captured images in time and/or space. In some embodiments, the first and second image frames may be adjacent image frames, such as frame N and frame N+1. In other embodiments, image frames identified at step 2401 may not be adjacent frames, but may be frames separated by one or more other frames, such as frame N and frame N+x. In some embodiments, one or more of the identified image frames are artificially interpolated image frames.

A RANSAC (random sample consensus) algorithm may be implemented to determine the optimal transformation between the two image frames. As described herein, focal length and rotation may be identified from keypoints tracked from a first frame to a second frame. Various transformations may be calculated from these parameters gathered from various combinations of keypoints and applied to the first frame and/or the second frame. The number of inlier keypoints and/or image intensity difference between the two frames is determined after a transformation has been applied. The RANSAC algorithm may test a predetermined number of calculated transformations as such, to determine an optimal transformation resulting in the largest number of inlier keypoints and/or a minimal image intensity difference.

At step 2403, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2405, two keypoints in the first frame and the corresponding keypoints in the second frame are selected. In some embodiments, the two keypoints in the first frame may be selected randomly by the RANSAC algorithm. The two corresponding keypoints in the second frame may be identified by the KLT feature tracker. In some embodiments, two keypoints may be randomly selected in the second frame and the corresponding keypoints in the first frame are identified. Each pair of corresponding keypoints may be referred to herein as a correspondence. For example, keypoint A on frame N and keypoint A' on frame N+1 correspond to each other via KLT feature tracking and may comprise a pair (A, A'). A second correspondence (B, B') may be selected at step 2405 which comprises keypoint B on frame N and keypoint B' on frame N+1.

Based on the two point correspondences, the focal length and rotation are solved to calculate the transformation at step 2407. In other words, a transformation, T, between the first frame and second frame may be calculated from the two corresponding pairs of keypoints using a predetermined algorithm. For example, a mathematical model may be used, such as that provided in M. Brown, R. Hartley, and D. Nister. Minimal solutions for panoramic stitching. In Proceedings of the International Conference on Computer Vision and Pattern Recognition (CVPR07), Minneapolis, June 2007. In order to calculate a transformation based on rotation and focal length, four parameters are required: three for rotation and one for focal length. Each correspondence of a keypoint between frames provides two constraints. Thus, four constraints can be provided by the two correspondences for each selected keypoints between frames. The derived close-form solution is the calculated transformation based on the two selected keypoints.

At step 2409, the calculated transformation T1 is applied to each keypoint in the first frame which is warped onto the second frame. In other words, all keypoints in the first frame are transformed to the second image via applying the calculated transformation. The transformation is reversible and in some embodiments, the keypoints in the second frame may be transformed onto the first frame after the calculated transformation is applied to keypoints in the second frame.

At step 2411, an inlier group of transformed keypoints is determined. In some embodiments, a transformed keypoint in the first frame is considered an inlier if the transformation T1 correctly transforms the keypoint to match the corresponding keypoint in the second frame. In some embodiments, this can be determined by computing the L2 distance between a transformed keypoint and its corresponding keypoint on the second image. For example, a transformed keypoint on a first frame N may be denoted as K and its corresponding keypoint on the second frame N+1 may be denoted as K'. The L2 distance is computed as $\|A^\wedge - A'\|$, which corresponds to the distance between two 2D points. If the distance between any keypoint correspondence is within a predetermined threshold distance in any direction, then the correspondence will be determined to be an inlier. In other words, if the difference between any keypoint correspondence is greater than the predetermined threshold distance, then the keypoint will be determined to be an outlier.

For example, the threshold distance may be a threshold pixel distance of 2 pixels, which is the L2 distance between two keypoints in a correspondence. Thus, if the distance between a keypoint K and its corresponding keypoint K' is more than 2 pixels, then that keypoint correspondence will be determined to be an outlier based on the transformation applied at step 2409. In various embodiments, the threshold pixel distance may be a function of image resolution and can scale linearly. For example, method 2400 may be processing images at a 320×180 pixels resolution and use a threshold pixel distance of 2 pixels. However, if method 2400 is used to process images at a 1080p (1920×1080 pixels) resolution, then a threshold pixel distance of 6-8 pixels may be used. In some embodiments, a different threshold pixel distance may be chosen for a given image resolution. In some embodiments, the threshold pixel distance may be empirically determined based on experimental results of accuracy.

After all keypoint correspondences have been measured as such, it is determined whether the calculated transformation T1 resulted in the largest inlier group identified, at step 2413. If the transformation T1 calculated applied at step 2409 does not result in the largest group of inlier keypoints, the calculated transformation T1 is discarded at step 2417. In other words, if a larger inlier group was identified based on a previous transformation, T0, calculated at step 2407 and applied at step 2409, then the current calculated transformation T1 is discarded. If the transformation T1 calculated at step 2407 is the first calculated transformation within the RANSAC algorithm, then it necessarily results in the largest group of inlier keypoints and the transformation data will be stored for comparison with subsequently calculated transformations.

If the calculated transformation T1 applied at step 2409 does result in the largest group of inlier keypoints, the image intensity difference between the first frame and the second frame is calculated at step 2415. In some embodiments, the calculated transformation T1 may be applied to every pixel in the first frame to warp the first frame onto the second frame, and an image intensity difference is calculated between the transformed first frame and the second frame. For example, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two frames will be between 0 and 255. A lower image intensity difference value corresponds to a closer image match between frames, and consequently a more accurate transformation.

There may be instances where a larger inlier group is determined at step 2413, but a higher image intensity difference value is calculated at step 2415. In this instance, the transformation resulting in the higher image intensity difference value will be discarded. Alternatively, the transformation resulting in the larger inlier group may be stored in some embodiments. Such instances are more likely to occur in instances where stabilization of foreground is desired in image frames that include large textured background regions. Accordingly, the RANSAC algorithm may result in calculated transformations that include large inlier keypoint sets that correspond to the large background, instead of the foreground. This may result in higher intensity error in the foreground region. To compensate for this in some embodiments, the RANSAC algorithm may measure focal length and rotation using only keypoints located in the foreground of an image. A background keypoint removal may be performed on the image frames within a sequence of images before the RANSAC algorithm is implemented. Keypoints corresponding to the background of an image may be identified based on IMU data to calculate how such keypoints with focal points at infinity should move between frames. Once identified, such background keypoints are removed, such that the RANSAC algorithm calculated transformations at step 2407 using only keypoints corresponding to the foreground. This may reduce undesired transformations resulting in larger inlier groups (aligning the background), but higher image intensity difference values (from unaligned foreground). Such background keypoint removal may also be used with concave MIDMRs, such as the MIDMR depicted in FIG. 7B. In convex panoramic MIDMRs, calculating transformations from keypoints corresponding to the background and the foreground may be desired.

It is then determined whether the calculated image intensity difference is the lowest image intensity difference identified at 2419. If a lower image intensity difference was determined from a previous transformation, such as T0, calculated at step 2407, then the current transformation T1 is discarded at 2417, and another two keypoint correspondences may be randomly selected at step 2405. If however, the image intensity difference for the present transformation T1 is determined to be the lowest out of all previously determined image intensity differences for prior transformations, then the current transformation is designated as the optimal transformation for the first and second frames at step 2421.

In some embodiments, step 2415 is only implemented if a larger inlier group is determined at 2413. The transformation calculated at step 2407 in a first iteration of the RANSAC algorithm would necessarily result in the largest inlier group. In other embodiments, step 2415 may be implemented if the inlier group determined at 2413 is at least equal to the largest inlier group resulting from a previous transformation. In rare instances, a subsequent transformation calculated at step 2407 may result in the same inlier group size, as well as the same image intensity difference. In such instance, the transformation calculated first may be kept while the second transformation is discarded at step 2417. In other embodiments, the subsequent transformation is kept while the previous transformation discarded.

The method 2400 may then return to step 2405 to select another two correspondences of keypoint pairs. Such keypoint correspondences may include another randomly selected pair of keypoints in the first frame. In some instances, randomly selected keypoint correspondences may be correspondences that were previously selected at step 2405. For example, correspondence (A, A') and a third corresponding keypoint pair (C, C') may be selected in the second iteration of the RANSAC algorithm. In even rarer occasions, the same exact keypoint pairs may be selected in subsequent iterations of the RANSAC algorithm. For example, a subsequent iteration of the RANSAC algorithm may again select correspondences (A, A') and (B, B'). In this case, the resulting inlier group size and calculated image intensity difference would be identical to the previously calculated transformation based on the previous iteration. In this instance, the first transformation will be kept and the subsequent iteration involving the same calculated transformation will be discarded. However, the probability of such occurrence may be very unlikely depending on the number of keypoints identified on an image frame, for example, 1,000 keypoints. Thus, the chance occurrence of this instance can simply be ignored.

The RANSAC algorithm of method 2400 may continue for any number of predetermined cycles. For example, the RANSAC algorithm may perform steps 2405 through 2417 one hundred times for two image frames. However, the RANSAC algorithm may be performed any number of cycles as desired. The result of method 2400 is an optimal transformation between the first frame and the second frame, which results in the largest amount of inlier keypoints and the lowest image intensity difference when the transformation is applied to the first frame and warped onto the second frame, or vice versa.

According to various embodiments, the image warp may be constructed from the transformation corresponding to the optimal focal length and rotation. In some embodiments, the image warp is constructed as $KRK^{-1}$, where K is an intrinsic parameter given the optimal focal length, and R is a 3×3 rotation matrix. K is a 3×3 focal length matrix, and $K^1$ is the inverse matrix of K. R may be a special orthogonal group 3, or SO(3), matrix. Applying this 3×33D transformation to the second image in the stereo pair will ensure that the second image frame is always perpendicular to the line of sight to the object of interest and/or foreground. In some embodiments, method 2400 may be implemented to determine the optimal transformation between each frame in the image sequence, which can be used to compose a trajectory for the image sequence of the MIDMR created at step 2203 of method 2200. In some embodiments, method 2400 may be implemented to stabilize the captured images of the image sequence of the surround vie created at step 2203. In such embodiments, subsequent rotation may not be required for image frames in a stereo pair.

As described, using focal length and camera rotation as stabilization parameters has a clear physical mean. In other words, given the captured image sequence, each image represents a three-dimensional camera location of a camera in a three-dimensional world, the rotation is modeled as how to rotate and zoom these set of cameras in three-dimensional space in order to produce a spatially correct rotation. Because, the image warp is mapped from physically meaningful parameters (focal length and camera rotation), the warped image will follow optical rules of physics, and the rotated image will be optically correct and free from unsound distortion. This effectively applies a 3×3 image warp to the left eye and right eye images.

AR/VR Content Generation

Figure 25A:
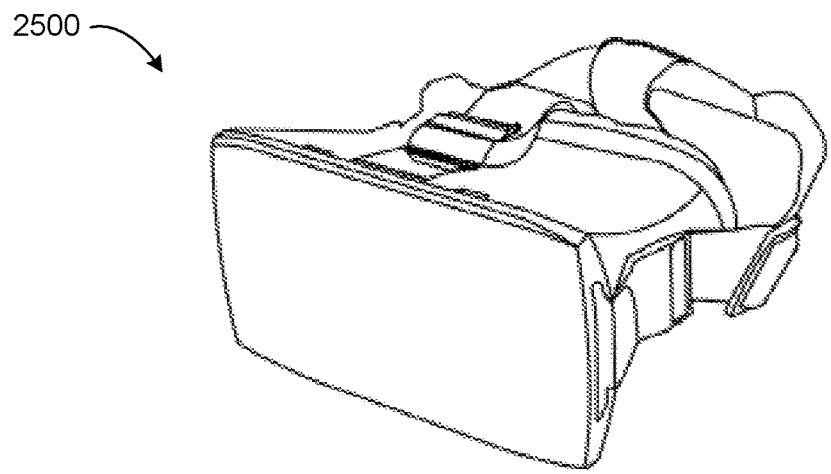
FIGS. 25A and 25B illustrate an example, of a AR/VR headset for displaying AR/VR content, in accordance with one or more embodiments.
Figure 25B:
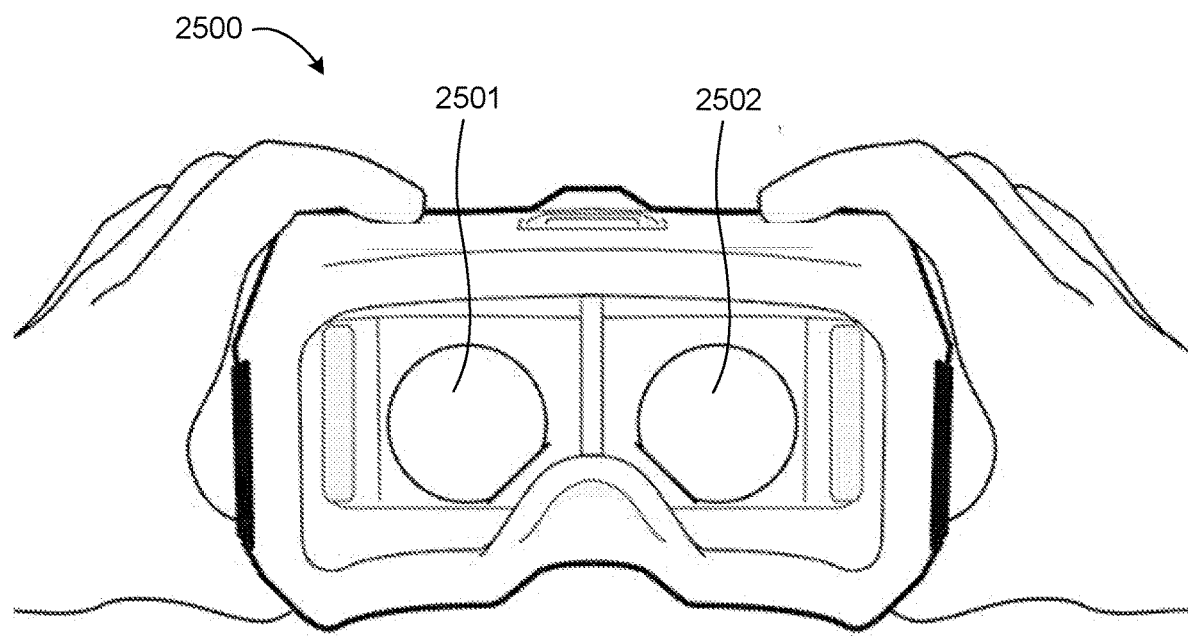

FIGS. 25A and 25B illustrate an example, of an AR/VR headset 2500 for displaying AR/VR content, in accordance with one or more embodiments. Headset 2500 may be a display module configured to be worn on a user's head over the eyes. In various embodiments, headset 2500 comprises a stereoscopic head-mounted display which provides separate images for each eye. Such separate images may be stereoscopic pairs of image frames, such as stereoscopic pair 2300, generated by method 2200. Each image in the stereoscopic pair may be projected to the user at one of screens 2501 or 2502. As depicted in FIG. 25B screen 2501 projects an image to the user's left eye, while screen 2502 projects in image to the user's right eye.

Further embodiments of headset 2500 may include stereo sound and/or head motion tracking, which may utilize gyroscopes, accelerometers, structured light systems, etc. In such embodiments, as the user moves, such as by turning her head or by walking around, various images, generated by the various methods described herein, may be presented to the user, which correspond to different viewpoints depending on the user's movement and/or position. In some embodiments, headset 2500 may further comprise eye tracking sensors and/or gaming controllers.

Figure 26A:
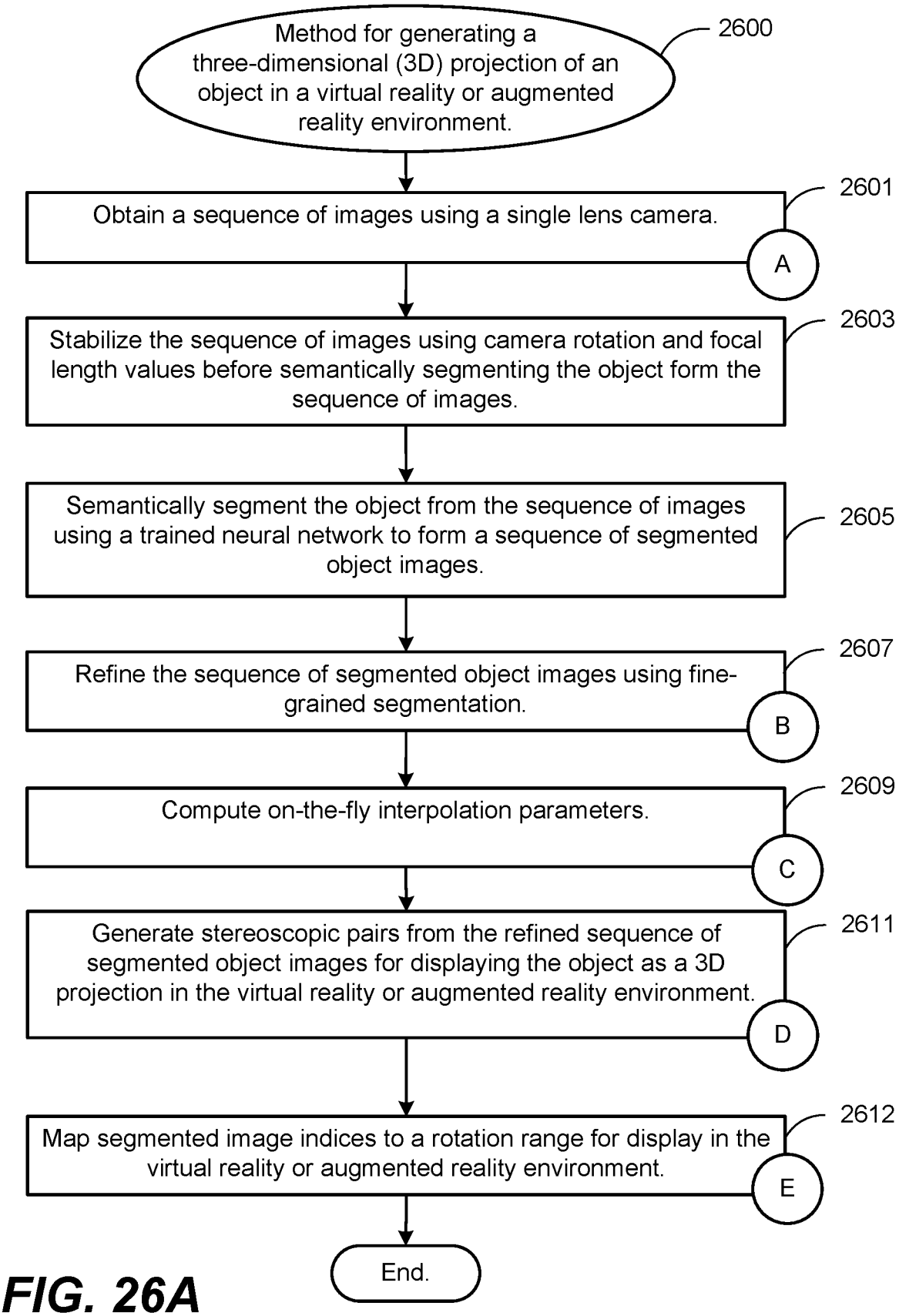
FIGS. 26A-26C illustrate an example of a method for generating a three-dimensional (3D) projection of an object in a virtual reality or augmented reality environment, in accordance with one or more embodiments.
Figure 26B:
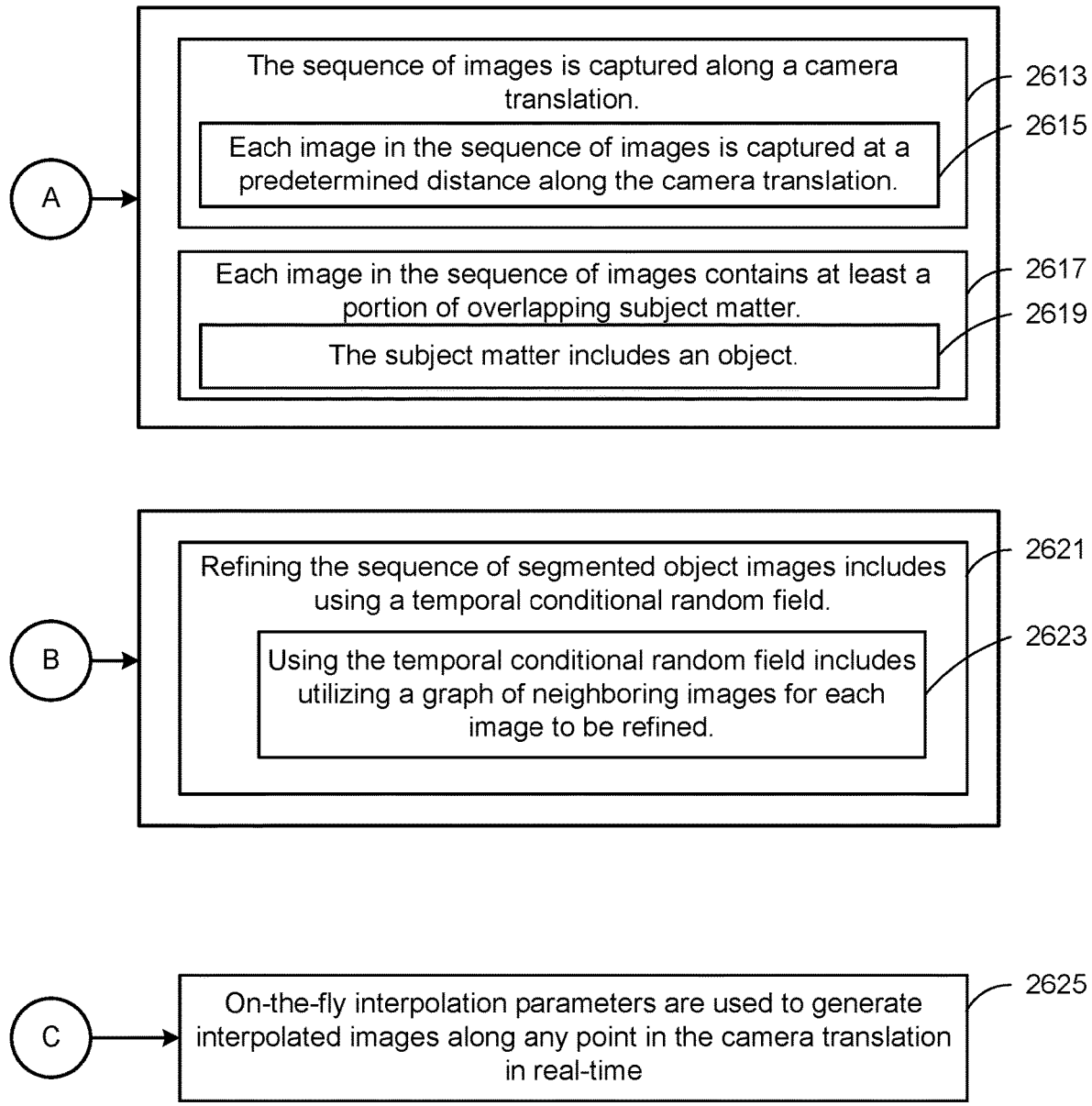
Figure 26C:
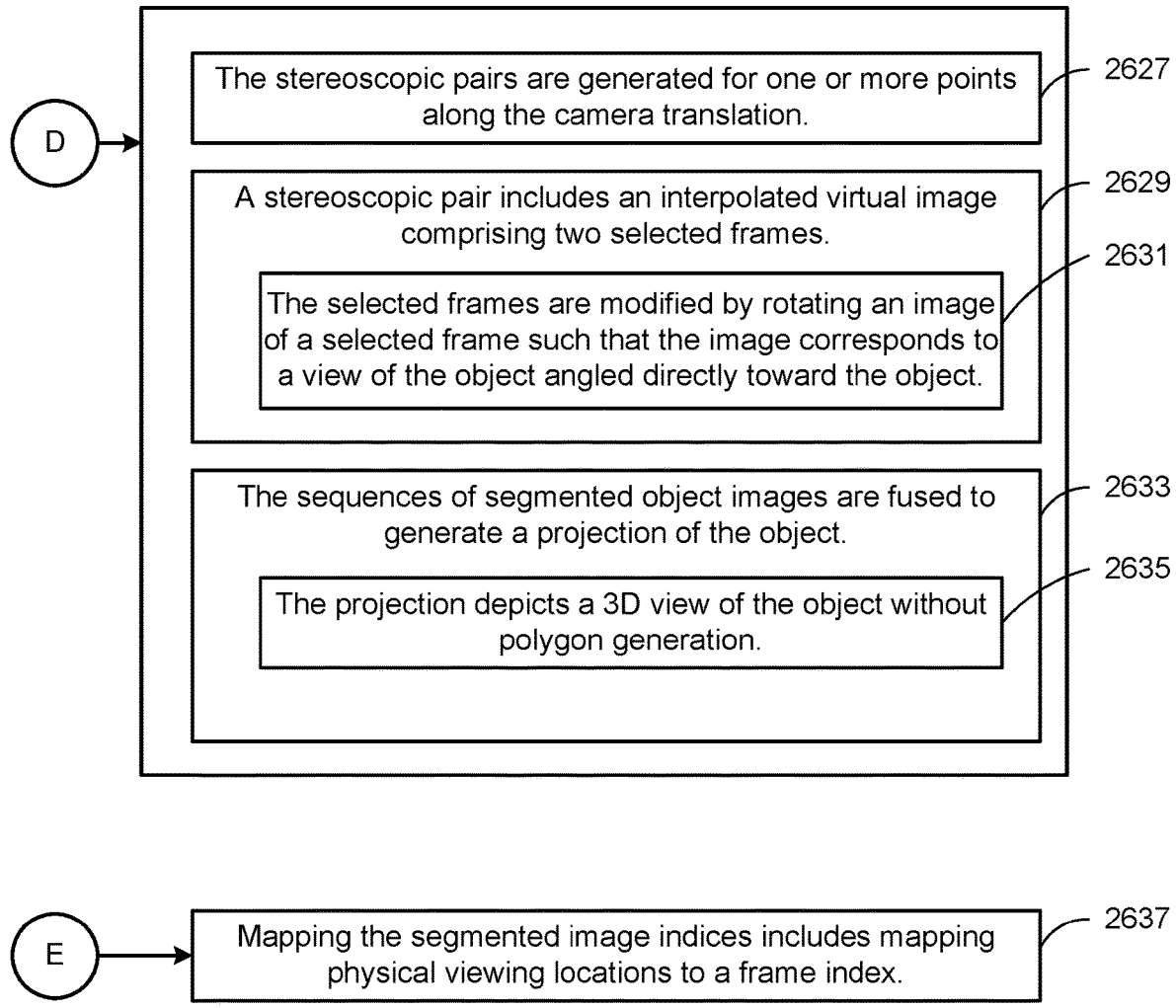

FIGS. 26A-26C illustrate an example of a method 2600 for generating a three-dimensional (3D) projection of an object 2619 in a virtual reality or augmented reality environment, in accordance with one or more embodiments. In particular embodiments, the 3D projection may be displayed in an augmented reality (AR) environment, in which elements of a live direct or indirect view of a physical, real-world environment are augmented (or supplemented) by computer-generated sensory input such as sound, video, graphics, or GPS data, including the 3D projection of the object 2619. At operation 2601, a sequence of images 2613 is obtained using a single lens camera. The sequence of images 2613 is captured along a camera translation 2615. In some embodiments, each image in the sequence of images 2613 is captured at a predetermined distance along the camera translation 2615. In some embodiments, each image in the sequence of images 2613 contains at least a portion of overlapping subject matter 2617. The subject matter 2617 may include an object 2619.

At operation 2603, the sequence of images 2613 may be stabilized using camera rotation and focal length values before semantically segmenting the object 2619 from the sequence of images 2613, as previously described with reference to FIG. 24. In other embodiments, other parameters may be used to stabilize the sequence of images 2613, including 2D translation (x,y translation), 2D Euclidean (2D rotation and x,y translation), similarity 2D (2D rotation, 2D scale, and x,y translation), affine, homography, etc. According to various embodiments, such stabilization may be implemented for frame selection of various keyframes in the sequence of images 2613, as described with reference to FIGS. 1 and 2.

At operation 2605, the object 2619 is semantically segmented from the sequences of images 2613 using a trained neural network to form a sequence of segmented object images, such as described with reference to FIGS. 2 and 11. At operation 2607, the sequence of segmented object images is refined using fine-grained segmentation, such as described with reference to FIGS. 2 and 12. In some embodiments refining the sequence of segmented object images includes using a temporal conditional random field 2621. Using the temporal conditional random field 2621 may include utilizing a graph 2623 of neighboring images for each image to be refined.

At operation 2609, on-the-fly interpolation parameters 2625 are computed. In some embodiments, on-the-fly interpolation parameters 2625 are used to generate interpolated images along any point in the camera translation in real-time. Various methods and processes previously described with reference to FIGS. 13-21 may be implemented to compute on-the-fly interpolation parameters 2625.

At operation 2611, stereoscopic pairs 2627 are generated from the refined sequence of segmented object images for displaying the object as a 3D projection in the virtual reality or augmented reality environment. In some embodiments, the stereoscopic pairs 2627 are generated for one or more points along the camera translation 2615. A stereoscopic pair 2627 may include an interpolated virtual image 2629 comprising two selected frames. Such interpolated virtual image may be rendered based on the on-the-fly interpolation parameters 2625 computed at operation 2609. The selected frames may be modified (2631) by rotating an image of a selected frame such that the image corresponds to a view of the object 2619 angled directly toward the object. In some embodiments, this stabilization may be performed by the method 2400 described with reference to FIG. 24. As previously described, such rotation may cause the line of sight to the object 2619 to be perpendicular to the plane of the selected frame.

In various embodiments, the segmented object images are fused (2635) to generate a projection of the object 2619. The projection may depict a 3D view of the object 2619 without polygon generation. At operation 2612, segmented image indices 2637 are mapped to a rotation range for display in the virtual reality or augmented reality environment. In some embodiments, mapping the segmented image indices 2637 may include mapping physical viewing locations to a frame index, as previously described with reference to FIG. 2. The fused object images may be displayed as a MIDMR to a user at a viewing device, such as headset 2500, where each image in the stereoscopic pair 2627 is displayed at one screen corresponding to one of the eyes of the user. As the user moves the viewing device, different views of object 2619 corresponding to the mapped viewing location.

As such, the user may perceive a three-dimensional view of the object 2619 without rendering and/or storing an actual three-dimensional model by the system. As previously described, there may be no polygon generation or texture mapping over a three-dimensional mesh and/or polygon model. However, the user still perceives the object 2619 and/or other context as an actual three-dimensional model. The three-dimensional effect provided by the MIDMR is generated simply through stitching of actual two-dimensional images and/or portions thereof.

As previously discussed, user action to view an object of interest at various viewpoints may include moving a viewing device, such as a smartphone or headset 2500, further described with reference to FIG. 25. For example, the viewing device can include sensors for detecting a tilt of the device. Thus, when a user tilts the device on which a multi-view interactive digital media representation is displayed, the senor data from the tilt sensor can be used to affect how a multi-view interactive digital media representation is subsequently displayed.

In particular embodiments, a system can be configured to output multi-view interactive digital media representations in response to user navigational inputs. The navigational inputs can be analyzed to determine metrics which indicate a user's interest in the multi-view interactive digital media representation. For example, an inertial measurement unit (IMU) on a mobile device can be used to measure rotations of the device about three axes. The measured rotations of the device can be used to determine rotations of a multi-view interactive digital media representation. A count, referred to as a tilt count, can be derived from the measured rotations of the device. The tilt count can be used as a metric to indicate the user's interest in the multi-view interactive digital media representation and affect how subsequent multi-view interactive digital media representations are displayed. Then, the system can receive tilt counts as navigational inputs which affect the presentation of the multi-view interactive digital media representation, such as inputs which cause the images in the multi-view interactive digital media representation to appear to rotate.

Figure 27:
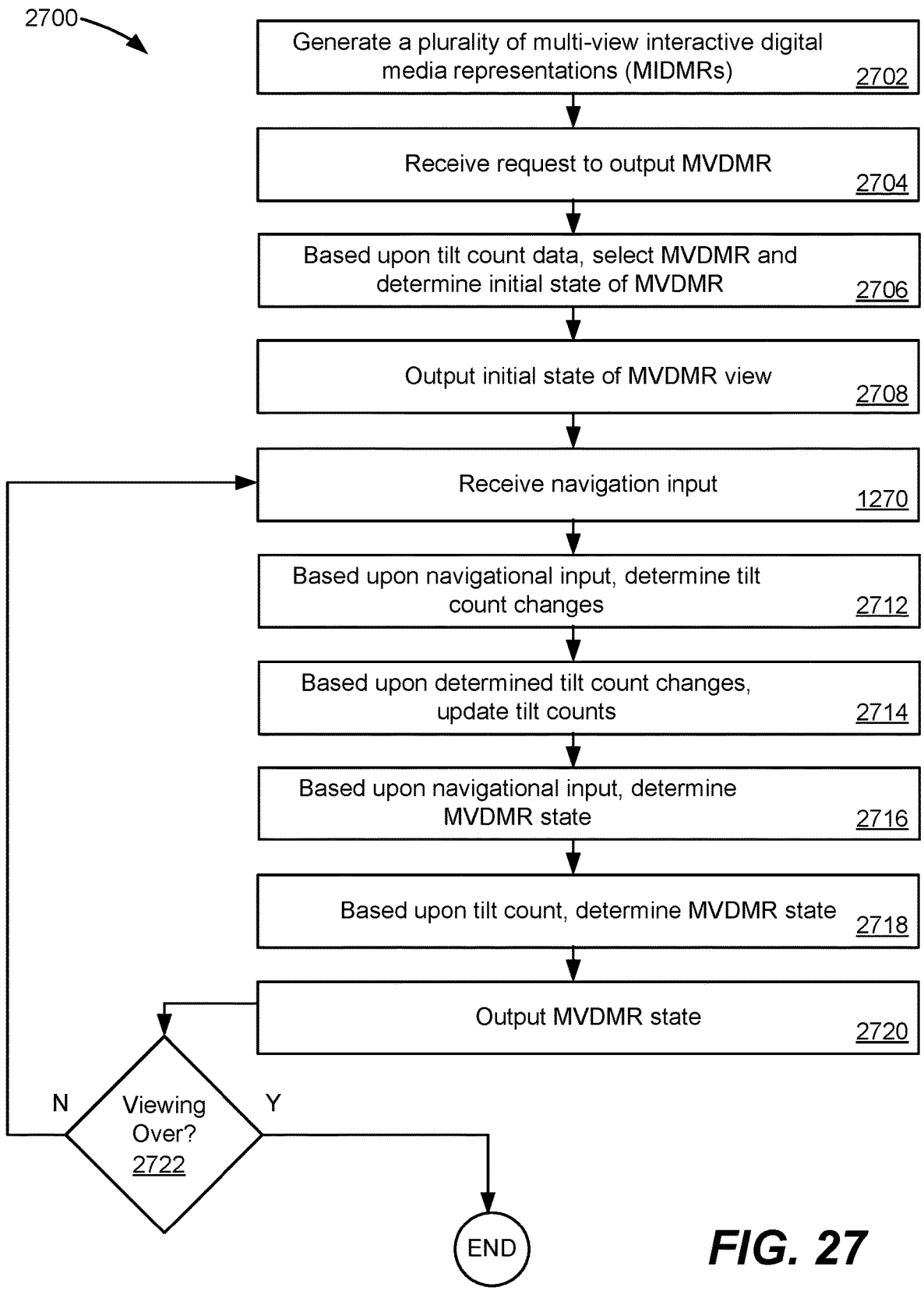
FIG. 27 illustrates an example of a process flow for generating a tilt count in accordance with embodiments of the present invention.

FIG. 27 illustrates an example of a process flow 2700 for generating a tilt count. In 2702, a plurality of multi-view interactive digital media representations can be generated. In 2704, a request to output a multi-view interactive digital media representation can be received. In 2706, based upon tilt count data, a multi-view interactive digital media representation can be selected from among a plurality of multi-view interactive digital media representations and an initial state of the selected multi-view interactive digital media representation can be determined. The initial state can be an image from a sequence of images in the multi-view interactive digital media representation to output. In an alternate embodiment, a selection of a particular multi-view interactive digital media representation to output can be received and the initial state of particular multi-view interactive digital media representation can be determined.

In 2708, the initial state of the multi-view interactive digital media representation can be output to a display. In 1270, navigational input can be received, such as navigational input based upon sensor data from an IMU on a mobile device. In 2712, based upon navigational input, tilt count changes can be determined. In 2714, based upon the determined tilt count changes, tilt counts can be updated.

In 2716, based upon the navigational input, a new multi-view interactive digital media representation state or a series of multi-view interactive digital media representation states can be determined. The tilt count can affect the multi-view interactive digital media representation state. For example, as described above, after a tilt count is exceeded, an aspect of a multi-view interactive digital media representation can change, such as a color, or a new path in image space can be unlocked. The new path can be a group of images in the image space that when output cause a new apparent motion of the object in the multi-view interactive digital media representation to be displayed. As another example, after a tilt count is exceeded, a multi-view interactive digital media representation may disappear and may no longer be displayed. Thus, in 2718, based upon the tilt count, modifications to the multi-view interactive digital media representation state can be determined. In 2720, based upon the navigational input and the effects of tilt count, a multi-view interactive digital media representation state can be output.

In 2722, the system can determine whether the viewing of the multi-view interactive digital media representation is over. The viewing may end when a user closes the multi-view interactive digital media representation or when navigational input is not received for some time period. When the viewing of the multi-view interactive digital media representation is over, tilt count data can be stored. When the viewing of the multi-view interactive digital media representation is not over, additional navigation input can be received in 1270 and steps 2712, 2714, 2716, 2718 and 2720 can be repeated.

Additional systems and methods for generating tilt counts for display of an MIDMR are further described with reference to U.S. patent application No. 15,449,511, titled TILTS AS A MEASURE OF USER ENGAGEMENT FOR MULTIVIEW DIGITAL MEDIA REPRESENTATIONS, previously referenced above.

Furthermore, various embodiments disclosed herein also provide the dynamic modification and augmentation of MIDMRs, and are described with reference to U.S. patent application No. 15,607,334, titled DYNAMIC CONTENT MODIFICATION OF IMAGE AND VIDEO BASED MULTI-VIEW INTERACTIVE DIGITAL MEDIA REPRESENTATIONS, previously referenced above. Various different types of inputs and combinations of such inputs may be received from one user or a multitude of users to create a dynamic content input. In various embodiments, the dynamic content input may be a physical input, such as a tilt, and such an input may be used to change or modify a presentation of an MIDMR as well as contents of such an MIDMR to implement changes in the presentation and functionality of the MIDMR dynamically and in real time. Such dynamic changes and modifications may include operations such as presenting or portaling to another view or additional data associated with an object included in the MIDMR, accessing or calling another application, or even changing or modifying an object that is the focal point of the MIDMR.

Figure 28:
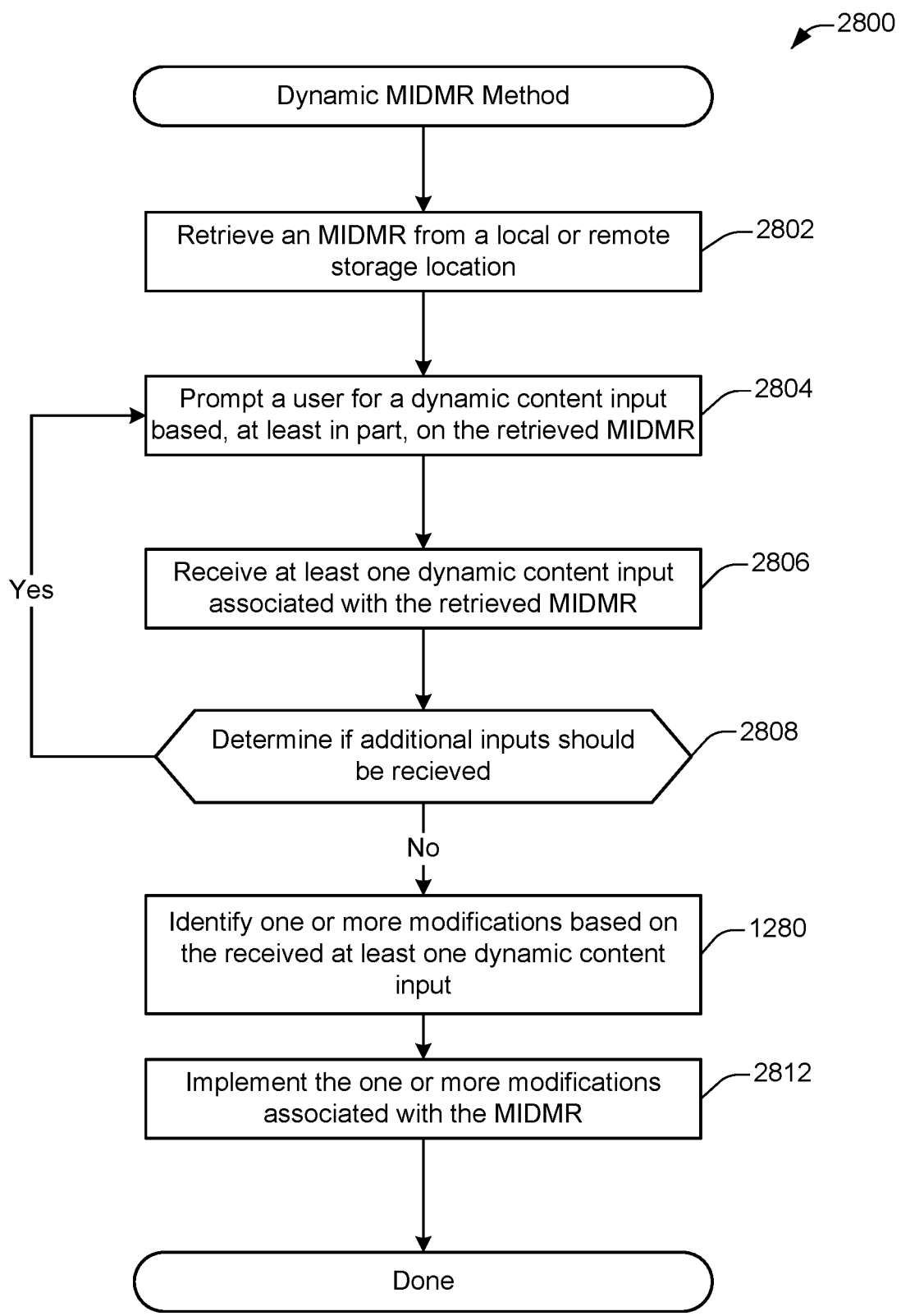
FIG. 28 illustrates a flow chart of an example of a method for implementing dynamic multi-view interactive digital media representations, implemented in accordance with some embodiments.

For example, with reference to FIG. 28, shown is an example of a method for implementing dynamic MIDMRs, implemented in accordance with some embodiments. As discussed above, a method for implementing dynamic MIDMR content, such as method 2800, may enable a user of a device to dynamically implement changes to MIDMRs that facilitate the modification of the MIDMR, the presentation of additional MIDMRs, or even the presentation of different data objects and execution of different applications associated with an object represented within the MIDMR.

Method 2800 may commence with operation 2802 during which one or more MIDMRs may be retrieved. As similarly discussed above, MIDMRs may be generated by one or more devices, such as mobile communications devices, and such MIDMRs may be stored locally on such devices, or may be stored centrally at a central repository. Accordingly, the MIDMR may be retrieved from the local storage on the device, or may be retrieved from the central repository. As discussed above, an MIDMR can provide a multi-view interactive digital media representation. In various examples, the MIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects. Accordingly, an MIDMR may include a content model that may be three dimensional, as well as a context model which may be two-dimensional or three-dimensional, and such models may have been generated based on a fusion of previously taken images. As will be discussed in greater detail below, inputs received at a device during a dynamic MIDMR method, such as method 2800, may be used to modify the presentation and/or contents of such content and context models.

As also discussed above, the MIDMR may be retrieved responsive to a request from one or more applications executing on the device, and/or responsive to one or more actions associated with such applications. For example, a social media or social networking application may request a data object including the MIDMR during operation of the social networking application, and in response to an input provided by a user that may identify one or more actions such as viewing the MIDMR or sharing the MIDMR. In another example, a web browser may request the MIDMR for display or upload to a webpage.

Method 2800 may proceed to operation 2804 during which a user may be prompted for an input. In some embodiments, the prompt may be a message or may simply be the presentation of a view of an object, or a user interface element associated with an object that may be included in the content model of the MIDMR. For example, the prompt may highlight a portion of the object or present a flashing portion of the object. In another example, the prompt may display text of a message indicating that additional views or actions are available. It will be appreciated that operation 2804 is optional, and in various embodiments, is not performed. For example, embodiments disclosed herein do not include operation 2804, and not prompt is provided to the user.

Method 2800 may proceed to operation 2806 during which an input may be received. In various embodiments, the input may be received from a user that may be using the device that has requested and is displaying the MIDMR. For example, the user may be a user of a mobile communications device that is displaying the requested MIDMR. In various embodiments, the input may be an input identified by sensors included in the device such as accelerometers, gyroscopes, and/or magnetometers. For example, accelerometers included in the device may identify a tilt as well as a direction of a tilt based on measurements made during the process of the tilt. In some embodiments, a tilt or other motion may be identified when such measurements exceed a particular threshold(s) configured to characterize the occurrence of a tilt. Accordingly, the input may include the physical movement of the device and changes in the orientation of the device. In various embodiments, the input may also include various other inputs such as the pressing of buttons, or interactions with a capacitive touch screen of the device.

Method 2800 may proceed to operation 2808 during which it may be determined if additional inputs should be received. In various embodiments, such a determination may be made based on dynamic content operation data included in or associated with the MIDMR. In this way, the MIDMR may be configured to implement one or more dynamic changes in response to receiving a particular input, or combination of inputs. As will be discussed in greater detail below, such inputs or combinations of inputs may trigger modifications to the presentation of the MIDMR to the user as well as the user's interaction with the MIDMR. Thus, the MIDMR may be configured to map received inputs to particular modifications or operations. In various embodiments, the MIDMR may have been configured in such a way by a software developer, a commercial entity, or even the user when specifying a type of MIDMR or features of an MIDMR when the MIDMR was initially generated. Accordingly, it may be determined whether or not additional inputs should be gathered based on the dynamic content operation data included in or associated with the MIDMR. If it is determined that additional inputs should be received, method 2800 may return to operation 2804, or if operation 2804 is not performed, to operation 2806. If it is determined that no additional inputs should be received, method 2800 may proceed to operation 1280.

Accordingly, method 2800 may proceed to operation 1280 during which one or more modifications may be identified based on the received input. As discussed above, the MIDMR may be configured to implement one or more dynamic changes in response to receiving a particular input, or combination of inputs, and such dynamic changes may be identified based on dynamic content operation data. In some embodiments, the dynamic content operation data may be configured to map a particular input or combination of inputs to a particular dynamic content modification. Accordingly, the received inputs may be mapped to a change in the presentation or contents of the content model and/or context model included in the MIDMR. As will be discussed in greater detail below, such changes may be identified and implemented dynamically and in real time. Furthermore, such changes may include specific combinations of inputs that may have particular physical and temporal constraints.

For example, an input that includes a designated number of tilts within a designated amount of time may be used to identify one or more operations that present another view. The different view may be a different orientation of the MIDMR, may be a different MIDMR entirely, or may be a different still view or additional content associated with the object identified by the content model of the MIDMR retrieved at operation 2802. In this way the input provided be used to identify a presentation of a different still or MIDMR of the object identified by the content model of the MIDMR, or the presentation of additional information or images of the object. Moreover, the input may be used to identify a modification of the content model to modify or redefine the object identified by the content model. In a specific example, if the MIDMR includes an object that is a person, but another object behind the person, such as the person's dog, is not visible, the input may be used to identify one or more modifications to the content model to include or focus on the dog, and enhance visibility of the dog. In this way, the input may be used to identify modifications to the contents of the content model as well as the representation of the objects in the MIDMR. As discussed above, the tilts may be directional such that a designated number of tilts in a first direction triggers the presentation of a first additional view, while a designated number of tilts in a second direction triggers the presentation of a second additional view.

In another example, an input may be used to identify an operation that blocks a particular view or presentation of an object in an MIDMR. In this example, if a designated number of tilts in a particular direction have been received, one or more operations may be identified that restrict the views available to a user. In this way, a particular orientation or view of an object within an MIDMR may be restricted such that it may be locked or inaccessible once a certain number of tilts or views have occurred.

In yet another example, an input may be used to identify an operation that portals to the contents of an object shown in the MIDMR. In a specific example, the object may be an item, such as a box, and an input, which may be a tilt or swipe, may be mapped to or used to identify one or more operations that cause the display of an additional data object that includes the contents of the box. In this way, additional data or contextual data associated with objects included in the MIDMR may be identified and displayed dynamically and based on the received inputs. Moreover, in another example, such an input may be used to identify an application program interface (API) that calls another application and causes the execution of that application. In this way, the input may be used to dynamically identify and execute another application that may be associated with the object included in the MIDMR. Similarly, the operations identified based on the received input may also enable the review of tags, metadata, or other internal content associated with the object.

It will be appreciated that while the above examples describe a tilt or tilts, any combination of any number of inputs may be implemented. For example, different tilts in different directions may be combined. Moreover, additional inputs such as swipes on a capacitive touch screen or presses of buttons may also be used as any of the inputs described above. Further still, different combinations of different types of inputs, such as combinations of tilts and swipes may be implemented as well.

Method 2800 may proceed to operation 2812 during which the MIDMR may be modified. As discussed above, based on the input(s) received, one or more modifications may be identified. Accordingly, during operation 2812, the modification(s) identified during operation 1280 may be implemented. For example, during operation 2812, the rendering and presentation of the MIDMR may be modified to present another view, or may be modified to block a particular view. In another example, the contents of an object may be portaled to, or another application may be called and executed.

As previously described, MIDMRs can include images of an object from many different viewing angles. Images with viewing angles about a common axis can be grouped together. These images can be provided in a sequence where the viewing angle changes from image to image in the sequence in an orderly manner. Thus, as the sequence of images is viewed on a display, the object can appear to rotate about the common axis. In particular embodiments, a multi-view interactive digital media representation can be provided with images with viewing angles about one or more axes. Thus, when viewed the object in the MIDMR can appear to rotate about the one or more axes.

Figure 29:
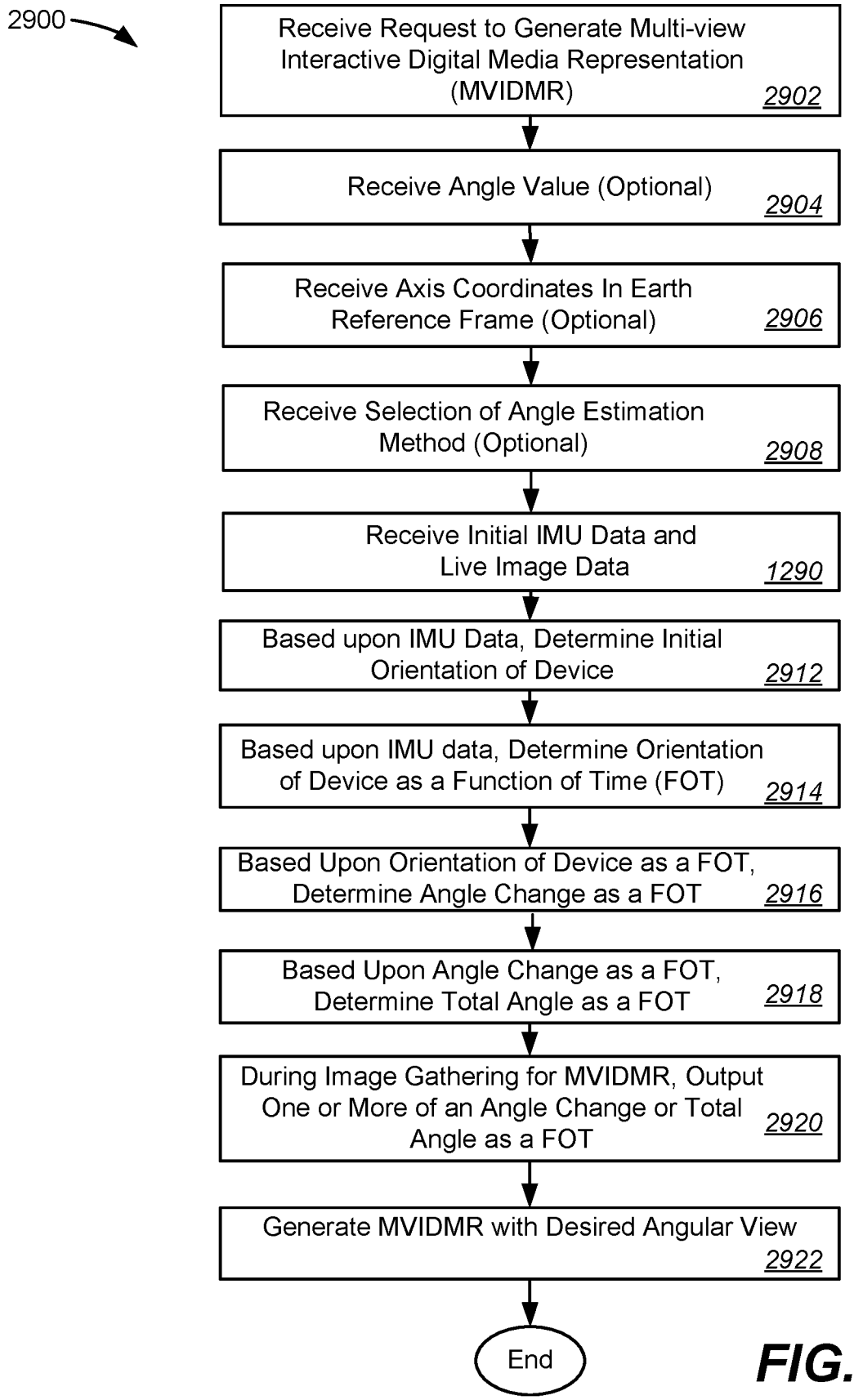
FIG. 29 illustrates an example of a process flow for generating a multi-view interactive digital media representation using IM data in accordance with embodiments of the present invention.

In various embodiments, as previously discussed, IMU data may be implemented in the generation of MIDMRs. FIG. 29 illustrates an example of a process flow 2900 for generating a MVIDMR using IMU data. In 2902, a request to generate an MVIDMR can be received. For example, the request can be received via a touch screen interface on a mobile device or verbally via a microphone on a mobile device. In 2904, an angle value can be optionally received. The angle value can be used to specify an angular view of an object that is desired in the MVIDMR.

In 2906, the MVIDMR can optionally receive a specification of an axis about which to determine angle changes as a function of time. In one embodiment, the default axis is the gravity vector. In 2908, the MVIDMR system can be configured to optionally output to an interface, such as a touch screen interface, a plurality of angle estimation methods which can be utilized. A number of different methods have been described above, such as using gyroscopic data or accelerometer data. Via the interface, a selection of one of the methods can be received.

In 1290, initial IMU data, such a data which allows a current tilt orientation of a mobile device relative to the Earth's gravity vector, can be determined. In addition, live image data can be received from a camera, such as a camera on a mobile device. In 2912, based upon the IMU data, an initial orientation of the device including the camera can be determined.

As the device orientation changes, the orientation of the device and hence the camera can be determined as a function of time. In 2916, based upon the orientation of the device including the camera as a function of time, the angle change can be determined from time to time. In 2918, the total angle change as a function time can be determined. The total angle change as a function of time can be associated with the live image data which is being captured. Hence, each image in the sequence of images that has been received can be associated with an amount of the angular view of the object that has been captured previously.

In 2920, during the image gathering process, the angle changes from time to time and/or the total angular view of the object which has been captured can be output to a display. An indication can be generated when a desired angular view of the object has been captured. Further, the image capture process can end. Then, in 2922, the MVIDMR with the desired angular view can be generated.

In one embodiment, when an angular view of an object of some amount is captured, the MVIDMR system can be configured to generate an MVIDMR with an angular view that is equal to or less than angular captured of the object. For example, when a three hundred sixty degree view of an object is captured, the system can be configured to receive an input of angular view amount less than three hundred sixty degrees and a range, such as one hundred degrees starting at ten degrees and going to one hundred and ten degrees or ninety degrees starting at one hundred eighty degrees and going to two hundred seventy degrees. In this example, the starting point where images are first captured can be considered zero degrees.

Various systems and methods for estimating the progress of capture or manipulation of a MIDMR based on IMU data are described in U.S. patent application No. 15,601,874, titled INERTIAL MEASUREMENT UNIT PROGRESS ESTIMATION, previously referenced above. In some embodiments, IMU data may be further implemented to generate a MIDMR including a three hundred sixty degree of an object based upon angle estimation using IMU data in accordance with embodiments of the present invention, as described in U.S. patent application No. 15,601,863, titled SNAPSHOTS AT PREDEFINED INTERVALS OR ANGLES, and in U.S. patent application No. 15,601,893, titled LOOP CLOSURE, previously referenced above.

Trilinear Interpolation Using Structured Image Array

Figure 30:
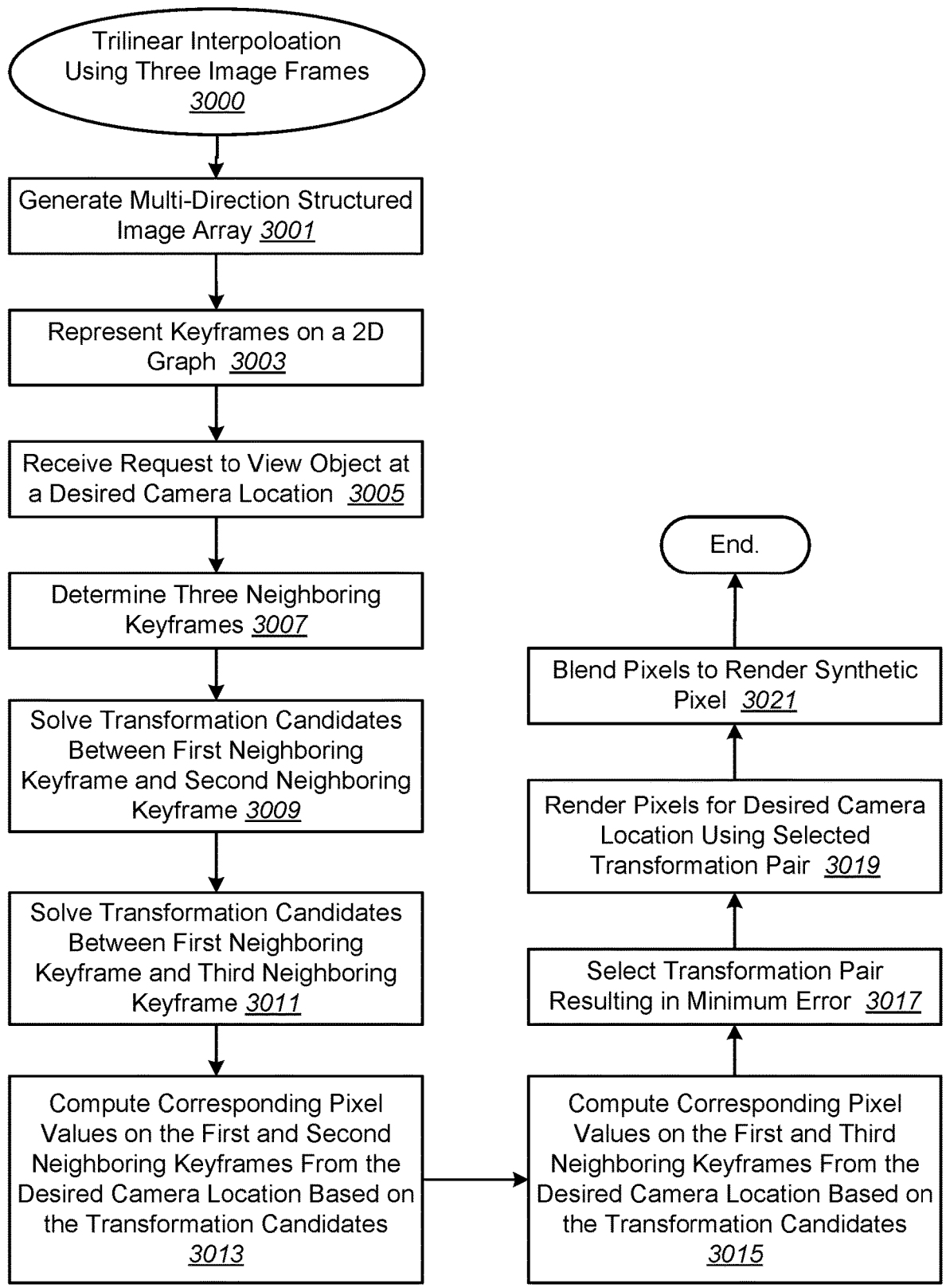
FIG. 30 illustrates an example method for trilinear interpolation using three image frames, in accordance with one or more embodiments.
Figure 31A:
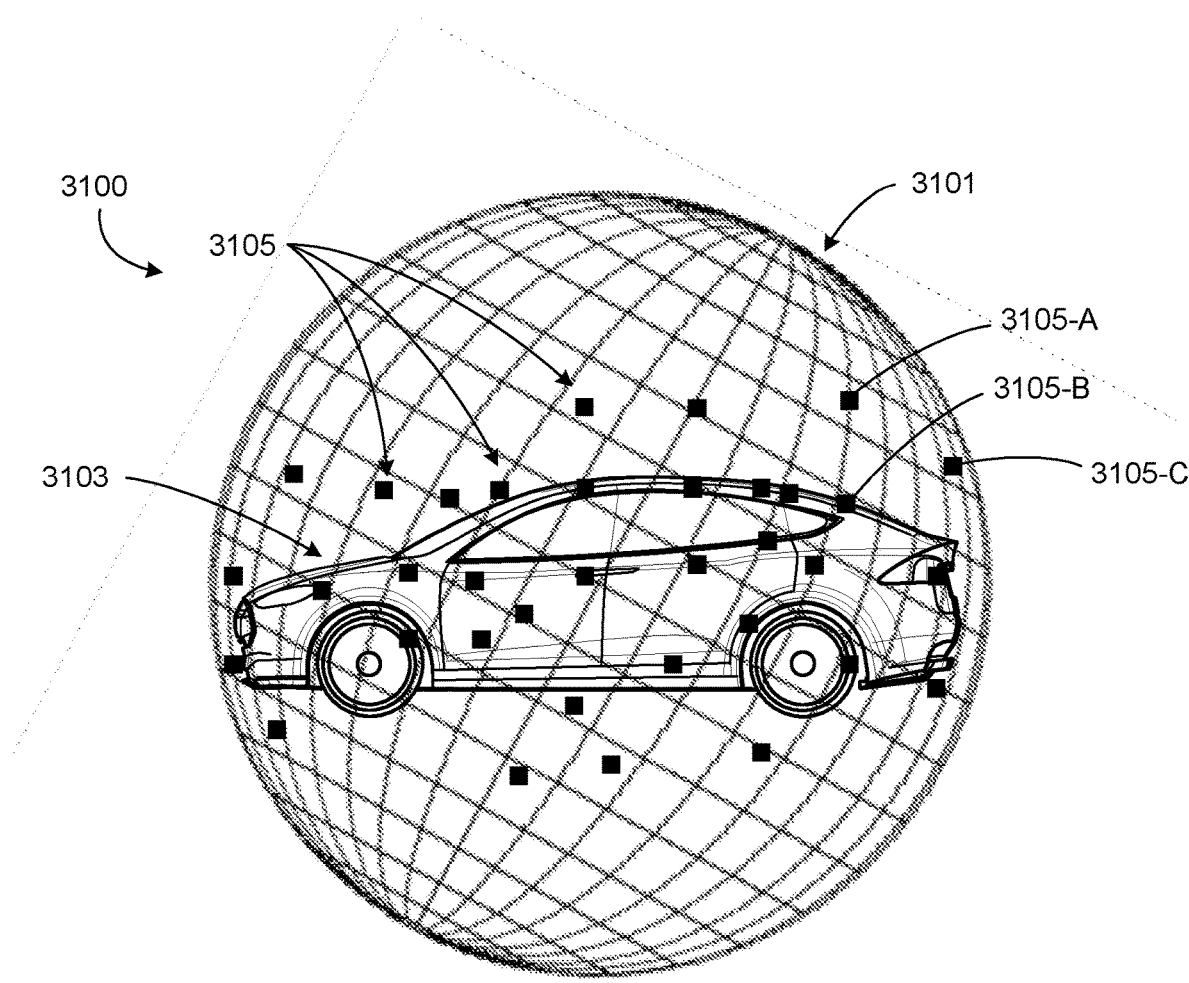
FIG. 31A illustrates an example of a multi-directional structured image array, in accordance with one or more embodiments.
Figure 31B:
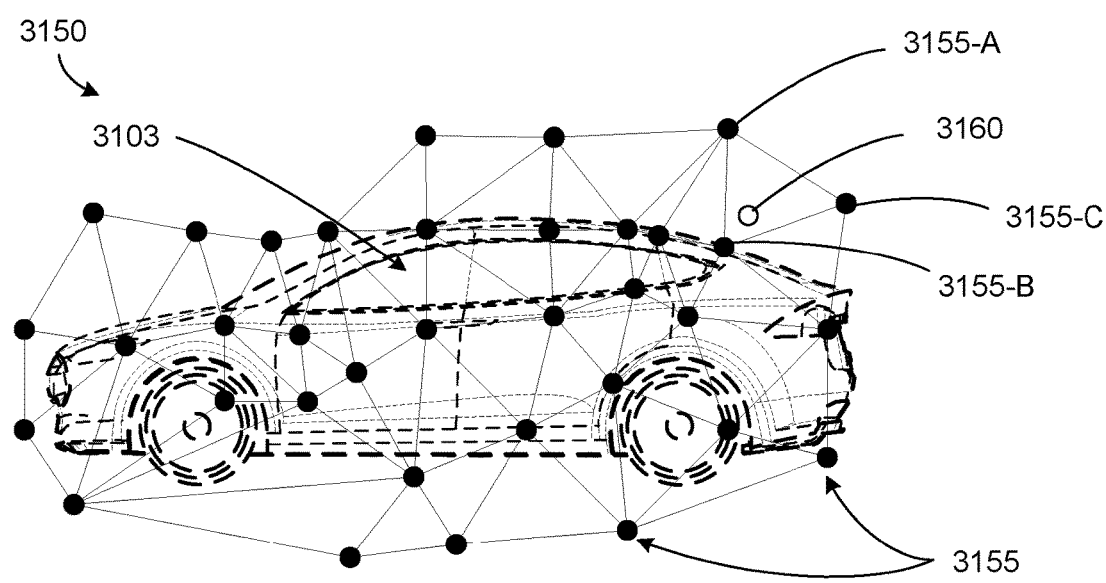
FIG. 31B illustrates an example of a 2D graph corresponding to a multi-directional structured image array, in accordance with one or more embodiments.

With reference to FIG. 30, shown is an example method for trilinear interpolation using three image frames, in accordance with one or more embodiments. At 3001, a multi-directional structured image array is generated. FIG. 31A depicts an example of a multi-directional structured image array 3100, in accordance with one or more embodiments. In some embodiments, image array 3100 may correspond to a light field comprising images captured of an object at various angles. In some embodiments, the light field may be an unstructured light field generated by moving a camera in multiple directions around an object. Each square in the image array 3100 may represent an image frame captured at a particular camera location 3105 in the light field. In some embodiments, a multi-directional structured image array may be organized as a 2D graph, where each node in the 2D graph corresponds to an image frame at a particular camera location. FIG. 31B depicts an example of a 2D graph 3150 corresponding to a multi-directional structured image array, in accordance with one or more embodiments. As shown, 2D graph 3150 corresponds to image array 3100, and each node 3155 may correspond to a camera location 3105, including nodes 3155-A, 3155-B and 3155-C.

As depicted in FIGS. 31A and 31B, the object 3103 is a car. In some embodiments, a virtual bounding sphere 3101 may be placed around an object 3103, which may be visualized with a wireframe mesh, as shown in FIG. 31A. In some embodiments, the sphere 3101 serves as a bound on the scene to be captured. In some embodiments, sphere 3101 may also serve as a coverage map tracking the range of viewpoints already covered. For each input view, the sphere represents a range in two of the four dimensions of the light field. The center of sphere 3101 may be centered at a desired point corresponding to the selected center of object 3103. The size of the sphere 3101 may be adjusted to fully encompass object 3103.

Images may then be captured manually and/or automatically. A coverage map may be displayed on top of the bounding sphere 3101 overlaid on the current view of the camera. The current location of the camera may be projected onto the surface of the sphere 3101 as a small dot (not shown). Every previously recorded image of the scene is also projected onto the coverage map and occupies a square mark corresponding to the range of views that it covers under predetermined sampling criterion. As shown in FIG. 31A, each captured camera location 3105 is marked by a square brush mark, including camera locations 3105-A, 3105-B, and 3105-C. The goal is to control the movement of the camera and to "paint" the surface of the sphere 3101 with marks 3105, such that enough data to generate a high quality rendering of the object is obtained. In other embodiments, various brush marks of other shapes may be used to mark previously captured images at the various camera locations. As the camera moves around the object, a new image may be captured and/or stored when the camera is viewing an under-sampled region of the light field. Each stored image may be designated as a keyframe and may be stored with additional location data, such as IMU information. For example, a new image may be captured and stored when the camera is presented with a new perspective of the object. In some embodiments, keyframes may be automatic stored when the camera is moved to an appropriate location. In some embodiments, the camera is automatically moved to appropriate locations in the light field.

In some embodiments, a viewpoint coverage map may be used to assist a user in achieving a dense coverage. In some embodiments, the brush marks may indicate scale to assist in image capture. For example, brush marks 3105 for images captured at the same and/or similar scale as the current camera location may be displayed as green in color. Brush marks 3105 for images that correspond to camera locations closer to the object 3103 may be displayed as blue, while brush marks 3105 for images that correspond to camera locations further from the object 3103 may be displayed as red. In some embodiments, different shades or intensity of coloration may be used to indicate the degree of distance. In other embodiments, various other colorations may be used for tracking of scale. In some embodiments, optimal coverage of an object 3103 may be achieved where image frames are captured as close to the same scale as possible. In some embodiments, the camera may only capture and/or store images that are within a predetermined range of scale with respect to previously captured and/or stored keyframes.

In other aspects, a structured image array may be generated by methods 3200 and 3300 described below with reference to FIG. 32 and FIGS. 33A-33B. In other aspects, a structured image array may be generated by systems and methods described in U.S. patent application No. 15,427,009, titled MULTI-DIRECTIONAL STRUCTURED IMAGE ARRAY CAPTURE ON A 2D GRAPH, previously referenced above. As described herein, in embodiments, one or more keyframes may be selected and stored from captured image frames. In some embodiments, the first keyframe N may be identified and stored based on the first image captured by the camera. The first image may be captured based on user selection and/or captured automatically based on predetermined criteria programmed into the camera. Subsequent image frames may be designated as keyframes by keypoint identification and tracking, warp computations, and convex hull comparisons, as further described below. Each identified keyframe may be represented as a node on a 2D graph, such as nodes 3155 on graph 3150. In other embodiments, such keyframes may be represented by the square brush marks in the multi-directional structured image array 3100. In some embodiments, a bounding sphere 3101 may not be used to bound the object 3103. Thus, this may ensure that every stored keyframe is includes a portion of overlap with every neighboring keyframe in the image array 3100 and/or 2D graph 3150.

At 3003, the keyframes in an array 3100 may then be projected on a 2D graph as nodes 3155, such as 2D graph 3150 shown in FIG. 31B. For example, structured image may be represented on a 2D graph 3150 where each node 3155 corresponds to a keyframe. The centers of projection for the key frames and/or captured images at each location 3105 may be triangulated to define a 2D viewpoint manifold, as shown in FIG. 31B. In some embodiments, a blending field may be constructed over the manifold by applying standard subdivision rules to the weights of each vertex to further subdivide the image array 3100 into more triangular sections. Each connection between nodes 3155 may represent a relative transformation.

At 3005, a request to view the object 3103 at a desired camera location 3160 is received. Based on user selection and/or position of the viewing device, a requested image may correspond to a camera location that is situated between nodes 3155. Various methods described herein may utilize trilinear interpolation based on the three closest keyframes to artificially render the requested image. Given a spatial location (based on user selection and/or position of the viewing device) the nearest three neighboring keyframes on the graph are located at 3007. Based on the triangulation parameters, every spatial location will fall within a triangular area formed by three nodes 3155. For example, as shown in FIG. 31B, a given spatial location 3160 falls between nodes 3155-A, 3155-B, and 3155-C. Thus, nodes 3155-A, 3155-B, and 3155-C correspond to the three keyframes that most closely neighbor the image that would exist at spatial location 3160.

Figure 31C:
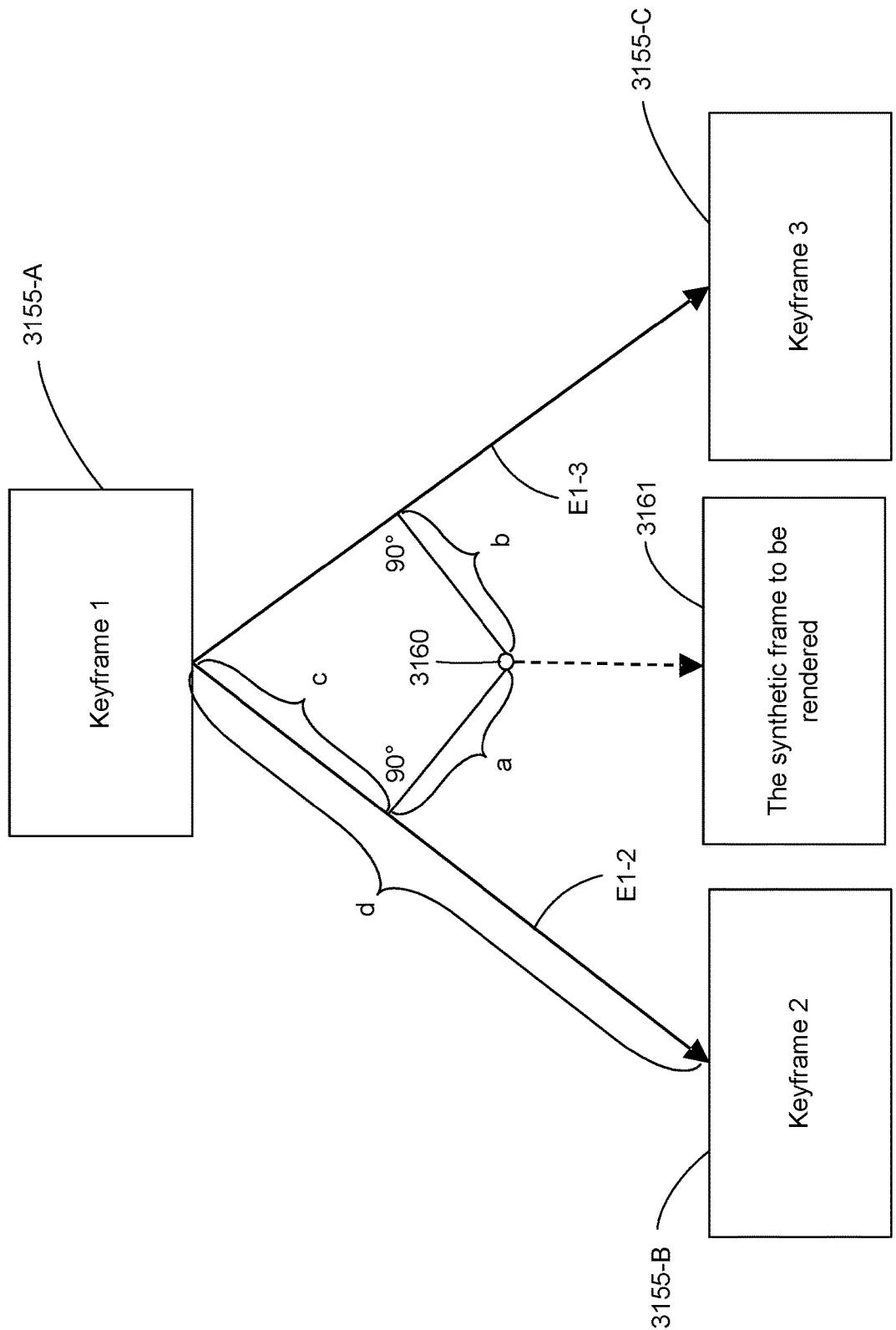
FIG. 31C illustrates an example of trilinear interpolation parameters, in accordance with one or more embodiments.

The relative transformation from spatial location 3160 to the three neighboring keyframes may be determined by trilinear interpolation. With reference to FIG. 31C, shown is an example of trilinear interpolation parameters, in accordance with one or more embodiments. For purposes of explanation, node 3155-A corresponds to keyframe 1, node 3155-B corresponds to keyframe 2, and node 3155-C corresponds to keyframe 3. Keyframes 1, 2, and 3 may be used to interpolate a synthetic frame 3161 corresponding to location 3160. An edge E1-2 connects keyframe 1 and keyframe 2, while an edge E1-3 connects keyframe 1 and keyframe 3. Each edge corresponds to the connection between the respective nodes, which may represent a relative transformation. The variable "a" represents the perpendicular distance from 3160 to E1-2, and the variable "b" represents the perpendicular distance from 3160 to E1-3.

A predetermined number of transformation candidates are determined between the three neighboring keyframes. At 3009, transformation candidates between the first neighboring keyframe and the second neighboring keyframe are solved. At 3011, transformation candidates between the first neighboring keyframe and the third neighboring keyframe are solved. With reference to FIG. 31C, transformation candidates are solved between keyframe 1 and keyframe 2, and transformation candidates are solved between keyframe 1 and keyframe 3.

In various embodiments, transformation candidates may be solved using methods described with reference to steps 901 to 917 of method 900. For example, transformation candidates may be solved between keyframe 1 and keyframe 2 by first identifying a predetermined number of keypoints in key frame 1 and their corresponding keypoints in keyframe 2, such as by using a Harris-style corner detector and a KLT feature tracker, such as in step 903. Then a RANSAC algorithm may randomly select two keypoints identified in keyframe 1 and the corresponding keypoints in keyframe 2, such as in step 905. Then, a transformation from the first frame to the second frame may be calculated based on the two keypoint correspondences by using various parameters, such as similarity 2D parameters, such as in step 907.

The calculated transformation may be applied to each identified keypoint in keyframe 1, such as in step 909, and an inlier group of transformed keypoints may be determined, such as in step 911. If a larger inlier group for the calculated transformation is determined than any previous calculated transformation, then the image intensity difference between a transformed keyframe 1 and keyframe 2, such as in step 915. The RANSAC algorithm may be programmed to randomly select a predetermined number of keypoints to calculate transformation candidates. In other embodiments, the RANSAC algorithm may be programmed to randomly select keypoints until a predetermined number of transformation candidates have been calculated. Such transformation candidates may then be ranked against previously calculated transformation candidates, such as in step 917.

As previously described, eight candidate transformations resulting in the most inlier keypoints and/or lowest image intensity difference may be selected between frames. For example, transformations candidates T1-2_1, T1-2_2, T1-2_3, T1-2_4, T1-2_5, T1-2_6, T1-27, and T1-2_8 may correspond to eight transformation candidates between keyframe 1 and keyframe 2. Furthermore, transformation candidates T1-3_1, T1-3_2, T1-33, T1-3_4, T1-35, T1-36, T1-37, and T1-3_8 may correspond to eight transformation candidates between keyframe 1 and keyframe 3, However, the number of transformations selected as transformation candidates may be a function of processing power and any number of transformation candidates may be selected in various embodiments.

In some embodiments, the transformation candidates described above may correspond to interpolated transformation candidates which considers the position of the desired camera location 3160 with respect to the keyframes. For example, as depicted in FIG. 31C, "d" represents the distance between keyframe 1 and keyframe 2, while "c" represents the distance of the desired camera location 3160 along "d". Similar values may be determined between keyframe 1 and keyframe 3. The value c/d may represent an interpolation weight. The interpolation weight value may be applied to a transformation candidate to determine the corresponding interpolated transformation candidate. In other words, an interpolated transformation candidate may be described as the transformation corresponding to the degree and/or amount of a full transformation calculated between two keyframes, such as keyframe 1and keyframe 2.

Once the transformation candidates have been determined, corresponding pixel values on the first and second neighboring keyframes are computed from the desired camera location based on the transformation candidates at 3013. In other words, for each pixel location, P, in the image frame corresponding to the desired location 3160, a corresponding pixel in keyframe 1 and a corresponding pixel in keyframe 2 is calculated using the eight transformation candidates solved between keyframe 1 and keyframe 2 at 3009. Similarly at 3015, for each pixel location, P, in the image frame corresponding to the desired location 3160, a corresponding pixel in keyframe 1 and a corresponding pixel in keyframe 3 is calculated using the eight transformation candidates solved between keyframe 1 and keyframe 3 at 3011. For example, transformation T1-2_1 is used to find corresponding pixel in keyframe 1 as F1-2_1, and a corresponding pixel in keyframe 2 as F2-1_1. This results in a pixel pair (F1-2_1, F2-1_1).

A set of eight pixel pairs may be determined corresponding to each transformation candidate between keyframes. The set of pixel pairs {(F1-2_1, F2-1_1), (F1-2_2, F2-1_2), (F1-2_3, F2-1_3), (F1-2_4, F2-1_4), (F1-2_5, F2-1_5), (F1-2_6, F2-1_6), (F1-2_7, F2-1_7), (F1-2_8, F2-1_8)} correspond to the pixels pairs computed based on the transformations candidates T1-2_1, T1-2_2, T1-2_3, T1-2_4, T1-2_5, T1-2_6, T1-2_7, and T1-2_8 between keyframe 1 and keyframe 2. The set of pixel pairs {(F1-3_1, F3-1_1), (F1-3_2, F3-1_2), (F1-3_3, F3-1_3), (F1-3_4, F3-1_4), (F1-3_5, F3-1_5), (F1-3_6, F3-1_6), (F1-3_7, F3-1_7), (F1-3_8, F3-1_8)} correspond to the pixels pairs computed based on the transformations candidates T1-3_1, T1-3_2, T1-3_3, T1-3_4, T1-3_5, T1-3_6, T1-3_7, and T1-3_8 between keyframe 1 and keyframe 3.

At 3017, a pair of transformations resulting in a minimum error is selected. In some embodiments, a transformation T1-2_N between keyframe 1 and keyframe 2 is selected from the eight transformation candidates between keyframes 1 and 2. Additionally, a transformation T1-3_M between keyframe 1 and keyframe 3 is selected from the eight transformation candidates between keyframes 1 and 3. The transformation pair resulting in the lowest following error is selected:

$$\operatorname{argmin}(\|F1\text{-}2\_N\text{-}F1\text{-}3\_M\|+\|F1\text{-}2\_N\text{-}F2\text{-}1\_N\|+\\ \|F1\text{-}3\_M\text{-}F3\text{-}1\_M\|)$$

In various embodiments, finding the minimum error above may ensure that the Nth transformation between keyframes 1 and 2, and the Mth transformation between keyframes 1 and 3, comprise the best transformation combination, which results in the lowest error.

At 3019, two pixels are rendered for the desired camera location 3160 using the selected transformation pair T1-2_N and T1-3_M, as pixel R1-2 and pixel R1-3, respectively. In some embodiments, transformations T1-2_N and T1-3_M are applied to keyframe 1 to obtain pixels R1-2 and R1-3. However, transformation T1-2_N may be applied to keyframe 2 to obtain pixel R1-2, and/or transformation T1-3_M may be applied to keyframe 3 to obtain pixel R1-3. The synthetic pixels R1-2 and R1-3 are then blended at 3021 to render a final rendering pixel, PR based on the following blending algorithm:

$$PR = (R1\text{-}2*b + R1\text{-}3*a)/(b+a).$$

In some embodiments, one or more steps of method 3000 may be implemented during runtime as a user is viewing the MIDMR and/or selecting an image location 3160. In other embodiments, one or more steps may be performed prior to runtime. For example, transformation candidates between neighboring keyframes may be solved at step 3009 and 3011 before a user views the images at runtime.

In some embodiments, a graphics processing unit (GPU) is used to implement one or more of steps 3013 to 3015. As previously described, such GPU may be a specialized processing unit that is included in a viewing device, such as GPU 3909 described below with respect to FIG. 39. In some embodiments, each pixel in the rendered image frame is processed as a separate thread of the GPU. Thus, time complexity of the processing time for each pixel is at constant time, bounded by O(1) and not O(n), where n is the number of processed elements (or pixels). This causes the processing time to be the same regardless of the size of the image being interpolated because the process is bounded by a value that does not depend on the size of the input.

In some embodiments, transformation candidates may be determined between keyframe 2 and keyframe 3, as described in in steps 3009 and 3011. Furthermore, corresponding pixel values on keyframe 3 may be computed from the desired camera location based on the transformation candidates, as described in steps 3013 and 3015, to obtain a set of pixel pairs corresponding to the transformation candidates. The pixel pairs may then be used at step 3017 to select a transformation between keyframes 2 and 3 that results in a minimum error with a transformation between keyframes 1 and 2 and/or between keyframes 2 and 3. In some embodiments, this may provide a more accurate pixel interpolation. However, method 3000, as described above, provides sufficient information to interpolate pixels onto an artificial image location 3160, without the added processing time for a third transformation.

In various embodiments, interpolated images may alternatively, and/or additionally, be rendered by systems and methods described in U.S. patent application No. 15,425,988 by Holzer et al., filed on Feb. 6, 2017, titled SYSTEM AND METHOD FOR INFINITE SYNTHETIC IMAGE GENERATION FROM MULTI-DIRECTIONAL STRUCTURED IMAGE ARRAY, which is incorporated by reference herein in its entirety and for all purposes.

Figure 32:
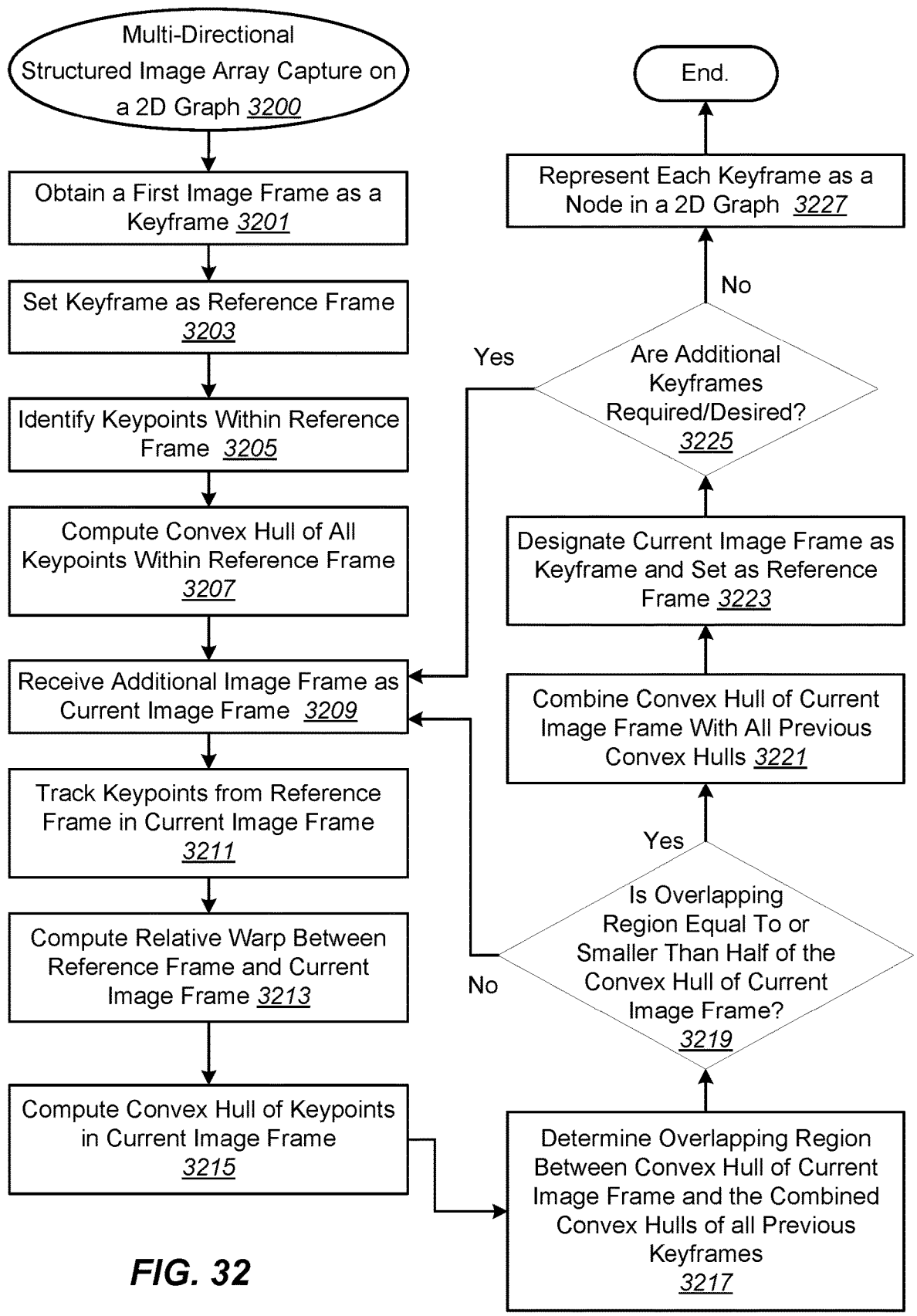
FIG. 32 illustrates an example method for multi-directional structured image array capture on a 2D graph, in accordance with one or more embodiments.

With reference to FIG. 32, shown is an example method 3200 for multi-directional structured image array capture on a 2D graph, in accordance with one or more embodiments. In various embodiments, method 3200 may be implemented to determine one or more keyframes to be selected and stored from a plurality of captured image frames. At step 3201, a first image frame N is obtained as a keyframe. In various embodiments, the first image frame N includes an object, and may be captured by a camera in a particular physical location around such object. This keyframe may be stored and designated as a first keyframe, or keyframe 1. In some embodiments, the first image frame N may be captured based on user selection and/or captured automatically based on predetermined criteria programmed into the camera. At step 3203, keyframe 1 is set as a reference frame.

Keypoints within the reference frame are then identified at step 3205. In various embodiments, keypoints within the reference frame may be detected with a Harris-style keypoint detector, such as described with reference to step 903 of method 900. For example, a Harris-style keypoint detector may be implemented to detect keypoints based on salient features to designate as keypoints in each frame, such as areas of large contrast, areas with minimum ambiguity in different dimensions, and/or areas with high cornerness. However, various different keypoint detection methods, previously described above, may be implemented. In various embodiments, any number of keypoints may be identified. In some embodiments, the keypoint detection algorithm may be configured to identify a predetermined number of keypoints.

At step 3207 a convex hull of all keypoints within the reference frame is computed. A convex hull may be the smallest convex set that contains a set of X points in the Euclidean plane or in a Euclidean space (or, more generally, in an affine space over the reals). For instance, when X is a bounded subset of the plane, the convex hull may be visualized as the shape enclosed by a rubber band stretched around X. In other words, the convex hull may be defined as the intersection of all convex sets containing X or as the set of all convex combinations of points in X.

Subsequent image frames are then captured by the camera as the camera is moved around the object. At step 3209, an additional image frame is received as the current image frame. For purposes of explanation, the current image frame may be designated as image frame N+1. Keypoints from the reference frame are then tracked in the current image frame N+1 at step 3211. As subsequent image frames are captured, one or more keypoints may be detected in each frame, as described above. During the image capture process, identified keypoints are tracked from frame to frame. Similar to keypoint tracking previously described with reference to step 905 in method 900, keypoints in subsequent frames that correspond to keypoints in the first frame N may be identified by a KLT feature tracker. In some embodiments, keypoint detection and tracking, as described herein with reference to FIG. 32, may be implemented during the online capture of image frames.

At step 3213, the relative warp between the reference frame and the current image frame N+1 is computed. In some embodiments, IMU data, such as rotation information, may be used to compensate for the transformations caused solely by keypoint tracking and not camera translation. For example, in a pure camera translation, tracked keypoints will move towards one direction. However, tracked keypoints may also move towards one direction of the image frame when a camera has a pure rotational movement (such as yaw or pitch), but no other translational movement. In instances where camera movement is pure rotation, a new keyframe should not be identified and stored because no new image data corresponding to the object has been captured. Thus, IMU data may be used to compute the relative warp between the current image frame and the reference frame. In other words, given IMU data corresponding to camera rotation, the transformation may be compensated by rotating the received image. Image rotation and may be performed using systems and methods described in U.S. patent application No. 15,408,211, titled GENERATING STEREOSCOPIC PAIRS OF IMAGES FROM A SINGLE LENS CAMERA, previously referenced above. Thus, the system may determine when movement of keypoints is due to camera rotation and when movement of keypoints is due to camera translation. In some embodiments, captured image frames in which keypoint movement is due, in significant part, to camera rotation, will not be designated and/or stored as a keyframe.

At step 3215, a convex hull corresponding to keypoints in the current image frame N+1 is computed. Every time a new keyframe is added to the image array, the convex hull may be augmented. For example, when a new frame, such as frame N+1, is tracked against the last created keyframe, such as keyframe 1, the rotational transformation is compensated for and the convex hull of the keypoints on the current frame N+1 is computed. Then, the overlapping region between the convex hull of the current frame N+1 and the combined convex hulls of all previous keyframes is determined at step 3217. The convex hull of the current frame N+1 may include a portion that overlaps a portion of the convex hull of the previous frames. Where there is only one designated keyframe, such as keyframe 1, then the convex hull of the current frame N+1 is compared with the convex hull of the first keyframe 1. However, if there were multiple keyframes previously designated, such as keyframe 1 and keyframe 2 for example, then the convex hull of the current frame will be compared with the combined convex hulls of both keyframe 1 and keyframe 2.

Each subsequent convex hull of each subsequent frame is then compared to the convex hull corresponding to all previous frames to determine whether a frame is designated as a keyframe. At 3219, it is determined whether the overlapping region is equal to or smaller than half of the convex hull of the current image frame N+1. If the size of the region of overlap is not equal to, or smaller, than half of the size of the convex hull of the current frame N+1, then an additional image frame will be received as a new current image frame N+2 at step 3209. In some embodiments, the image frame N+1 may then be discarded, and/or deleted from the system.

However, if the size of the region of overlap is equal to, or smaller, than half of the size of the convex hull of the current frame N+1, then the convex hull of current frame is then combined with convex hulls of all previous keyframes at step 3221. In the present example, the convex hull of keyframe 1 is augmented with the union of the convex hull of the current frame N+1. In some embodiments, the convex hull of the current frame N+1 is combined with the convex hull corresponding to previous keyframes when the size of the region of overlap is equal to, or smaller than, some other predetermined size the convex hull of the current frame. In some embodiments, the predetermined size of the overlapping region may be larger than half the size of the convex hull of the current frame N+1. In other embodiments, the predetermined size of the overlapping region may be smaller than half the size of the convex hull of the current frame N+1.

At step 3223, the current frame N+1 is designated as a keyframe and set as the reference frame. For example, current frame N+1 may be designated as keyframe 2 and stored. In some embodiments, a current reference frame is replaced by each subsequently identified keyframe. Once a frame, such as frame N+1, is designated as a keyframe and stored, it may be used as a reference frame in identifying subsequent keyframes, as described above. Keypoints identified in subsequent frames are then tracked from the keypoints identified in the reference frame. As previously described, keypoint detection and tracking, as described herein with reference to FIG. 32, may be implemented during the online capture of image frames. However, in other embodiments, the system may store all received images for offline processing to determine keyframes. In such examples, all image frames captured may be temporarily stored and only be discarded after keyframes are designated, such as through steps 3211-3219.

At 3225, it may be determined whether additional keyframes are required and/or desired. In some embodiments, a predetermined number of keyframes are designated and stored. In other embodiments, the number of keyframes may be designated by user selection. In various embodiments, the number of keyframes may depend on the amount of coverage required to capture a desired MIDMR of an object. If additional keyframes are required and/or desired, method 3200 may return to step 3209, where an additional image frame, such as frame N+2, may be received as the current image frame.

If no additional keyframes are to be designated at 3225, then each designated keyframe is represented as a node in a 2D graph at 3227. In some embodiments, keyframes identified by this process may be represented as a node on a 2D graph, such as nodes 3155 on graph 3150. In other embodiments, such keyframes may be represented by the square brush marks in the multi-directional structured image array 3100. In some embodiments, a bounding sphere 3101 may not be used to bound the object 3103. Thus, this may ensure that every stored keyframe is includes a portion of overlap with every neighboring keyframe in the image array 3100 and/or 2D graph 3150. Such 2D graph may then be used in non-linear interpolation of image frames, such as described in method 3000.

Figure 33A:
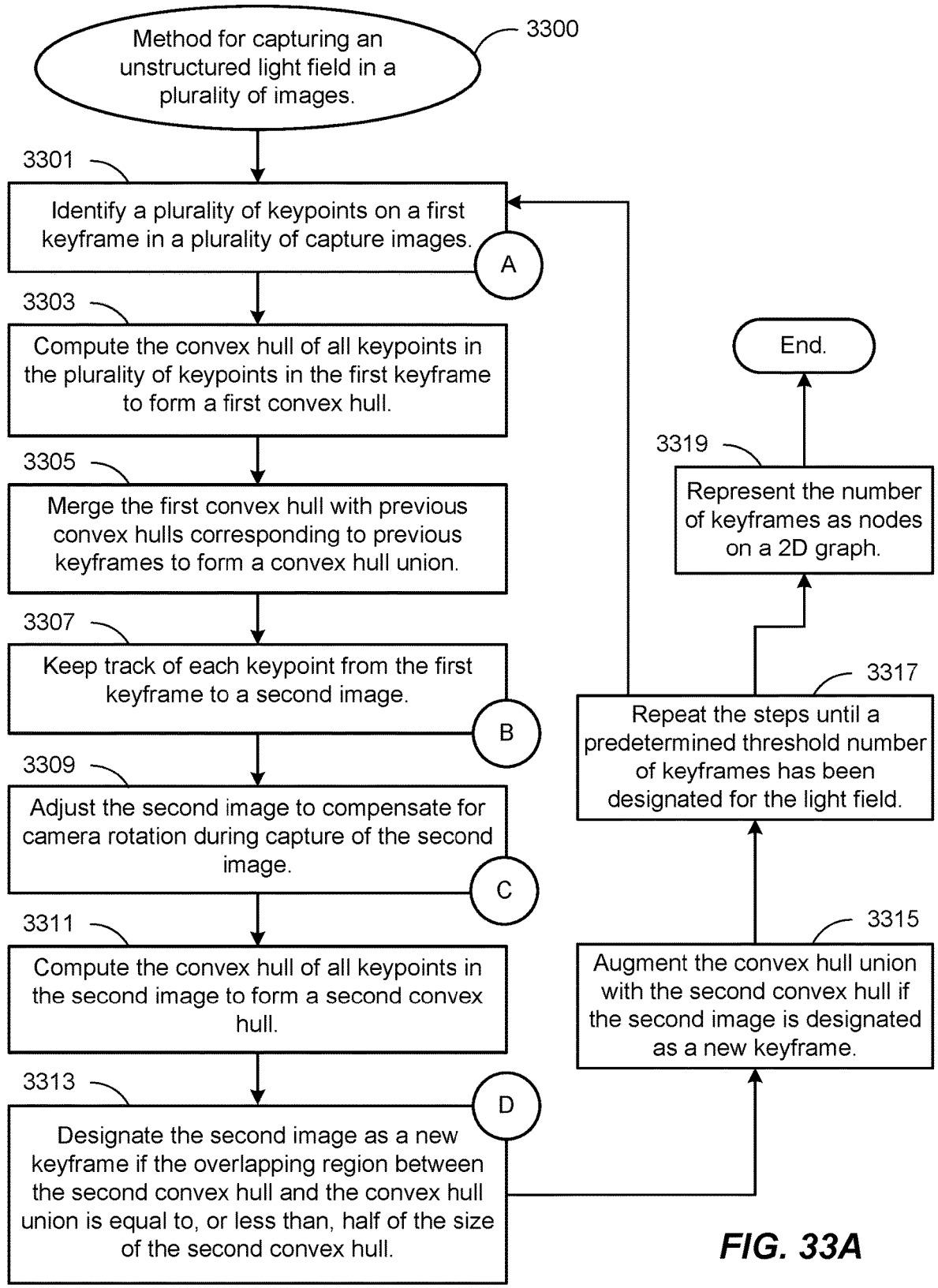
FIGS. 33A-33B illustrate an example method for capturing an unstructured light field in a plurality of images, in accordance with one or more embodiments.
Figure 33B:
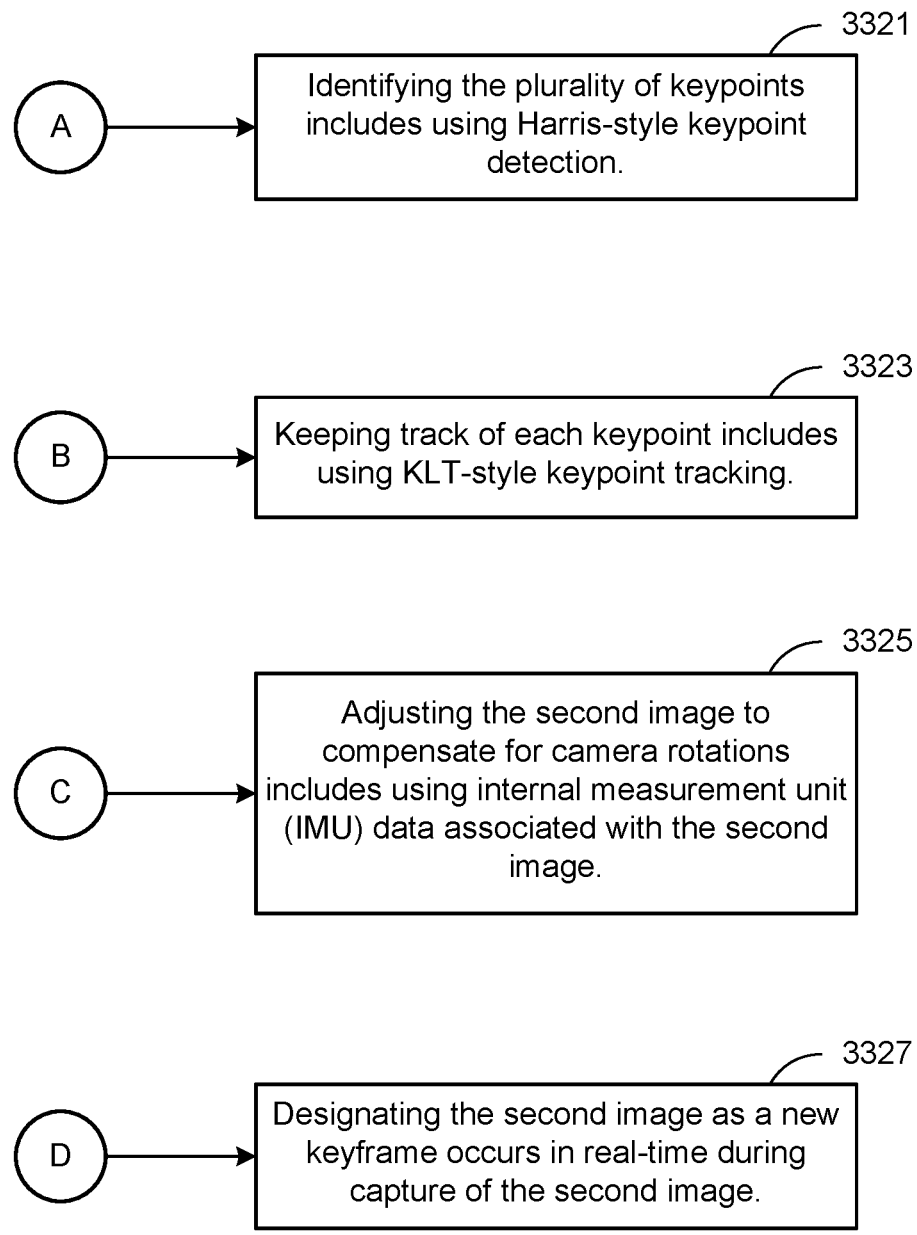

With reference to FIGS. 33A-33B, shown is an example method 3300 for capturing an unstructured light field in a plurality of images, in accordance with one or more embodiments. At operation 3301, a plurality of keypoints on a first keyframe in a plurality of capture images is identified. For example, the plurality of keypoints may be identified as described with reference to step 3205. In some embodiments, the first keyframe may correspond to the first image obtained at step 3201, which is set as the reference frame at step 3203. In some embodiments, identifying the plurality of keypoints includes using Harris-style keypoint detection 3321, such as in step 3205.

At operation 3303, the convex hull of all keypoints in the plurality of keypoints in the first keyframe is computed to form a first convex hull. For example, the first convex hull may be computed and formed as previously described with reference to step 3207. At operation 3305, the first convex hull is merged with previous convex hulls corresponding to previous keyframes to form a convex hull union. For example, the first convex hull may be merged with previous convex hulls, as described with reference to step 3221, to form the convex hull union. In some embodiments, the convex hull union may be the combined convex hulls of all previous keyframes, as described with reference to method 3200.

At operation 3307, each keypoint from the first keyframe is kept track of to a second image. For example, keypoints from the first keyframe may be tracked as previously described with reference to step 3211. In some embodiments, the second image may be the additional image frame received at step 3209. Keypoints in the second image may also be identified with Harris-style keypoint detection similar to operation 3301 and/or step 3205. As previously explained with reference to step 3211, in some embodiments, keeping track of each keypoint includes using KLT-style keypoint tracking 3323.

The relative warp between the first keyframe and the second image may then be computed, such as in step 3213. This may require compensating for camera rotation. At operation 3309, the second image is adjusted to compensate for camera rotation during capture of the second image. For example, the second image may be rotated to remove any transformation caused by camera rotation. As such, the second image may represent a view based on pure camera translation from the first keyframe. In some embodiments, adjusting the second image to compensate for camera rotations includes using internal measurement unit (IMU) data 3325 associated with the second image.

At operation 3311, the convex hull of all keypoints in the second image is computed to form a second convex hull, such as in step 3215. The second convex hull may then be compared with the convex hull union, such as in steps 3217 and 3219. At operation 3313, the second image is designated as a new keyframe if the overlapping region between the second convex hull and the convex hull union is equal to, or less than, half of the size of the second convex hull, such as in step 3223. In some embodiments, designating the second image as a new keyframe occurs in real-time 3327 during capture of the second image. At operation 3315, the convex hull union is augmented with the second convex hull if the second image is designated as a new keyframe, such as in step 3221.

At operation 3317, the steps are repeated until a predetermined threshold number of keyframes has been designated for the light field. As previously described, a predetermined number of keyframes may be designated and stored. In other embodiments, the predetermined number of keyframes may be designated by user selection. In yet further embodiments, the predetermined number of keyframes may depend on the amount of coverage required to capture a desired MIDMR of an object, which may rely upon factors such as size of the object, field of view of the camera, distance between the camera and the object, capture speed of the camera, etc.

Once the required amount of keyframes have been identified designated, the number of keyframes are represented as nodes on a 2D graph at operation 3319, such as in step 3227. In some embodiments, the keyframes may be nodes 3155 on 2D graph 3150. As previously described, the 2D graph may correspond to a multi-directional structured image array, such as 3100. In some embodiments, each node represents a particular location in a light field. The 2D graphs and/or image arrays created by methods 3200 and 3300 may include sufficient overlapping subject matter to enable a system to perform trilinear interpolation of artificial images along a non-linear camera translation, such as by method 3400 described below. In other embodiments, trilinear interpolation of artificial images along a non-linear camera translation may be implemented by systems and methods described in U.S. patent application No. 15,425,988, previously referenced above.

In various embodiments, methods 3200 and/or 3300 may improve various processes involved with capturing a light field as an image array. By identifying and selecting only the most necessary keyframes, less images may be stored while still accurately representing an entire light field. Keyframes may be automatically determined from captured frames based on the amount of measured overlap between a currently captured frame and one or more previously captured frames. Furthermore, keyframes may be determined in real-time during capture of the image frames. The number of keyframes required may be varied based on the amount of overlapping subject matter desired in a new keyframe. Fewer keyframes may be required where less overlap is required and/or desired. Thus, the amount of images required for an image array may be reduced to further increase processing power and/or speed of the system. Furthermore, a more optically accurate 2D graph and/or multi-directional structured image array may be generated from the light field because camera rotation is compensated for in the captured images. By correcting for camera rotation, the claimed systems and methods also enable a more accurate fusion of convex hulls, and more accurate comparisons of overlapping subject matter within image frames, such as when the overlapping region is determined at step 3217.

Figure 34A:
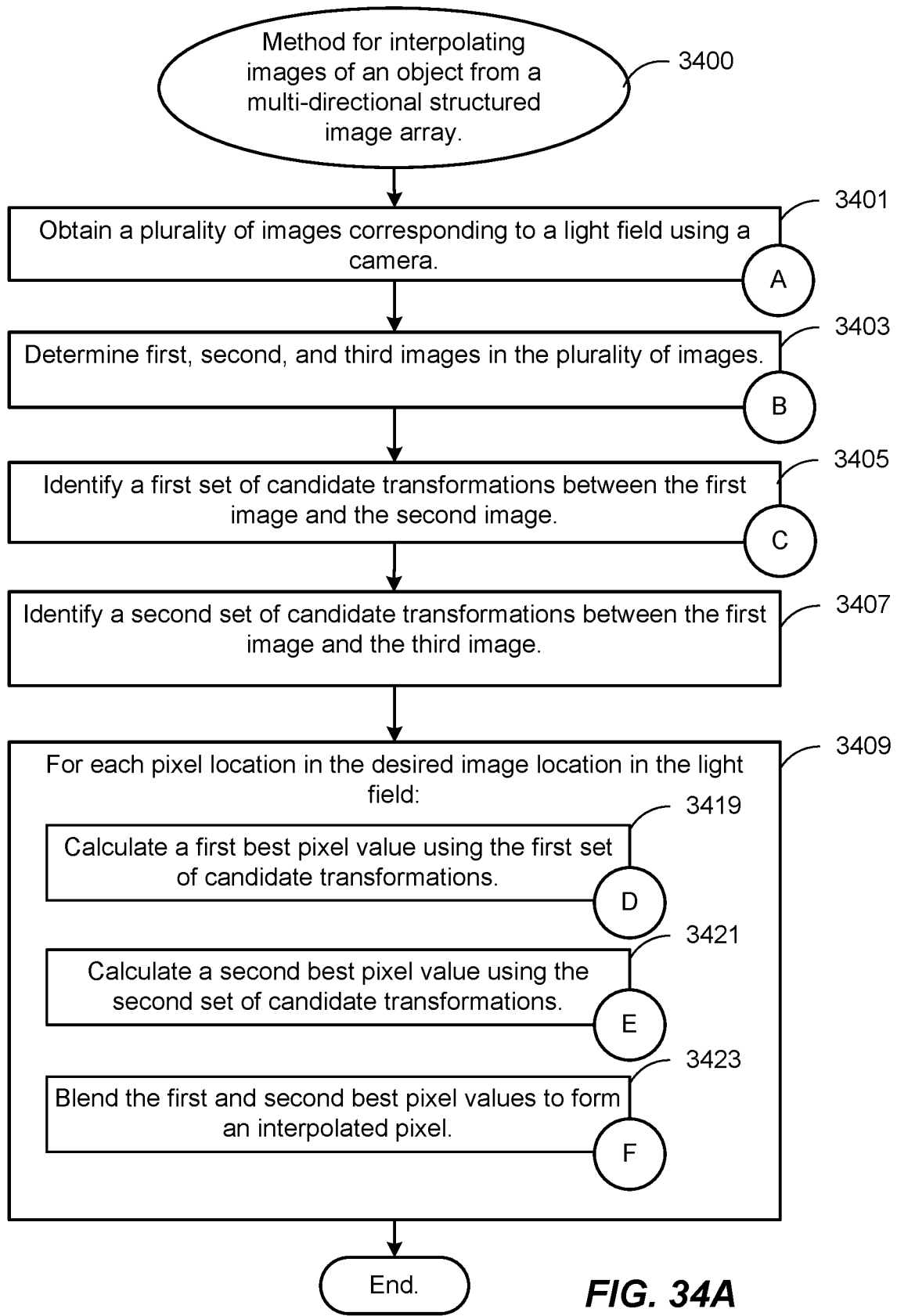
FIGS. 34A-34C illustrate an example method for interpolating images of an object from a multi-directional structured image array, in accordance with one or more embodiments.
Figure 34B:
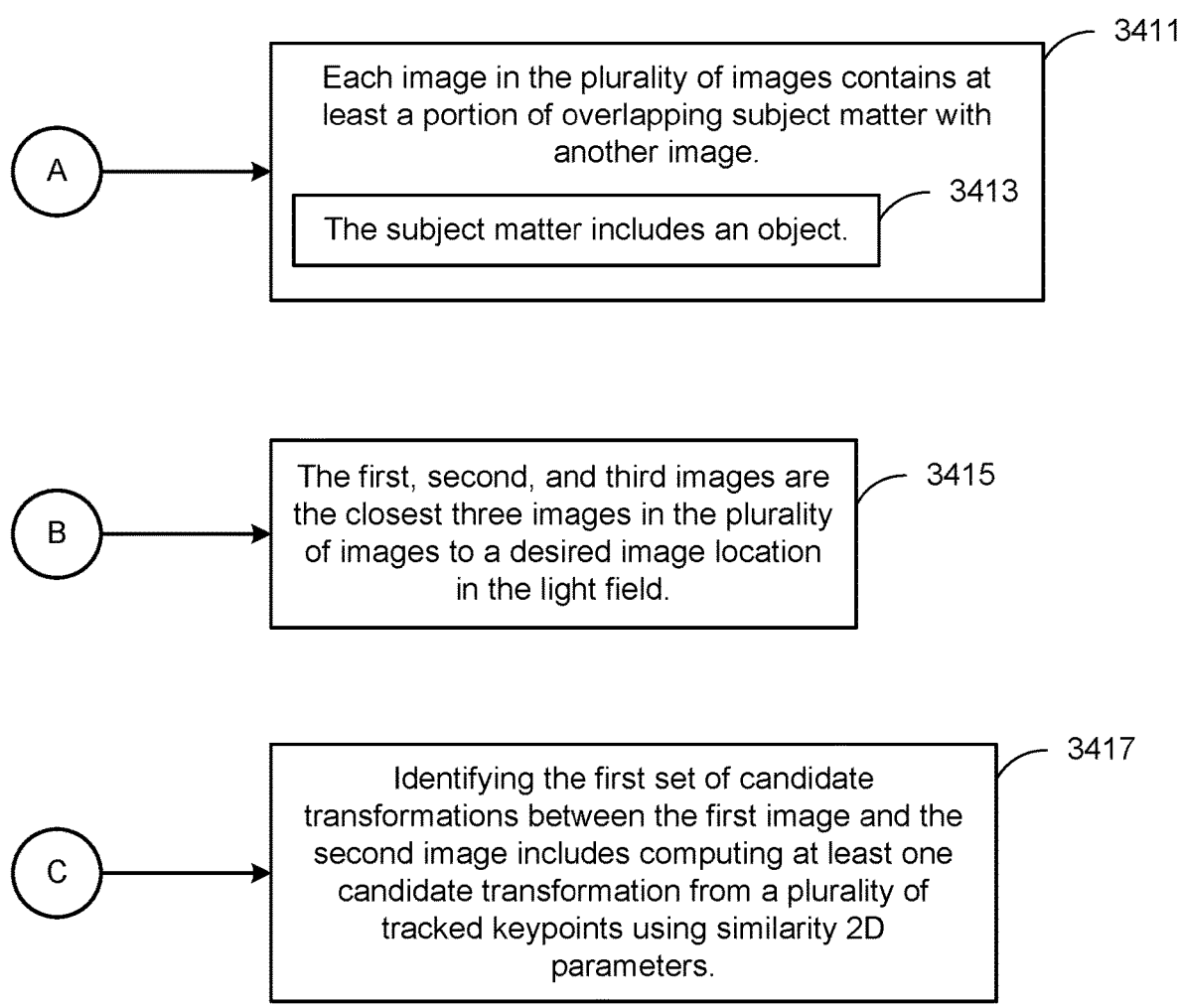
Figure 34C:
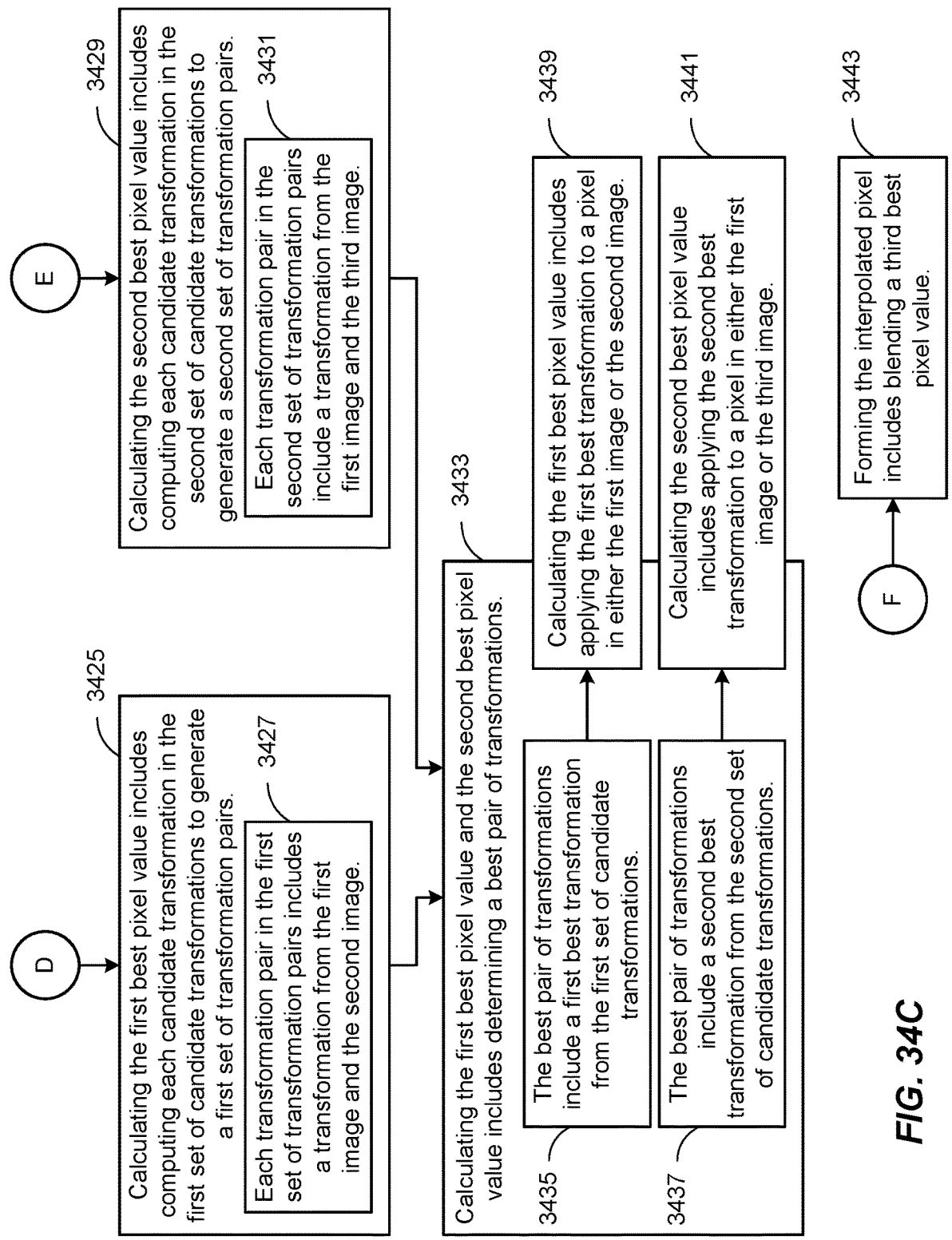

With reference to FIGS. 34A-34C, shown is an example method 3400 for interpolating images of an object from a multi-directional structured image array, in accordance with one or more embodiments. At operation 3401, a plurality of images corresponding to a light field is obtained using a camera. Each image in the plurality of images contains at least a portion of overlapping subject matter 3411 with another image. The subject matter 3411 includes an object 3413. In some embodiments, the light field may be represented as a multi-directional structured image array, such as multi-direction structured image array 3100 generated at step 3001. In some embodiments, the multi-directional structured image array may correspond to a 2D graph, such as 2D graph 3150, where each node in the 2D graph corresponds to a camera location.

At operation 3403, first, second, and third images are determined in the plurality of images, such as in step 3007. The first, second, and third images are the closest three images in the plurality of images to a desired image location 3415 in the light field. For example, the first, second, and third images may correspond to nodes in a 2D graph that are closest to a position corresponding to the desired image and/or camera location.

At operation 3405, a first set of candidate transformations is identified between the first image and the second image, such as in step 3009. For example, the first set of candidate transformations may include transformations candidates T1-2_1, T1-2_2, T1-2_3, T1-2_4, T1-2_5, T1-2_6, T1-2_7, and T1-2_8, which correspond to eight transformation candidates between keyframe 1 and keyframe 2. At operation 3407, a second set of candidate transformations is identified between the first image and the third image, such as in step 3011. For example, the first set of candidate transformations may include transformation candidates T1-3_1, T1-3_2, T1-3_3, T1-3_4, T1-3_5, T1-3_6, T1-3_7, and T1-3_8, which correspond to eight transformation candidates between keyframe 1 and keyframe 3.

As previously described, in various embodiments, transformation candidates may be solved using methods described with reference to steps 901 to 917 of method 900. In some embodiments, identifying the first set of candidate transformations between the first image and the second image includes computing at least one candidate transformation from a plurality of keypoints using similarity 2D parameters 3417. In some embodiments, identifying the second set of candidate transformations between the first image and the third image also includes computing at least one candidate transformation from a plurality of keypoints using similarity 2D parameters 3417. As previously explained, other parameters may be used to solve candidate transformations in other embodiments, including 2D translation (x and y translation), 2D Euclidean parameters (2D rotation and x,y translation), affine, homography, etc.

Method 3400 then determines best pixel values to blend to render a synthetic pixel for the interpolated image, such as in steps 3013 to 3021. For each pixel location 3409 in the desired image location 3415, a first best pixel value 3425 is calculated using the first set of candidate transformations at 3419, such as in step 3013. In some embodiments, calculating the first best pixel value 3425 includes computing each candidate transformation in the first set of candidate transformations to generate a first set of transformation pairs 3427. In some embodiments, each transformation pair in the first set of transformation pairs 3427 includes a transformation from the first image and the second image. For example, a transformation candidate T1-2_1 may be used to generate a transformation pair, which includes one transformation of a pixel from the first image to the desired camera location 3415, and another transformation of the pixel form the second image to the desired camera location 3415. In some embodiments, a transformation candidate T1-2_1 may be used generate a transformation pair, which includes one transformation for a pixel from the desired camera location 3415 to the first image, and another transformation of the pixel from the desired camera location 3415 to the second image. This may result in a pixel pair for each transformation candidate, such as pixels F1-2_1 and F2-1_1 for transformation T1-2_1.

For each pixel location 3409 in the desired image location 3415, a second best pixel value 3429 is calculated using the second set of candidate transformations at 3421, such as in step 3015. In some embodiments, calculating the second best pixel value 3429 includes computing each candidate transformation in the second set of candidate transformations to generate a second set of transformation pairs 3431. In some embodiments, each transformation pair in the second set of transformation pairs 3431 includes a transformation from the first image and the third image. For example, a transformation candidate T1-3_1 may be used to generate a transformation pair, which includes one transformation of a pixel from the first image to the desired camera location 3415, and another transformation of the pixel form the third image to the desired camera location 3415. In some embodiments, a transformation candidate T1-3_1 may be used generate a transformation pair, which includes one transformation for a pixel from the desired camera location 3415 to the first image, and another transformation of the pixel from the desired camera location 3415 to the third image. This may result in a pixel pair for each transformation candidate, such as pixels F1-3_1 and F3-1_1 for transformation T1-3_1.

In some embodiments, calculating the first best pixel value and the second best pixel value includes determining a best pair of transformations 3433, such as in steps 3017 and 3019. The best pair of transformations 3433 includes a first best transformation 3435 from the first set of candidate transformations, such as T1-2_N. The best pair of transformations 3433 also includes a second best transformation 3437 from the second set of candidate transformations, such as T1-3_M. In some embodiments, calculating the first best pixel value 3425 includes applying (3439) the first best transformation 3435 to a pixel in either the first image or the second image. In some embodiments, calculating the second best pixel value 3429 includes applying (3441) the second best transformation 3437 to a pixel in either the first image or the third image. For example, the first best pixel value 3425 may be R1-2 and the second best pixel value 3429 may be R1-3, as previously described with reference to step 3019. Pixel R1-2 may be rendered from applying the first best transformation 3435 to either the first image or the second image. Pixel R1-3 may be rendered by applying the second best transformation 3437 to the first image or the third image.

For each pixel location 3409 in the desired image location 3415, the first and second best pixel values are blended to form an interpolated pixel 3443 at 3423, such as in step 3021. For example, a final rendering pixel, PR, may be rendered based on the following blending algorithm, previously described:

$PR=(R1-2*b+R1-3*a)/(b+a)$.

In some embodiments, forming the interpolated pixel 3443 includes blending a third best pixel value. In some embodiments, a third best pixel value for a pixel location may be calculated using a third set of candidate transformations identified between the second image and the third image, such as in operation 3405 and/or 3407. In other embodiments, the third set of transformations may be identified between the first image and a fourth image. The third best pixel value may then be calculated from the third set of candidate transformations, such as in operations 3419 and/or 3421.

Combined Embedded Multi-View Interactive Digital Media Representations

In various embodiments, one or more MIDMRs may be embedded in a more general MIDMR for enhanced user interaction of a particular object of interest. A combined embedded MIDMR, as described herein in particular embodiments, may include a general view which displays a general object MIDMR of an object of interest. The combined embedded MIDMR may further include one or more selectable tags located in the general view which may trigger a specific view of a corresponding feature or component when selected. The specific view of the combined embedded MIDMR may display a specific feature MIDMR, which includes a more detailed interactive view of a particular feature or component.

Figure 35:
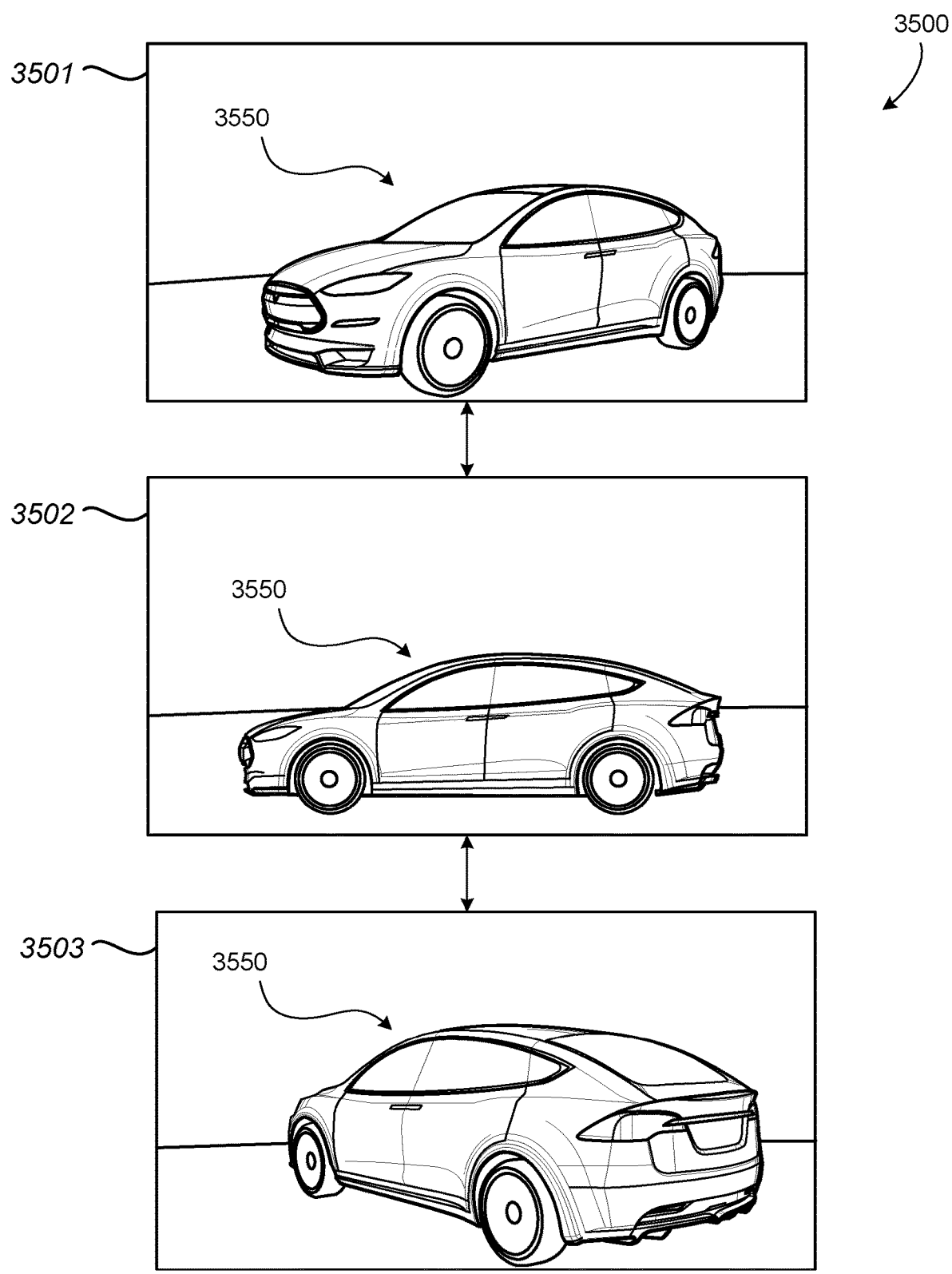
FIG. 35 illustrates an example general object Multi-View Interactive Digital Media Representation (MIDMR), in accordance with one or more embodiments.

With reference to FIG. 35, shown is an example general object Multi-View Interactive Digital Media Representation (MIDMR), in accordance with one or more embodiments. As depicted in FIG. 35, MIDMR 3500 comprises sequence of image frames including at least frames 3501, 3502, and 3503. Frames 3501, 3502, and 3503 provide various viewing angles of an object 3550 along a translational path. In various embodiments, MIDMR 3500 depicts an interactive representation of an object 3550. MIDMR 3500 may be displayed on a viewing device, such as a user device, smartphone, headset 2500, etc. MIDMR 3500 may include additional frames that depict additional angles or camera positions around object 3550 (not illustrated in FIG. 35). The interactive representation may be enhanced to provide a three-dimensional effects or stereoscopic view of the object 3550 to a user. In some embodiments, object 3550 shown in the MIDMR 3500 may be of any one of various object, objects, and/or backgrounds, such as a statue, a person, a book, furniture, etc. As depicted in FIG. 35, the object 3550 shown in MIDMR 3500 is a vehicle.

In some embodiments, the MIDMR 3500 may be responsive to user interaction with the device. In various embodiments, such user interaction can include moving (e.g. tilting, translating, rotating, etc.) an input device, swiping the screen, etc. Frame 3501 depicts a first position 1 of object 3550; Frame 3502 depicts a second position 2 of object 3550; and Frame 3503 depicts of third position 3 of object 3550. Various viewing angles of MIDMR 3500 may be displayed based on interaction with the user device. A user may interact with the viewing device, such as by swiping or tilting the device about an axis, to view different viewing angles of the object 3550 along a translational path. For example, as a user tilts the viewing device about an axis, different angles of object 3550 which correspond to the degree of tilt, are displayed to the user. The image displayed may be based on a tilt count as described with reference to FIG. 27. As shown, a viewing device may be tilted along an axis to display frame 3501, then frame 3502, and then frame 3503 in that particular order. A user may tilt the viewing device in an opposite direction along the axis to display the frames in an opposite order from frame 3503 to frame 3502, and then from frame 3502 to frame 3501. As another example, the user interaction may comprise swiping the screen with one or more fingers to drag the image of the MIDMR in a desired direction.

The MIDMR may display additional viewing angles of the object 3550 in between frames 3501, 3502, and 3503 which correspond to the degree of motion the user has swiped, such as through interpolation or infinite smoothing. Any number of images may be interpolated for viewing angles of object 3550 existing between the frames 3501, 3502, and 3503 depicted in FIG. 35. In some embodiments, a user may tilt or drag the device to any degree to view a desired angle of the object. As previously described, the MIDMR 3500 may respond to spatial and movement sensors in the user device. For example, the systems and methods described may operate a sensor package for determining orientation and movement of a user device, such as device 3500, including gyroscopes, IMU sensors, etc. Thus, the device may detect movement of the device corresponding to translational movement or rotational movement of the device. In some embodiments, the MIDMR may rotate or move in concert with the detected movement.

In some embodiments, the device may additionally, and/or alternatively, determine the degree of movement in an MIDMR through use of a camera. For example, the device may include a camera, which may be located on the opposite side of the display screen. As the user moves the device to view the MIDMR, the camera may be operational to capture images which can be processed in the background to detect and compute the motion of the device. Such captured images may not be displayed. Such images may be temporarily stored in RAM for processing.

MIDMR 3500 may be a general object MIDMR which displays a general view of an object of interest 3550. In some embodiments, the general view may show the entirety of an object at one or more viewing angles. In some embodiments, the general view MIDMR may include a convex or concave motion capture using a recording device. As shown in FIG. 35, MIDMR 3500 displays a concave MIDMR, such as that described in FIG. 7A.

In some embodiments, an MIDMR may be presented to a user as a combined embedded MIDMR. In various embodiments, a combined embedded MIDMR includes a general view in which a general view MIDMR, such as MIDMR 3500, is displayed for interactive viewing by a user on a user device. For example, a combined embedded MIDMR may comprise general object MIDMR with one or more additional MIDMRs embedded within MIDMR 3500. Such additional embedded MIDMRs may be specific feature MIDMRs which display a detailed view of a particular portion of object 3550.

Figure 36:
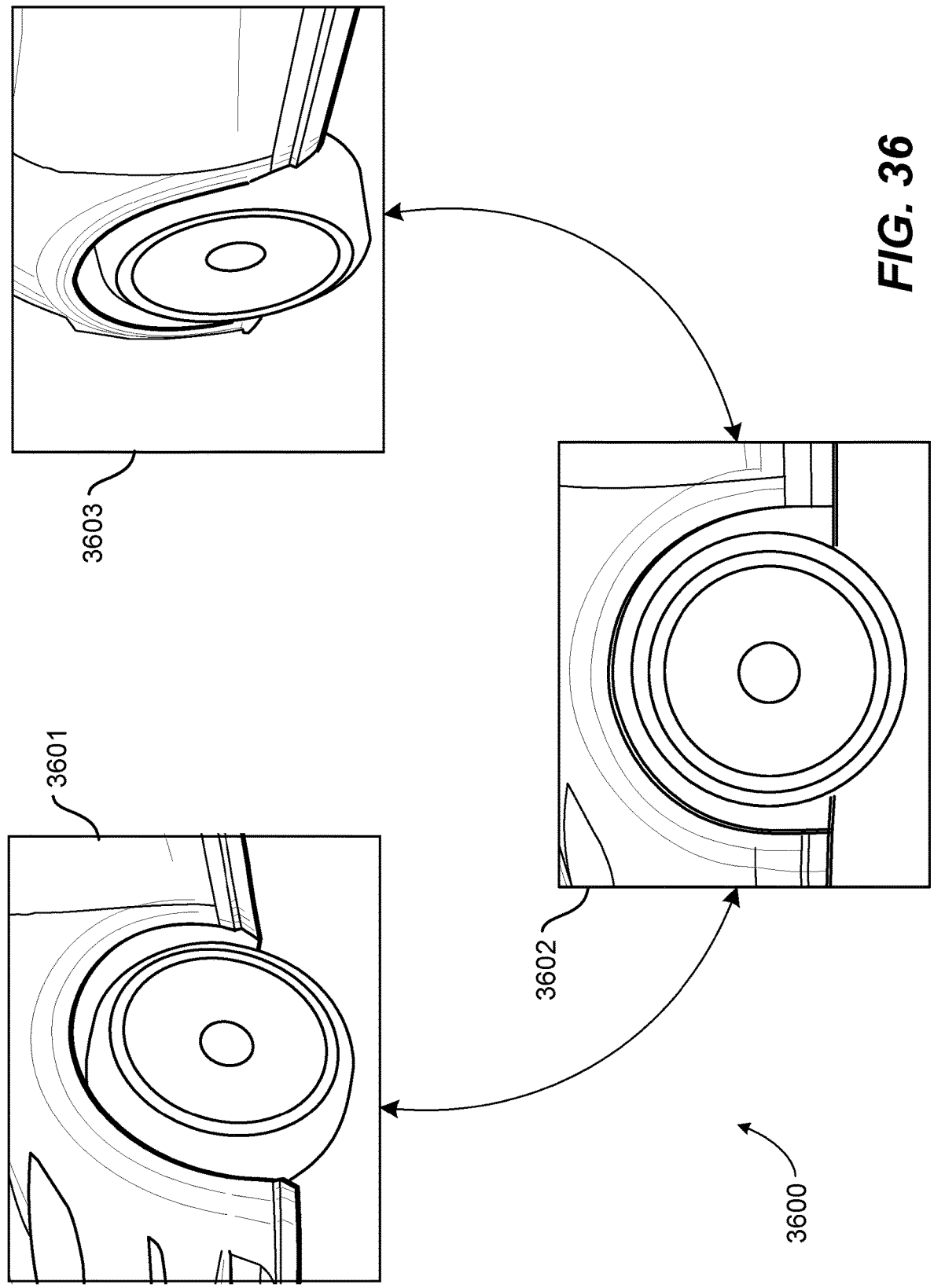
FIG. 36 illustrates an example of a specific feature Multi-View Interactive Digital Media Representation (MIDMR), in accordance with one or more embodiments.

With reference to FIG. 36, shown is an example of a specific feature Multi-View Interactive Digital Media Representation (MIDMR) 3600, in accordance with one or more embodiments. As previously described, a specific feature MIDMRs may display detailed view of a particular feature or component of object 3550. As shown in FIG. 36, MIDMR 3600 displays a detailed view of left front wheel of object 3550 at various viewing angles in frames 3601, 3602, and 3603. Just as different viewing angles of general object MIDMR 3500 may be accessed based on swiping or tilting actions, various viewing angles of MIDMR 3600 may also be displayed based on user interaction with the user device. Specific feature MIDMR 3600 may be embedded into general object MIDMR 3500 to generate a combined embedded MIDMR 3700, as described below. In some embodiments, general object MIDMRs and embedded specific feature MIDMRs may be stored as the same combined embedded MIDMR file. In other embodiments, general object MIDMRs and embedded specific feature MIDMRs may be stored as separate files. Links may be embedded within the MIDMR files to link associated MIDMRs and allow users to access and alternate between associated MIDMRs in a combined embedded MIDMR.

Figure 37:
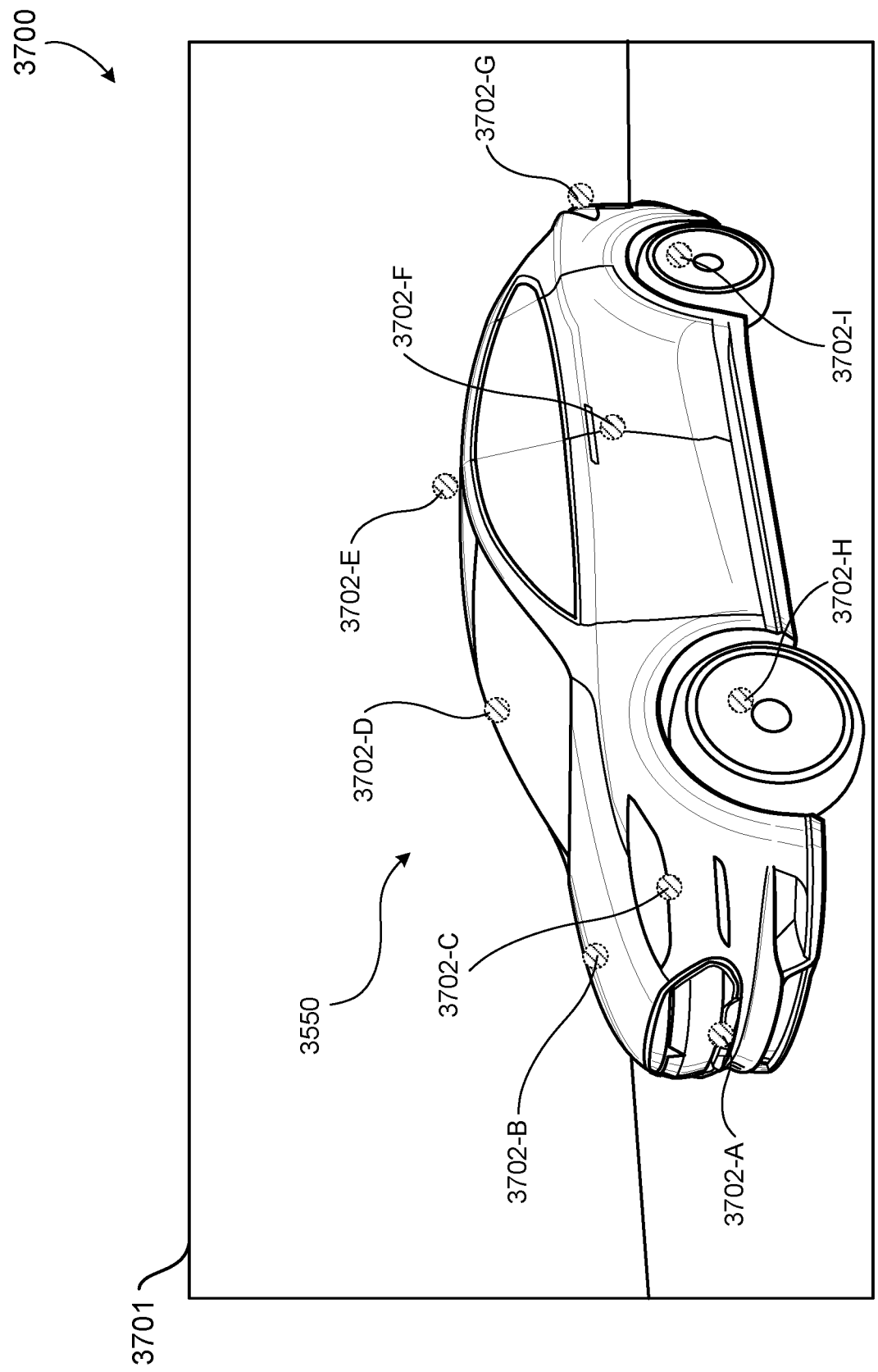
FIG. 37 illustrates an example of a combined embedded Multi-View Interactive Digital Media Representation (MIDMR), in accordance with one or more embodiments.

With reference to FIG. 37, shown is an example of a frame 3701 of a combined embedded Multi-View Interactive Digital Media Representation (MIDMR) 3700, in accordance with one or more embodiments. Combined embedded MIDMR 3700 may include a general view, in which general object MIDMR 3500 is displayed for interactive viewing by a user on a user device. As depicted, frame 3701 of combined embedded MIDMR 3700 may correspond to frame 3501 of MIDMR 3500. In other words, frames 3701 and 3501 may display the image and same viewing angle of object 3550. In some embodiments, frame 3701 may be the same frame as frame 3501, but with an additional embedded MIDMR embedded within. MIDMR 3700 may include additional frames in the general view that correspond to frames 3502 and 3503, as well as interpolated frames in between.

As previously described, a combined embedded MIDMR may include links embedded within to allow access between associated MIDMRs. In various embodiments, the general view of a combined embedded MIDMR includes one or more selectable tags located somewhere in the MIDMR. For example, MIDMR 3700 may include one or more selectable tags located somewhere in frame 3701. For example, frame 3701 includes various selectable tags 3702-A, 3702-B, 3702-C, 3702-D, 3702-E, 3702-F, 3703-G, 3702-H, and 3702-I. Tags 3702-A to 3702-I may correspond to particular areas or components of object 3550. For example, tag 3702-A may correspond to the front grill of a vehicle; tag 3702-B may correspond to the hood of the vehicle; tag 3702-C may correspond to the left front headlight; tag 3702-D may correspond to the windshield, tag 3702-E may correspond to the moon roof, tag 3702-F may correspond to the handle of the driver side door; tag 3702-G may correspond to the left rear headlight; tag 3702-H may correspond to the left front wheel; and tag 3702-I may correspond to the left rear wheel.

Such tags may be additionally located in other frames of MIDMR 3700, including interpolated frames. Although tags 3702-A through 3702-I are visible in FIG. 37, in some embodiments, selectable tags are not visible to the user in a combined embedded MIDMR. In some embodiments, the selectable area of a selectable tag may be associated with the entire structure of the corresponding area or component of object 3550. For example, tag 3702-C may be selected by selection of any part of the left front headlight. In some embodiments, a selectable tag may be selected throughout the MIDMR. However, in some embodiments, a tag may only be visible or available for selection at certain viewing angles of MIDMR 3700. For example, a tag corresponding to the right front wheel (not visible in frame 3701) may only be selectable in frames where the right front wheel is visible to the user.

In some embodiments, the selectable tag corresponds to an embedded specific feature MIDMR. For example, selectable tag 3702-H may correspond to specific feature MIDMR 3600 of the left front wheel. In some embodiments, an embedded MIDMR, such as MIDMR 3600, is not available for viewing in the general view of MIDMR 3700. However, selection of a selectable tag may trigger a specific view to be displayed on the user device. The specific view may correspond to an embedded specific feature MIDMR, such as MIDMR 3600. For example, a user may select tag 3602-H to access specific feature MIDMR 3600 to be displayed on the user device for interactive viewing. Such tags may correspond to links, such as hypertext links, etc., that link to the specific feature MIDMR.

Tags corresponding to the interior of the vehicle may also be included in combined embedded MIDMR 3700. For example, a selectable tag may correspond to the interior of the car and may cause a MIDMR display of the interior of the car to be shown when selected. The MIDMR of the interior of the car may be a convex panoramic view of the interior, such as that described with reference to FIG. 7B. In some embodiments, the MIDMR of the interior of the vehicle may include additional tags corresponding to specific feature MIDMRs of various components, such as the steering wheel, dashboard, glove compartments, seats, gears shifts, user consoles, etc. In some embodiments, a particular MIDMR, such as the MIDMR of the interior of a vehicle may be a specific feature MIDMR that may be selected from the general view MIDMR 3700. As such, a specific feature MIDMRs may additionally include selectable tags that correspond to additional specific feature MIDMRs embedded within. Some specific feature MIDMRs may additionally include tags for returning to the general view of the combined embedded MIDMR 3700. The MIDMR of the interior of the vehicle may additionally, or alternatively, be considered a general view MIDMR with additional selectable tags therein. In some embodiments, the interior MIDMR may be a general view that may be selected separately from the general view MIDMR 3700.

In various embodiments, a general object MIDMR and a specific feature MIDMR embedded therein may be obtained using different capture motions. In other words, the general object MIDMR and the specific feature MIDMR may be separate MIDMRs capture individually. In some embodiments, MIDMR 3500 and MIDMR 3600 may both be captured with concave or convex camera translations. In some embodiments, one of MIDMR 3500 and MIDMR 3600 may be captured with a concave camera translation and the other one of MIDMR 3500 and MIDMR 3600 may be captured with a convex camera translation. In yet other embodiments, the specific feature MIDMR may be detailed view of a particular feature or component that is extracted from the general object MIDMR. For example, a general object MIDMR may be captured and generated, but displayed in the general view with lower resolution. This may utilize less processing power when the combined embedded MIDMR is viewed in the general view. However, when a particular tag is selected, such as tag 3702-H, to view the corresponding feature or component in a specific view, the displayed specific feature MIDMR may be a portion of the general object MIDMR containing the left front wheel that is enlarged and displayed in a greater resolution.

Figure 38A:
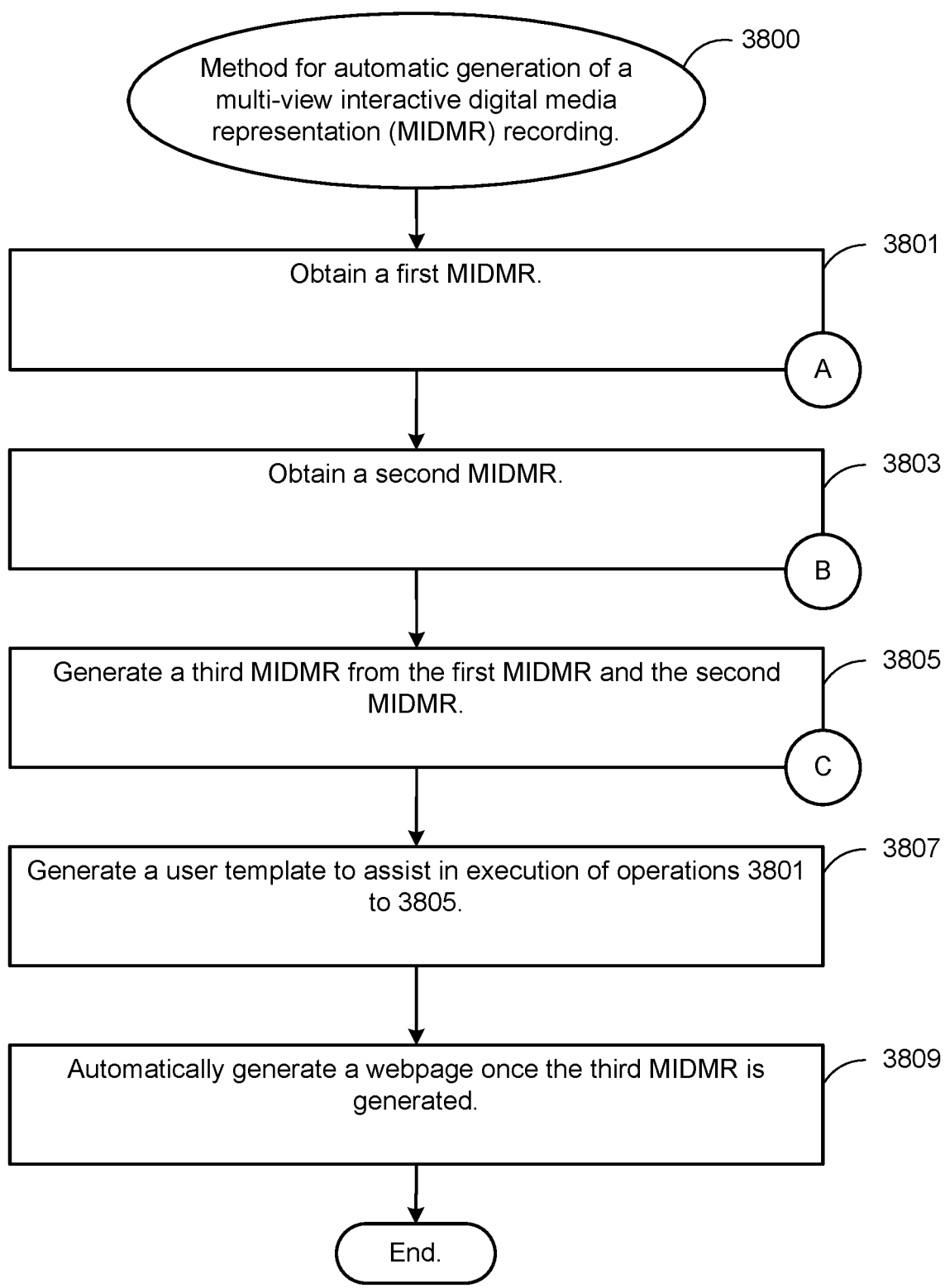
FIGS. 38A-38C illustrate an example method for automatic generation of a Multi-View Interactive Digital Media Representation (MIDMR), in accordance with one or more embodiments.
Figure 38B:
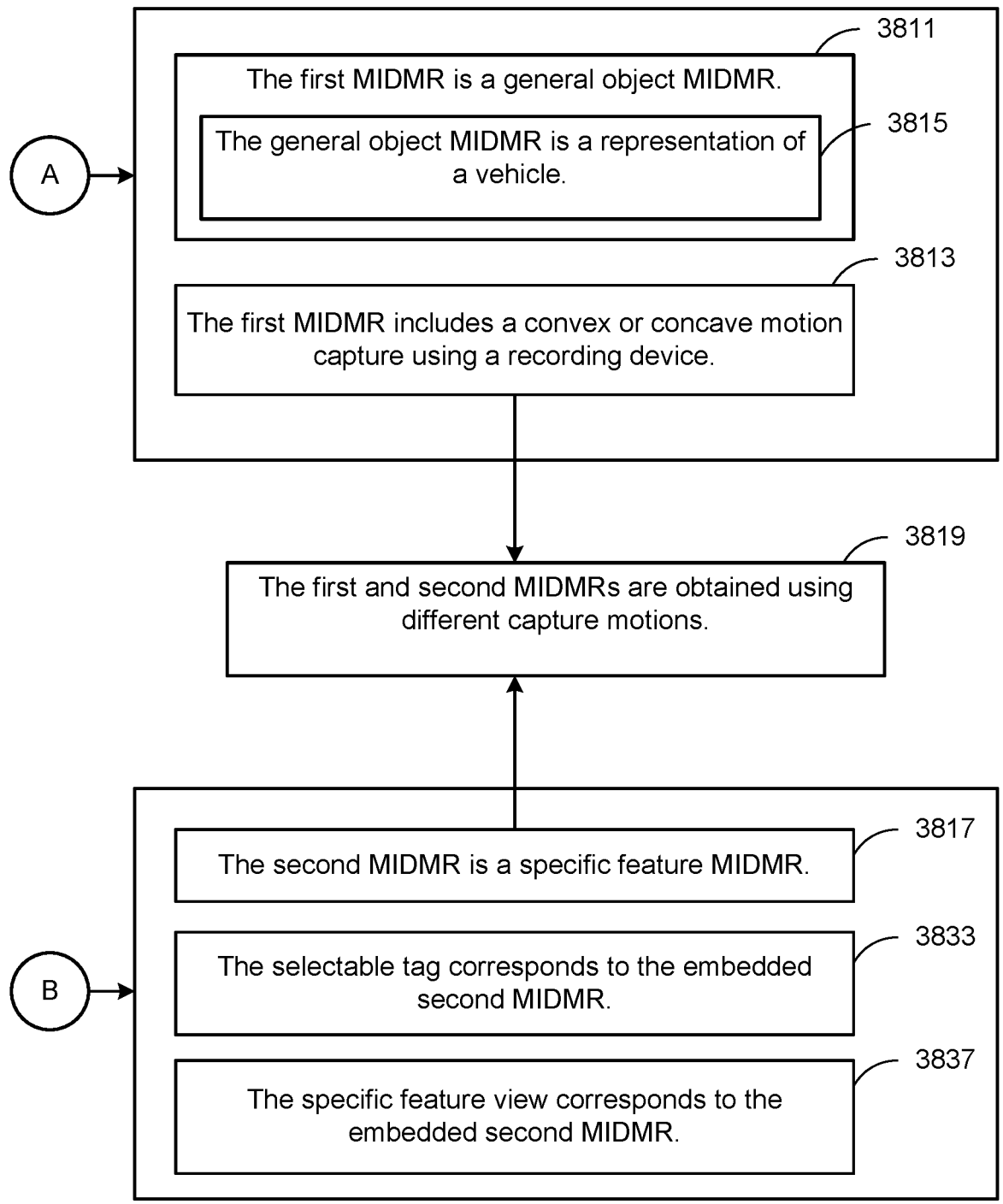
Figure 38C:
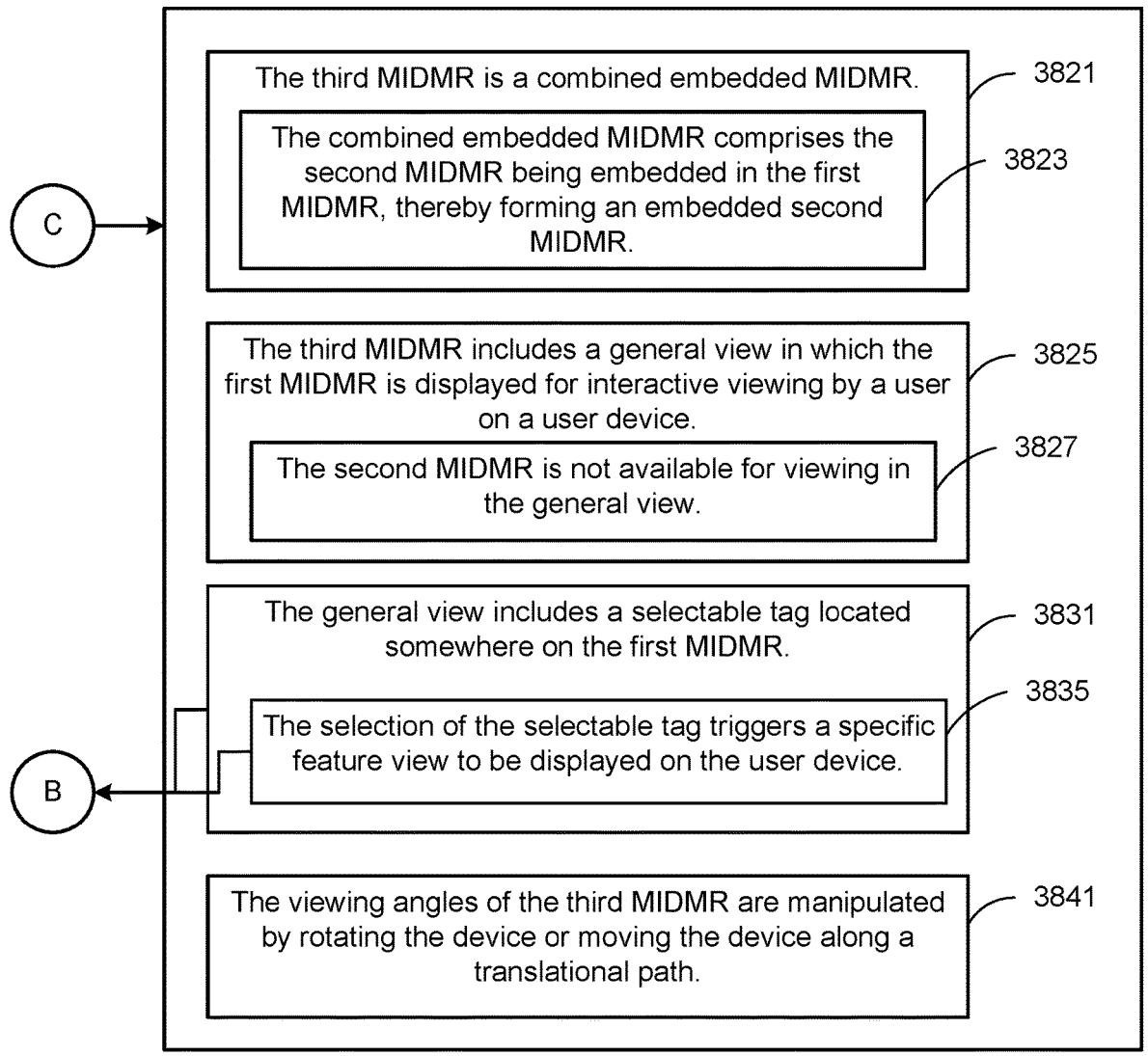

With reference to FIGS. 38A-38C, shown is an example method 3800 for automatic generation of a multi-view interactive digital media representation (MIDMR) recording. At operation 3801, a first MIDMR 3811 is obtained. The first MIDMR 3811 may be a general object MIDMR, such as general object MIDMR 3500. In some embodiments, the first MIDMR 3811 may include a convex or concave motion capture 3813 using a recording device, such as described with reference to FIGS. 7A-7D. In some embodiments, the motion capture 3813 may be a flat view capture, such as that depicted in FIG. 7E. As previously described, a general object MIDMR may display any one or more of various objects, such as object 3550. For example, a general object MIDMR 3811 may be a representation of a vehicle 3815, such as in general object MIDMR 3500.

At operation 3803, a second MIDMR 3817 is obtained. The second MIDMR 3817 may be a specific feature MIDMR, such as specific feature MIDMR 3600. In some embodiments, the first and second MIDMRs (3811 and 3817, respectively) are obtained (3819) using different capture motions. Such capture motions may be those described with reference to FIGS. 5, 6A-B, and 7A-E. In some embodiments, the second MIDMR 3817 may be a detailed view of a portion extracted from the first MIDMR 3811. In some embodiments, the first MIDMR 3811 or the second MIDMR 3817 may each be captured using a structured image array as described with reference to FIGS. 30, 32, 33A-33B, and 34A-34C.

At operation 3805, a third MIDMR 3821 is generated from the first MIDMR 3811 and the second MIDMR 3817. The third MIDMR 3821 may be a combined embedded MIDMR, such as that described with reference to FIG. 37. Such combined embedded MIDMR may comprise the second MIDMR 3817 being embedded in the first MIDMR 3811, thereby forming an embedded second MIDMR 3823. In some embodiments, the third MIDMR 3821 includes a general view 3825 in which the first MIDMR 3811 is displayed for interactive viewing by a user on a user device. For example, the general view of combined embedded MIDMR 3700 may display general object MIDMR 3500 in the general view. The second MIDMR 3817 may not be available for viewing (3827) in the general view 3825. However, in some embodiments, the second MIDMR 3817 may be available for viewing in the general view 3825. For example, smaller thumbnails may show one or more frames of the second MIDMR 3817 in the general view 3825 of the third MIDMR 3821.

In some embodiments, the general view 3825 includes a selectable tag 3833 located (3831) somewhere on the first MIDMR 3811. The selectable tag 3833 corresponds to the embedded second MIDMR 3823. The selectable tag 3833 may include a link to a particular specific view. In some embodiments, selection of the selectable tag 3833 triggers (3835) a specific view 3837 to be displayed on the user device. The specific view 3837 corresponds to the embedded second MIDMR 3823. For example, selection of tag 3702-H in the general view of MIDMR 3700 may cause specific feature MIDMR 3600 to display on the client device to show various viewing angles of the front left wheel. In some embodiments, the viewing angles of the third MIDMR 3821 are manipulated (3841) by rotating the device or moving the device along a translational path.

At operation 3807, a user template may be generated to assist in execution of operations 3801 through 3805. In various embodiments, a template may be generated based on the type of object of interest 3550. For example, a user may indicate that the object of interest is a vehicle. As another example, a user may indicate that the object of interest is a hand bag. In yet another example, the object of interest may be a book. In some embodiments, a general template may be generated which may populate various inputs for the user to select. The various inputs may be based on the type of object of interest.

Based on the type of object, the user template may prompt a user to capture general object MIDMRs or specific feature MIDMRs. For example, a user may be prompted to capture a concave 360 degree image capture of a vehicle to generate the first general view MIDMR 3811. In some embodiments, the user may then be prompted to capture additional images to generate a specific feature MIDMR of particular features or components of the object of interest. The various views and particular features or components may be suggested to the user based on the type of object of interest. For example, referring back to FIGS. 35-37, particular components for a vehicle may include, but are not limited to, grills, hoods, headlights and taillights, windows, door handles, wheels, hubcaps, etc. Particular components may also include interior portions of the vehicle, such as steering wheel, dashboard, glove compartments, door handles, seats, etc. As another example, objects of interest may include bags, such as handbags, purses, backpacks, etc. Particular components for bags may include, but are not limited to, handles, straps, buckles, zippers, interior linings, etc. In some embodiments, the views or particular features or components may be suggested based on specific feature MIDMRs generated and embedded by other users. Such information may be stored on a network, which may be a local network or a global network and retrieved by the user device.

In some embodiments, various types of objects may be automatically detected in a general object or specific feature MIDMR to generate a user template. Similar to method 1100, a neural network may be trained to label pixels according to a corresponding category or class in an image frame of a MIDMR, such as at step 1101. Each image frame may be input into the neural network, such as at step 1103, and a feature map may be produced for each image frame, such as at step 1105. As described, the neural network may be trained for any number of object classes (such as a vehicle, bags, books, etc.) to determine the probability that a pixel being of a particular object class and extract the feature map corresponding to that object, such as in steps 1107 and 1109. For example, a neural network may be trained to identify vehicles as a class of objects and determine that the images in a MIDMR, such as MIDMR 3500, show a vehicle 3550 as the object of interest. A user template corresponding to a vehicle may then be generated for the user. The template may further prompt the user to capture additional MIDMRs of specific features of the vehicle, such as headlights, taillights, bumpers, etc.

In some embodiments, a neural network may be trained, such as in method 1100, to recognize particular components of an object, such as the wheels, bumper, headlights, taillights, doors, door handles, steering wheels, etc. of a vehicle. In some embodiments, the neural network may further be trained to recognize particular vehicle types, such as a truck, car, SUV, etc. In some embodiments, the make or model of a car may be automatically identified, such as based on logos or markings on the car. Other attributes, such as color or number of doors may also be recognized by the neural network. Such additional information may be automatically input into the template. The template may also prompt the user to capture specific feature MIDMRs based on these recognized components or features. In some embodiments, the neural network may additionally be trained to recognize other features, such as a dent or scratch on the surface of a vehicle. For example, the neural network may recognize breaks in smooth lines of various components that would indicate imperfections based on trained images. The neural network may detect a dent on the grill of vehicle 3550 and prompt the user to capture and generate a specific feature MIDMR of the particular portion of the bumper with the dent.

In some embodiments, tags 3833 may be automatically generated based on the captured specific feature MIDMRs. The template may prompt the user for placement of these tags based on the object type of the object of interest. As previously described, tags 3833 may correspond to particular specific feature MIDMR which displays a detailed view of a specific feature or component of the object of interest in a general object MIDMR. In some embodiments, the placement of tags in a general view may be suggested to the user in the user template based on the automatic recognition of particular features by a neural network. For example, once a general object MIDMR 3500 is generated, the system may recognize various features of vehicle 3550, such as the wheels. Once a specific feature MIDMR 3600 of the left front wheel is capture and generated, the template may then automatically generate an associated tag for the left front wheel in one or more frames of MIDMR 3500, such as tag 3702-H, and place it on the left front wheel in MIDMR 3500. In some embodiments, the tags are only placed on the component or feature in frames in which such component or feature is visible.

In some embodiments, tags may first be automatically generated and placed to indicate suggested components or features for capturing specific view MIDMRs. The user may then select a tag to begin image capture of the corresponding component or feature. For example, tag 3702-H may first be generated and placed on the left front wheel once general object MIDMR 3500 has been generated. The user may select tag 3702-H to begin capturing an associated specific feature MIDMR 3600 of the left front wheel to correspond to tag 3702-H to create combined embedded MIDMR 3700. In various embodiments, a user need not select all tags suggested by the template. In some embodiments, the placement of tags in a general view may be suggested to the user based on locations of tags manually placed by other users for similar objects of interest. Such placement information may be stored on a network, which may be a local network or a global network.

At operation 3809, a webpage may be automatically generated once the third MIDMR 3821 is generated. The webpage may be automatically generated from a Hyper Text Markup Language (HTML) file. In some embodiments, all or a portion of the HTML file may utilize a template of HTML tags and be created from the user template based on input by the user regarding the object of interest. For example, the webpage may indicated that a particular MIDMR 3821 displays a vehicle and may provide details of the vehicles make, model, color, year, etc. This information may be input by the user based on the user template. Alternatively, or additionally, this information may be automatically determined based on object recognition by a neural network.

In various embodiments, the webpage may display the combined embedded MIDMR 3821 when rendered by a web browser. In some embodiments, MIDMR 3821 may be initially displayed in the general view 3825. In some embodiments embedded specific feature MIDMRs may also be displayed initially. In some embodiments, files containing combined embedded MIDMR 3821, including the general object MIDMR and one or more embedded specific feature MIDMRs, may be stored at the client device or at a server system. The stored files of MIDMR 3821 may be embedded into the webpage or input via a link using HTML tags. The HTML file associated with MIDMR 3821 may be stored in the same or different location as the MIDMR 3821.

In some embodiments, the webpage may comprise a posting to sell or buy the particular object of interest displayed in MIDMR 3821. For example, the webpage may state the price of the vehicle that the user desires to sell the vehicle for. In some embodiments, the webpage is part of a website functioning as an online marketplace. In some embodiments, the website may be operated at a separate server over a network.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Figure 39:
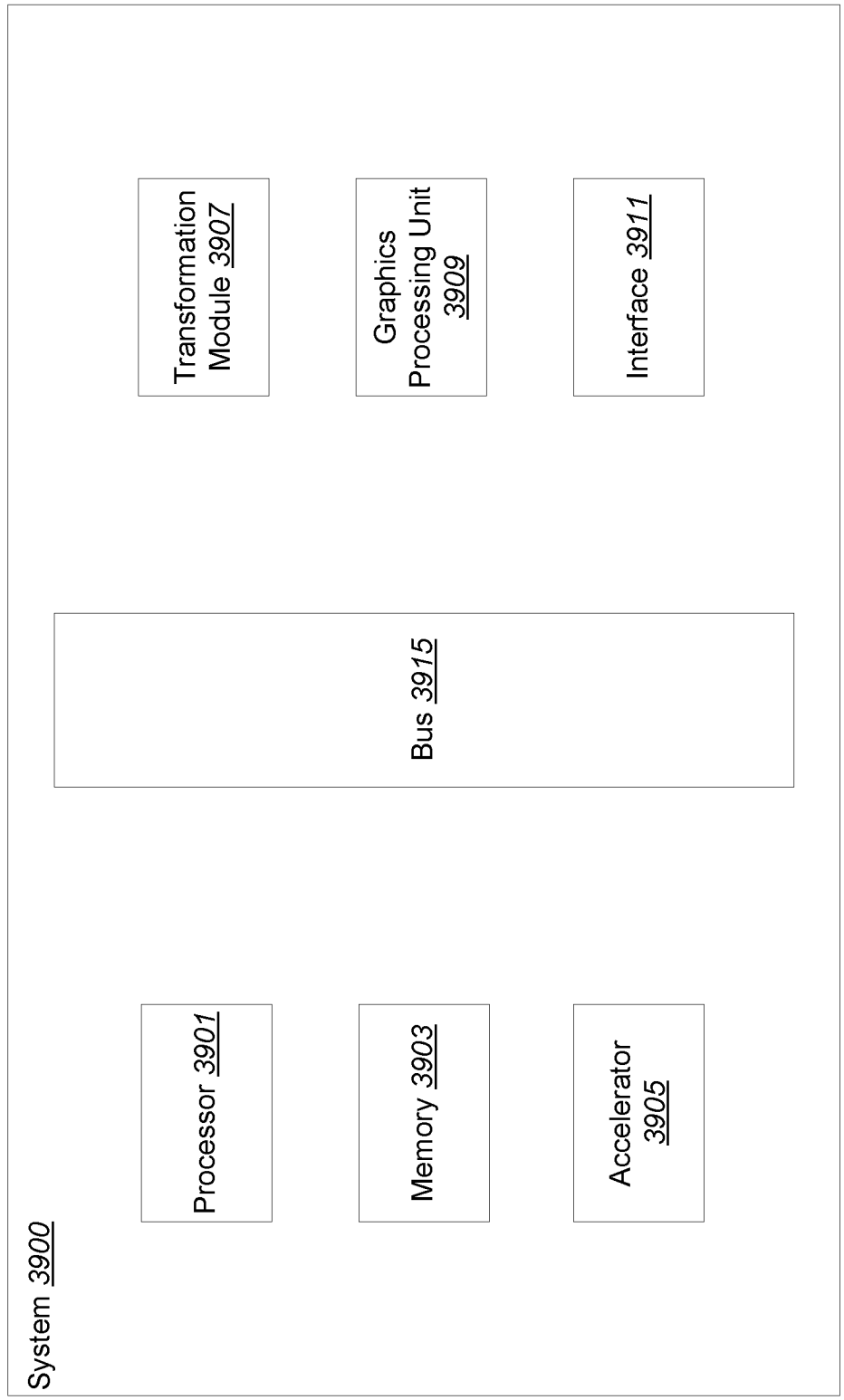
FIG. 39 illustrates a particular example of a computer system that can be used with various embodiments of the present disclosure.

Various computing devices can implement the methods described. For instance, a mobile device, computer system, etc. can be used to generate artificially rendered images. With reference to FIG. 39, shown is a particular example of a computer system that can be used to implement particular examples of the present disclosure. For instance, the computer system 3900 can be used to provide generate artificially rendered images according to various embodiments described above. In addition, the computer system 3900 shown can represent a computing system on a mobile device.

According to particular embodiments, a system 3900, suitable for implementing particular embodiments of the present disclosure, includes a processor 3901, a memory 3903, accelerator 3905, image editing module 3909, an interface 3911, and a bus 3915 (e.g., a PCI bus or other interconnection fabric) and operates as a streaming server. In some embodiments, when acting under the control of appropriate software or firmware, the processor 3901 is responsible for various processes, including processing inputs through various computational layers and algorithms, as described herein. Various specially configured devices can also be used in place of a processor 3901 or in addition to processor 3901. The interface 3911 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 3900 uses memory 3903 to store data and program instructions for operations including MIDMR generation, keypoint selection, keypoint tracking, calculating inlier groups, measuring image intensity differences, image rendering, and various image transformation operations. The program instructions may control the operation of an operating system and/or one or more applications, for example. The memory or memories may also be configured to store received metadata and batch requested metadata. In some embodiments, memory 3903 may be used to store files containing combined embedded MIDMRs including general object MIDMRs, specific feature MIDMRs, selectable tag information, and HTML files for webpage rendering. In various embodiments, memory may be hard disk network storage. In other embodiments, memory 3903 may function as Random Access Memory (RAM). In some embodiments, hard disk network storage and RAM may both be included as separate components in system 3900.

In some embodiments, system 3900 further comprises a graphics processing unit (GPU) 3909. As described above, the GPU 3909 may be implemented to process each pixel on a separate thread to determine the optimal transformation to apply for each pixel, such as in steps 2105, 2407, and/or steps 3013 to 3021. In some embodiments, GPU 3909 may be implemented to process captured images during capture to determine keyframes, such as in method 3300 or method 3400. In some embodiments GPU 3909 may be implemented to process and display combined embedded MIDMRs on a client device. In some embodiments, system 3900 further comprises an accelerator 3905. In various embodiments, accelerator 3905 is a rendering accelerator chip, which may be separate from the graphics processing unit. Accelerator 3905 may be configured to speed up the processing for the overall system 3900 by processing pixels in parallel to prevent overloading of the system 3900. For example, in certain instances, ultra-high-definition images may be processed, which include many pixels, such as DCI 4K or UHD-1 resolution. In such instances, excess pixels may be more than can be processed on a standard GPU processor, such as GPU 3909. In some embodiments, accelerator 3905 may only be utilized when high system loads are anticipated or detected.

In some embodiments, accelerator 3905 may be a hardware accelerator in a separate unit from the CPU, such as processor 3901. Accelerator 3905 may enable automatic parallelization capabilities in order to utilize multiple processors simultaneously in a shared memory multiprocessor machine. The core of accelerator 3905 architecture may be a hybrid design employing fixed-function units where the operations are very well defined and programmable units where flexibility is needed. In various embodiments, accelerator 3905 may be configured to accommodate higher performance and extensions in APIs, particularly OpenGL 2 and DX9. In some embodiments, accelerator 3905 may work in conjunction with transformation module 3907 configured for solving transformations, such as in step 907, determining transformation candidates, such as in steps 2107 and/or steps 3009-3011, applying transformations to individual pixels, such as in steps 2109 and/or step 3019, and/or blending pixels, such as in step 3021. In some embodiments, transformation module 3907 may only be utilized when high system loads are anticipated or detected.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for automatic generation of a multi-view interactive digital media representation (MIDMR) recording, the method comprising:
    obtaining a first MIDMR;
    obtaining a second MIDMR; and
    generating a third MIDMR from the first MIDMR and the second MIDMR, wherein the first and second MIDMRs are obtained using different capture motions, wherein the third MIDMR is a combined embedded MIDMR, wherein the third MIDMR provides a three dimensional view of a first object MIDMR as well as an embedded three dimensional view of a second object MIDMR,
    wherein the first and second MIDMRS are generated by stitching together two dimensional images, and wherein the third MIDMR is generated by combining the first and second MIDMR, and wherein the first, second, and third MIDMRs each provide a three-dimensional view of content without rendering and/or storing an actual three-dimensional model.

2. The method of claim 1, wherein the combined embedded MIDMR comprises the second MIDMR being embedded in the first MIDMR, thereby forming an embedded second MIDMR.

3. The method of claim 2, wherein the third MIDMR includes a general view in which the first MIDMR is displayed for interactive viewing by a user on a user device.

4. The method of claim 3, wherein the embedded second MIDMR is not available for viewing in the general view.

5. The method of claim 4, wherein the general view includes a selectable tag located somewhere on the first MIDMR, the selectable tag corresponding to the embedded second MIDMR.

6. The method of claim 5, wherein selection of the selectable tag triggers a specific view to be displayed on the user device, wherein the specific view corresponds to the embedded second MIDMR.

7. The method of claim 1, further comprising generating a user template to assist in execution of the steps in claim 1.

8. The method of claim 1, further comprising automatically generating a webpage once the third MIDMR is generated.

9. The method of claim 1, wherein the general object MIDMR is a representation of a vehicle.

10. The method of claim 1, wherein viewing angles of the third MIDMR are manipulated by rotating the device or moving the device along a translational path.

11. A non-transitory computer readable medium storing one or more programs configured for execution by a computer, the one or more programs comprising instructions for:
obtaining a first MIDMR;
obtaining a second MIDMR; and
generating a third MIDMR from the first MIDMR and the second MIDMR, wherein the first and second MIDMRs are obtained using different capture motions, wherein the third MIDMR is a combined embedded MIDMR, wherein the third MIDMR provides a three dimensional view of a first object MIDMR as well as an embedded three dimensional view of a second object MIDMR,
wherein the first and second MIDMRS are generated by stitching together two dimensional images, and wherein the third MIDMR is generated by combining the first and second MIDMR, and wherein the first, second, and third MIDMRs each provide a three-dimensional view of content without rendering and/or storing an actual three-dimensional model.

12. The non-transitory computer readable medium of claim 11, wherein the combined embedded MIDMR comprises the second MIDMR being embedded in the first MIDMR, thereby forming an embedded second MIDMR.

13. The non-transitory computer readable medium of claim 12, wherein the third MIDMR includes a general view in which the first MIDMR is displayed for interactive viewing by a user on a user device.

14. The non-transitory computer readable medium of claim 13, wherein the embedded second MIDMR is not available for viewing in the general view.

15. The non-transitory computer readable medium of claim 14, wherein the general view includes a selectable tag located somewhere on the first MIDMR, the selectable tag corresponding to the embedded second MIDMR.

16. The non-transitory computer readable medium of claim 15, wherein selection of the selectable tag triggers a specific view to be displayed on the user device, wherein the specific view corresponds to the embedded second MIDMR.

17. The non-transitory computer readable medium of claim 11, further comprising generating a user template to assist in execution of the steps in claim 11.

18. The non-transitory computer readable medium of claim 11, further comprising automatically generating a webpage once the third MIDMR is generated.

19. The non-transitory computer readable medium of claim 11, wherein the general object MIDMR is a representation of a vehicle.

20. A system comprising:
a processor;
memory; and
one or more programs stored in the memory, the one or more programs comprising instructions for:
obtaining a first MIDMR;
obtaining a second MIDMR; and
generating a third MIDMR from the first MIDMR and the second MIDMR, wherein the first and second MIDMRs are obtained using different capture motions, wherein the third MIDMR is a combined embedded MIDMR, wherein the third MIDMR provides a three dimensional view of a first object MIDMR as well as an embedded three dimensional view of a second object MIDMR,
wherein the first and second MIDMRS are generated by stitching together two dimensional images, and wherein the third MIDMR is generated by combining the first and second MIDMR, and wherein the first, second, and third MIDMRs each provide a three-dimensional view of content without rendering and/or storing an actual three-dimensional model.

* * * * *